United States Patent
Esfandiarijahromi et al.

(10) Patent No.: US 12,493,200 B2
(45) Date of Patent: Dec. 9, 2025

(54) GEOMETRICALLY DEFINED SHAPES AND/OR CONTOUR OPTICAL ELEMENTS FOR OPHTHALMIC LENSES AND METHODS FOR CREATING SUCH GEOMETRICALLY DEFINED SHAPES AND/OR CONTOUR OPTICAL ELEMENTS

(71) Applicant: Brien Holden Vision Institute Limited, Sydney (AU)

(72) Inventors: Hassan Esfandiarijahromi, Campsie (AU); Arthur Back, Danville, CA (US)

(73) Assignee: Brien Holden Vision Institute Limited, Sydney (AU)

(*) Notice: Subject to any disclaimer, the term of this patent is extended or adjusted under 35 U.S.C. 154(b) by 368 days.

(21) Appl. No.: 18/012,508

(22) PCT Filed: Jun. 25, 2021

(86) PCT No.: PCT/IB2021/055686
§ 371 (c)(1),
(2) Date: Dec. 22, 2022

(87) PCT Pub. No.: WO2021/260642
PCT Pub. Date: Dec. 30, 2021

(65) Prior Publication Data
US 2023/0258958 A1    Aug. 17, 2023

Related U.S. Application Data

(60) Provisional application No. 63/092,199, filed on Oct. 15, 2020, provisional application No. 63/044,460, filed on Jun. 26, 2020.

(51) Int. Cl.
G02C 7/02 (2006.01)
G02C 7/06 (2006.01)

(52) U.S. Cl.
CPC ............. *G02C 7/028* (2013.01); *G02C 7/022* (2013.01); *G02C 7/061* (2013.01); *G02C 2202/24* (2013.01)

(58) Field of Classification Search
CPC ........ G02C 7/028; G02C 7/022; G02C 7/061; G02C 7/044; G02C 7/045; G02C 7/066; G02C 2202/24; A61F 2/1618
(Continued)

(56) References Cited

U.S. PATENT DOCUMENTS 7,052,133 B2 * 5/2006 Lindacher .............. G02C 7/044
                                                        351/159.1
8,162,476 B2 * 4/2012 Perrin ...................... G02C 7/04
                                                        351/159.41
(Continued)

FOREIGN PATENT DOCUMENTS

CN    102119354    7/2011
CN    104768499    7/2015
(Continued)

OTHER PUBLICATIONS

Supplementary European Search Report dated Oct. 18, 2024 for EP 21829807.
(Continued)

*Primary Examiner* — William R Alexander
(74) *Attorney, Agent, or Firm* — Jones Day

(57) ABSTRACT

An ophthalmic lens comprising a front surface; a back surface; and one or more geometrically defined shapes and/or contour optical elements formed by changing the curvature of at least one of the front surface of the ophthalmic lens and/or a back surface of the ophthalmic lens; wherein the one or more geometrically defined shapes and/or contour optical elements on the surface of the ophthalmic lens are formed by applying a function to one or
(Continued)

more parameters of the ophthalmic lens in a predefined region of the ophthalmic lens and in a predefined direction.

29 Claims, 53 Drawing Sheets

(58) Field of Classification Search
USPC .................................................... 351/159.01
See application file for complete search history.

(56) References Cited

U.S. PATENT DOCUMENTS

| | | | |
|---|---|---|---|
| 8,911,079 B2* | 12/2014 | Roffman | G02C 7/041 351/159.05 |
| 11,022,816 B2* | 6/2021 | Bailey | G02C 7/043 |
| 11,022,817 B2* | 6/2021 | Bailey | G02C 7/043 |
| 2004/0233382 A1* | 11/2004 | Lindacher | G02C 7/043 351/159.1 |
| 2005/0068489 A1 | 3/2005 | Hall et al. | |
| 2010/0036489 A1 | 2/2010 | Lindacher et al. | |
| 2010/0171924 A1* | 7/2010 | Perrin | G02C 7/04 351/159.06 |
| 2012/0075580 A1* | 3/2012 | Roffman | G02C 7/041 351/159.41 |
| 2013/0222761 A1 | 8/2013 | Hansen et al. | |
| 2017/0042480 A1 | 2/2017 | Gandhi et al. | |
| 2019/0328509 A1 | 10/2019 | Ishikawa | |
| 2019/0391412 A1* | 12/2019 | Bailey | G02C 7/045 |
| 2020/0073147 A1 | 3/2020 | Bakaraju et al. | |
| 2020/0150458 A1 | 5/2020 | Bakaraju et al. | |
| 2020/0393701 A1* | 12/2020 | Bailey | G02C 7/045 |

FOREIGN PATENT DOCUMENTS

| | | |
|---|---|---|
| CN | 106461969 | 2/2017 |
| CN | 110068937 | 7/2019 |
| CN | 110226118 | 9/2019 |
| CN | 110637251 | 12/2019 |
| JP | 2019-128599 | 8/2019 |
| JP | 2020-016886 | 1/2020 |

OTHER PUBLICATIONS

Examination Report dated Sep. 24, 2024 for Taiwan Patent Application No. 110123464 (with English translation).
International Search Report dated Sep. 3, 2021 for PCT/IB2021/055686.
Written Opinion of the International Searching Authority dated Sep. 3, 2021 for PCT/IB2021/055686.
Office Action for corresponding Chinese Application 202180050275.4 dated Apr. 11, 2025, with English Translation.

* cited by examiner

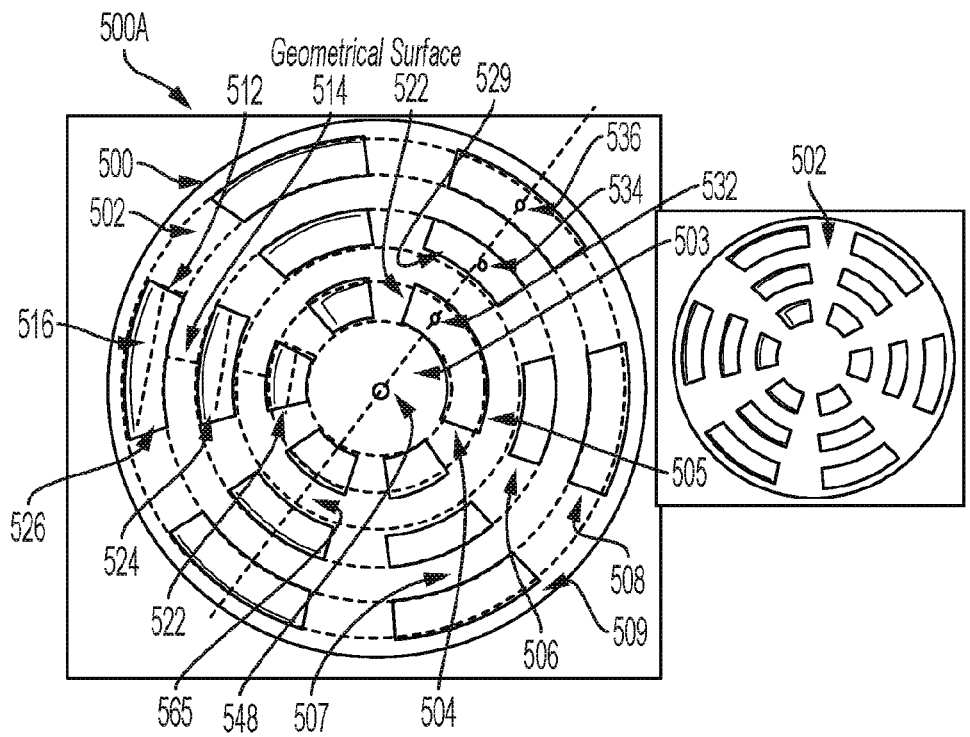
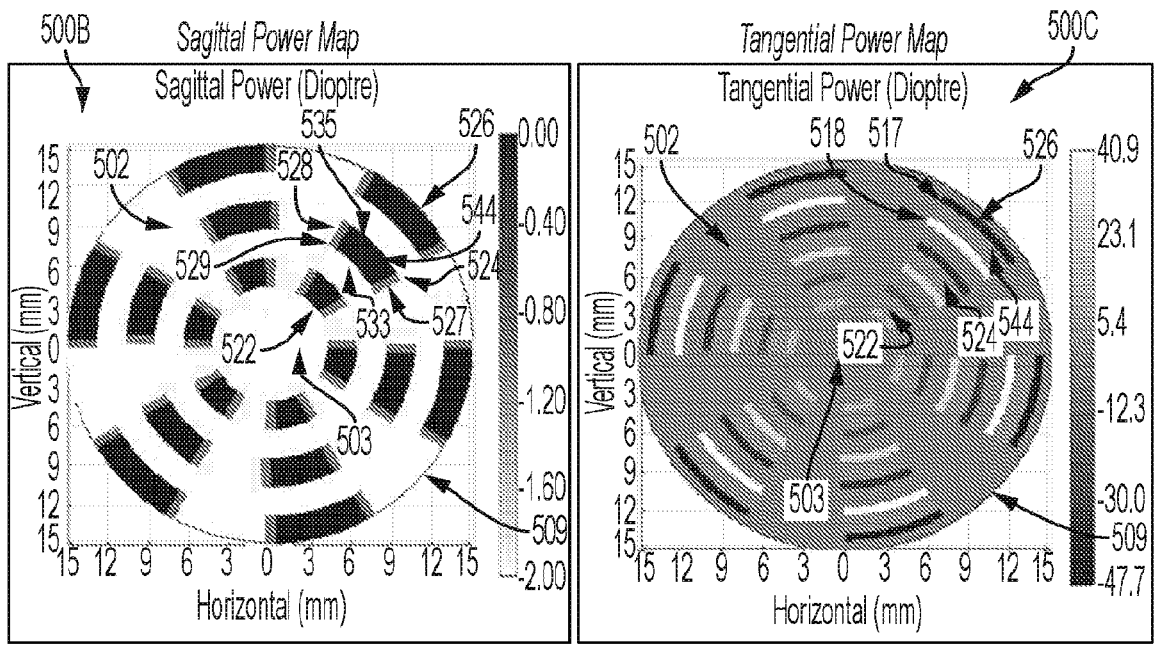
FIG. 5

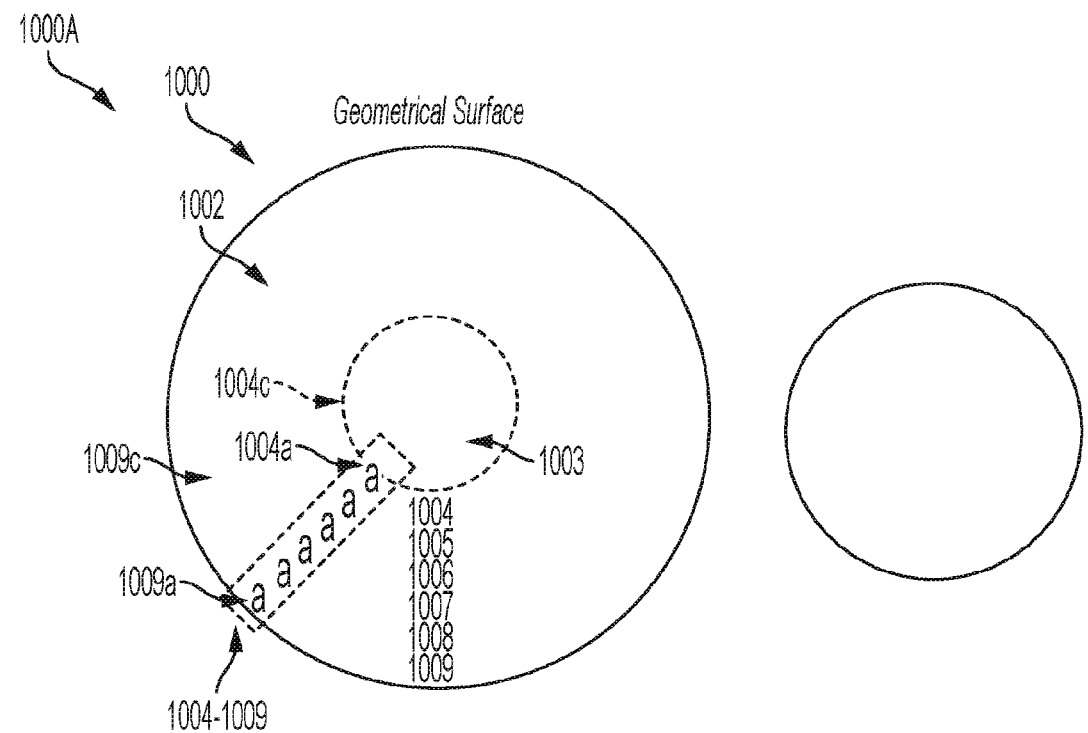
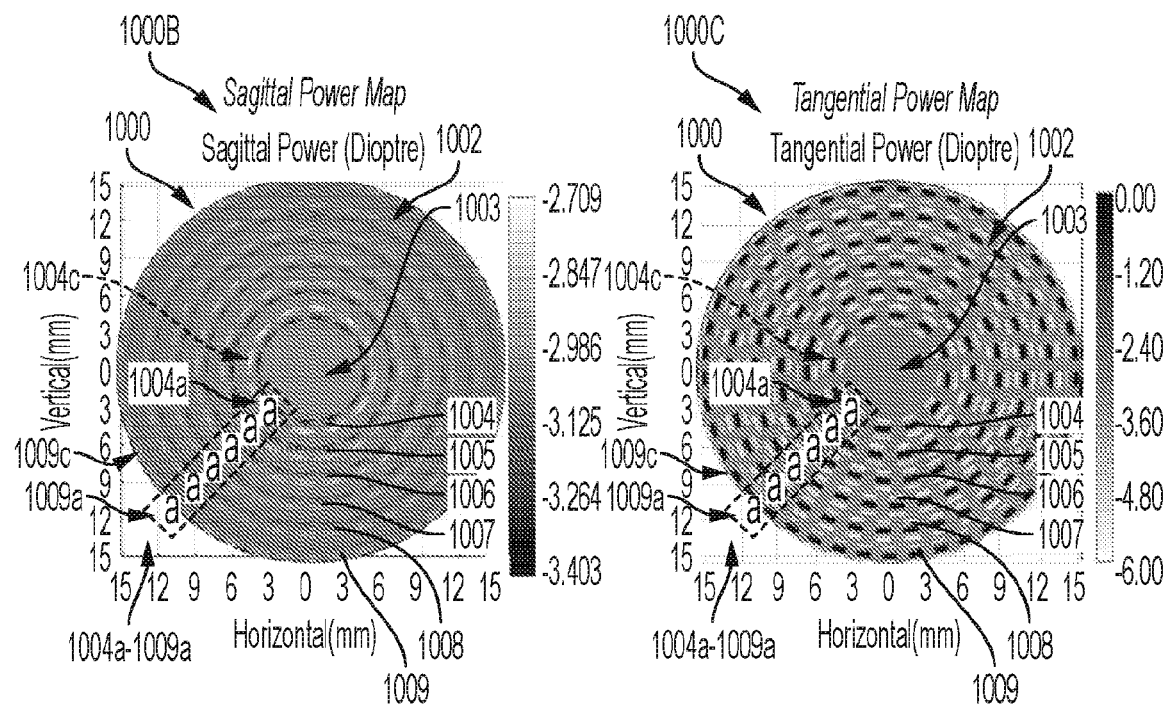
FIG. 10C

Modulating geometric parameter Surface Roughness effecting light scatter properties.

Modulating non geometric parameter Density Mask effecting light transmittance properties.

Modulating geometric parameter, surface step to change the light phase value affecting diffraction properties.

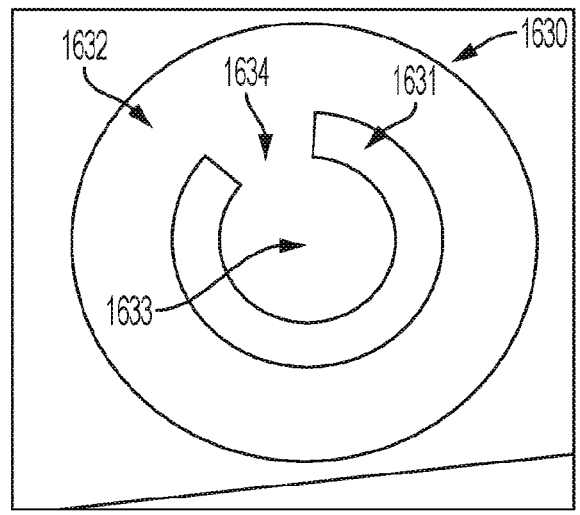

FIG. 16D
Modulating geometric parameter radius of curvature using a high period value (T value) square wave as the modulating function.

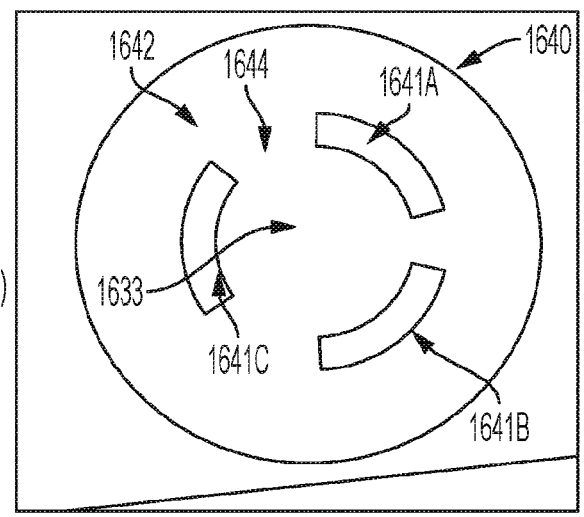

FIG. 16E
Modulating geometric parameter radius of curvature using a high period value (T value) square wave as the modulating function, similar to the FIG.16D, but the regions are conditioned angularly to create discontinuity along the modulating region.

GEOMETRICALLY DEFINED SHAPES AND/OR CONTOUR OPTICAL ELEMENTS FOR OPHTHALMIC LENSES AND METHODS FOR CREATING SUCH GEOMETRICALLY DEFINED SHAPES AND/OR CONTOUR OPTICAL ELEMENTS

CROSS REFERENCE TO RELATED APPLICATIONS

This application is the National Phase application of International Application No. PCT/IB2021/055686, filed Jun. 25, 2021, which claims priority to U.S. Provisional Application No. 63/044,460, filed Jun. 26, 2020; International Application No. PCT/IB2020/057863, filed Aug. 21, 2020; and U.S. Provisional Application No. 63/092,199, filed Oct. 15, 2020. Each of these priority applications are herein incorporated by reference in their entirety.

This disclosure is related to International Application No. PCT/AU2017/051173, filed Oct. 25, 2017, which claims priority to U.S. Provisional Application No. 62/412,507, filed on Oct. 25, 2016; and International Application No. PCT/AU2020/056079, filed Jun. 26, 2020, which claims priority to U.S. Provisional Application No. 62/868,348, filed Jun. 28, 2019 and U.S. Provisional Application No. 62/896,920, filed Sep. 6, 2019. Each of these related applications are herein incorporated by reference in their entirety.

TECHNICAL FIELD

This disclosure relates to ophthalmic lenses and/or refractive surgery systems. More particularly, this disclosure is related to ophthalmic lenses comprising one or more geometrically defined shapes and/or contour optical elements and associated methods for forming the one or more geometrically defined shapes and/or contour optical elements.

BACKGROUND

The discussion of the background in this disclosure is included to explain the context of the disclosed embodiments. This is not to be taken as an admission that the material referred to was published, known or part of the common general knowledge at the priority date of the embodiments and claims presented in this disclosure.

The optics of an eye determines whether an image is focused on the retina of an eye. Images that are focused on the retina of an eye are typically perceived as being in focus. Images that are not focused on the retina of an eye (e.g., either in front of or behind the retina) are typically perceived as being blurred with reduced image quality. Myopia, commonly referred to as shortsightedness, is an optical disorder of the eye and results in on-axis images being focused in front of the retina. On-axis images are those that are substantially in line with the fovea or foveal region of the retina; the region that is capable of the highest visual acuity. Presbyopia, is an optical disorder of the eye wherein the ability of the crystalline lens to accommodate is reduced resulting in blurred vision for distances close to the eye.

Ophthalmic lenses may be designed to correct, slow, reduce, and/or control the progression of an optical disorder. There are a number of strategies that are designed to address optical disorders. Incorporation of one or more optical elements that create positive and/or negative defocus, focus, or redirection of light in a predefined direction (e.g., symmetrically, asymmetrically, and/or aberrated) may modify the retinal image quality and assist with addressing optical disorders.

Accordingly, there is a need to provide ophthalmic lenses with geometrically defined shapes and/or contour optical elements for correcting, slowing, reducing, and/or controlling the progression of an optical disorder (e.g., myopia or presbyopia). The present disclosure is directed to solving these and other problems disclosed herein. The present disclosure is also directed to pointing out one or more advantages to using exemplary ophthalmic lenses and methods described herein.

SUMMARY

The present disclosure is directed to overcoming and/or ameliorating one or more of the problems described herein.

The present disclosure is directed, at least in part, to ophthalmic lenses and/or methods for correcting, slowing, reducing, and/or controlling the progression of myopia.

The present disclosure is directed, at least in part, to ophthalmic lenses and/or methods for correcting or substantially correcting presbyopia.

The present disclosure is directed, at least in part, to ophthalmic lenses and/or methods for utilizing one or more of geometrically defined shapes and/or contour optical elements for correcting, slowing, reducing, and/or controlling the progression of an optical disorder (e.g., myopia or presbyopia) by creating positive or negative defocus, focus, and/or redirection of light in a predefined direction (e.g., symmetrically, asymmetrically, and/or aberrated).

The present disclosure is directed, at least in part, to ophthalmic lenses and/or methods that utilize one or more of geometrically defined shapes and/or contour optical elements on the surface of the ophthalmic lens formed by changing (e.g., gradually changing) the curvature of the surface of the ophthalmic lens.

The present disclosure is directed, at least in part, to ophthalmic lenses comprising one or more of geometrically defined shapes and/or contour optical elements on the surface of the ophthalmic lens formed by either the intersection of a flat plane or applying a modulating function to one or more parameters of the ophthalmic lens geometry and/or properties in a predefined region of the lens and in a predefined direction. The process of application of the modulating function to the ophthalmic lens geometry and/or property results in the modulation of the selected parameter.

In some embodiments, the modulation function may originate from any combination of one or more types of mathematical functions (e.g., logarithmic, sinusoidal, conic, polynomial or any pre-defined surface pattern). For example, in the case of using a periodic mathematical function, the resulting plurality of geometrically defined shapes and/or contour optical elements may be periodic relative to one another.

In some embodiments, the one or more parameters of the ophthalmic lens may comprise geometrical and/or non-geometrical parameters. For example, the target of the design may be the optical power in a predefined direction, including sagittal and/or tangential and/or the optical modulation transfer function (MTF) and/or a light scattering property. Examples of geometric parameters may include the radius of curvature (across any location and/or region of the geometry), radial and/or axial thickness, center coordinates of the radius of curvature of the geometrically defined shapes and/or contour optical elements geometries. Non-geometrical parameters may include, for example, refractive index.

In some embodiments, the predefined region of the ophthalmic lens may comprise the entire surface of one or more surfaces of the lens or a portion of one or more surfaces of the lens.

In some embodiments, the predefined direction for application of the modulating function may comprise any spatial direction of the lens (e.g., any combination of one or more of radial, angular, arithmetic spiral, diagonal, sinusoidal).

In some embodiments, the function may be continuous in the predefined direction.

In some embodiments, the function may be a definition of a lens surface or portion of a lens surface.

In some embodiments, the plurality of geometrically defined shapes and/or contour optical elements may have any shape, form, or optical configuration.

In some embodiments, the plurality of geometrically defined shapes and/or contour optical elements may be distributed in any direction (e.g., radial, circumferential, horizontal, vertical, diagonal, spiral, or any combination of these directions).

In some embodiments, the plurality of geometrically defined shapes and/or contour optical elements may have any combination of powers.

In some embodiments, the one or more of geometrically defined shapes and/or contour optical elements may be configured to create any combination of one or more of defocus, prism, light scattering, diffraction, diffusion, dispersion, aberrations, light deviations or a combination thereof.

In some embodiments, individual geometrically defined shapes and/or contour optical elements may be configured to create and combination of one or more of defocus, prism, light scattering, diffraction, diffusion, dispersion, aberrations, deviations, contrast modulation or a combination thereof. For example, a single optical element (or plurality of geometrically defined shapes and/or contour optical elements) may be configured to provide scattering, defocus, and focus of light.

In some embodiments, the one or more of geometrically defined shapes and/or contour optical elements may be configured to be somewhat inconspicuous (e.g., not be readily visible) by adjusting and/or optimizing certain parameters of the geometrically defined shapes and/or contour optical elements.

In some embodiments, the ophthalmic lens comprising the one or more of geometrically defined shapes and/or contour optical elements on the surface of the ophthalmic lens may be manufactured using CNC machining or free-form manufacturing techniques or molding (e.g., in whole or in part) techniques.

In some embodiments, the ophthalmic lens may be a spectacle lens, contact lens, a lens wafer, an optical film, or an anterior chamber or a posterior chamber intraocular lens.

The present disclosure is directed, at least in part, to ophthalmic lenses comprising a front surface; a back surface; and one or more geometrically defined shapes and/or contour optical elements formed on one or more surfaces of the ophthalmic lens; wherein the one or more geometrically defined shapes and/or contour elements on the surface of the ophthalmic lens is/are formed by applying one or more modulating functions to one or more parameters of the ophthalmic lens geometry and/or property; wherein the one or more geometrically defined shapes and/or contour elements is formed in a predefined region (e.g., anywhere on the front and/or back surface of the ophthalmic lens) of the ophthalmic lens and in a predefined direction (e.g., a ring shape, a spiral shape, and/or a non-annular shape).

The present disclosure is directed, at least in part, to methods for forming one or more geometrically defined shapes and/or contour optical elements on a surface of an ophthalmic lens comprising: defining a modulating function to modify one or more parameters of the ophthalmic lens surface geometry and/or lens property in a predefined region (e.g., anywhere on the front and/or back surface of the ophthalmic lens) of the ophthalmic lens and in a predefined direction (e.g., a ring shape, a spiral shape, and/or a non-annular shape); and forming the one or more geometrically defined shapes and/or contour optical elements by applying the modulating function to the one or more parameters surface geometry and/or lens property of the ophthalmic lens to change the curvature of at least one of a front surface of the ophthalmic lens and/or a back surface of the ophthalmic lens.

In some embodiments, the ophthalmic lens may comprise a plurality of geometrically defined shapes and/or contour optical elements.

In some embodiments, the one or more geometrically defined shapes and/or contour optical elements may comprise a power profile that varies in the predefined direction and/or a direction perpendicular to the predefined direction.

In some embodiments, the one or more geometrically defined shapes and/or contour optical elements may comprise a power profile that may increase or may decrease at the edge of the geometrically defined shape and/or contour optical element in the predefined direction.

In some embodiments, the one or more geometrically defined shapes and/or contour optical elements may comprise a power profile that may increase or may decrease in a direction perpendicular to the predefined direction.

In some embodiments, the size of the geometrically defined shapes and/or contour optical elements may increase, decrease, and/or remain the same in a direction extending radially from a center of the ophthalmic lens.

In some embodiments, the modulating function may be applied to the one or more parameters surface geometry and/or lens property of the back and/or front surface or both of the ophthalmic lens to create one or more depressions, facets, grooves or lines corresponding to the one or more geometrically defined shapes and/or contour optical elements.

In some embodiments, the modulating function may be applied to the one or more parameters surface geometry and/or lens property of the back and/or front surface or both of the ophthalmic lens to create one or more elevations, ridges or lines corresponding to the one or more geometrically defined shapes and/or contour optical elements.

In some embodiments, the one or more geometrically defined shapes and/or contour optical elements may be configured to correct, slow, reduce, and/or control the progression of an optical disorder (e.g., myopia, hyperopia, astigmatism and/or presbyopia).

In some embodiments, the one or more geometrically defined shapes and/or contour optical elements may be configured to create any combination of one or more of positive defocus, negative defocus, focus, deviation, dispersion and/or redirection of light in a predefined direction (e.g., symmetrically, asymmetrically, aberrated in at least one direction, single focus, and/or multi foci).

In some embodiments, the modulating function may be created by any combination of one or more mathematical functions, including, for example, a sign function, a logarithmic function, a sinusoidal function, a conic function, a polynomial function and/or any pre-defined mathematical function.

In some embodiments, the function modulating may be a periodic function and the resulting one or more geometrically defined shapes and/or contour optical elements are periodic relative to one another.

In some embodiments, the modulating function may be created by a mathematical combination (e.g., the product) of a sinusoidal function with a first frequency and a square function with a second frequency.

In some embodiments, the modulating function may be created by a mathematical combination (e.g., the product) of a sinusoidal function with a first frequency and a square function with a second frequency for defining the number of geometrically defined shapes and/or contour optical elements in the predefined region.

In some embodiments, the one or more parameters of the ophthalmic lens may comprise any combination of one or more of geometrical and/or non-geometrical parameters.

In some embodiments, the surface geometry and/or lens property of the ophthalmic lens may include any combination of one or more of an optical power in a predefined direction (e.g., sagittal and/or tangential and/or the optical modulation transform function (MTF) and/or a light scattering function) and/or prism power and/or prism directions. In some embodiments, the one or more parameters of the surface geometry and/or lens property of the ophthalmic lens may include the radius of curvature (across any location and/or region of the geometry); radial and/or axial thickness; center coordinates of the radius of curvature, surface thickness and/or refractive index.

In some embodiments, the predefined region may comprise the entire surface of the lens or a region of the ophthalmic lens.

In some embodiments, the predefined region may comprise a portion of the ophthalmic lens defined by an inner radius and an outer edge extending to the outer edge of the ophthalmic lens.

In some embodiments, the predefined region may comprise a ring on one or more surfaces the ophthalmic lens defined by an inner radius and an outer radius.

In some embodiments, the predefined region may comprise a plurality of concentric rings on one or more surfaces of the ophthalmic lens defined by an inner radius and a corresponding outer radius.

In some embodiments, the predefined region may comprise a ring defined by an inner radius and a corresponding outer radius and the predefined region comprises 1, 2, 3, 4, 5, 6, 7, 8, 9, 10, 11, 12, 13, 14, 15, 16, 17, 18, 19, 20, 21, 22, 23, 24, or 25 geometrically defined shapes and/or contour optical elements.

In some embodiments, the ophthalmic lens may comprise at least two predefined regions defined by concentric rings with the same (or different) number of geometrically defined shapes and/or contour optical elements in the at least two (e.g., 2, 3, 4, 5, 6, 7, 8, 9, or 10) concentric rings, wherein the location of the geometrically defined shapes and/or contour optical elements in one ring is in-phase (or out of phase) with the geometrically defined shapes and/or contour optical elements in the other ring.

In some embodiments, the predefined direction may comprise any combination of one or more spatial directions of the ophthalmic lens (e.g., any combination of one or more of a radial, angular, arithmetic spiral, diagonal, and/or sinusoidal direction).

In some embodiments, the predefined direction may comprise any combination of a radial direction, non-radial, angular, and/or non-angular (e.g., linear) direction.

In some embodiments, the modulating function may be continuous in the predefined direction.

In some embodiments, the pre-modulated surface geometry that defines the lens surface shape may be a definition of an ophthalmic lens surface or portion of an ophthalmic lens surface.

In some embodiments, the modulating function may be selected to define any combination of one or more of a shape, form, power, configuration, quantity, and/or location of the one or more geometrically defined shapes and/or contour optical elements.

In some embodiments, the one or more geometrically defined shapes and/or contour optical elements may be distributed in any combination of one or more of a radial direction, a non-radial direction, an angular direction, a non-angular (e.g., linear) direction, a circumferential direction, a horizontal direction, a vertical direction, a diagonal direction, and/or a spiral direction or in a linear form, triangular, square, circular, semi-circular, arcuate, radial, spoke-like or any other desired form or shape or combinations thereof.

In some embodiments, the one or more geometrically defined shapes and/or contour optical elements may have any combination of power profiles.

In some embodiments, the one or more geometrically defined shapes and/or contour optical elements may be configured to create any combination of one or more optical effects of defocus, prism, light scattering, diffraction, diffusion, dispersion, aberrations, deviations and contrast and light amplitude modulation.

In some embodiments, any one of the one or more geometrically defined shapes and/or contour optical elements may be configured to create any combination of one or more optical effects of light scattering, diffraction, and/or diffusion and with or without a power profile and/or a light amplitude modulation (e.g., reduced transparency, different refractive index).

In some embodiments, the one or more geometrically defined shapes and/or contour optical elements may be configured to be somewhat or substantially inconspicuous (e.g., not be readily visible) by adjusting and/or optimizing certain parameters of the geometrically defined shapes and/or contour optical elements.

In some embodiments, the one or more geometrically defined shapes and/or contour optical elements may be part/parts of one or more spatial flat planes.

In some embodiments, the one or more geometrically defined shapes and/or contour optical elements may be created by the intersection of a flat plane with the back or front or both surfaces of the ophthalmic lens.

In some embodiments, the ophthalmic lens comprising the one or more geometrically defined shapes and/or contour optical elements may be manufactured using CNC machining, free-form manufacturing techniques, molding, three-dimensional printing techniques, lasers (e.g., femtosecond lasers), and/or other suitable techniques.

In some embodiments, the ophthalmic lens may be one of a lens wafer, an optical film, or an anterior chamber or a posterior chamber intraocular lens.

In some embodiments, the ophthalmic lens may be configured to correct, slow, reduce, and/or control the progression of myopia, hyperopia and/or astigmatism.

In some embodiments, the ophthalmic lens may be configured to correct or substantially correct for presbyopia.

Other features and advantages of the subject matter described herein will be apparent from the description and drawings, and from the claims.

BRIEF DESCRIPTION OF THE DRAWINGS

Aspects of the embodiments described herein may be understood from the following detailed description when read with the accompanying figures.

FIG. 2A, 2B, 2C, 2D, 2E, 2F, 2G, 2H, 2I, 2J, and 2K illustrate an exemplary embodiment of an ophthalmic lens comprising a plurality of geometrically defined shapes and/or contour optical elements on the surface of the ophthalmic lens as described herein.

FIG. 5 illustrates an exemplary embodiment of an ophthalmic lens comprising a plurality of geometrically defined shapes and/or contour optical elements on the surface of the ophthalmic lens as described herein.

FIGS. 10A, 10B, and 10C illustrates an exemplary embodiment of an ophthalmic lens comprising a plurality of geometrically defined shapes and/or contour optical elements on the surface of the ophthalmic lens as described herein.

FIG. 2I illustrates the process in which a plane intersects the base geometry and creates a spatially-flat surface i.e. facet.

DETAILED DESCRIPTION

Figure 1A:
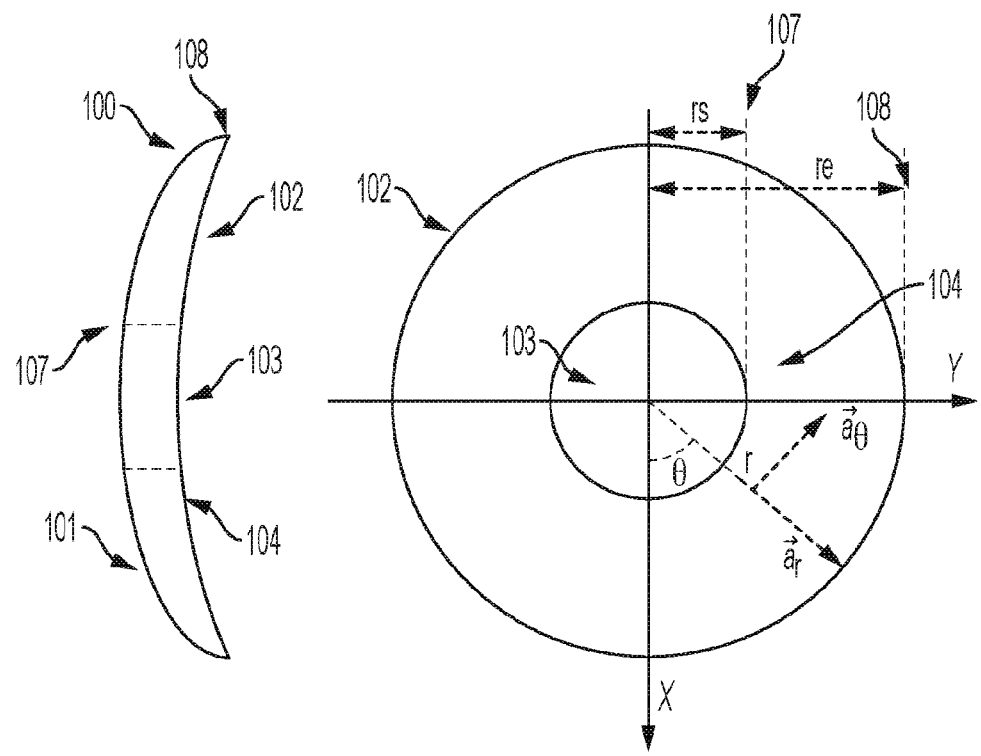
FIG. 1A, 1B, 1C, 1D and 1E illustrate an exemplary embodiment of an ophthalmic lens comprising a back surface with an optical power defined by a first surface geometry equation.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The subject headings used in the detailed description are included for the ease of reference of the reader and should not be used to limit the subject matter found throughout the disclosure or the claims. The subject headings should not be used in construing the scope of the claims or the claim limitations.

The terms "about" as used in this disclosure is to be understood to be interchangeable with the term approximate or approximately.

The term "comprise" and its derivatives (e.g., comprises, comprising) as used in this disclosure is to be taken to be inclusive of features to which it refers, and is not meant to exclude the presence of additional features unless otherwise stated or implied.

The term "myopia" or "myopic" as used in this disclosure is intended to refer to an eye that is already myopic, is pre myopic, or has a refractive condition that is progressing towards myopia.

The term "hyperopia" or "hyperopic" as used in this disclosure is intended to refer to an eye that is already hyperopic, is pre-hyperopic or has a refractive condition that is progressing towards hyperopia.

The term "astigmatism" or "astigmatic" as used in this disclosure is intended to refer to an eye that is already astigmatic, is astigmatic or has a refractive condition that is progressing towards astigmatism.

The term "presbyopia" or "presbyopic" as used in this disclosure is intended to refer to an eye that is has a diminished ability to focus on intermediate and near objects.

The term "ophthalmic lens" as used in this disclosure is intended to include one or more of a spectacle lens or a contact lens or an intraocular lens (e.g., an anterior or posterior chamber intraocular lens).

The term "spectacle lens" as used in this disclosure is intended to include a lens blank, a finished or substantially finished spectacle lens.

The term "geometrically defined shape and/or contour optical element" as used in this disclosure refers to a region or area or zone or section or portion or segment in (e.g., in the lens matrix) or on the modulated lens and/or the lens surface wherein one or more parameter(s) of the surface geometry and/or non-geometrical property that defines the lens surface shape and/or lens properties in this region or area or zone or section or portion or segment in or on the lens and/or the surface is/are modified via the use of a mathematical function (e.g., a modulating function) to result in a different or altered (e.g., continuously or gradually) or varied or modified geometry and/or optical property and/or an optical effect compared to the base lens and/or base surface that is either unmodulated or pre-modulated (e.g., previously modulated). A "geometrically defined shape and/or contour optical element" may also be created in a region or area or zone or section or portion or segment in or on the lens and/or the surface by the intersection of one or more spatial planes with the base lens and/or base surface that is either unmodulated or pre-modulated (e.g., previously modulated) and is referred to as a spatially flat "geometrically defined shape and/or contour optical element".

The term "modulating function" as used in this disclosure is a mathematical formula or function with a defined form and finite range of output used to alter, modify, and/or adjust one or more components (or parameters) of the surface geometry and/or non-geometrical properties that define the lens surface shape and/or lens properties of the ophthalmic lens applied on a region of the lens and in a direction. The modulating function may be applied to a starting surface geometry and/or lens property that defines the lens surface shape and/or lens properties at one or more regions of the ophthalmic lens or the surface to generate the geometrically defined shape and/or contour optical element to create a substantially different or altered (continuously or gradually) or varied or modified geometry and/or optical property or an optical effect that is different relative to the base lens or the surface that is either unmodulated or pre-modulated (e.g., previously modulated).

The term "direction" refers to a direction along which the modulating function is applied and may be e.g., angular, radial, vertical, horizontal, zig zag, sinusoidal, spiral, random, quasi-random, concentric, curved, straight, vortex, helical or a combination of one or more directions from any point on the ophthalmic lens.

The term "region" is any portion or part or a section or a segment or a zone of the ophthalmic lens, matrix of the ophthalmic lens and/or surface of the ophthalmic lens that is described spatially.

The term "modulating range" as used in this disclosure is a range defining a starting point or value of a given parameter of the surface geometry and/or non-geometrical property that defines the lens surface shape and/or lens properties of the base lens or the unmodulated surface and the final point or value of that given parameter, within which the parameter may be modulated and modified.

The term "surface" as used in this disclosure may refer to the front or rear surface of the ophthalmic lens or base lens or the layer or surface of an eye of a living being.

The term "prismlet" refers to the effect of at least a portion of an ophthalmic lens or a geometrically defined shape and/or contour optical element, where the light rays passing through the at least a portion of the lens and/or shape and/or element may or may not diverge or converge and may also deviate Lom the optical path.

The present disclosure is related to methods and designs for ophthalmic lenses and refractive surgery including one or more geometrically defined shape and/or contour optical elements formed on a surface of an ophthalmic lens or the ocular surface to manage, treat or control refractive errors of the eye such as presbyopia and/or myopia and/or hyperopia and/or astigmatism. For eyes with myopia, use of an optical lens with relatively uniform lens power has not been found to slow myopia. In such eyes, an optical lens or a surface that has a variable or a non-uniform optical surface/s or features may be able slow or reduce or arrest the onset and progression of myopia. Similarly, in hyperopic eyes, an optical lens or a surface that has a variable or a non-uniform optical surface/s or features may be able to reduce or arrest the onset and progression of hyperopia. For eyes with presbyopia, use of an optical lens with relatively uniform lens power may provide good or acceptable vision to only certain distances. For such eyes, an optical lens that has a variable or a non-uniform optical surface/s may be able to provide good or acceptable vision to far, intermediate and/or near distances. For some eyes, an optical lens that has multiple geometrically defined shape and/or contour optical elements may be able to provide good or acceptable vision at far, intermediate and/or near distances. In some embodiments, the ophthalmic lens comprising one or more geometrically defined shapes and/or contour optical elements may be a spectacle lens, contact lens, an optical film and/or anterior or a posterior chamber intraocular lens. In some embodiments, the surface comprising one or more geometrically defined shape and/or contour optical elements may be the surface of an ophthalmic lens or involving the layer of the eye of a living being. The geometrically defined shape and/or contour optical elements on the surface of the ophthalmic lens or the surface of the eye may be formed by altering/modifying or adjusting the one or more parameters of the surface. In some embodiments, the geometrically defined shape and/or contour optical element may be formed by one or more modulating functions (e.g., mathematical functions) applied to one or more parameters of the surface geometry and/or non-geometrical property that defines the lens surface shape and/or lens properties of the ophthalmic lens in a predefined region of the lens and/or the surface and in a predefined direction. In some embodiments, the application of the modulating function to the one or more parameters of the surface geometry and/or non-geometrical property that defines the lens surface shape and/or lens properties of the ophthalmic lens may result in a geometrically-continuous surface in the selected direction of the optical element (e.g., modulation of the selected parameter).

In some embodiments, the modulating function may originate from any combination of one or more types of mathematical functions (e.g., logarithmic, sinusoidal, conic, polynomial or any pre-defined mathematical function). For example, in the case of using a periodic function, the resulting geometrically defined shapes and/or contour optical elements may be periodic relative to one another. In some embodiments, the resulting geometrically defined shapes and/or contour optical elements may be aperiodic relative to one another, may be monotonic, may be non-monotonic or a combination thereof.

In some embodiments, the one or more parameters or components of the lens or lens surface or ocular surface may comprise geometrical and/or non-geometrical parameters that are modulated to result in a desired geometrically defined shape and/or contour optical element that results in a desired optical effect. For example, the desired optical effect may be the optical power in a predefined direction, including sagittal and/or tangential and/or the optical modulation transfer function (MTF) and/or a light scattering function. Examples of geometric parameters may include the radius of curvature (across any location and/or region of the geometry), radial and/or axial thickness, center coordinates of the optical elements geometries, and/or optical axes angle and direction. Non-geometrical parameters may include, for example, refractive index.

For example, the optical property of an ophthalmic lens or an ocular surface along a spatial vector, may be referred to as a function $f$, and function $f$ may not be a scalar, but may be a vector that is a dependent of one or more variables including e.g., geometrical and non-geometrical parameters. For example, function $f$ may be a profile map that describes the optical power of a lens along any spatial direction (i.e. sagittal and tangential). In some embodiments, function $f$ may be an optical modulation transfer function (MTF), or it may be a function to induce or vary or alter or modify defocus, prism, light scattering, diffraction, diffusion, dispersion, aberrations, deviations and contrast modulation. In general, the function $f$ may be described as:

$$f(p_1, p_2, p_3, \ldots, p_i, \ldots p_n)$$

where $p_1, p_2, p_3, \ldots, p_i, \ldots p_n$ are the parameters or variables contributing to different values for f.

In some embodiments, the function $f$ may be defined using cartesian, cylindrical, and/or spherical coordinates. In some embodiments, the function $f$ may be continuous along the direction of creation of the geometrically defined shape and/or contoured optical elements.

In some embodiments, the predefined region where the modulating function is applied may comprise substantially the entire surface of the lens or a portion of the lens (e.g., a ring or plurality of rings on the surface of the lens). In some embodiments, the predefined region where the modulating function is applied may comprise the front surface or the back surface or both.

In some embodiments, the predefined direction in which the modulating function is applied may comprise any spatial direction of the lens (e.g., any combination of one or more of radial, angular, arithmetic spiral, diagonal, sinusoidal).

In some embodiments, the modulating function may be continuous in the predefined direction.

In some embodiments, the one or more geometrically defined shapes and/or contour optical elements may have any size, shape, form, contour, or optical configuration. In some embodiments, the plurality of geometrically defined shapes and/or contour optical elements may be distributed in any direction (e.g., radial, circumferential, horizontal, vertical, diagonal, spiral, or any combination of these directions).

In some embodiments, the one or more geometrically defined shapes and/or contour optical elements may have any combination of powers. In some embodiments, the plurality of geometrically defined shapes and/or contour optical elements may be configured to create any combination of one or more optical effects of positive or negative defocus, zero defocus, prism, light scattering, diffraction, diffusion, dispersion, aberrations, deviations and contrast and amplitude modulation. For example, a single geometrically defined shapes and/or contour optical elements (or plurality of geometrically defined shapes and/or contour optical elements) may be configured to provide one or more of positive or negative defocus, zero defocus, prism, light scattering, diffraction, diffusion, dispersion, aberrations, deviations, contrast and light amplitude modulation.

In some embodiments, the plurality of geometrically defined shapes and/or contour optical elements may be configured to be inconspicuous (e.g., not be readily visible)

by adjusting and/or optimizing certain parameters of the surface geometry and/or non-geometrical property that defines the lens surface shape and/or lens properties.

In some embodiments, the ophthalmic lens comprising the plurality of geometrically defined shapes and/or contour optical elements on the surface or in the matrix of the ophthalmic lens may be manufactured directly on a lens or on a lens precursor or a film or a layer to be used as part of a lens system using CNC machining or free-form manufacturing techniques molding e.g., cast molding or injection molding or laser based process e.g., femtosecond or any other wavelength or carbon dioxide process that removes material or stamping or embossing processes or alter material properties or microblasting processes or lithographic techniques or printing processes e.g., inkjet or 3D printing and/or printing processes using an ink or polymer curing or evaporative or drying steps or coating processes e.g., vacuum or spin process or other suitable techniques.

In some embodiments, the plurality of geometrically defined shapes and/or contour optical elements on one or more layers of the eye of a person or individual may be produced using refractive surgical procedures.

As used throughout this description, the description of "modulation" refers to a process of applying the modulating function on the parameter in the defined region along the desired direction. For example, the parameter of the surface geometry and/or non-geometrical property that defines the lens surface shape and/or lens properties, to which the modulating function may be applied, may be the refractive index of the lens or be a density of a light transmittance mask; this may be defined as the non-geometric property parameter (rather than a geometry parameter) that defines a lens property e.g., material of the ophthalmic lens. When the modulating function is applied to this parameter, for example a laser energy level or a time of exposure to a laser energy or a speed of travel of a print head or a printed layer thickness, it may alter/modify/vary the parameter to create or result in a geometrically defined shape and/or contour element and an optical effect on the lens. Other such parameters may be one or more of radius of curvature, the coordinate location of the radius of curvature that may have an optical effect of lateral separation of optical axes, refractive index, etc. The modulating value range refers to the range that may be desired to change or alter or vary the parameter of the lens. For example, if it may be desirable to change the radius of curvature of an ophthalmic lens that is about 200 mm, to about 150 mm to 220 mm, and therefore the range for the change in curvature may be about −50 to +20. In some embodiments, the modulating function may be a mathematical function with a defined form and finite range of input, that is applied to one or more parameters of the surface geometry and/or non-geometrical property that defines the lens surface shape and/or lens properties ophthalmic lens or surface(s) to create one or more geometrically defined shape and/or contour elements leading to varied/altered/modified optical effects on the lens. The modulated surface geometry/property is the final geometry/property after the process of applying the modulating function is complete.

Figure 1B:
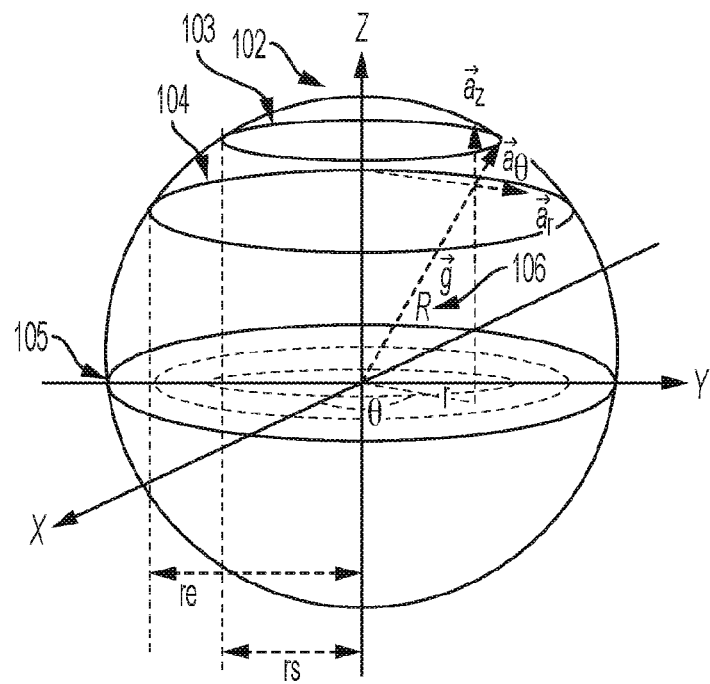

FIG. 1A, illustrates a cross-sectional and plan view of an exemplary embodiment of an ophthalmic lens 100 comprising a base lens having a front surface 101, a back surface 102, a center zone 103 and peripheral regions 104 with region 104 formed by a surface modulation process designed to incorporate a geometrically defined shape and/or contour optical element on a surface (e.g., a back surface 102) of the ophthalmic lens 101. FIG. 1B shows a three-dimensional view of the back surface 102 of the ophthalmic lens 100. The center zone 103 and the peripheral regions 104 (e.g., pre-modulated starting surface without any geometrically defined shape and/or optical contour element) combine with the front surface 101, the lens thickness and refractive index to form a base power of the lens 100 of −2D. The spherical base surface of region 104, targeted for modulation, may have a starting geometric function (e.g., surface geometry and/or non-geometrical property that defines the lens surface shape and/or lens properties) defined relative to the spherical surface 105 using e.g., a cylindrical coordinate system. Therefore, the starting surface geometry (e.g., for the back surface 102) may be defined as:

$$\vec{g}(r, \theta, z) = (r*\vec{a}_r) + \left(\sqrt{R^2 - r^2} *\vec{a}_z\right), r = 0 \text{ to } re$$

where $\vec{a}_r$, $\vec{a}_z$ and $\vec{a}_\theta$ are the unity vectors of the related parameters r, z and $\theta$ respectively as shown in FIG. 1B.

In some embodiments, the front surface of the ophthalmic lens may be defined by the starting surface geometry (the surface geometry and/or non-geometrical property that defines the lens surface shape and/or lens properties). In some embodiments, both the front and back surfaces of the ophthalmic lens may be each defined by a starting surface geometry.

Figure 1C:
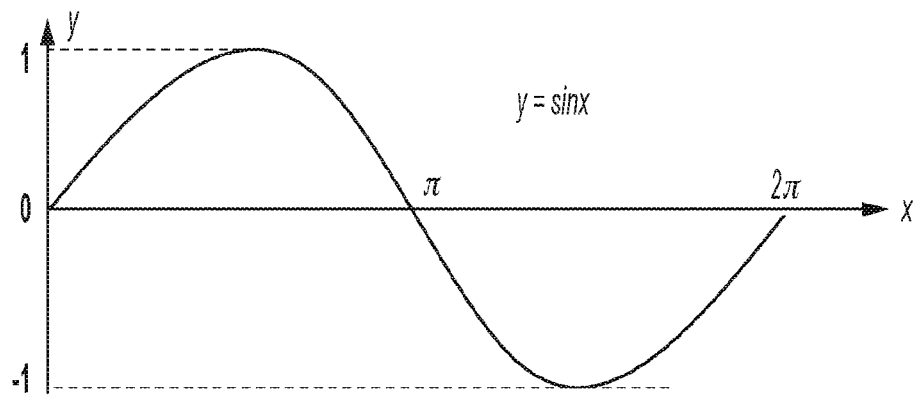
Figure 1D:
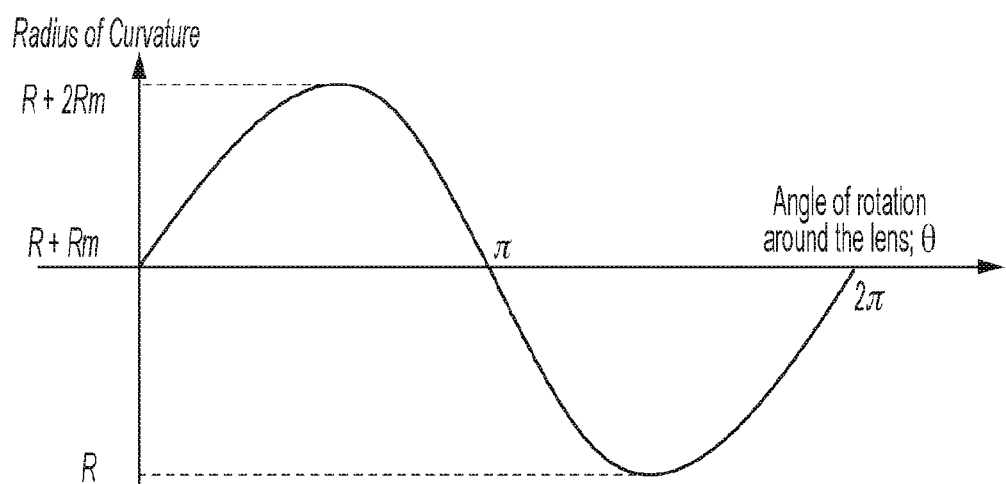

In the described embodiment, as shown in FIGS. 1A, 1B, 1C and 1D, the parameter of starting surface geometry of the geometrically spherical lens 100 modulated by the modulating function is the radius of curvature R 106 (see e.g., FIG. 1B). The region 104 of the ophthalmic lens upon which the "modulating function" is applied is defined as having an inner radius 107 equal to rs (e.g., rs=about 4 mm (from the center of the lens)) to an outer radius 108 equal to re (e.g. re=about 15 mm from the lens center) and the "modulation range" in this example may be defined as 0 to +2Rm, (where 0 indicates the unmodulated surface, and 2Rm is the maximum value to be added to the radius of curvature R; see e.g., FIG. 1D). As illustrated, the direction of application of the "modulating function" is perpendicular to the radial line from the center of the lens at any point (e.g., $\vec{a}_\theta$). Stated differently, the direction of modulation is the direction of vector $\vec{a}_\theta$ (e.g., R@r=rs to re, $\theta$=0 to 2$\pi$; as shown in FIG. 1D).

FIG. 1C defines the "modulating function" applied to the parameter of the starting geometry and is created by a mathematical function of sinusoidal wave (e.g., y=sin x) with a periodic interval of 360 degrees. The modulating function may be applied to the modulated parameter, radius of curvature, over the defined region in the modulated range, and changes the R to R+(Rm*(1+sin $\theta$)) (see e.g., FIG. 1D).

The resulting modulated surface geometry, $\vec{gm}$, may be:

$$\vec{gm}(r, \theta, z): \begin{cases} \text{for } r = 0 \text{ to } rs; & (r*\vec{a}_r) + \left(\sqrt{R^2 - r^2}*\vec{a}_z\right) \\ \text{for } r = rs \text{ to } re; & \begin{array}{l}(r*\vec{a}_r) + \\ \left(\sqrt{(R + (Rm*(1+\sin\theta)))^2 - r^2}*\vec{a}_z\right)\end{array} \end{cases}$$

Figure 1E:
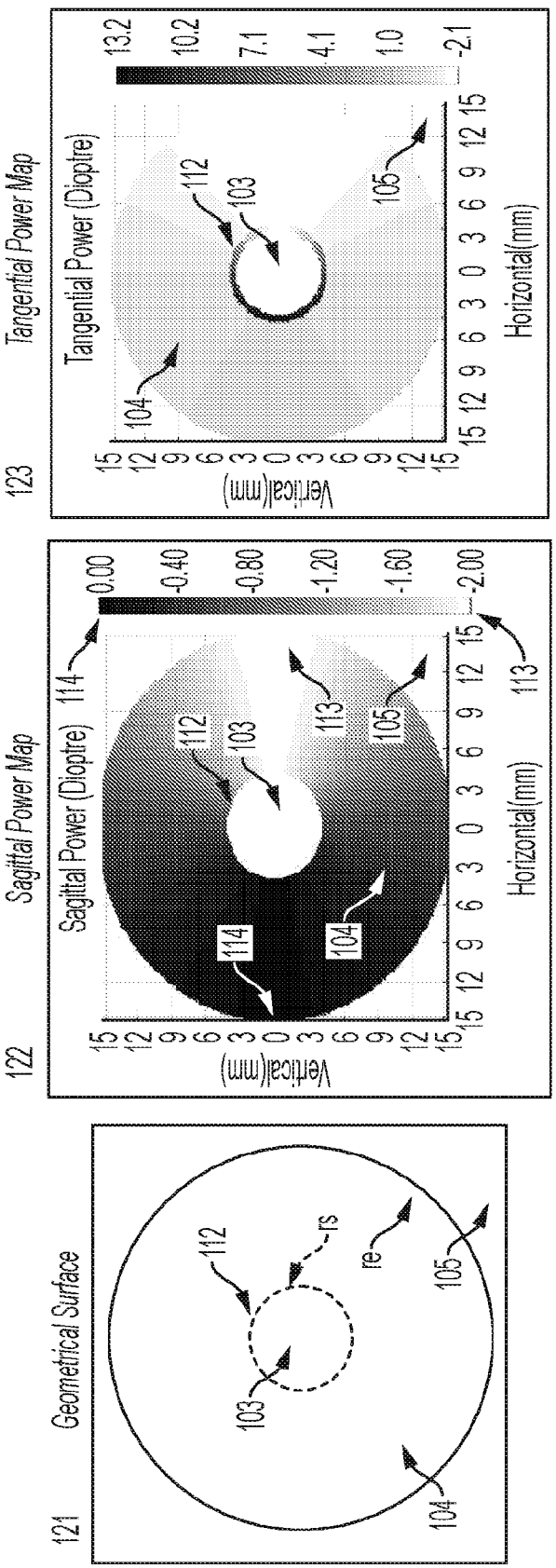

FIG. 1E illustrates the geometrical surface 121, sagittal power map 122 and tangential power map 123 of a central 103 and peripheral part 104 of an exemplary ophthalmic lens after applying the surface modulation process described above to the peripheral region 104. The center zone 103 has a base power of −2D (see, e.g., 113-Sagittal Power Map) and the peripheral region 104 comprises the geometrically defined shape and/or optical contour element formed by the modulation process (e.g., a single sinusoidal cycle) and has a power of 0D (see e.g., 114) providing a maximum to minimum power difference of +2D (see e.g., FIG. 1E). As illustrated, the sinusoidal modulation over the defined region changes the optical power p-values while maintaining the continuity of the geometrical surface. The sagittal and tangential power maps are used to describe the optical power values of a lens in two directions, and, in some embodiments, they may be defined within optical software (e.g., Zemax). For example, "The term "tangential" refers to data computed in the tangential plane, which is the plane defined by a line and one point: the line is the axis of symmetry, and the point is the field point in object space. The sagittal plane is the plane orthogonal to the tangential plane, which also intersects the axis of symmetry at the entrance pupil position".

The ophthalmic lens of FIG. 1A describes a simple annular shaped surface modulation that generates a single sinusoidal cycle of radius of curvature modulation (see e.g., FIG. 1D) in an annular region and angular direction resulting in an undulating power profile (see e.g., FIG. 1E). However, it may be desirable to incorporate more than one, for example, a plurality, of geometrically defined shapes and/or contour optical elements on the ophthalmic lens to provide other desirable optical effects to the wearer of the ophthalmic lens. Thus at least one modulating function(s) may be designed and applied to at least one ophthalmic lens geometrical parameter(s) and/or non-geometrical parameter(s) to create at least one or more geometrically defined shape(s) and/or contour optical element(s) in any region(s) or in any direction(s) or to any extent(s) or of any dimension(s) to create any configuration(s) or any arrangement(s) on the lens surface(s) or with any continuity(s) or discontinuity(s) with the base surface(s) or in between the lens surfaces to generate any desired optical effects or combinations thereof including but not limited to refractive, non-refractive, diffractive, contrast modulating, phase-modulating, meta-surfaces, light scattering, aberrated, holographic, diffusing, light deviating (prism), light amplitude modulating or a combination of one or more optical properties thereof.

FIGS. 2-17 illustrate several exemplary embodiments of ophthalmic lenses incorporating different configurations and arrangements of geometrically defined shapes and/or contour optical elements including several figures describing exemplary different forms of the modulating functions to control the number, dimensions, shapes, optical contours and distributions of the geometrically defined shapes and/or contour optical elements modify the optical effects produced.

Figure 2A:
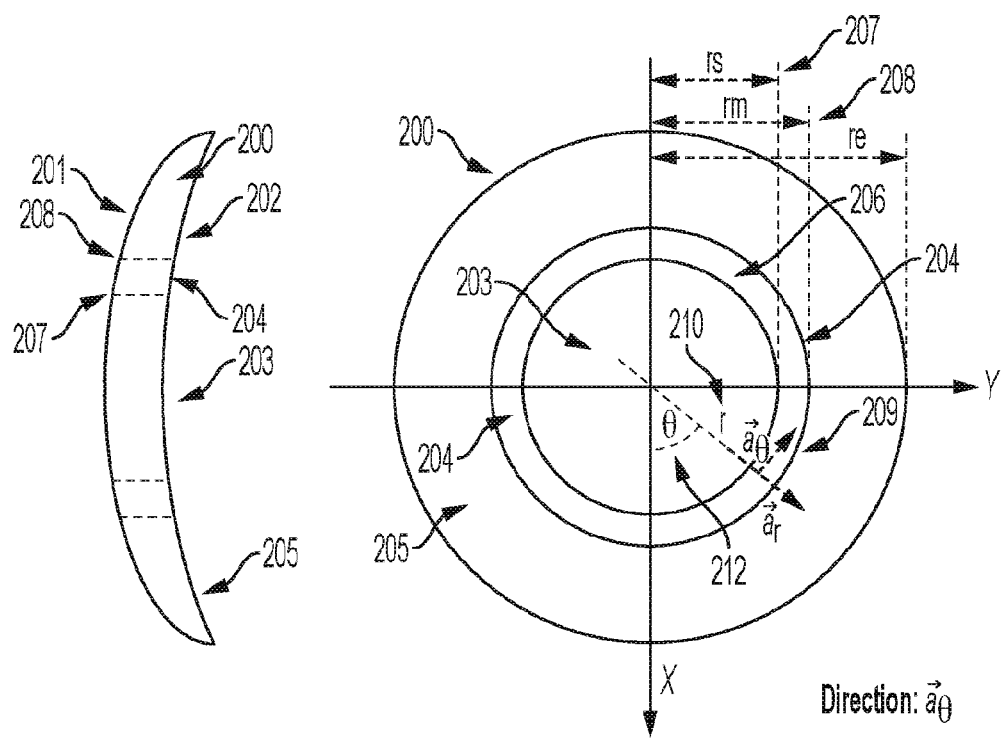
Figure 2B:
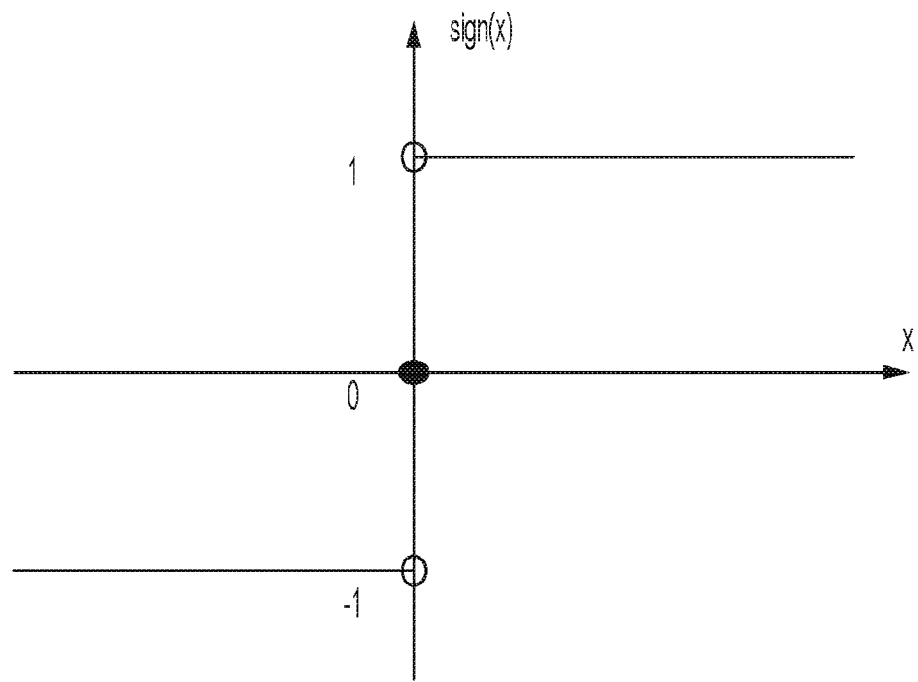

FIG. 2A illustrates an exemplary embodiment of an ophthalmic lens comprising an annular region defined for modulation on back surface of the ophthalmic lens. The ophthalmic lens 200 comprises a base lens having a front surface 201, a back surface 202, a center zone 203 and peripheral regions 204 and 205. The starting premodulated surface geometry 202 of the ophthalmic lens 200 (FIG. 2A) may be substantially similar to the pre-modulated back surface geometry of FIG. 1A i.e. the starting surface geometry may be written as $$\vec{g}(r, \theta, z) = (r * \vec{a}_r) + \left(\sqrt{R^2 - r^2} * \vec{a}_z\right), r = 0 \text{ to } re$$

As illustrated in FIG. 2A, the modulated geometric parameter radius of curvature R (106 in FIG. 1B) may be modulated over the region 204 as follows: R@r=rs to rm, θ=0 to 2π, and like the example in FIG. 1, the direction of modulation 209 of the ophthalmic lens of FIG. 2A may be $\vec{a}_\theta$ and the "modulating function" may be y=sin x, where x may be any angular value, as previously shown in FIG. 1D.

Figure 2C:
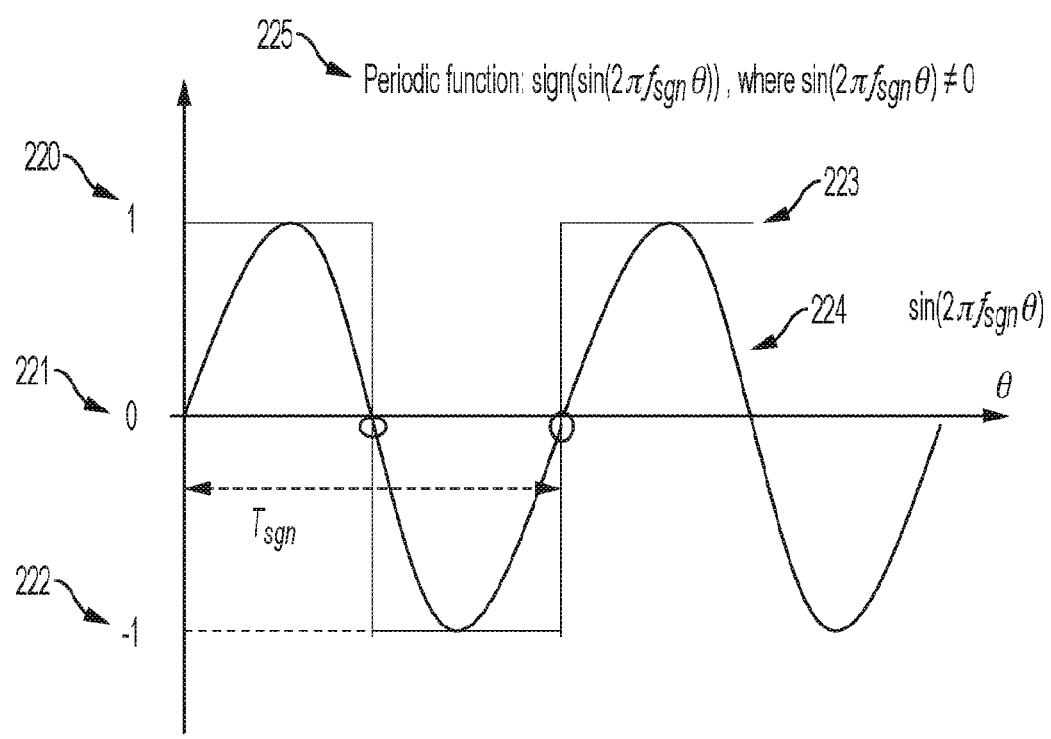

In the example of FIG. 2, to create the desired "modulating function" in region 204, a mathematical sign function (see e.g., FIG. 2B) is applied to the mathematical sinusoidal function 224 to create a periodic square wave function 225 as shown in FIG. 2C. The sign function (FIG. 2B) may be mathematically described by the formula:

$$\text{sign}(x) = \begin{cases} 1 & x > 0 \\ 0 & x = 0 \\ -1 & x < 0 \end{cases}$$

and since the direction of modulation 209 in this example is angular along vector $\vec{a}_\theta$ (e.g., 209 in FIG. 2A) the x argument of the sign function (see e.g., FIG. 2B) may be changed to a sinusoidal function of an angular variable θ (212) as follows;

$$x = \sin(2\pi f_{sgn}\theta)$$

and by substituting x in the sign function so that the sign(x) equation becomes:

$$\text{sign}(\sin(2\pi f_{sgn}\theta)) \text{ where } \sin(2\pi f_{sgn}\theta) \neq 0$$

it results in a periodic square wave function 225 as shown in FIG. 2C. For example, as shown in FIG. 2C when the new argument of the function $\sin(2\pi f_{sgn}\theta)$ has a frequency of $f_{sgn}$, and because the argument of the sign function is sinusoidal, the values may create outputs between −1 (222) and +1 (220) and consequently the sign function values may continuously switch between +1 and −1 and create the square wave function 225 as shown in FIG. 2C as follows: sign(sin(2π$f_{sgn}$θ)) where sin(2π$f_{sgn}$θ)≠0. The zero condition may be added to the function 225 of FIG. 2C to create only two output values of −1 and 1:

$$S(\theta) = \begin{cases} \text{sign}(\sin(2\pi f_{sgn}\theta)) & \sin(2\pi f_{sgn}\theta) \neq 0 \\ 1 & \sin(2\pi f_{sgn}\theta) = 0 \end{cases}$$

Figure 2D:
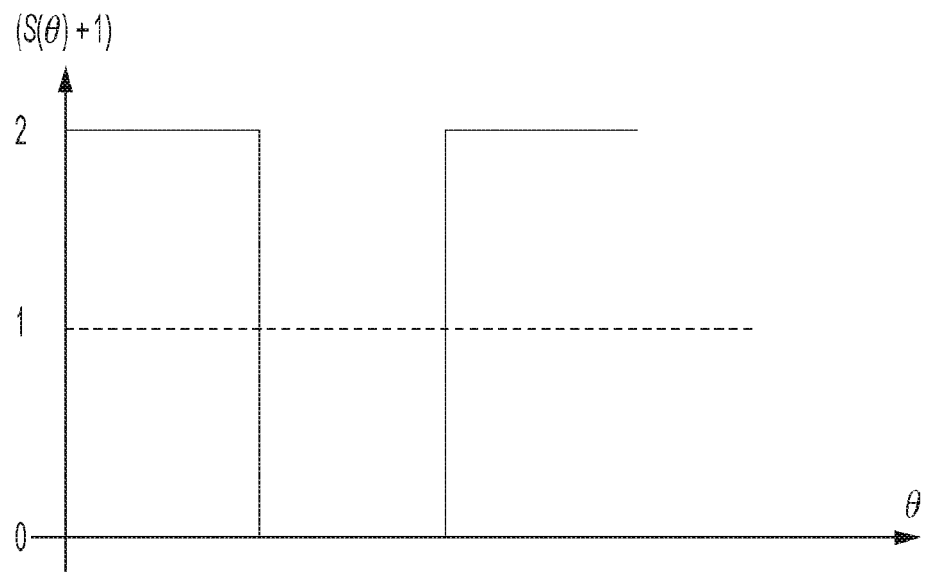

In some embodiments, in order to get positive outputs, it may be desirable to add a value of 1 to S(θ) to arrive at S(θ)+1 as shown in FIG. 2(D). In some embodiments, in order to arrive at output values of 0 and 1, it may be desirable to divide S(θ)+1 by 2 as plotted in FIG. 2E.

Figure 2E:
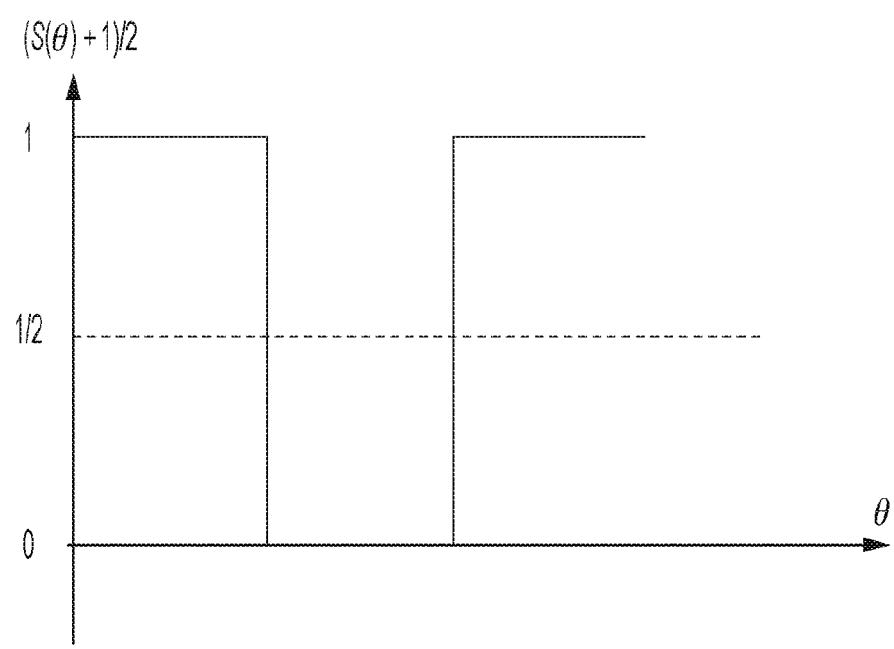

In some embodiments, the periodic square wave illustrated in FIG. 2E may be used as a "modulating function" on its own. In some embodiments, in order to design one or more of geometrically defined shapes and/or contour optical elements in region 204 of the lens of FIG. 2A, the function argument θ in x=sin (2π$f_{sgn}$θ) may be multiplied by a factor of ω, enabling the number of periodic intervals to be altered, for example increased, based on the frequency of the sinusoidal wave, as follows;

$$\frac{1}{f_{sgn}} = T_{sgn} = 2\pi/\omega,$$

where $f_{sgn}$ is the sinusoidal wave frequency, and Tsgn is the periodic interval.

However, as shown in the steps described with respect to FIGS. 2D and 2E, the square wave function 225 may be modified and also be used as another "modulating function" and create further embodiments that may alter the, for example, surface geometry in the modulated region 204 and consequently the power profiles of the region 204. The lens power profile may cycle through values 220 and 222 around the base power 221 and may produce sharp discontinuities in surface curvature along the direction of modulation as shown in FIG. 2C, and therefore power profile, between the base surface curvature and the plurality of geometrically defined shapes and/or contour optical elements in region 204. In some embodiments, it may be desirable to produce geometrically defined shapes and/or contour optical elements that may be smooth and continuous with the base surface in the direction of modulation. In some embodiments, the geometrically defined shapes and/or contour elements in region 204 may not intersect e.g., meet with the base lens surface 202, for example the base lens surface in peripheral region 205, and may remain elevated above (or below) the base lens surface 202 in between the geometrically defined shapes and/or contour optical elements for at least a portion of the region 204 and thereby may have a different power profile to the base zone 203, 205 power profile that may correct the refractive error of the wearer of the ophthalmic lens 200.

Figure 2F:
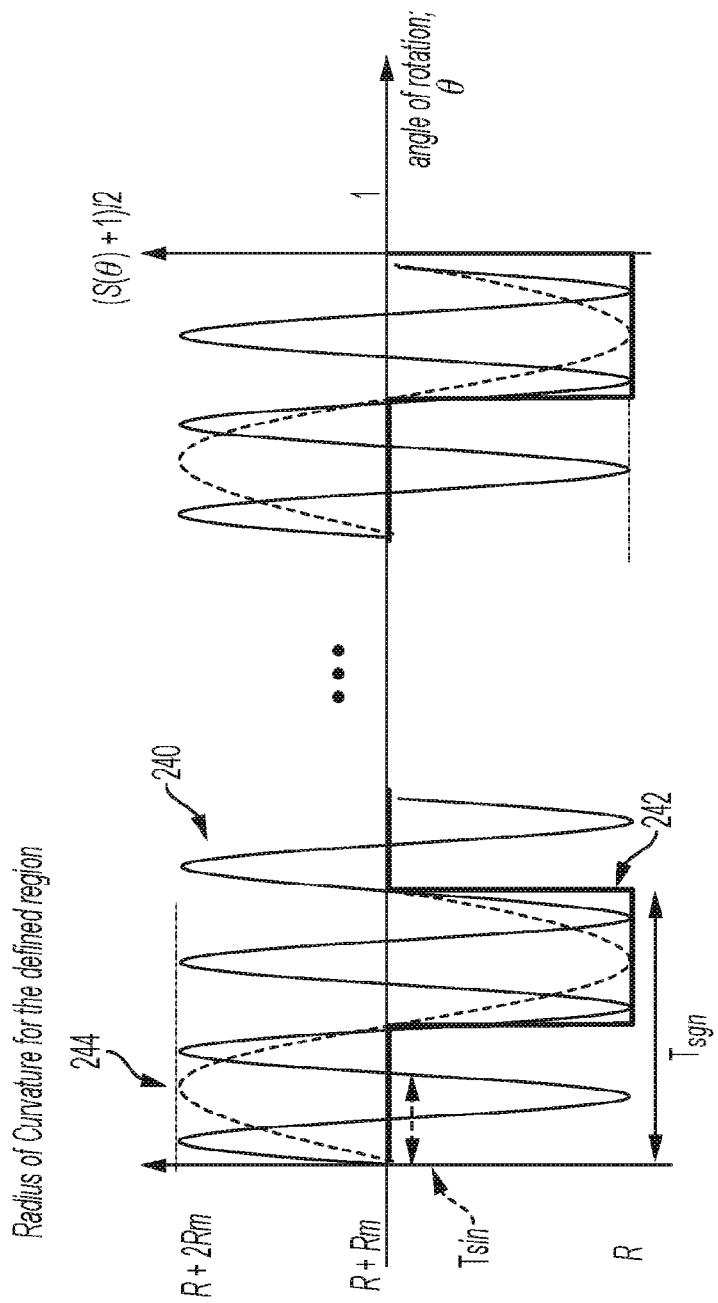
Figure 2G:
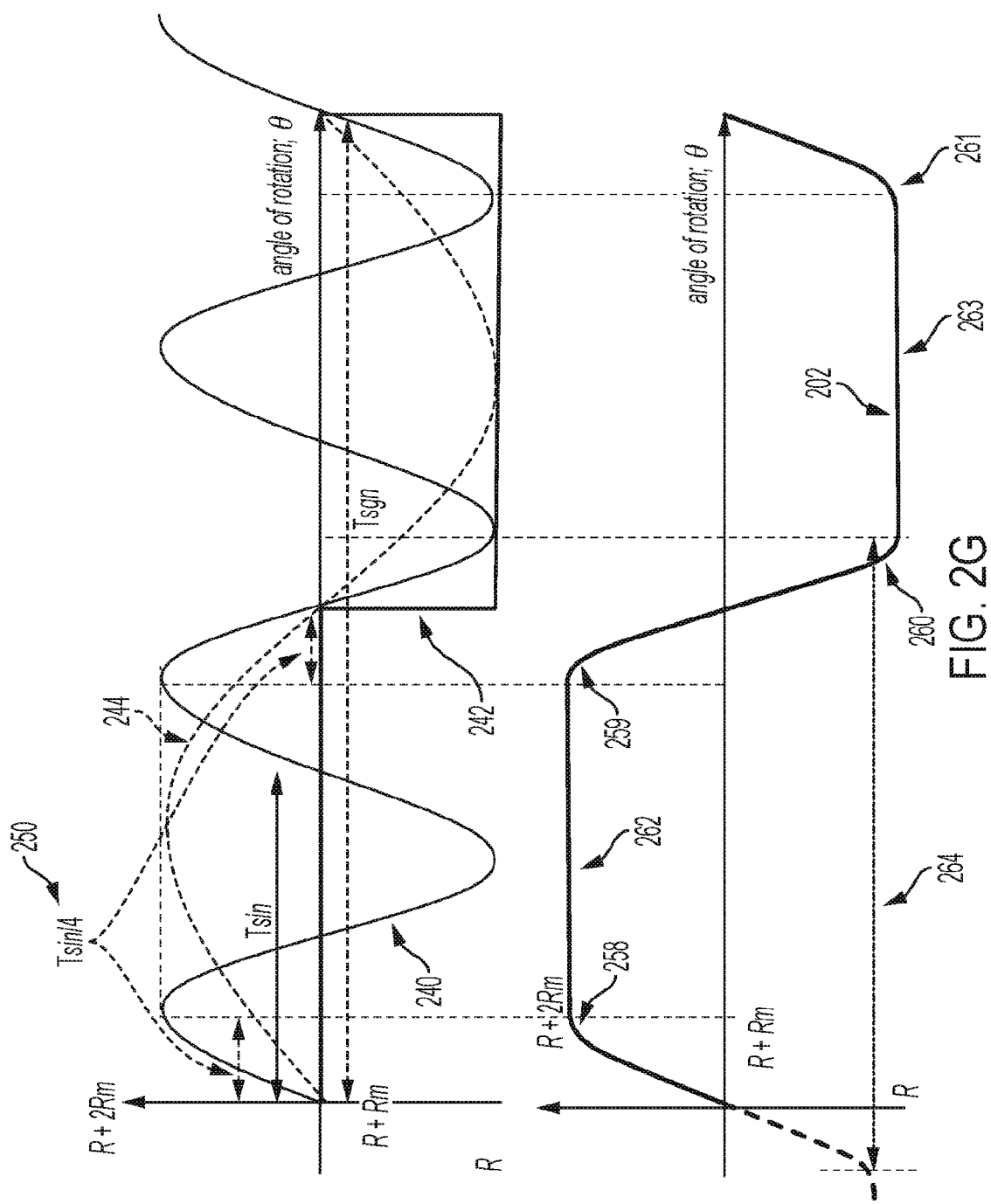

FIG. 2F illustrates the square wave function of FIG. 2E (driven by the lower frequency sinusoidal function 244 (Tsgn)) combined with a sinusoidal component function 240 (Tsin). As drawn in FIG. 2F, the frequency of the sinusoidal component function 240 (Tsin) may be increased relative to the square wave component function 242 (driven by the lower frequency sinusoidal function 244 (Tsgn)) and the combination of functions may provide a plurality of, for example, smaller shapes of a different rate of radius of curvature change across each element and therefore also surface contour and/or optical contour, for example, power profile and continuity of the elements with the base surface 202. FIG. 2G provides additional detail of the periodic function described in FIG. 2F formed by the combination of the higher frequency sinusoidal function 240 and the square wave function 242 (driven by the lower frequency sinusoidal function 244) and shows a single square wave cycle (Tsgn) that may form a portion of a single geometrically defined shape and/or contour optical element 264. As illustrated in FIG. 2G, the modulation process may control the shape and contour features of the element as may be seen in cross section profile 264. For example, the frequency of the sinusoidal function 240 and/or the square wave function 242 may combine to form the periodic "modulating function" and therefore the features and/or properties of the geometrically defined shapes and/or contour optical elements. As illustrated in FIG. 2G, the smoothness of the transition between the base lens surface and the dimensions and contour of the optical element 264, including, for example the rate of change of radius of curvature at the transitions (258, 259, 260 and 261), may be controlled, at least in part, by the frequency of the sinusoidal function 240 while the length of the element portion, for example 262, and the separation of the elements, for example 263, may be controlled, at least in part, by the frequency of the square wave function 242. Therefore a high frequency term applied to the sinusoidal function 240 may generate a more rapid change in radius of curvature at the transition (244 between the element 264 and the base lens surface 202), starting from about 259 and ending at about 260. Conversely, a lower frequency of the sinusoidal function 240 may generate a slow and gradual change in radius of curvature at the transition between the element 264 at 259 and the base lens surface 202 at, for example 260. As also illustrated in FIG. 2G, the dimensions of the geometrically defined shape and/or contour optical element 264, including, for example the length of the region 262 and the separation between elements e.g. 263 may be controlled by the frequency of the square wave function 242, for example a high frequency may generate a shorter length of 262 and 263 while a lower frequency of the square wave function 242 may generate a longer length of 262 and 263.

In some embodiments, the at least one or more of the geometrically defined shapes and/or contour optical elements may be designed, for example, with a plurality of (and e.g., smaller) elements while in some embodiments the desired ophthalmic lens application may require fewer and/or larger and/or more contoured geometrically defined shapes and/or contour optical elements, for example, freeform shapes, and/or more varying power profiles and/or other properties or interactions with the other portions of the ophthalmic lens including, for example, with or without smooth and continuous surfaces in the modulated regions and for the transition to non-modulated portions of the ophthalmic lens. In some embodiments, by changing the square wave frequency term, $f_{sgn}$ in the periodic function 225 of FIG. 2C, the size of the square wave (Tsgn, 223) along the direction of modulation 209 in the defined region 204 of the ophthalmic lens of FIG. 2A may be controlled, which means, shorter or longer flat peaks e.g. 262 and flat troughs e.g. 263 of FIG. 2G may be designed to, for example, change the number, size, shape and contour of the geometrically defined shapes and/or optical contour elements formed in a region(s) on a lens and thus control the optical effects derived.

Figure 2H:
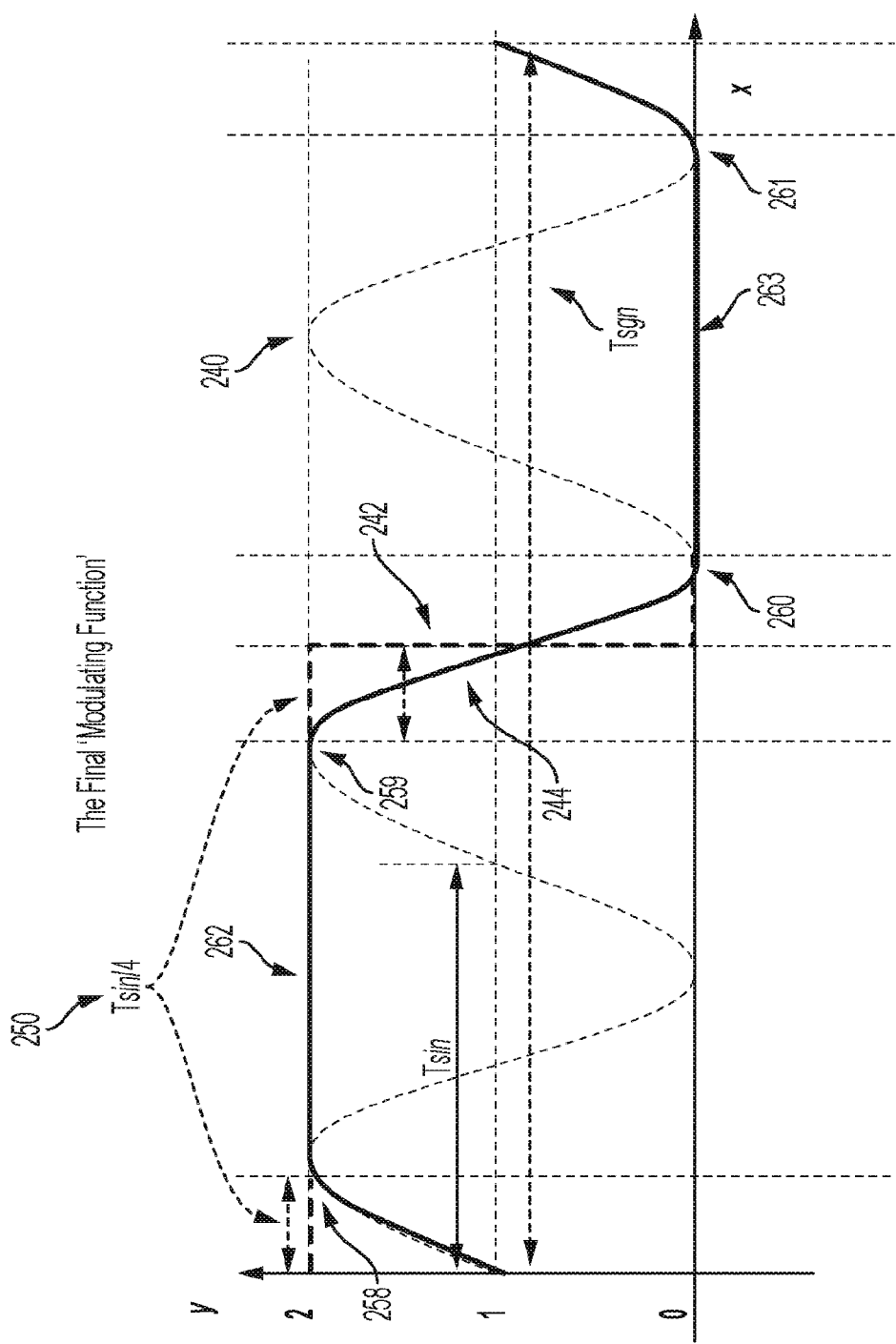
Figure 21:
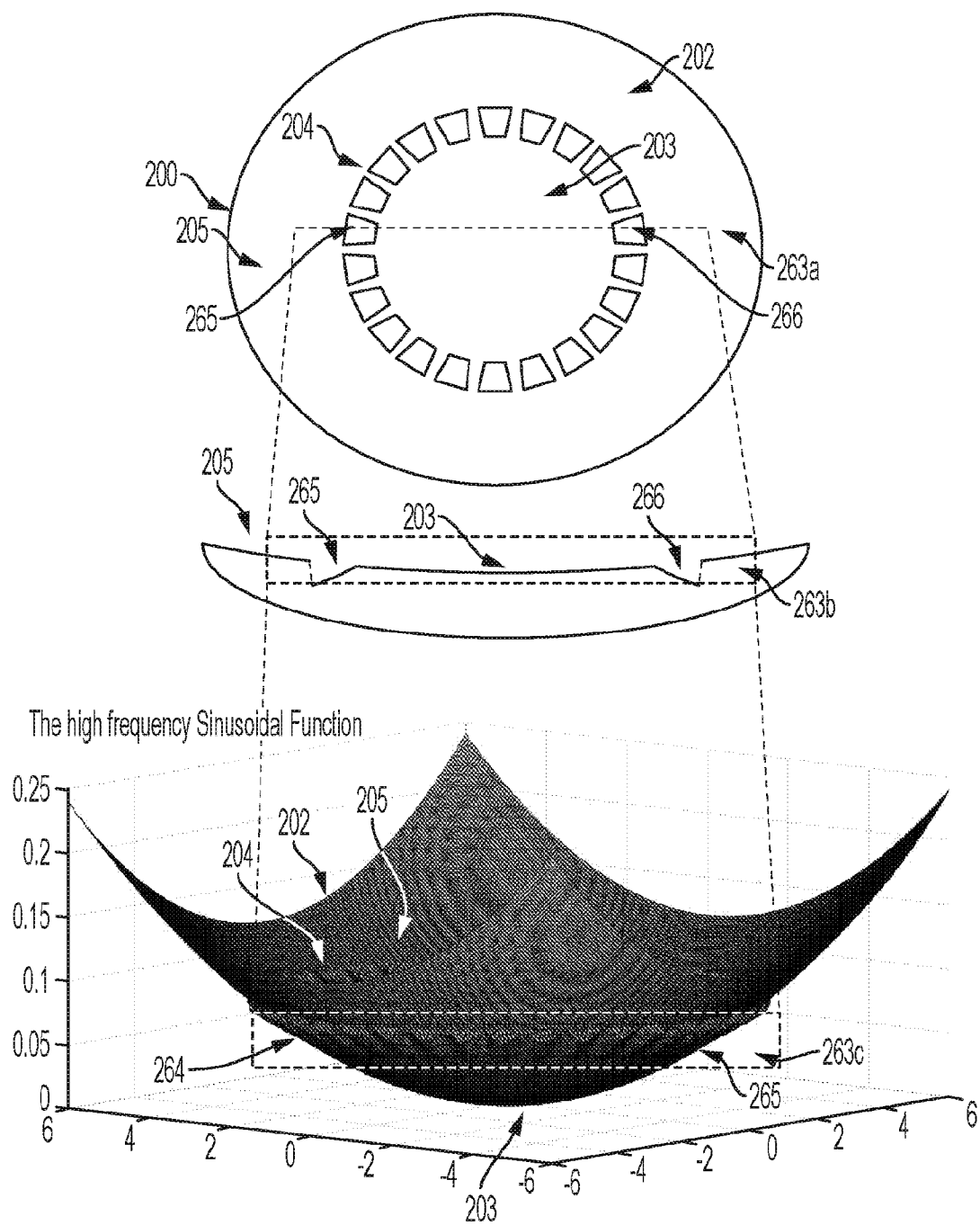

As shown in FIG. 2G the frequency of the sinusoidal function 240 ($f_{sin}$) used in combination with a periodic function term, e.g., the square wave function term 242, may determine the rate (e.g., fast or slow) of surface curvature change of the transitions between portions of a geometrically defined shape and/or contour optical element design. As shown in FIG. 2F and in more detail in FIG. 2G, the terms of the two periodic functions 240 and 242, namely, $f_{sin}$ and $f_{sgn}$ (T$_{sin}$ and T$_{sgn}$) in the form Tsgn=(2i+1)*Tsin where i=1, 2, 3 . . . may, in some embodiments, enable smooth and continuous transitions in the direction of the modulation between the peaks 258, 259 and troughs 260, 261 of the element. Therefore, in some embodiments, the "modulating function" may now be generically described as shown in FIG. 2H and written as y and x by the following formula;

$$y = \begin{cases} 2 & ((k-1)*Tsgn) + \dfrac{Tsin}{4} < x < (k*Tsgn) - \dfrac{Tsgn}{2} - \dfrac{Tsin}{4} < 2\pi \\ (1 + \sin 2\pi f_{sin} x) & (k*Tsgn) - \dfrac{Tsgn}{2} < x < (k*Tsgn) - \dfrac{Tsgn}{2} + \dfrac{Tsin}{4} < 2\pi \cup (k*Tsgn) - \dfrac{Tsin}{4} < x < (k*Tsgn) < 2\pi \\ \left(\dfrac{S(x)+1}{2}\right)*(1 + \sin 2\pi f_{sin} x) & \text{Otherwise} \end{cases}$$

-continued

Where $k = 1, 2, 3 \ldots$ $T\text{sgn} = (2i + 1) * T\text{sin}$ where $i = 1,2,3 \ldots$ $$S(x) = \begin{cases} \text{sign}(\sin(2\pi f_{sgn}x)) & \sin(2\pi f_{sgn}x) \neq 0 \\ 1 & \sin(2\pi f_{sgn}x) = 0 \end{cases}$$

FIG. 2I illustrates the post modulated back surface geometry 202 of an ophthalmic lens 200 incorporating a plurality of geometrically defined shapes and/or contour optical elements e.g., 265, 266 in an annular region 204. The lens 200 has a central zone 203 a modulated region 204 and an outer peripheral zone 205. Also shown is a location of a slice section 263a and cross-section 263b and in a three dimensional sliver view (263c) which provide more details of the geometrically defined shapes and/or contour optical elements including frequency, contour, surface continuity and depth. The lens geometry of FIG. 2I may be configured similarly to the lens 200 shown in FIG. 2A, for example, with a central zone 203 and where the modulated geometric parameter is a radius of curvature R (106 in FIG. 1B) modulated over the region 204 between region 203 and outer peripheral region 205 in the direction $\vec{a}_\theta$ (209) as follows: R@r=rs to rm, θ=0 to 2π, and the modulating function is a high frequency sinusoidal function 224 as described in FIG. 2C (e.g., without the square wave 223). The plurality of geometrically defined shapes and/or contour optical elements, for example 265, 266, in region 204 may be shown as recessions or depressions into the lens back surface 202 as illustrated in cross section 263b and may be small and highly curved and may generate power profiles that may be highly aberrated. As such, the optical effect of each shape e.g., 265, 266 may reduce the image quality e.g. an MTF or an image contrast compared to a contour element that may, for example, have more or less focal power than required to focus on a retinal image plane and may be less aberrated or non aberrated or even spherical. In some embodiments, the plurality of geometrically defined shapes and/or contour optical elements e.g., 265, 266, formed in the modulated region, for example, an annular region 204 as shown in FIG. 2I may provide a combined optical effect that may be desirable for a particular application. In some embodiments, the ophthalmic lens produced by the surface modulation process described herein may result in ophthalmic lenses comprising at least one or more modulated regions of a lens filled with at least one or more, for example, a plurality of spaced apart geometrically defined shapes and/or contour optical elements that provide a desired optical effect. For example, the high frequency of small, spaced apart, highly curved and aberrated geometrically defined shapes and/or contour optical elements 265, 266 of FIG. 2I may collectively reduce the image quality of images formed inside the eye of a wearer. In some embodiments, for example, with ophthalmic lenses used for myopia control, the geometrically defined shapes and/or contour optical elements may be located at least in a portion of a peripheral zone and may form a treatment priority zone on or in the ophthalmic lens juxtaposed with a vision priority zone to correct the refractive error of the progressing myope. In some embodiments, at least a portion of the treatment priority zones may contain geometrically defined shapes and/or contour optical elements that may reduce the contrast of the retinal images formed on the retinal plane. In some embodiments, the focal points formed by the geometrically defined shapes and/or contour optical elements may form a hyperopic defocus behind the retina or a myopic defocus in front of the retinal plane. In some embodiments, the geometrically defined shapes and/or contour optical elements may be designed and contoured to form a through focus light distribution extending across at least one or more hyperopic and/or myopic or in focus focal points. In some embodiments, the focal points formed by the geometrically defined shapes and/or contour optical elements may be off axis focal points and/or on axis focal points. In some embodiments, the geometrically defined shapes and/or contour optical elements may form focal points that may contribute to an extended depth of focus and may be useful for myopia control applications or refractive error corrections, including myopia, hyperopia or astigmatism or for the correction of presbyopic refractive errors at distance, intermediate and near focal points and any in between. In some embodiments, the optical contour profile may be shaped and/or contoured to provide a focal point(s) substantially near or about the retinal image plane but the image quality may be reduced compared to a regular focal point and as such the image quality at or about the retinal image plane may not be defocused but aberrated to provide, for example, a reduced contrast compared to typical retinal image focal points from defocus or images associated with light scattering. In some embodiments, this type of optical effect may be created by geometrically defined shapes and/or contour optical elements that may be afocal or substantially afocal, for example, by a phase modulating contour element designed with about zero dioptric power or other optical principles.

Figure 2J:
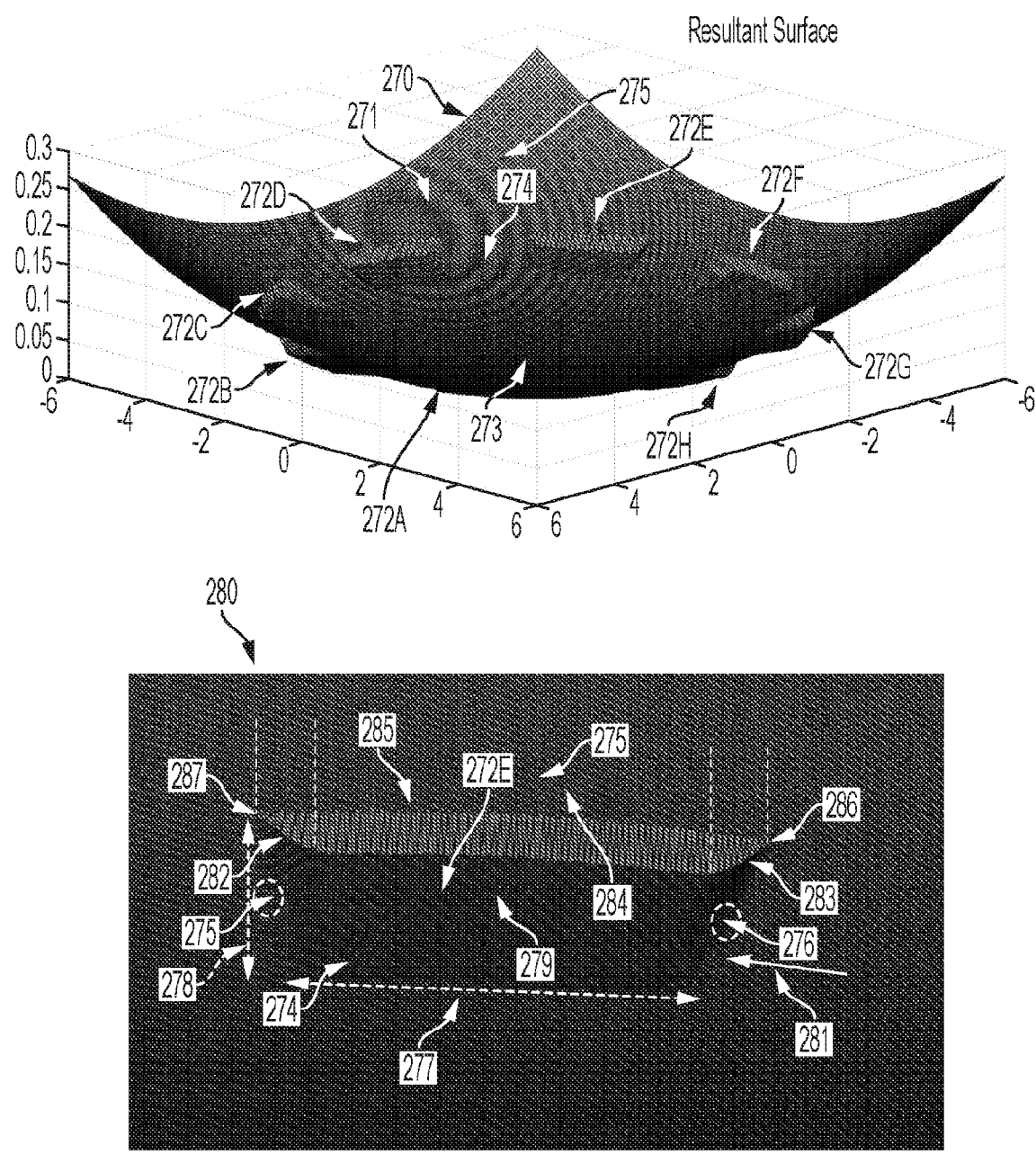

FIG. 2J illustrates a three dimensional sliver section view (270) of the post modulated back surface geometry 271 of an ophthalmic lens incorporating a plurality of geometrically defined shapes and/or contour optical elements 272A-272H in an annular region 274. The lens 270 has a central zone 273 a modulated region 274 and an outer peripheral zone 275. Also shown is a magnified view 280 showing a 3 dimensional view of one of the geometrically defined shapes and/or contour optical elements 272E formed on the lens including contour, surface continuity and depth. The lens geometry of FIG. 2J may be configured similarly to the lens 200 shown in FIG. 2I, for example, where the modulated parameter is a geometric parameter e.g. a radius of curvature R modulated over the region 204 in the direction $\vec{a}_\theta$ (209) as follows: R @r=rs to rm, θ=0 to 2π, but in addition to the high frequency sinusoidal function 240 used to generate the modulated surface described in FIG. 2I the lower frequency periodic square wave function 242 may be combined to generate the lens surface 271 of FIG. 2J as described in FIG. 2H (the final "modulating function"). Therefore, like the lens of FIG. 2I, the lens surface sliver section 270 in FIG. 2J may have a starting base back surface geometry based on the lens back surface 202 previously described in FIG. 2A and the final modulated surface geometry 271 may be formed by applying the modulating function of FIG. 2H to parameter R, to modify the radius of curvature R, in the desired direction $\vec{a}_\theta$ over the defined region 274 in the "modulating range" from 0 to +2Rm, (where 0 indicates the unmodulated surface, and 2 Rm is the maximum value added to the radius of curvature R) with the desired frequency. In the embodiment shown in FIG. 2J, the frequency ($f_{sgn}$) of the "modulating function" may be changed, for example, from the high frequency sinusoidal function 240 used to form the lens surface 202 of FIG. 2I to the periodic "modulating function" described in FIG. 2H in order to create the new arrangement of the geometrically defined shapes and/or contour optical elements, for example, the surface contour of the geometrically defined shape and/or contour optical element 264. As illustrated in the 3 dimensional sliver section 270 of the back surface 271 shown in FIG. 2J the back surface modulation formed eight geometrically defined shapes and/or contour elements optical elements 272A to 272H in the defined region 274. The "modulating function" describing the lens of FIG. 2J may include the lower frequency term as follows: Number of the cycles in the defined region=$8=2\pi f_{sgn}$, $f_{sgn}=4/\pi$ and the final modulated surface geometry may be described as follows:

$$\vec{gm}(r, \theta, z) =$$

$$\begin{cases} \left(r*\vec{a}_r + \left(\sqrt{R^2 - r^2} * \vec{a}_z\right)\right) & 0 \le r \le rs \cup rm < r < re \\ \left(r*\vec{a}_r\right) + \left(\sqrt{[R + [(S(\theta)+1)/2 * (Rm*(1+\sin2\pi f_{sin}\theta))]]^2 - r^2} * \vec{a}_z\right) & rs < r \le rm \\ \left(r*\vec{a}_r\right) + \left(\sqrt{[R + [(Rm*(1+\sin2\pi f_{sin}\theta))]]^2 - r^2} * \vec{a}_z\right) & (k*Tsgn) - \frac{Tsgn}{2} < \theta < (k*Tsgn) - \frac{Tsgn}{2} + \frac{Tsin}{4} < 2\pi \cup (k*Tsgn) - \frac{Tsgn}{2} - \frac{Tsin}{4} < 2\pi \\ & \text{where } rs < r \le rm \cap ((k-1)*Tsgn) + \frac{Tsin}{4} < \theta < (k*Tsgn) - \frac{Tsgn}{2} - \frac{Tsin}{4} < 2\pi \\ \left(r*\vec{a}_r\right) + \left(\sqrt{[R+2Rm]^2 - r^2} * \vec{a}_z\right) & \end{cases}$$

Where $$S(\theta) = \begin{cases} \text{sign}(\sin(2\pi f_{sgn}\theta)) & \sin(2\pi f_{sgn}\theta) \ne 0 \\ 1 & \sin(2\pi f_{sgn}\theta) = 0 \end{cases}$$

$k = [1, 2, 3 ...]$.

Tsgn=$(2i+1)*$Tsin where i=$[1, 2, 3 ... ]$. And i is the integer number to produce a multiplication of Tsin from 0 to 360 degrees around the lens.

The three-dimensional view of the sliver section 270 of the back surface 271 shows a sample of the 8 elements 272A to 272H recessed into the back surface of the resultant surface of the ophthalmic lens of FIG. 2J. The window 280 illustrates a single shape/element 272A and reveals more detail on the shape, contour and intersection of the element with the base back surface 271. The element 272A is about rectangular in shape indicating the shape/element is longer in the circumferential direction 277 than in the radial direction 278. The shape/element has a portion 279 with relatively stable radius of curvature and may form the recessed surface of the shape/element into the lens back surface 271. The shape/element forms a smooth and continuous surface along its intersection with the base surface 271, for example as shown at locations 275 and 276 in the direction of modulation 281 where the gradual transitions 282, 283 between the non-modulated base surface region 271 and the base of the element surface recession 284 formed by the shape/element 272A. The shape/element 272A also forms a sharp return to base surface 271 (discontinuity) at 285, 286 and 287 in the radial direction.

Figure 2K:
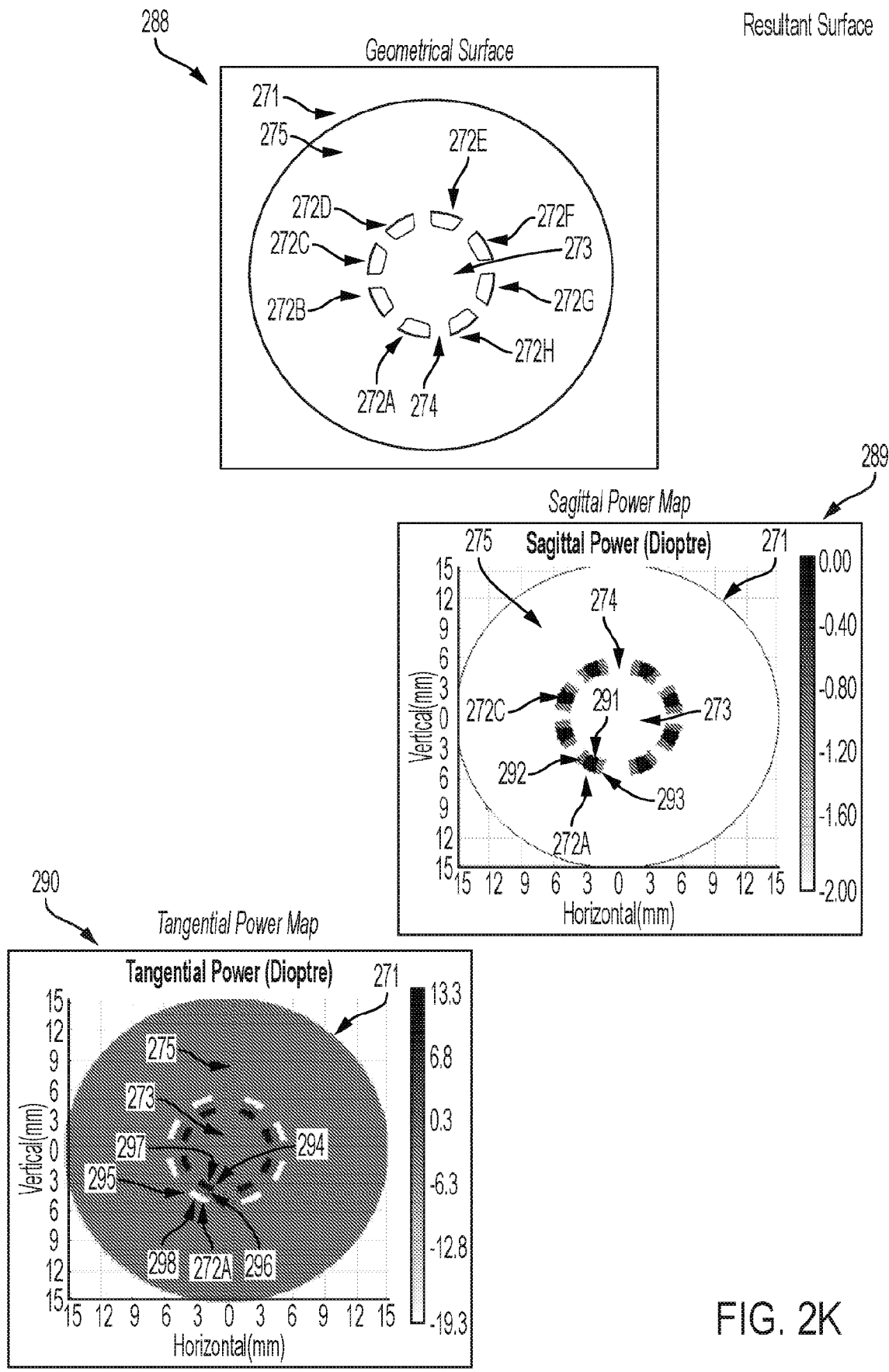

FIG. 2K illustrates a plan view 288 of the geometry of the back surface 271 and sagittal and tangential power maps 289, 290 for the exemplary ophthalmic lens surface 271 shown in FIG. 2J. As illustrated in the plan view 288, the eight geometrically defined shapes and/or contour optical elements 272A to 272H may be seen on the back surface 271 in the modulated region 274 located in between the central zone 273 and outer peripheral zone 275 of the ophthalmic lens. The sagittal power map 289, and dioptric scale included, shows the lens base power was about $-2$D and the 8 individual elements may be substantially identical in power profile. Considering for example, one of the elements 272A, the element may have varying power profile with a central portion 291 comprising a relatively more positive power of 0D whereas the peripheral portions of the geometrically defined shapes and/or contour optical elements element at 292 and 293 have a relatively less positive power than the central portion 291. The tangential power map 290 reveals the power of the eight shapes/optical elements 272A-272H may be substantially identical in power profile and, considering for example, one of the elements 272A, the element may have a strongly changing power profile, for example, decreasing in relative positive power radially across the element from an inner portion 294 of about $+13.3$D to the outer portion 295 of about $-19.3$D. The element/shape central power may have a relatively more positive peak central power at 296 than the outer element portion 295 of $-19.3$D and may also be relatively more positive than the base power. The example shape/element 272A may also sharply increase in positive power at 297 and decrease in positive power radially at the point of discontinuity 298 between the base lens surface and the shape/element 272A. The shape and/or contour of the plurality of geometrically defined shapes and/or contour optical elements 272A-H in region 274 may provide, for example, a power profile and/or a higher order aberration profile, resulting in optical properties that may reduce the image quality compared to contour elements that may, for example, have more or less focal power than required to focus on a retinal image plane and may be less aberrated or even spherical. In some embodiments, the plurality of geometrically defined shapes and/or contour optical elements formed in a modulated region, for example, an annular region 274 as shown in FIG. 2I or 2J-2K may provide a combined optical effect that may be desirable for a particular application. In some embodiments, the ophthalmic lens produced by the surface modulation process described herein may result in ophthalmic lenses comprising at least one or more modulated regions of a lens filled with at least one or more, for example, a plurality of spaced apart geometrically defined shapes and/or contour optical elements that provide a desired optical effect.

Further control of the modulated surface geometry may be achieved by defining additional terms and conditions to the modulating value ranges in the periodic function, for example, in some embodiments, the features and/or properties of the geometrically defined shapes and/or contour optical elements may be designed by applying further conditions to the modulating function terms including, for example, frequency of function cycles, heights, widths, lengths, rates of change, transitions and the like.

Figure 3:
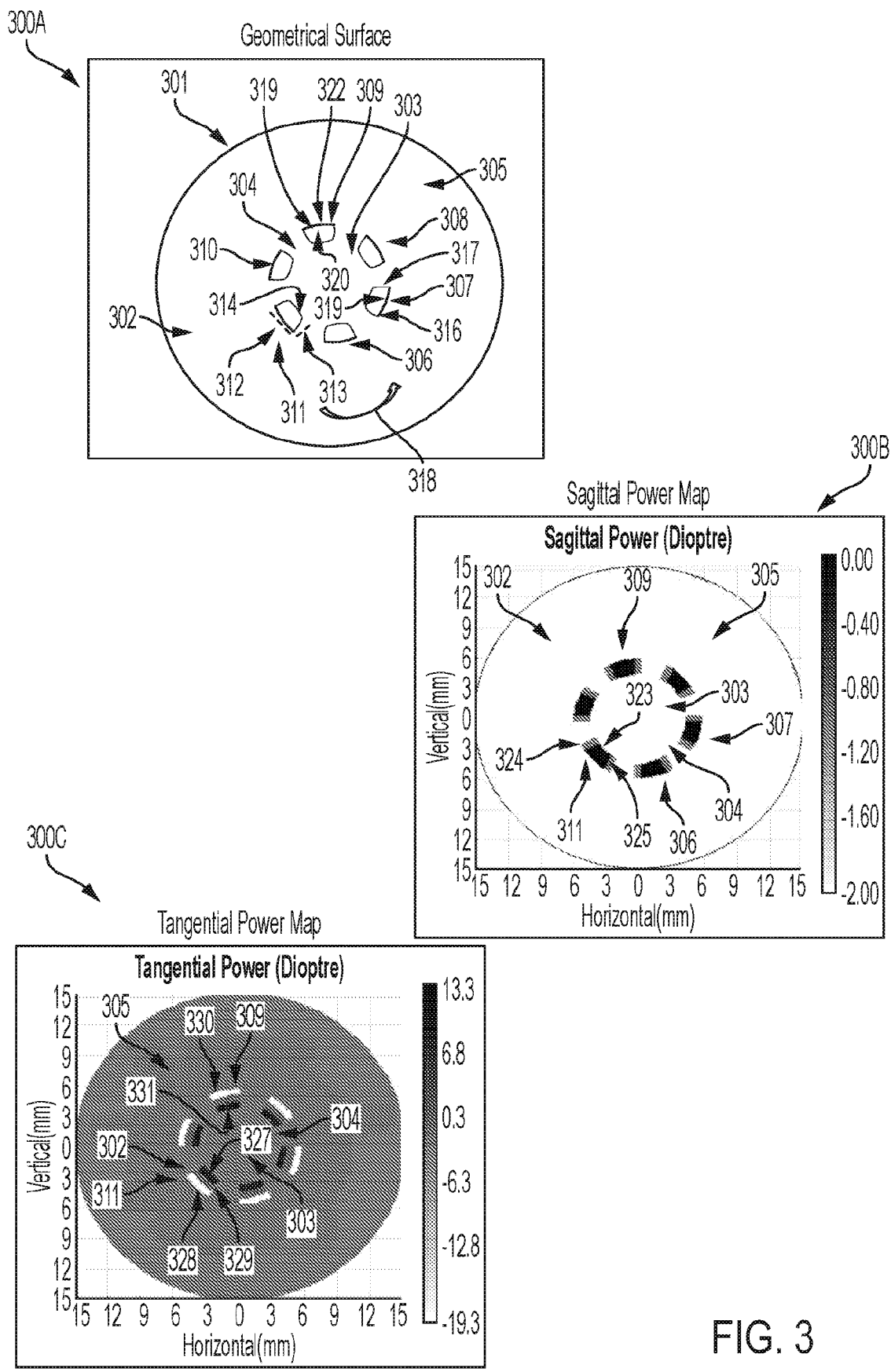
FIG. 3 illustrates an exemplary embodiment of an ophthalmic lens comprising a plurality of geometrically defined shapes and/or contour optical elements on the surface of the ophthalmic lens as described herein.

FIG. 3 illustrates the plan view 300A of a modulated back surface geometry 302 of an ophthalmic lens 301, a sagittal power map 300B and tangential power map 300C of an exemplary embodiment of an ophthalmic lens comprising a plurality of geometrically defined shapes and/or contour optical elements 306-311 in an annular region 304. The lens 301 has a central zone 303 a modulated region 304 and an outer peripheral zone 305. The lens geometry of FIG. 3 may be configured similarly to the lens 200 in e.g., FIG. 2J/2K, where the modulated geometric parameter is a radius of curvature R (106 of FIG. 1B) modulated over the region 204 but unlike the lens of FIG. 2J, the modulating function that may form the lens surface 302 may have a lower frequency and may form fewer elements, for example, only 6 elements (306-311). The starting base back surface geometry (prior to modulation) was based on the lens back surface 203 in FIG. 2A, and the final modulated back surface geometry 302 of the lens 301 (FIG. 3 in 300A) may be formed by applying the "modulating function" of FIG. 2H with the lower frequency term on parameter R, to modify R, in the desired direction $\vec{a}_\theta$ over the defined region 304 in the "modulating range" from 0 to +2Rm, (where 0 indicates the unmodulated surface, and 2 Rm is the maximum value added to the radius of curvature R). In some embodiments, the number of elements may be 1, 2, 3, 4, 5, 6, 7, 8, 9, and/or 10.

In the embodiment of FIG. 3, the frequency ($f_{sgn}$) of the "modulating function" may be changed from a higher frequency applied to the lens described in FIG. 2J/2K to a lower frequency in order to create a new arrangement of the geometrically defined shapes and/or contour optical elements (306-311). The "modulating function", and consequently the modulated surface geometry 302, may be changed by altering (e.g., reducing) the frequency in the "modulating function" applied to the parameter R to form fewer, for example 6, geometrically defined shapes and/or contour optical elements 306 to 311 on the lens surface 302 of FIG. 3 by substituting the frequency term 'number of the cycles in the defined region =6=ω=$2\pi f_{sgn}$, $f_{sgn}$=3/π' into the "modulating function" described in FIG. 2H. The modulation formed a back surface geometry 302 with six contoured optical elements 306 to 311 recessed into the back surface 302 in region 304 of the ophthalmic lens 301 in FIG. 3. Similar to the elements shown in e.g., FIG. 2J and FIG. 2K, the elements 306-311 are about rectangular in shape. Considering one of the elements 311, the element is longer in the circumferential direction 312 than in the radial direction 313, may have a portion with relatively stable radius of curvature 314 and forms a recessed surface into the lens back surface 302 in the region 304. The geometrically defined shapes and/or contoured optical elements 306-311 may form smooth and continuous surfaces in the direction of modulation 318. For example, considering the element 307 at 316 and 317, the element surface gradually contours to the recessed base surface 319. The shape/elements, e.g., element 309 also forms sharper transitions at 320, 321 and 322 in the radial direction. The sagittal power map 300B illustrates the six geometrically defined shapes and/or contour optical elements 306 to 311 in the modulated region 304 of the ophthalmic lens 301. The dioptric scale of 300B that the lens base power is about approximately –2D and the individual elements 306 to 311 are substantially identical (or similar) in power profile. Considering for example one of the elements 311, the element may have a varying power profile with a relatively more positive peak central power 323 of 0D and the edges of the element at 324 and 325 are relatively less positive in power than the central portion 323. The tangential power map 300C illustrates that the six geometrically defined shapes/contoured optical elements 306 to 311 may be substantially identical in power profile and, considering for example, the optical element 311, the element may have a strongly changing power profile, for example, decreasing in relative positive power radially across the element from an inner portion 327 of about +13.3D to the outer portion 328 of about –19.3D. The element/shape central power 329 may have a central power that is slightly more, substantially more, about the same or slightly less than the base power (–2D). Similar to the other elements in region 304, the element 309 may also sharply increase in positive power at 330 and decrease in positive power at 331 radially at the discontinuity between the base lens surface and the shape/element 309. The one or more of the geometrically defined shapes and/or contour optical elements 306-311 in region 304 may provide, for example, a power profile and/or a higher order aberration profile, resulting in optical properties that may substantially reduce, or somewhat reduce the image quality. The fewer shapes/elements formed on the lens surface shown in FIG. 3 may provide a lower fill factor than the lens of FIG. 2K and therefore may be designed to provide less image quality change at the retinal plane and thus may improve the vision, wearability and the compliance of the progressive myope using the ophthalmic lens for myopia control.

Figure 4A:
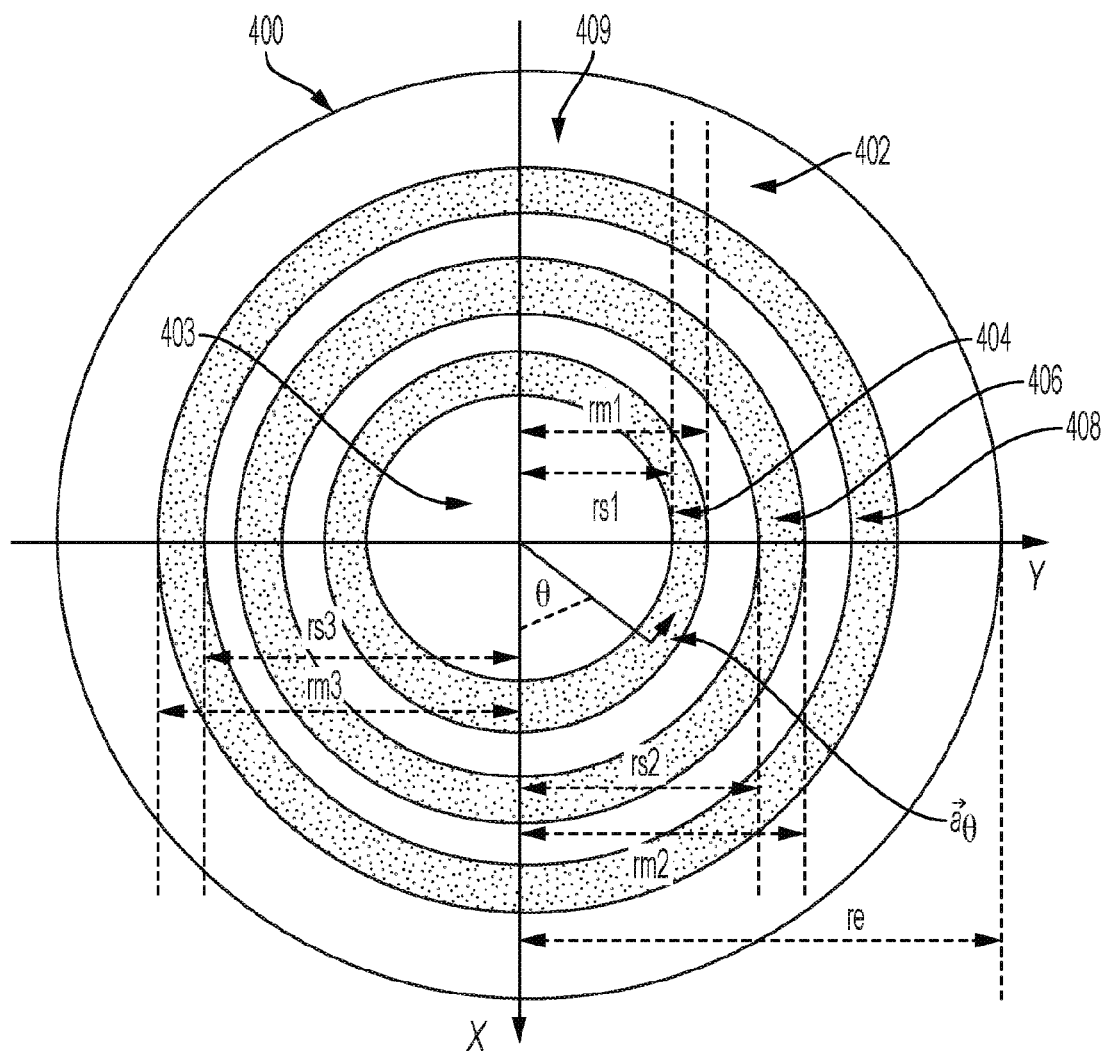
FIGS. 4A and 4B illustrate an exemplary embodiment of an ophthalmic lens comprising a plurality of geometrically defined shapes and/or contour optical elements on the surface of the ophthalmic lens as described herein.
Figure 4B:
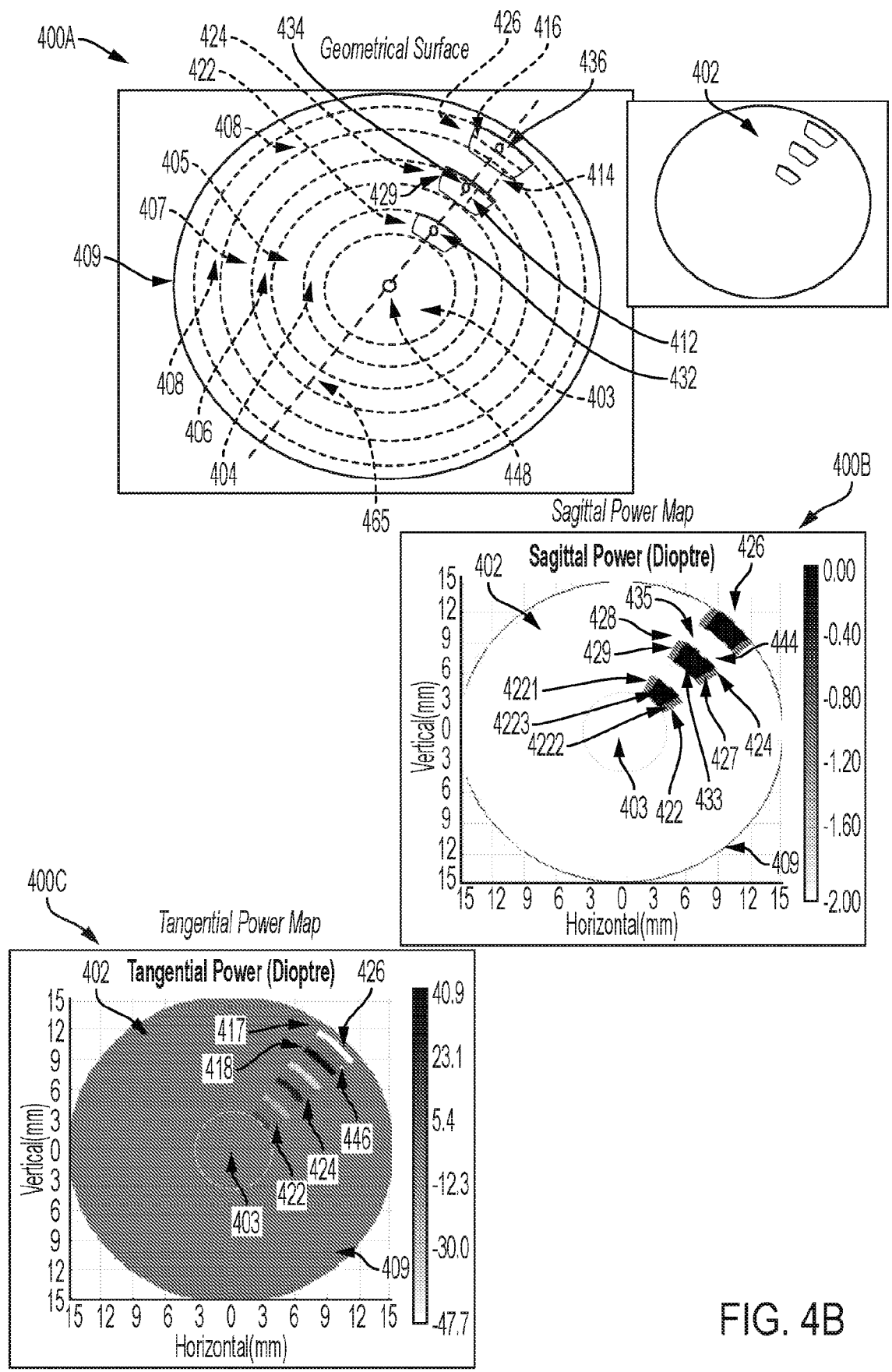

FIGS. 4A and 4B illustrate another exemplary embodiment of an ophthalmic lens 400 comprising a plurality of geometrically defined shapes and/or contour optical elements on the surface of the ophthalmic lens as described herein. In this example, the "modulating function", the modulated parameter and modulating value range that were used to form the geometrically defined shapes and/or contour optical elements on the surface of the ophthalmic lens 301 from FIG. 3 were applied along the same direction but are applied to three annular regions and with a different frequency.

FIG. 4A illustrates a plan view of a modulated back surface geometry 402 of an ophthalmic lens 400 showing several annular regions including a central zone 403, an inner peripheral region with four annular zones 404-408 surrounded by an outer annular peripheral portion 409. FIG. 4B illustrates a further plan view 400A of the lens back surface 402 showing the geometrically defined shapes and/or contour optical elements 422, 424, 426 formed by the "modulating function" applied to the lens back surface in zones 404, 406 and 408 respectively. The other zones 403, 405, 407 and 409 are not modulated and may contain the base surface geometry contributing to form a base power profile to correct the refractive error of the wearer of the ophthalmic lens. Also shown, are the sagittal power map 400B and tangential power map 400C of the ophthalmic lens 400 of FIG. 4A. As illustrated in FIG. 4A, the 3 modulated regions 404, 406, 408 may be located between rs1 and rm1; rs2 and rm2; and rs3 and rm3 and the manner in which the geometrically defined shapes and/or contour optical elements are created may be similar to the manner in which the geometrically defined shapes and/or contour optical elements were generated in the exemplary embodiment of e.g., FIGS. 2J-2K. For example, the radius of curvature R may be modulated in the desired direction $\vec{a}_\theta$ (as at 209 of FIG. 2A) over each of the 3 defined regions (404, 406 and 408) in the modulating range from 0 to +2Rm, (where 0 indicates the unmodulated surface, and 2 Rm is the maximum value added to the radius of curvature R) with the desired frequency. Therefore, the new back surface geometry 402 of the lens 400 may be generated by substituting the new frequency and angle terms into the generic "modulating function" described in e.g., FIG. 2H and, for example, the angle may be conditioned as below (e.g., 0<θ≤π/4) for all three regions to only include one cycle of the modulation and the new modulated surface geometry may be described as follows (assuming the r values may be on the surface; r<re in FIG. 4A):

$$\overrightarrow{gm}(r, \theta, z) = \begin{cases} (r*\vec{a}_r) + \left(\sqrt{R^2 - r^2} *\vec{a}_z\right) & \text{Eq. 1} \\ (r*\vec{a}_r) + \left(\sqrt{[R + [S(\theta)+1)/2*(Rm*(1+\sin 2\pi f_{sin}\theta))]]^2 - r^2} *\vec{a}_z\right) & \text{Eq. 2} \\ (r*\vec{a}_r) + \left(\sqrt{[R + [(Rm*(1+\sin 2\pi f_{sin}\theta))]]^2 - r^2} *\vec{a}_z\right) & \text{Eq. 3} \\ (r*\vec{a}_r) + \left(\sqrt{[R + 2Rm]^2} *\vec{a}_z\right) & \text{Eq. 4} \\ (r*\vec{a}_r) + \left(\sqrt{[R + [S(\theta)+1)/2*(Rm*(1+\sin 2\pi f_{sin}\theta))]]^2 - r^2} *\vec{a}_z\right) & \text{Eq. 5} \\ (r*\vec{a}_r) + \left(\sqrt{[R + [(Rm*(1+\sin 2\pi f_{sin}\theta))]]^2 - r^2} *\vec{a}_z\right) & \text{Eq. 6} \\ (r*\vec{a}_r) + \left(\sqrt{[R + 2Rm]^2} *\vec{a}_z\right) & \text{Eq. 7} \\ (r*\vec{a}_r) + \left(\sqrt{[R + [S(\theta)+1)/2*(Rm*(1+\sin 2\pi f_{sin}\theta))]]^2 - r^2} *\vec{a}_z\right) & \text{Eq. 8} \\ (r*\vec{a}_r) + \left(\sqrt{[R + [(Rm*(1+\sin 2\pi f_{sin}\theta))]]^2 - r^2} *\vec{a}_z\right) & \text{Eq. 9} \\ (r*\vec{a}_r) + \left(\sqrt{[R + 2Rm]^2} *\vec{a}_z\right) & \text{Eq. 10} \end{cases}$$

$$\begin{cases} \text{Eq. 1} & 0 \leq r \leq rs1 < r \leq rs2 \cup rm2 < r \leq rs3 \cup rm3 < r < re \cup \pi/4 < \theta < 2\pi \\ \text{Eq. 2} & rs1 < r \leq rm1 \cap 0 < \theta \leq \pi/4 \\ \text{Eq. 3} & \left[(k*Tsgn) - \frac{Tsgn}{2} < \theta < k*Tsgn\right] - \frac{Tsgn}{2} + \frac{Tsin}{4} < 2\pi \cup (k*Tsgn) - \frac{Tsin}{4} < \theta < (k*Tsgn) < 2\pi \cap rs1 < r \leq rm1 \cap 0 < \theta \leq \pi/4 \\ \text{Eq. 4} & rs1 < r \leq rm1 \cap 0 < \theta \leq \pi/4 \cap ((k-1)*Tsgn) + \frac{Tsin}{4} < \theta < (k*Tsgn) - \frac{Tsgn}{2} - \frac{Tsin}{4} < 2\pi \\ \text{Eq. 5} & rs2 < r \leq rm2 \cap 0 < \theta \leq \pi/4 \\ \text{Eq. 6} & \left[(k*Tsgn) - \frac{Tsgn}{2} < \theta < k*Tsgn\right] - \frac{Tsgn}{2} + \frac{Tsin}{4} < 2\pi \cup (k*Tsgn) - \frac{Tsin}{4} < \theta < k*Tsgn, 2\pi \cap rs2 < r \leq rm2 \cap 0 < \theta \leq \pi/4 \\ \text{Eq. 7} & rs2 < r \leq rm2 \cap 0 < \theta \leq \pi/4 \cap ((k-1)*Tsgn) + \frac{Tsin}{4} < \theta < (k*Tsgn) - \frac{Tsgn}{2} - \frac{Tsin}{4} < 2\pi \\ \text{Eq. 8} & rs3 < r \leq rm3 \cap 0 < \theta \leq \pi/4 \\ \text{Eq. 9} & \left[(k*Tsgn) - \frac{Tsgn}{2} < \theta < k*Tsgn\right] - \frac{Tsgn}{2} + \frac{Tsin}{4} < 2\pi \cup (k*Tsgn) - \frac{Tsin}{4} < \theta < (k*Tsgn) < 2\pi \cap rs3 < r \leq rm3 \cap 0 < \theta \leq \pi/4 \\ \text{Eq. 10} & rs3 < r \leq rm3 \cap 0 < \theta \leq \pi/4 \cap ((k-1)*Tsgn) + \frac{Tsin}{4} < \theta < (k*Tsgn) - \frac{Tsgn}{2} - \frac{Tsin}{4} < 2\pi \end{cases}$$

$$k = 1, 2, 3, \ldots$$

As illustrated in FIG. 4B, a single geometrically defined shape and/or contour optical element 422, 424, 426 may be formed in the three regions 404, 406, 408 of the ophthalmic lens surface 402 and may be about rectangular in shape and may be recessed or depressed into the lens back surface and may be configured as having substantially similar widths 412 and distances 414 between each optical element and may also have substantially different circumferential dimensions 416. The optical contour element 422 spans the smallest angular distance from the center 448 while the outermost optical contour element 426 spans the widest angular distance and so all three optical contour elements may be of different dimensions. The sagittal power map 400B illustrates the power profile varies substantially along each individual element (e.g., the edges 4221, 4222 of the geometrically defined shape and/or contour optical element 422 have a relatively lower power (e.g. less negative power) than the central portion 4223. However, the tangential power map 400C displays the power of each optical element (e.g. element 426) at the innermost edge 417 and outermost edge 418 are different and the power-difference increases radially (absolute power difference) across each element and between each of the elements 422, 424 and 426. It may also be seen in 400B that the shape/elements e.g. element 424 may form smooth and continuous surfaces at 427 and 428 in the direction of modulation where the gradual transitions (seen as grey regions 429 in 400A and 400B) smoothly transition between the non-modulated surface region 402 down to the base of the surface recession 434 (400A) formed by the shape/element 424. Each optical element e.g. 424 (400B) may form a sharp return to base surface (discontinuity) at 433, 435 in the radial direction. The sagittal power map 400B and dioptric scale included shows the lens base power was about −2D and the individual elements are substantially identical in power profile and, for example, the element 424 may have a varying power profile with a relatively more positive central power 444 of 0D and the edges of the geometrically defined shapes and/or contour optical elements at 427 and 428 have a relatively less positive power than the central portion 444. The tangential power map 400C reveals the power of the 3 optical elements may also be substantially identical in power profile and, considering for example, the element 426 may have a strongly changing power profile, for example, decreasing in relative positive power radially across the element from an inner portion 418 of about +40.9D to the outer portion 417 of about −47.7D. The optical element central power may have a relatively more positive central power at 446 than the outer element portion 417 and may also be relatively more positive than the base power (−2D). The shape/element 426 may also sharply increase in positive power at 418 and decrease in positive power at 417 radially at the discontinuity between the base lens surface 402 and the optical element 426. Although the center of the element in each of the 3 regions are radially aligned (i.e. not offset, e.g. where the centers 432, 434, 436 of the elements may lie along the radial line 465 passing through the lens center 448 of lens 400A), in some embodiments, it may be desirable to apply an offset to one or more of the regions so the center of an optical element in one or more regions is not radially aligned with the center of other optical elements in a different region of the ophthalmic lens. In some embodiments, one or more regions of the ophthalmic lens may include a plurality of geometrically defined shapes and/or contour optical elements. In some embodiments, the geometrically defined shapes and/or contour optical elements may be different (or the same) in size. In some embodiments, the geometrically defined shapes and/or contour optical elements in each region may not be radially aligned to the shapes or elements in another region. In some embodiments, the geometrically defined shapes and/or contour optical elements in each region may be randomly distributed within a region and relative to another region of the ophthalmic lens. In some embodiments, the geometrically defined shapes and/or contour optical elements in each region may be distributed within a region and relative to another region of the ophthalmic lens such that the elements form a patterned arrangement, for example, checkerboard or hexagonal or grid or diagonal or concentric or spiral patterns.

FIG. 5 illustrates an exemplary embodiment of an ophthalmic lens surface comprising a plurality of geometrically defined shapes and/or contour optical elements on the surface of the ophthalmic lens located in the same 3 annular regions as described in e.g., FIG. 4A. However, in this example, 6 geometrically defined shapes and/or contour optical elements may be formed in each of the 3 annular regions 504, 506, 508 on the back surface 502 of the ophthalmic lens 500. The plan view 500A of the modulated back surface geometry 502 of an ophthalmic lens 500 shows several annular regions including a central zone 503 and an inner peripheral portion with five annular zones 504-508 surrounded by an outer annular peripheral portion 509. Six geometrically defined shapes and/or contour optical elements, for example, 522, 524, 526 may be formed in each region 504, 506 and 508 respectively by the "modulating function" applied to the lens back surface in the respective modulated zones. The other zones 503, 505, 507 and 509 may not be modulated and may contain the base surface geometry contributing to form a base power profile to correct the refractive error of the wearer of the ophthalmic lens. Also shown, are the sagittal power map 500B and tangential power map 500C of the ophthalmic lens 500 of FIG. 5. Like the lens 400 illustrated in FIG. 4A, the 3 modulated regions 504, 506, 508 illustrated in 500A may be located between rs1 and rm1; rs2 and rm2; and rs3 and rm3 (as shown in FIG. 4A) and the manner in which the geometrically defined shapes and/or contour optical elements are generated may be similar to the manner in which the geometrically defined shapes and/or contour optical elements were created in the exemplary embodiment of FIGS. 2J-2K. For example, the radius of curvatures (R) may be modulated in the desired direction $\vec{a}_\theta$ (as at 209 of FIG. 2A) over each of the 3 defined regions (504, 506 and 508 in FIG. 5) in the modulating range from 0 to +2Rm, (where 0 indicates the unmodulated surface, and 2 Rm is the maximum value added to the radius of curvature R). Therefore, the new back surface geometry 502 of the lens 500 may be generated by substituting the new frequency and angle terms into the generic "modulating function" described in FIG. 2H, for example, the frequency of the "modulating function" selected so that the three regions 504, 506 and 508 may comprise six geometrically defined shapes and/or contour optical elements per region (rather than a single element as in FIG. 4). The modulated surface geometry may be as follows:

$$\overline{gm}(r, \theta, z) = \begin{cases} (r*\vec{a}_r) + \left(\sqrt{R^2 - r^2} * \vec{a}_z\right) & \text{Eq. 1} \\ (r*\vec{a}_r) + \left(\sqrt{[R + [S(\theta) + 1]/2 * (Rm * (1 + \sin 2\pi f_{sin}\theta))]]^2 - r^2} * \vec{a}_z\right) & \text{Eq. 2} \\ (r*\vec{a}_r) + \left(\sqrt{[R + [(Rm * (1 + \sin 2\pi f_{sin}\theta))]]^2 - r^2} * \vec{a}_z\right) & \text{Eq. 3} \\ (r*\vec{a}_r) + \left(\sqrt{[R + 2Rm]^2} * \vec{a}_z\right) & \text{Eq. 4} \\ (r*\vec{a}_r) + \left(\sqrt{[R + [S(\theta) + 1]/2 * (Rm * (1 + \sin 2\pi f_{sin}\theta))]]^2 - r^2} * \vec{a}_z\right) & \text{Eq. 5} \\ (r*\vec{a}_r) + \left(\sqrt{[R + [(Rm * (1 + \sin 2\pi f_{sin}\theta))]]^2 - r^2} * \vec{a}_z\right) & \text{Eq. 6} \\ (r*\vec{a}_r) + \left(\sqrt{[R + 2Rm]^2} * \vec{a}_z\right) & \text{Eq. 7} \\ (r*\vec{a}_r) + \left(\sqrt{[R + [S(\theta) + 1]/2 * (Rm * (1 + \sin 2\pi f_{sin}\theta))]]^2 - r^2} * \vec{a}_z\right) & \text{Eq. 8} \\ (r*\vec{a}_r) + \left(\sqrt{[R + [(Rm * (1 + \sin 2\pi f_{sin}\theta))]]^2 - r^2} * \vec{a}_z\right) & \text{Eq. 9} \\ (r*\vec{a}_r) + \left(\sqrt{[R + 2Rm]^2} * \vec{a}_z\right) & \text{Eq. 10} \end{cases}$$

$$\begin{cases} \text{Eq. 1} & 0 \leq r \leq rs1 < r \leq rs2 \cup rm2 < r \leq rs3 \cup rm3 < r < re \cup \pi/4 < \theta < 2\pi \\ \text{Eq. 2} & rs1 < r \leq rm1 \cap 0 < \theta \leq \pi/4 \\ \text{Eq. 3} & \left[(k*Tsgn) - \frac{Tsgn}{2} < \theta < k*Tsgn\right) - \frac{Tsgn}{2} + \frac{Tsin}{4} < 2\pi \cup (k*Tsgn) - \frac{Tsin}{4} < \theta < (k*Tsgn) < 2\pi \cap rs1 < r \leq rm1 \cap 0 < \theta \leq \pi/4 \\ \text{Eq. 4} & rs1 < r \leq rm1 \cap 0 < \theta \leq \pi/4 \cap ((k-1)*Tsgn) + \frac{Tsin}{4} < \theta < (k*Tsgn) - \frac{Tsgn}{2} - \frac{Tsin}{4} < 2\pi \\ \text{Eq. 5} & rs2 < r \leq rm2 \cap 0 < \theta \leq \pi/4 \\ \text{Eq. 6} & \left[(k*Tsgn) - \frac{Tsgn}{2} < \theta < k*Tsgn\right) - \frac{Tsgn}{2} + \frac{Tsin}{4} < 2\pi \cup (k*Tsgn) - \frac{Tsin}{4} < \theta < k*Tsgn, 2\pi\right] \cap rs2 < r \leq rm2 \cap 0 < \theta \leq \pi/4 \\ \text{Eq. 7} & rs2 < r \leq rm2 \cap 0 < \theta \leq \pi/4 \cap ((k-1)*Tsgn) + \frac{Tsin}{4} < \theta < (k*Tsgn) - \frac{Tsgn}{2} - \frac{Tsin}{4} < 2\pi \\ \text{Eq. 8} & rs3 < r \leq rm3 \cap 0 < \theta \leq \pi/4 \\ \text{Eq. 9} & \left[(k*Tsgn) - \frac{Tsgn}{2} < \theta < k*Tsgn\right) - \frac{Tsgn}{2} + \frac{Tsin}{4} < 2\pi \cup (k*Tsgn) - \frac{Tsin}{4} < \theta < (k*Tsgn) < 2\pi \cap rs3 < r \leq rm3 \cap 0 < \theta \leq \pi/4 \\ \text{Eq. 10} & rs3 < r \leq rm3 \cap 0 < \theta \leq \pi/4 \cap ((k-1)*Tsgn) + \frac{Tsin}{4} < \theta < (k*Tsgn) - \frac{Tsgn}{2} - \frac{Tsin}{4} < 2\pi \end{cases}$$

$k = 1, 2, 3, \ldots$

As illustrated in 500A, 6 geometrically defined shape and/or contour optical elements may be formed in each of the three regions 504, 506, 508 of the ophthalmic lens surface 502. The elements 522, 524 and 526 (FIG. 500A) and may be about rectangular in shape and may be recessed or depressed into the lens back surface 502 and may be configured as having substantially similar widths 512 and distances 514 between each optical element and also having substantially different circumferential dimensions 516. The optical contour elements, for example element 522, spans the smallest angular distance from the center 548 while the outermost optical contour elements, for example 526 spans the widest angular distance and so all three optical contour elements are of different dimensions. The sagittal power map 500B illustrates the power profile varies substantially along each individual element (e.g., the edges 5221, 5222 of the geometrically defined shapes and/or contour optical element 522 have a relatively lower power (e.g. less negative power) than the central portion 5223. However, the tangential power map 500C displays the power of each optical element (e.g., element 526) at the innermost edge 518 and outermost edge 517 are different and the power difference increases radially (e.g., the absolute power difference) across each element and between each of the elements 522, 524 and 526. It may also be seen in 500B that the shape/elements e.g. element 524 may form smooth and continuous surfaces at 527 and 528 in the direction of modulation. Each optical element e.g., 524 may form sharp return to base surface (discontinuity) at 533, 535 in the radial direction. The sagittal power map 500B and dioptric scale included shows the lens base power was about −2D and the individual elements are substantially identical in power profile and, for example, the element 524 may have a varying power profile with a relatively more positive central power 544 of 0D and the edges of the geometrically defined shapes and/or contour optical elements element at 527 and 528 have a relatively less positive power than the central portion 544. The tangential power map 500C reveals the power of the 3 optical elements may also be substantially identical in power profile and, considering for example, the element 526, the element may have a strongly changing power profile, for example, decreasing in relative positive power radially across the element from an inner portion 518 of about +40.9D to the outer portion 517 of about −47.7D. The optical element central power may have a relatively more positive central power at 544 than the outer element portion 517 and may also be relatively more positive than the base power (−2D). The shape/element 526 may also sharply increase in positive power at 518 and decrease in positive power at 517 radially at the discontinuity between the base lens surface 502 and the optical element 526. Although the center of the element in each of the 3 regions are radially aligned (i.e. not offset, e.g. where the centers 542, 544, 546 of the elements may lie along the radial line 565 passing through the lens center 548), in some embodiments, it may be desirable to apply an offset to one or more of the regions so the center of an optical element in one region is not radially aligned with the center of other optical elements in a different region of the ophthalmic lens.

Figure 6:
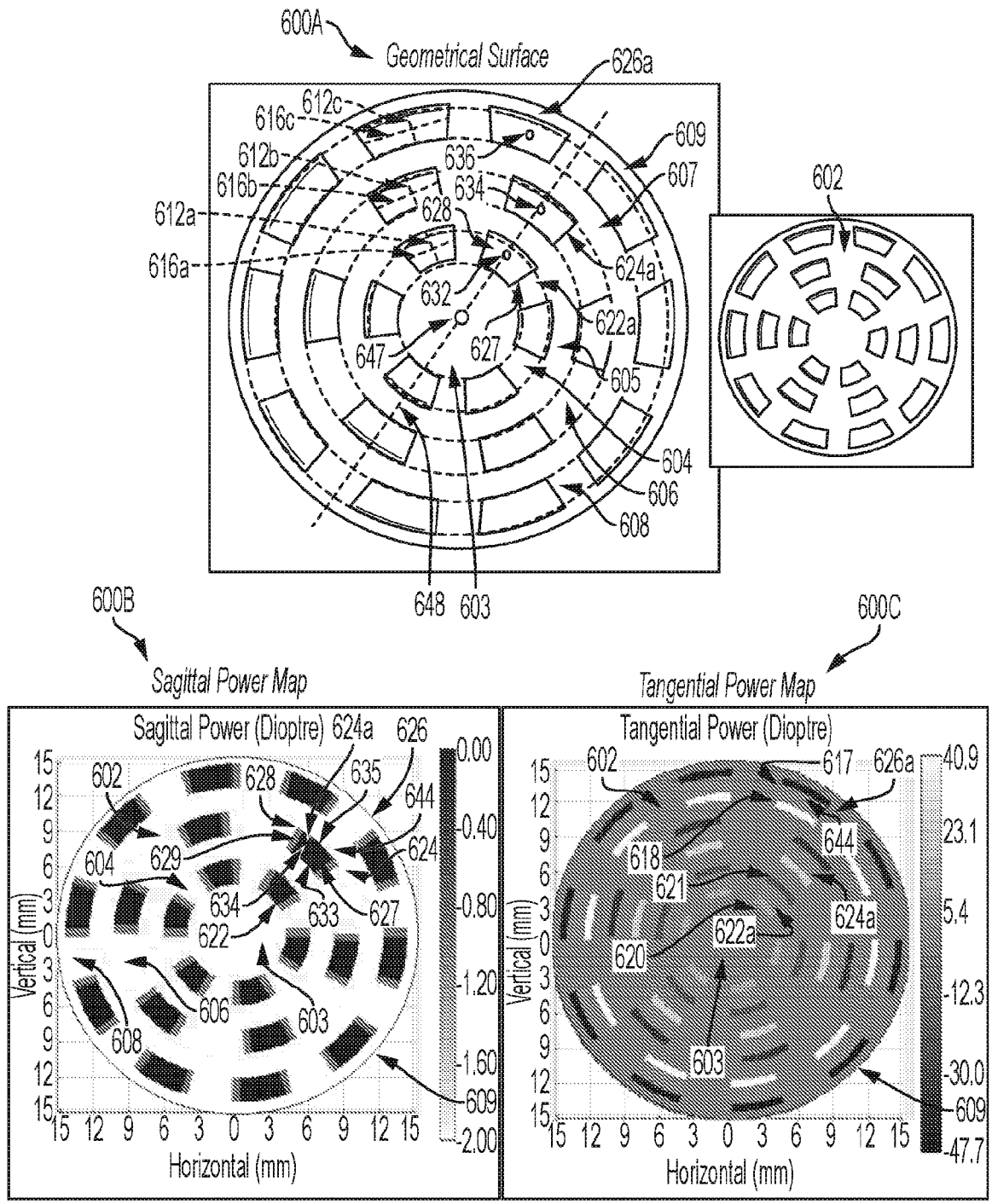
FIG. 6 illustrates an exemplary embodiment of an ophthalmic lens comprising a plurality of geometrically defined shapes and/or contour optical elements on the surface of the ophthalmic lens as described herein.

FIG. 6 illustrates another exemplary embodiment of an ophthalmic lens surface comprising a plurality of geometrically defined shapes and/or contour optical elements on the surface of the ophthalmic lens located in the same three annular regions as described in the ophthalmic lens 500 of FIG. 5. However, in the embodiment of FIG. 6, the modulating function applied to each annular region may have different terms resulting in different arrangements of the geometrically defined shapes and/or contour optical elements designed on the back surface of the ophthalmic lens 600. As shown in FIG. 6 the plan view 600A of the modulated back surface geometry 602 of an ophthalmic lens 600 shows several annular regions including a central zone 603 and an inner peripheral portion with five annular zones 604-608 surrounded by an outer annular peripheral portion 609. As previously illustrated in FIG. 4A, the 3 modulated regions 604, 606 and 608 of FIG. 6 may be located between rs1 and rm1; rs2 and rm2; and rs3 and rm3 and the manner in which the geometrically defined shapes and/or contour optical elements are generated may be similar to the manner in which the geometrically defined shapes and/or contour optical elements are formed in the exemplary embodiment of FIGS. 2J-2K, for example, the radius of curvature (R) may be modulated in the desired direction $\vec{a}_\theta$ (209 of FIG. 2A) over each of the 3 defined regions (604, 606 and 608) in the modulating range from 0 to +2Rm, (where 0 indicates the unmodulated surface, and 2 Rm is the maximum value added to the radius of curvature R). In the embodiment of FIG. 6, the frequency of the "modulating function" may be applied differentially across the three regions; for example, the frequency term in the third (outer most) region 608 may be increased relative to the other two inner regions 604, 606 and may result in more optical elements being formed in the outer region 608 than in the inner 2 regions 604 and 606 (10 versus 6 and 6 elements, respectively). Additionally, the phase of the "modulating function" applied to the third region 608 may also be different than the other regions so that the geometrically defined shapes and/or contour optical elements in the third region 608 (e.g. element 626*a*) may be radially offset (e.g., do not start from the same angular position) as compared to the elements formed, for example 622*a* and 624*a*, in the other two regions 604 and 606. Consequently, the center of element 626*a* (636) may not fall along the radial line 648 as do the centers 632 and 634 of the other two elements (622*a* and 624*a*, respectively). The frequency and phase terms included in the modulating function used to generate the back surface 602 of the ophthalmic lens 600 illustrated in FIG. 6 may be written as: $f_{sgn1}=f_{sgn2}\neq f_{sgn3}$, $T_{sgn1}=T_{sgn2}\neq T_{sgn3}$ and $S1(\theta)=S2(\theta)\neq S3(\theta)$ Therefore, the new surface geometry 602 may be generated by substituting these new frequency and phase terms into the "modulating function" to describe the geometry and may be written as follows:

optical elements may be radially offset, at least in part, and are increased in number (10 vs 6, respectively). The optical contour elements in the innermost region 604, for example element 622*a*, spans the smallest angular distance 616*a* while the outermost optical contour elements, for example 626*a* spans the widest angular distance 616*c* and so all three optical contour elements may be of different dimensions e.g area and/or volume. The sagittal power map 600B and dioptric scale included shows the lens base power was about −2D and the individual elements may be substantially identical in power profile within and across regions 604, 606 and 608. An example element 624*a* in region 606 shows the power profile varies substantially along the individual element (e.g., the edges 627, 628 of the geometrically defined shape and/or contour optical element 624*a* may have a relatively lower power (e.g. less negative power) than the relatively more positive central portion, e.g. at 634 and this power may be more than the base power provided by, for example, region 603. However, the tangential power map 600C shows the power of each optical element. Considering $$\vec{gm}(r,\theta,z) = \begin{cases} \left(r*\vec{a}_r\right)+\left(\sqrt{R^2-r^2}*\vec{a}_z\right) & \text{Eq. 1} \\ \left(r*\vec{a}_r\right)+\left(\sqrt{[R+[S(\theta)+1]/2*(Rm*(1+\sin 2\pi f_{sin}\theta))]]^2-r^2}*\vec{a}_z\right) & \text{Eq. 2} \\ \left(r*\vec{a}_r\right)+\left(\sqrt{[R+[(Rm*(1+\sin 2\pi f_{sin}\theta))]]^2-r^2}*\vec{a}_z\right) & \text{Eq. 3} \\ \left(r*\vec{a}_r\right)+\left(\sqrt{[R+2Rm]^2}*\vec{a}_z\right) & \text{Eq. 4} \\ \left(r*\vec{a}_r\right)+\left(\sqrt{[R+[S(\theta)+1]/2*(Rm*(1+\sin 2\pi f_{sin}\theta))]]^2-r^2}*\vec{a}_z\right) & \text{Eq. 5} \\ \left(r*\vec{a}_r\right)+\left(\sqrt{[R+[(Rm*(1+\sin 2\pi f_{sin}\theta))]]^2-r^2}*\vec{a}_z\right) & \text{Eq. 6} \\ \left(r*\vec{a}_r\right)+\left(\sqrt{[R+2Rm]^2}*\vec{a}_z\right) & \text{Eq. 7} \\ \left(r*\vec{a}_r\right)+\left(\sqrt{[R+[S(\theta)+1]/2*(Rm*(1+\sin 2\pi f_{sin}\theta))]]^2-r^2}*\vec{a}_z\right) & \text{Eq. 8} \\ \left(r*\vec{a}_r\right)+\left(\sqrt{[R+[(Rm*(1+\sin 2\pi f_{sin}\theta))]]^2-r^2}*\vec{a}_z\right) & \text{Eq. 9} \\ \left(r*\vec{a}_r\right)+\left(\sqrt{[R+2Rm]^2}*\vec{a}_z\right) & \text{Eq. 10} \end{cases}$$

$$\begin{cases} \text{Eq. 1} & 0 \leq r \leq rs1 < r \leq rs2 \cup rm2 < r \leq rs3 \cup rm3 < r < re \cup \pi/4 < \theta < 2\pi \\ \text{Eq. 2} & rs1 < r \leq rm1 \cap 0 < \theta \leq \pi/4 \\ \text{Eq. 3} & \left[(k*Tsgn)-\frac{Tsgn}{2}<\theta<k*Tsgn\right)-\frac{Tsgn}{2}+\frac{Tsin}{4}<2\pi \cup (k*Tsgn)-\frac{Tsin}{4}<\theta<(k*Tsgn)<2\pi \cap rs1<r\leq rm1 \cap 0<\theta\leq \pi/4 \\ \text{Eq. 4} & rs1<r\leq rm1 \cap 0<\theta\leq \pi/4 \cap ((k-1)*Tsgn)+\frac{Tsin}{4}<\theta<(k*Tsgn)-\frac{Tsgn}{2}-\frac{Tsin}{4}<2\pi \\ \text{Eq. 5} & rs2<r\leq rm2 \cap 0<\theta\leq \pi/4 \\ \text{Eq. 6} & \left[(k*Tsgn)-\frac{Tsgn}{2}<\theta<k*Tsgn\right)-\frac{Tsgn}{2}+\frac{Tsin}{4}<2\pi \cup (k*Tsgn)-\frac{Tsin}{4}<\theta<k*Tsgn, 2\pi\right] \cap rs2<r\leq rm2 \cap 0<\theta\leq \pi/4 \\ \text{Eq. 7} & rs2<r\leq rm2 \cap 0<\theta\leq \pi/4 \cap ((k-1)*Tsgn)+\frac{Tsin}{4}<\theta<(k*Tsgn)-\frac{Tsgn}{2}-\frac{Tsin}{4}<2\pi \\ \text{Eq. 8} & rs3<r\leq rm3 \cap 0<\theta\leq \pi/4 \\ \text{Eq. 9} & \left[(k*Tsgn)-\frac{Tsgn}{2}<\theta<k*Tsgn\right)-\frac{Tsgn}{2}+\frac{Tsin}{4}<2\pi \cup (k*Tsgn)-\frac{Tsin}{4}<\theta<(k*Tsgn)<2\pi \cap rs3<r\leq rm3 \cap 0<\theta\leq \pi/4 \\ \text{Eq. 10} & rs3<r\leq rm3 \cap 0<\theta\leq \pi/4 \cap ((k-1)*Tsgn)+\frac{Tsin}{4}<\theta<(k*Tsgn)-\frac{Tsgn}{2}-\frac{Tsin}{4}<2\pi \end{cases}$$

$k = 1,2,3,\ldots$

As shown in the plan view 600A of the modulated surface 602, the six geometrically defined shapes and/or contour optical elements generated in regions 604 and 606 and the ten elements generated in region 608, for example optical elements 622*a*, 624*a* and 626*a*, respectively, may be about rectangular in shape and may be recessed or depressed into the lens back surface 602 of the ophthalmic lens surface and may have substantially different circumferential dimensions (616*a-c*) but similar radial widths (612*a-c*). As discussed above, the optical elements in region 604 and 606 may be in phase with each other while in the outer region 608 the for example, element 626*a*, the power at the innermost edge 618 may be different to the power at the outermost edge 617 and furthermore, the power varies radially (absolute power difference) across each element. In some embodiments, the power profile of each optical element may be similar to other optical elements within a region and as shown in the tangential power map 600C. In some embodiments, the tangential power change may not be similar between the elements within a region and/or across regions. As shown in 600C, the power of the optical elements in regions 604, 606 and 608 may not be identical in power profile and, for example, the element 626a may have a strongly varying power profile, for example, decreasing in relative positive power radially across the element from an inner portion 618 of about +40.9D to the outer portion 617 of about −47.7D. In comparison, example element 622a from the innermost region 604 may have a less strongly varying power profile from an inner portion 620 to the outer portion 621. As demonstrated in the plan view of the ophthalmic lens in 600A, each of the shape/element may form a smooth and continuous surface at 627 and 628 in the direction of modulation where the gradual transitions 627, 628 transition between the non-modulated surface region 602 to the base of the surface recession 644 formed by the shape/element 622a. The optical element in the 3 regions may form sharper transitions at 635 in the radial direction.

As illustrated in 600A, the center of the elements in the 2 regions 604 and 608 may be radially aligned (e.g., not offset) (e.g. where the centers 632 and 634 of the elements 622a and 624a may lie along the radial line 648 passing through the lens center 647) while the elements in the outermost region 608 may not be radially aligned with the elements in regions 604 and 608 (e.g., offset) (e.g. where the centers 636 of the elements 626a may not lie along the radial line 648 passing through the lens center 647). In some embodiments, it may be desirable to apply an offset to one or more of the regions so the center of an optical element in one region is not radially aligned with the center of other optical elements in a different region of the ophthalmic lens. For example, an offset or random distribution of geometrically defined shapes and/or contour optical elements may mitigate or alleviate adverse optical effects such as distortions, dynamic vision disturbances with head movements, haloes, ghosting or doubling of vision or hazy vision or reduced contrast vision than more ordered, regularly patterned arrangements.

In some embodiments, one or more regions of the ophthalmic lens may include a plurality of geometrically defined shapes and/or contour optical elements. Altering the relative number of geometrically defined shapes and/or contour optical elements between regions on the surface of the ophthalmic lens may provide improved ophthalmic lenses for example in myopia control applications. Improved ophthalmic lenses for myopia control having more controlled distribution of optical properties, including for example defocus and prism, may be required to increase myopia control efficacy and/or wearability of the lenses. For example, regions closer to the central region of the lens may require a different number of geometrically defined shapes and/or contour optical elements or different powers and/or power profiles of the geometrically defined shapes and/or contour optical elements compared to the more outer or peripheral regions of the lens. In some embodiments, lens wearability may be improved by decreasing the number of geometrically defined shapes and/or contour optical elements or reducing the powers and/or power profiles of the inner regions compared to more outermost regions of the lens. In some embodiments, lens wearability may be improved by decreasing the number of geometrically defined shapes and/or contour optical elements or reducing the powers and/or power profiles of the upper (for example above the lens center) regions compared to more lower (for example below the lens center) regions of the lens. In some embodiments, lens wearability may be improved by decreasing the number of geometrically defined shapes and/or contour optical elements or reducing the powers and/or power profiles in quadrants of the lens (for example on the nasal or temporal quadrant from the lens center) compared to the other quadrants (for example temporal or nasal quadrant from the lens center) of the lens. In some embodiments, the myopia control effectiveness may be improved by varying the number of shapes and/or elements (for example increasing around the lens center) or varying the powers and/or power profiles of geometrically defined shapes and/or contour optical elements closer to the lens center compared to other regions of the lens. In some embodiments, the myopia control effectiveness may be improved by alternating the powers and/or power profiles of the geometrically defined shapes and/or contour optical elements over regions of the lens (for example laterally or vertically or diagonally). In some embodiments, the myopia control effectiveness may be improved by altering other optical properties of the geometrically defined shapes and/or contour optical elements over regions of the lens, for example; defocus, prism power, light scattering, diffraction, diffusion, dispersion, aberrations, deviations, contrast and light amplitude modulation. In some embodiments, ophthalmic lenses with different modulated optical properties may form part of a lens treatment system, for example, a user may initially be prescribed an ophthalmic lens with a modulation of a geometric parameter for example a radius curvature providing geometrically defined shapes and/or contour optical elements with refractive defocus that may be effective in controlling the myopia progression for a period of time e.g. 1 month, 2 months, 3 months, 4 months, 5 months, 6 months, 9 months or 1 year but thereafter become less effective or lose effect on controlling the myopia progression. However, thereafter a second pair of ophthalmic lenses may be prescribed from the lens treatment system that may incorporate geometrically defined shapes and/or contour optical elements that may be formed by a modulation of a different optical principle, for example a light scattering parameter such as a surface roughness and therefore result in a different type of retinal image quality from the different optical properties and thus stimulate the retinal receptors in an alternate and effective manner to renew the myopia control effectiveness. In some embodiments, any combination of optical principles may be used in tandem or in sequence between eyes or within pairs to periodically change the optical signal to the retinal receptors. The modulated ophthalmic lenses used in the treatment system may be employed over a period of time from as short as a few hours within a single day or over a day or more or weeks or months or longer.

Figure 7:
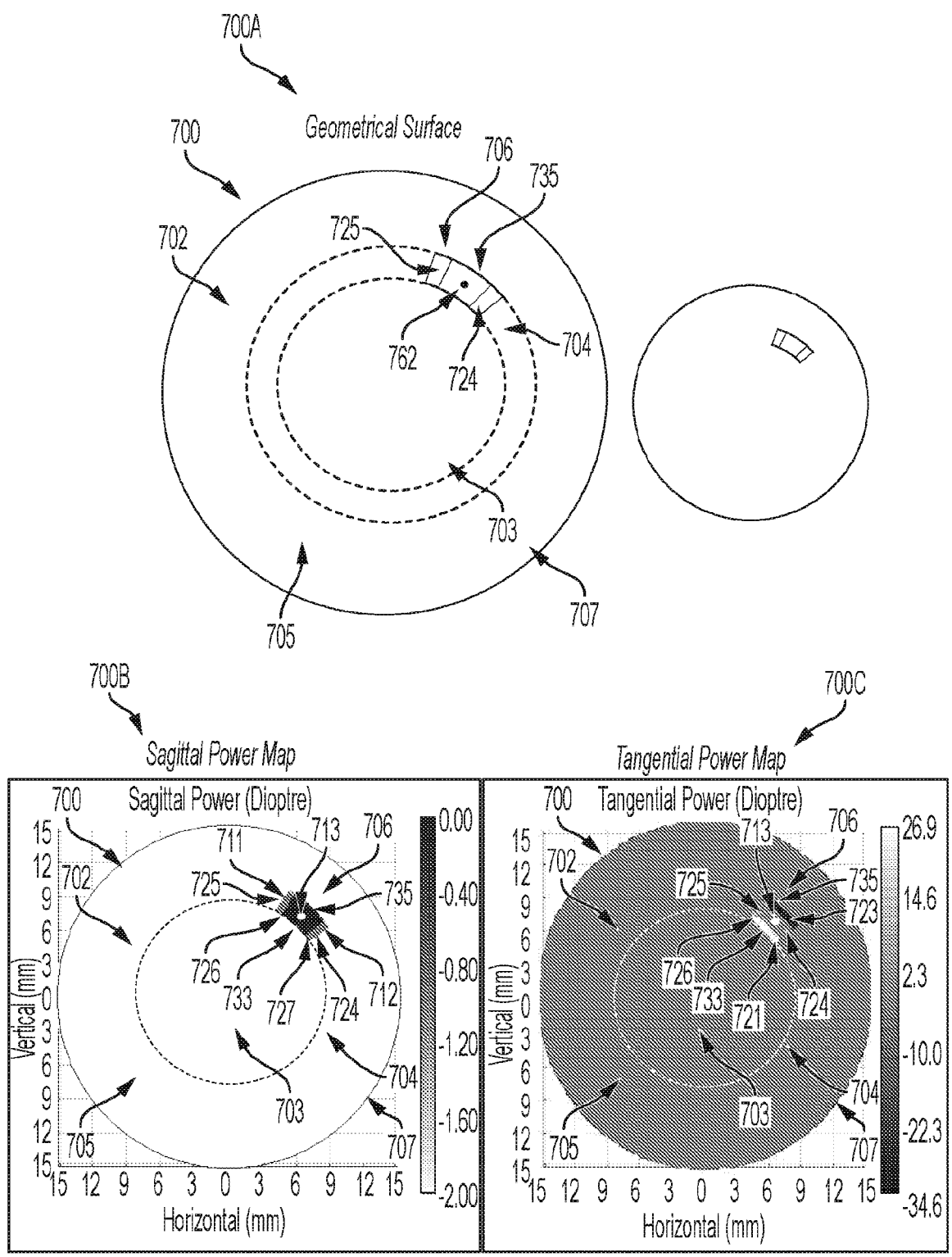
FIG. 7 illustrates an exemplary embodiment of an ophthalmic lens comprising a plurality of geometrically defined shapes and/or contour optical elements on the surface of the ophthalmic lens as described herein.

FIG. 7 illustrates a plan view of another exemplary embodiment of an ophthalmic lens comprising a geometrically defined shape and/or contour optical element on the surface of the ophthalmic lens as described herein. To generate the back surface 702 on the ophthalmic lens 700 of FIG. 7, the modulating function, modulated parameter, modulating region and modulating value range used to form the geometrically defined shapes and/or contour optical elements on the surface 402 of the ophthalmic lens 400 from FIG. 4 were applied along the same direction but the angle of the modulating region is conditioned to form a single geometrically defined shape and/or contour optical element in a single annular region. As shown in FIG. 7, the plan view 700A of the modulated geometry of the back surface 702 of an ophthalmic lens 700 incorporating several regions including a central zone 703 and an inner peripheral region 704 incorporating a single geometrically defined shape and/or contour optical element 706 and an outer region 705 that may, like region 703, incorporate the base lens power profile to correct, at least in part, the refractive error of the wearer of the ophthalmic lens. The plan view 700A of the lens back surface geometry 703 shows the dimensions, shape and location of the geometrically defined shape and/or contour optical element 706 formed by applying the modulating function to the lens back surface in zone 704. Also shown in FIG. 7, are the sagittal power map 700B and tangential power map 700C of the ophthalmic lens 700. As illustrated in FIG. 4A, the modulated region 704, may be located between rs1 and rm1; the manner in which the geometrically defined shape and/or contour optical element may be created is in a similar manner to the geometrically defined shapes and/or contour optical elements generated in the exemplary embodiment of FIGS. 2J-2K, for example, the radius of curvature (R modulated in the desired direction $\vec{a}_\theta$ (209 in FIG. 2A) over the defined region 704 in the modulating range from 0 to +2Rm, (where 0 indicates the unmodulated surface, and 2 Rm is the maximum value added to the radius of curvature R). Therefore, the new back surface 702 may be created by substituting a new angle term into the generic "modulating function" described in FIG. 2H so that the angle may be conditioned to include only one cycle of the modulation in the defined region 704. The single geometrically defined shape and/or contour optical element 706 is formed and may be about rectangular in shape and may be recessed or depressed into the lens back surface. The sagittal power map 700B shows the power profile varies substantially along the optical element 706 (e.g., the edges 711, 712 of the geometrically defined shape and/or contour optical element 706 has a relatively lower power (e.g. less negative power) than the central portion 713. However, the tangential power map shows that the power of the optical element 706 at the innermost edge 721 and outermost edge 723 may be different and the power difference varies radially (absolute power difference). Considering the element, 706 in 700A, the element may form a smooth and continuous surface at 724 and 725 in the direction of modulation between the non-modulated surface region 703 or 705 to the center of the element surface 713 formed by the shape/element 706 but may form sharper transitions at 735 in the radial direction. The tangential power map 700C reveals the power of the optical element may also have a strongly changing power profile, for example, decreasing in relative positive power radially across the element from an inner portion 721 of about +26.9D to the outer portion 723 of about −34.6D.

In some embodiments, at least one geometrically defined shape and/or contour optical element may be large and may be located in any region of either of the lens surfaces, for example, the optical element may cover at least 10% or more of the lens surface area in an inferior portion of the lens surface. In some embodiments, the surface area coverage may be 20% or more or may be 40% or more or may be 50% or more. In some embodiments, the large and inferiorly located geometrically defined shape and/or contour optical element may be designed to correct a near refractive error of a presbyope and may have a relatively more positive power profile than the base lens surface. In some embodiments, the geometrically defined shape and/or contour optical element may be formed by a modulating function that may have terms forming a progressive power profile. In some embodiments, it may be desirable to form a geometrically defined shape and/or contour optical element that may form a smooth and continuous surface with the base lens surface in the direction of modulation of the modulated parameter and in some embodiments, may be desirable to form a geometrically defined shape and/or contour optical element that may form a smooth and continuous surface with the base lens surface in at least a portion of the junction of the optical element or in at least every portion and in any direction around the optical element.

Figure 8:
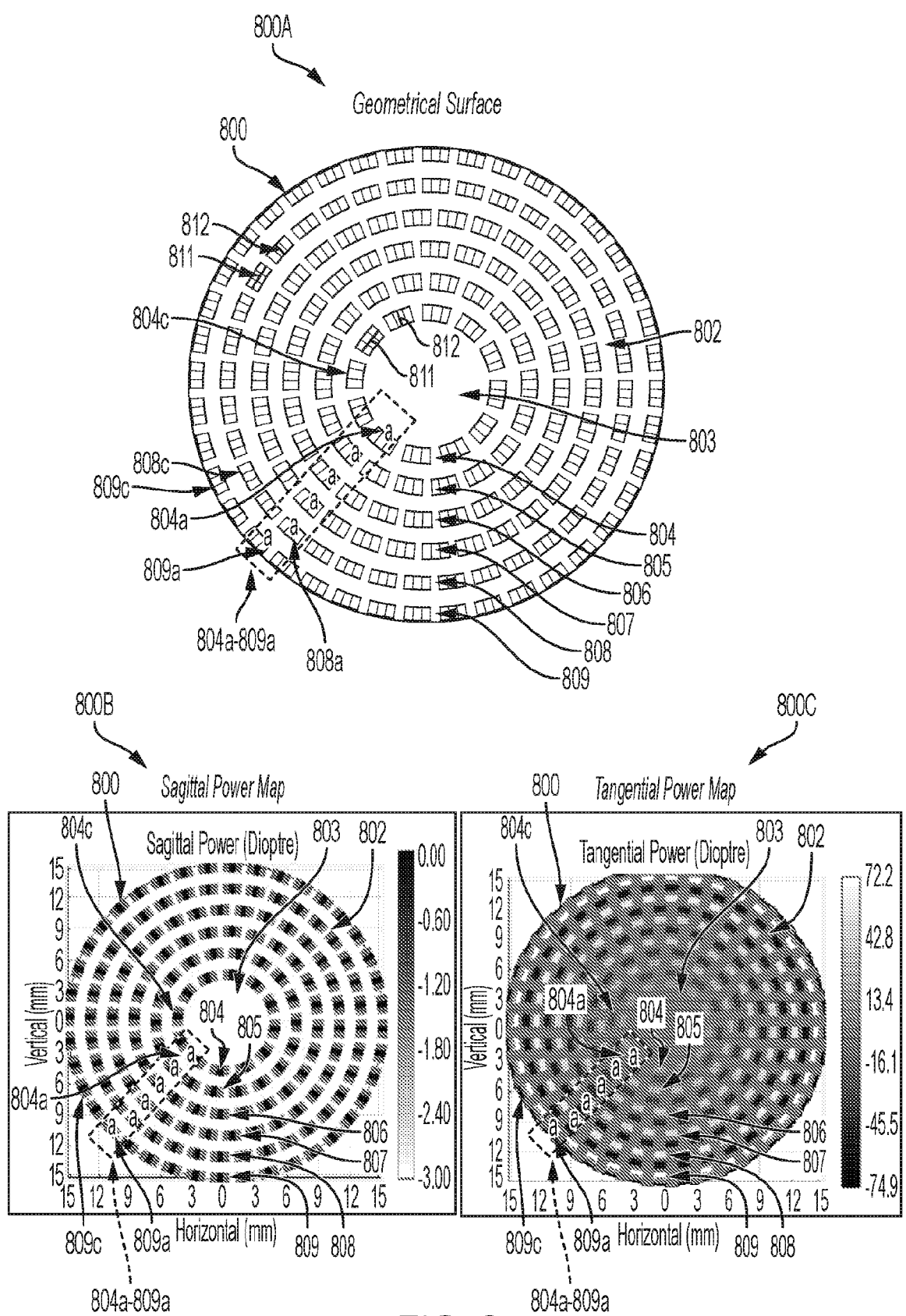
FIG. 8 illustrates an exemplary embodiment of an ophthalmic lens comprising a plurality of geometrically defined shapes and/or contour optical elements on the surface of the ophthalmic lens as described herein.
Figure 9A:
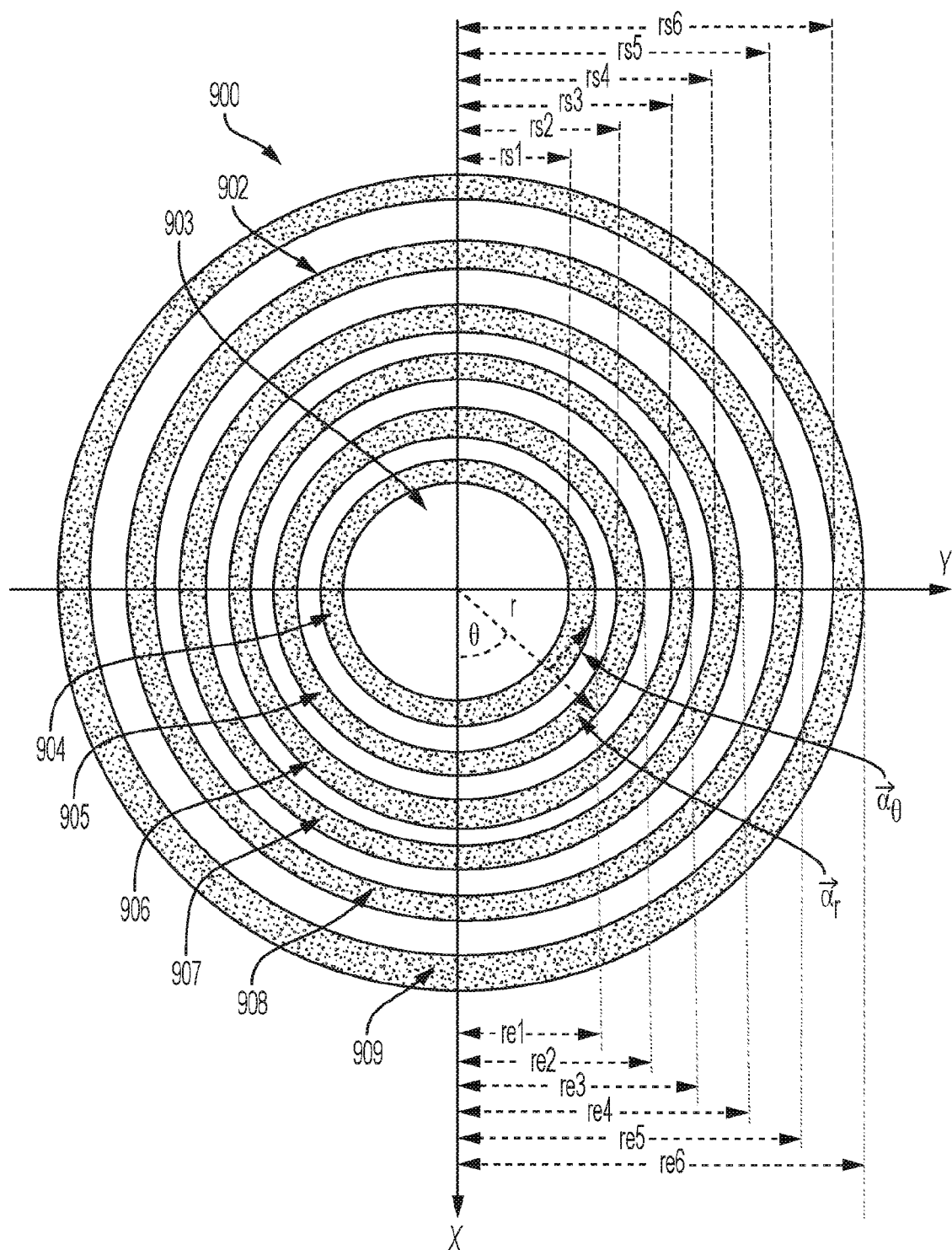
FIGS. 9A, 9B and 9C illustrate an exemplary embodiment of an ophthalmic lens comprising a plurality of geometrically defined shapes and/or contour optical elements on the surface of the ophthalmic lens as described herein.

FIG. 8 illustrates another exemplary embodiment of an ophthalmic lens surface comprising a plurality of geometrically defined shapes and/or contour optical elements on the surface of the ophthalmic lens located in a plurality of annular regions. This exemplary embodiment uses the same modulating function, modulated parameter and modulating value range applied to the same starting surface geometry (but a different base power) in the same circumferential direction to form the geometrically defined shapes and/or contour optical elements in the targeted modulation regions on the surface of the example ophthalmic lenses as previously described in FIGS. 4-7. However, in the embodiment of FIG. 8, the modulating function applied to the pre-modulated lens surface may have different frequency terms resulting in different arrangements of the geometrically defined shapes and/or contour optical elements designed on the back surface of the ophthalmic lens 800. As shown in FIG. 8, the plan view 800A of the modulated geometry of the back surface 802 of an ophthalmic lens 800 incorporates a central zone 803 and a plurality, for example 6, of annular modulated regions 804 to 809 alternating with 5 annular zones of unmodulated base lens surface. The annular modulated regions 804 to 809 each incorporate a plurality of geometrically defined shape and/or contour optical elements and the alternating regions of unmodulated base surface may incorporate the base lens power profile to correct, at least in part, the refractive error of the wearer of the ophthalmic lens. The plan view 800A of the lens back surface geometry 803 shows the dimensions, shape and location of the geometrically defined shape and/or contour optical elements formed by the modulating function applied to the lens back surface in regions 804 to 809. As illustrated in FIG. 9A, the 6 modulated regions 804 to 809 now generated on the lens back surface 802 of FIG. 8 may be located between rs1 and rm1; rs2 and rm2; and through to rs6 and rm6 and the manner in which the geometrically defined shapes and/or contour optical elements are generated may be similar to the manner in which the geometrically defined shapes and/or contour optical elements are formed in the exemplary embodiment of FIGS. 2J-2K, for example, the radius of curvature (R) may be modulated in the desired direction $\vec{a}_\theta$ (209 in FIG. 2A) over each of the 6 defined regions (804 to 809) in the modulating range from 0 to +2Rm, (where 0 indicates the unmodulated surface, and 2 Rm is the maximum value added to the radius of curvature R) and generating more elements per region from 804 to 809. As illustrated in 800A, the dimensions of the geometrically defined shapes and/or contour optical elements within each region (for example, elements 808a and 808c in region 808 in 800A) and across regions (for example, elements 804a to 809a in regions 804 to 809 in 800A) may be of similar shape, length (811 in 800A) and width (812 in 800A) and therefore area and/or volume. Accordingly, the modulating function may also be used by the different frequency terms in each region and so the number of shapes and/or elements in each region may be different, for example, with fewer elements in the innermost regions e.g. 804 may have 12 elements of equal dimensions and the outermost region e.g. 809 may have 40 elements of equal dimensions. Importantly, the number of annular regions and/or frequency values of the modulating functions applied to each region may be selected to increase/decrease a fill ratio (e.g., to obtain a desired fill ratio). A fill ratio may be defined as the proportion of a defined area on an ophthalmic lens that may be dedicated to geometrically defined shapes and/or contour optical elements (and therefore the degree of optical effects derived therefrom) and, for example, the area that may be dedicated to the base lens refractive power that may correct the refractive error of the user of the ophthalmic lens. In the example illustrated in FIG. 8, the resultant lens has a base power profile of −3 D, and relatively more positive power inside the geometrically defined shapes and/or contour optical elements.

The sagittal (800B) and tangential (800C) power maps also reveal the optical properties of the elements in the sagittal meridian may be substantially identical across all elements and regions (e.g. 808a and 804a) however the tangential meridian may be similar in each region e.g., 808a and 808c, but the elements in different regions may not be identical, for example, the absolute power change difference across each element may vary from a smallest difference in the innermost region 804 e.g., element 804a to a largest difference in the outermost region 809 e.g., element 809a. In some embodiments, any parameter or property of the geometrically defined shapes and/or contour optical elements may be manipulated collectively or individually or any combinations thereof to alter the optical effects observed by the user of the ophthalmic lens.

As would be readily understood by persons of skill in the art based on the disclosure herein and using the methodology described herein, the number of regions and/or geometrically defined shapes and/or contour optical elements in a region may be adjusted to obtain a desired fill ratio or desired result, more generally. For example, in some embodiments, the number of geometrically defined shapes and/or contour optical elements in a region (e.g., ring) may be 1, 2, 3, 4, 5, 6, 7, 8, 9, 10, 11, 12, 13, 14, 15, 10 or less, 15 or less, 20 or less, 25 or less, 30 or less, etc. In some embodiments, the number of regions (e.g., rings) may be 1, 2, 3, 4, 5, 6, 7, 8, 9, or 10. In some embodiments any number of e.g., 1, 2, 3, 4, 5, 6, 7, 8, 9, 10, 11, 12, 13, 14, 15, 10 or less, 15 or less, 20 or less, 25 or less, 30 or less geometrically defined shapes and/or contour optical elements may be present in any combination with any number of 1, 2, 3, 4, 5, 6, 7, 8, 9, or 10 regions (e.g., rings). In some embodiments, the power or power profile of the geometrically defined shapes and/or contour optical element in a region or of the geometrically defined shapes and/or contour optical elements between regions may be different or may be the same. In some embodiments, the dimensions of geometrically defined shapes and/or contour optical elements in a region may be different or the dimensions of each region containing geometrically defined shapes and/or contour optical may be different.

The example embodiments of FIGS. 1-8 describe the use of a modulating function that may be applied to the geometrical or non-geometrical parameters of ophthalmic lenses to form different configurations and arrangements of geometrically defined shapes and/or contour optical elements to produce a desired optical effect to the user of the ophthalmic lens. As part of the design process, the modulation process may have several terms defined that may control the geometrically designed shapes and/or contour optical elements that may facilitate the optical design implementation. One such term is the direction of modulation in the defined modulated region and FIGS. 1-8 may be described as being modulated in the circumferential direction $\vec{a}_\theta$ (e.g. as shown as 209 in FIG. 2A) and as such the geometrically defined shapes and/or contour optical elements may form smooth and continuous surface with the base lens surface in the direction of modulation as described in the exemplary figures herein. However, in some embodiments, it may be desirable to generate the geometrically defined shapes and/or contour optical elements by the modulation of at least one or more geometrical or non-geometrical parameter(s) in other directions, for example in at least a radial direction $\vec{a}_r$, (for example as shown as in FIG. 1A) or in both circumferential and radial directions (e.g., $\vec{a}_\theta$ and $\vec{a}_r$) in any of the regions of an ophthalmic lens being modulated. In some embodiments, the control of the modulation direction in the modulating function may result in geometrically defined shapes and/or contour optical elements that continuously vary in their power along the shapes and elements in both circumferential and radial (or all) directions and may also result in the geometrically defined shapes and/or contour optical elements forming smooth and continuous surfaces in any (or all) directions with the base lens surfaces.

Figure 9B:
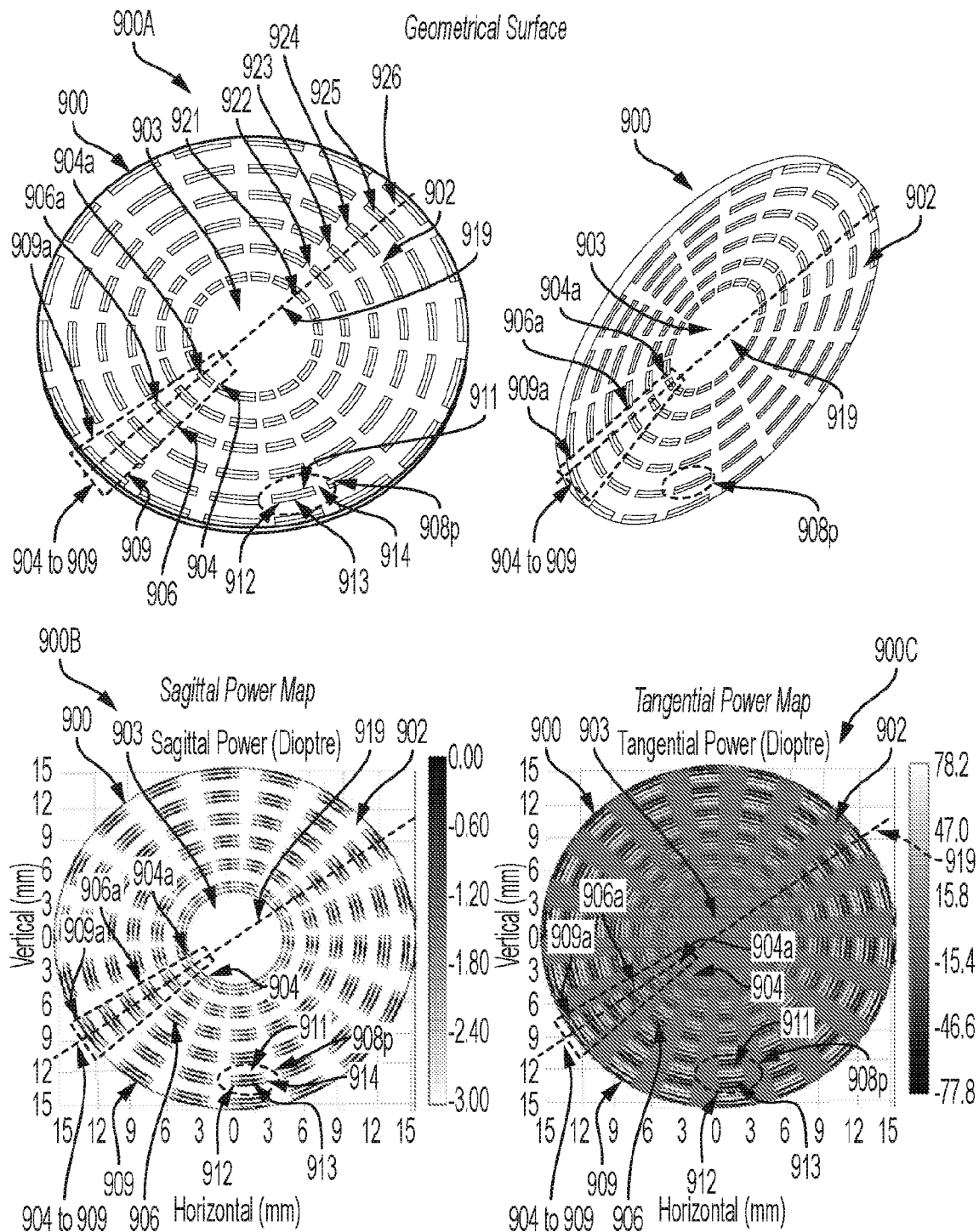

FIG. 9A illustrates a plan view of a surface of an ophthalmic lens comprising a plurality of geometrically defined shapes and/or contour optical elements on the surface of an ophthalmic lens formed by the modulation of a radius of curvature in both circumferential and radial directions in a plurality of modulated annular region. FIG. 9B illustrates a plan view 900A of the geometry of the modulated lens back surface, a sagittal power map 900B and a tangential power map 900C of the exemplary embodiment of the ophthalmic lens illustrated herein. The lens 900 in FIG. 9A has a back surface 902, a central zone 903 incorporating a base lens surface contributing to the power profile of the ophthalmic lens 900 to correct the refractive error of the wearer, a plurality of modulated annular zones 904-909 incorporating a plurality of geometrically defined shapes and/or contour optical elements and a plurality of annular zones of base lens surface alternating in between the modulated annular zones that may also contribute to the power profile of the ophthalmic lens to correct the refractive error of the wearer. As drawn in 900A of FIG. 9B, the plurality of modulated annular zones 904-909 incorporate a plurality of geometrically defined shapes and/or contour optical elements. The modulating process that may generate the plurality of geometrically defined shapes and/or contour optical elements in each modulated annular zone, for example, the innermost region 904 defined between rs1 to re1 by applying the modulating function to modulate the radius of curvature, R, of the base lens surface in the annular zone 904 in both a circumferential (e.g., $\vec{a}_\theta$) and radial directions (e.g., $\vec{a}_r$) in the defined modulating value ranges from 0 to +2Rm, (where 0 indicates the unmodulated surface, and 2 Rm is the maximum value added to the radius of curvature R). The modulating function may include terms to similarly modulate the radius curvature of the base lens in the remaining other regions 905-909 to generate the same number of geometrically defined shapes and/or contour optical elements in each of the regions and may include further specific terms to condition the dimensions of each optical element in each region. For example, as shown in 900A in FIG. 9B the innermost and outermost modulated annular regions 904 and 909 each have 19 optical contour elements designed in phase with each other, i.e. the centers of each of the 19 optical contour elements may align along the same radial axis 910, however, the dimensions of the optical contour elements may be larger in region 909 than 904 e.g. elements 909a and 904a respectively. Because the plurality of optical contour elements in each region may be generated by the modulation of radius of curvature in both the circumferential and radial directions (FIG. 9A), the plan view of the geometrical surface 900A shows the transitions between the optical elements and the base lens surface were smooth and continuous surface in both directions as seen in the plan view of the surface geometry for an example element 908p in region 908 at location 911 and 912 in the circumferential direction and at 913 and 914 in the radial direction). The sagittal and tangential power maps 900B and 900C respectively of the ophthalmic lens illustrated in FIG. 900B show that individual elements (e.g., 908p in region 908) may have a varying sagittal power profile in the circumferential direction e.g., the edges 911 and 914 of the geometrically defined shapes and/or contour optical element 908p located in region 908 may have a varying power compared to the central portion 913 similar to previous embodiments described in FIGS. 2-8. Similarly, the tangential power map 900C show that individual elements (e.g., 908p in region 908) may have a varying tangential power profile in the radial direction (e.g., the edges 911 and 912 of the example geometrically defined shape and/or contour optical element 908p located in region 908 compared to the central portion 913 and so may be different to previous embodiments lenses where the modulation was only in the circumferential direction and without any radial direction the transitions of elements in a radial direction may show a sharp transition in surface geometry, as previously described in FIGS. 2-8.

Figure 9C:
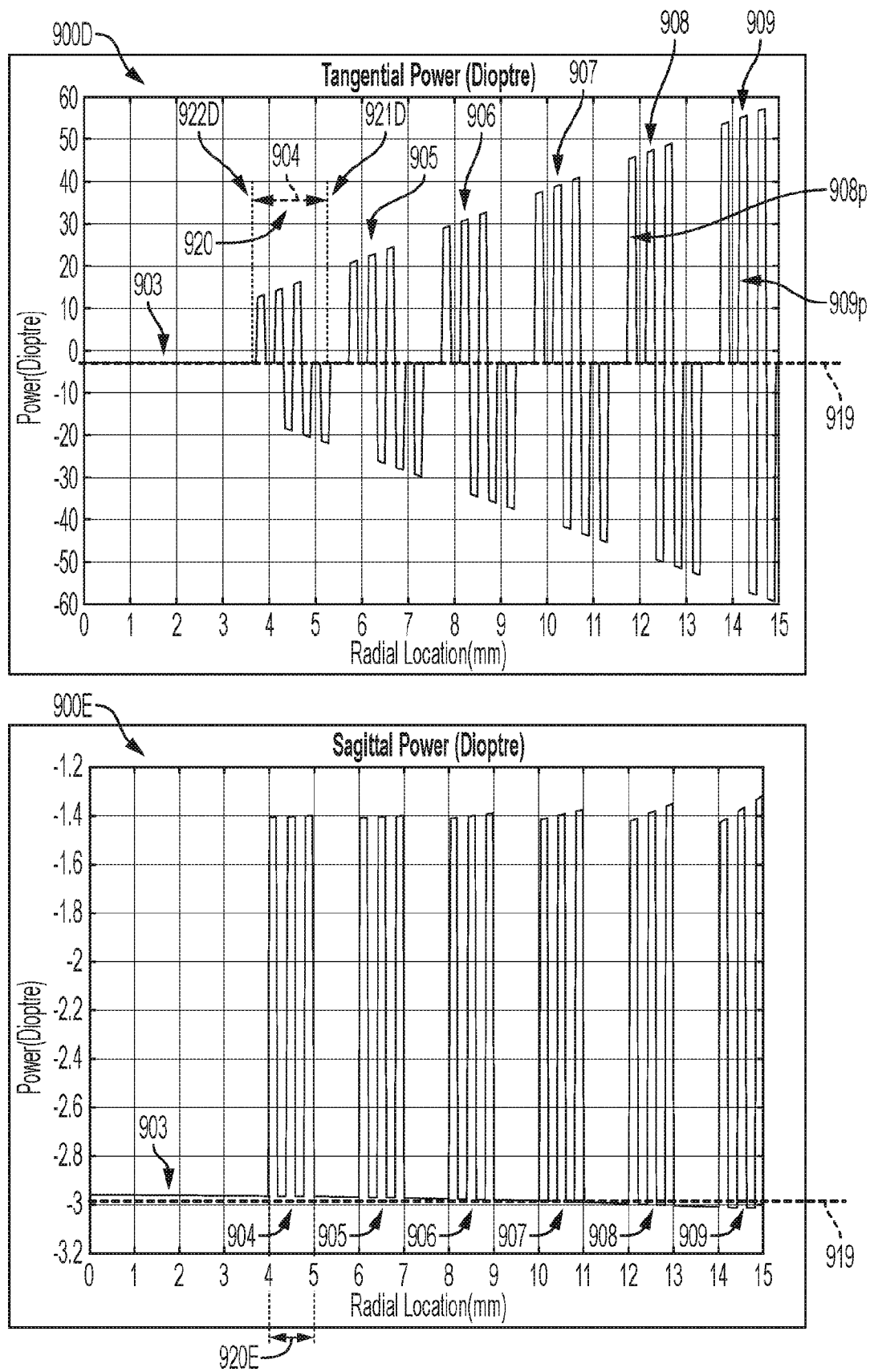

FIG. 9C plots the tangential 900D and the sagittal 900E power profiles along a radial meridian 919 (900A in FIG. 9B) passing through the central optical zone 903 (900A in FIG. 9B), and the center of the 6 optical elements e.g. 921 to 926 located in each of the modulated regions 902-908 of the ophthalmic lens as indicated in FIG. 9A. As can be seen from the tangential power profile displayed in 900D (FIG. 9C), the base lens power of the ophthalmic lens along meridian, e.g. 919 is about −3D and the addition of the modulation of the radius of curvature in the radial direction produces, for example, a tangential power map cross-section showing the power of the shapes and/or elements formed may have a more sequential variation (e.g., oscillating above and below the base power) along the radial direction as shown 920 between 922D and 921D in 900D in FIG. 9C. The optical element 904 shows an oscillating of tangential power change around the base lens power of −3D between about a range of +12D to +17D and −18D to −22D across the element length 920. The power variation around the base power progressively increases across the lens regions with the outermost element 909p in region 909 (shown in FIG. 9A) exhibiting a variation of almost +/−60D. It can also be seen in 900E in FIG. 9C, after the clear center zone 903, the regions 904 to 909 include about +1.5 D add power elements in the sagittal power profile cross-section 919. The three peaks of high plus powers shown in the zone 904 as 920E, are the results of the radial modulation inside this and other zones.

Additionally, it may be desirable to vary the power and power profile of geometrically defined shapes and/or contour optical elements. In some embodiments, the variation of powers inside the element in both circumferential and radial directions across the lens or in portions of the lens may be controlled and enable the optical designer to tailor the image quality and deliver optical signals to the eye for particular ophthalmic lens applications. For example, in some embodiments, the through focus light distribution of an ophthalmic lens may be dispersed between the different power values within a single or plurality of geometrically defined shapes and/or contour optical elements on the surface of an ophthalmic lens to lower the optical contrast of the image formed on the retinal image plane. Ophthalmic lenses that lower retinal image contrast generally or filter (e.g. reduce or enhance or eliminate) specifically selected spatial frequencies may be useful for myopia control applications. In some embodiments, the geometrically defined shapes and/or contour optical elements may form smooth and continuous surfaces in any (or all) directions but may not return to the base lens surface, for example, remains at an elevation above and or below the base lens surface. As illustrated in FIG. 9A, the modulated annular zones 904 to 909 incorporating a plurality of geometrically defined shapes and/or contour optical elements may alternate with annular zones of base lens surface and base lens power profile and may form a smooth and continuous transition in the circumferential and/or the radial direction as disclosed herein. In some embodiments, the modulated annular zones 904 to 909 incorporating a plurality of geometrically defined shapes and/or contour optical elements may alternate with annular zones that may not incorporate the base lens surface 902, for example, the at least one or more alternating zones may also undergo a modulation process similar to the process that may have modulated the annular zones 904 to 909, and the alternating annular zones in-between 904 to 909 and may now also incorporate a plurality of geometrically defined shapes and/or contour optical elements. In some embodiments, the modulation process may be altered when applied on the geometric parameter, for example, a similar modulating function may be applied on the radius of curvature in one or more of the alternating annular regions in between annular zones 904 to 909 but the modulating value range may be different to the modulating range applied in regions 902 to 909, for example, less and smaller range, such that the plurality of elements generated may have less curvature change compared to the zones 904 to 909 and thereby may, for example, have a lesser power profile than the plurality of elements in the zones 904 to 909 but may be still be greater than the base lens surface power profile. In some embodiments, the modulating direction may be circumferential and/or radial and may form smooth and/or continuous transitions between the annular zones in the circumferential and/or the radial direction or in any direction. In some embodiments, the modulating function that may modulate the surfaces of the annular zones 904 to 909 and the alternating zones in between may be conditioned to generate less than a plurality of geometrically defined shapes and/or contour optical elements, for example, at least one geometrically defined shapes and/or contour optical elements. In some embodiments, the element may form a complete ring and the entire annular zone lens surface may be occupied by the element. In some embodiments, the at least one or more elements within a zone or in any zone may have different ranges of modulation of the modulating parameter, for example a radius of curvature, and thereby generating, for example, a single annular element in at least one zone that may have a larger range of modulation of the radius of curvature than another zone(s), including the alternating annular zones in between zones 904 to 909. Accordingly, one or more zones of the annular zones 904 to 909 and/or the alternating annular zones in between zones 904 to 909, may have one or more zones having a modulation, for example, a radius of curvature modulation resulting in a different, for example less strength or more strength, than the power profile or an optical property of the pre-modulated base lens surface and/or any zone, for example central zone 903, that may incorporate a power profile to correct the refractive error of the user of the ophthalmic lens.

In some embodiments, the geometrically defined shapes and/or contour optical elements may be generated by modulating an optical axis angle of the defined region. As with the radius of curvature, the optical axis of the defined regions may be changed by the application of a "modulating function" on this parameter. In some embodiments, this may result in the inclusion of a prism power in the geometrically defined shapes and/or contour optical elements. In some embodiments, the modulating function application on the region may shift (e.g., laterally or in any direction) the optical axis of one or more of the geometrically defined shapes and/or contour optical elements on the surface relative to the optical axis of the base lens. Any suitable technique for changing the optical axis may be used. In some embodiments, the center coordinates of the radius of curvature may be used as the parameter for this process, in order to create the desired optical and/or geometrical properties. Likewise, any other optical properties may be manipulated to introduce desired optical effects into the design of an ophthalmic lens by the modulation of geometrical and/or non-geometrical parameters in an ophthalmic lens as described herein. These optical effects may be including refractive, non-refractive, diffractive, contrast modulating, phase-modulating, light scattering, aberrated, holographic, diffusing, light deviating (prism), light amplitude modulating or a combination of one or more optical properties thereof.

Figure 10A:
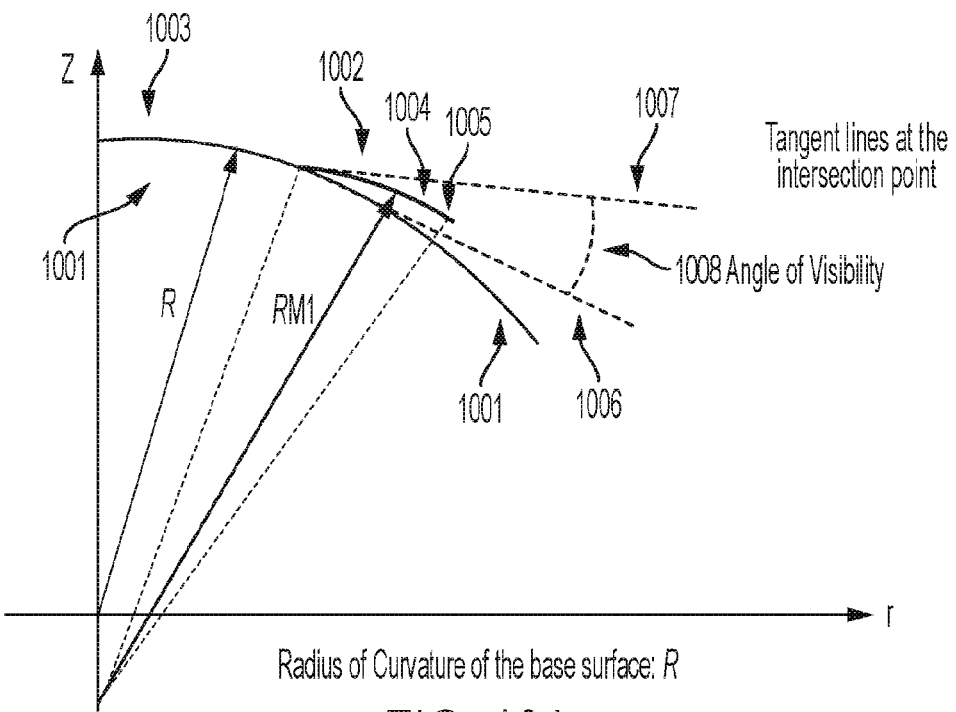
Figure 10B:
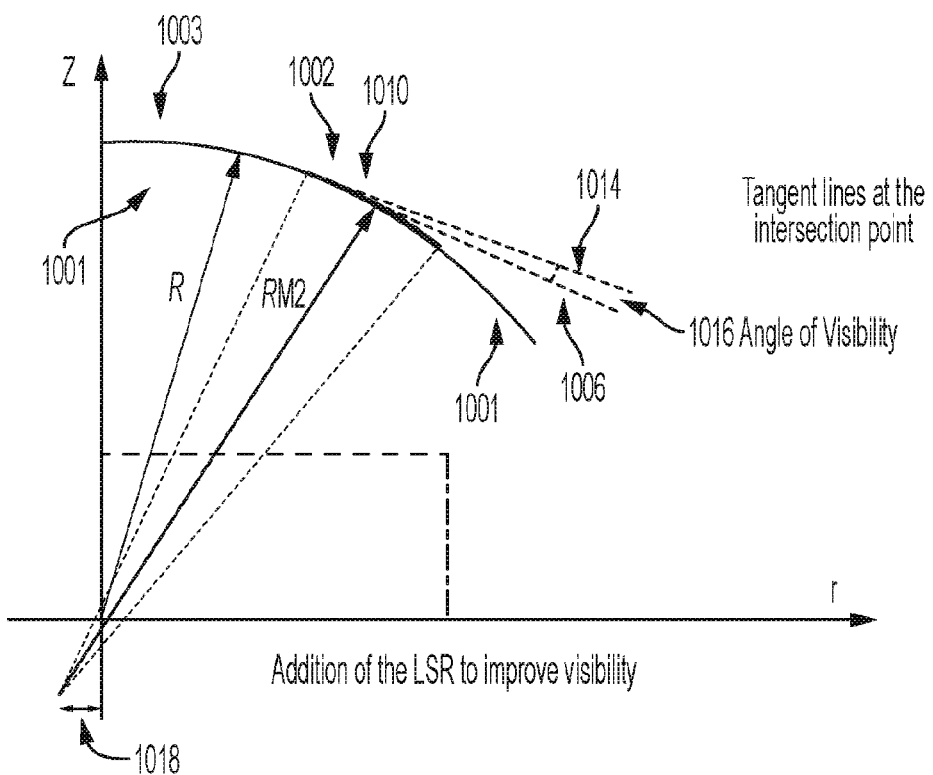

FIG. 10A-C describes another embodiment of an ophthalmic lens comprising a plurality of annular zones modulated by a modulating function to generate a plurality of geometrically defined shapes and/or contour optical elements on the surface of the ophthalmic lens in the same arrangement as shown previously in FIG. 8 where the dimensions of the optical elements may be about the same and the number of elements in each region may be different. FIG. 10A-B illustrate cross-sections of the geometry of a portion of the lens surface produced without (FIG. 10A) and with (FIG. 10B) the inclusion of modulating a secondary geometrical parameter (the ROC (radius of curvature) center location) used in addition to the previous modulations, to generate the ophthalmic lens described in FIG. 8.

FIG. 10C illustrates a plan view of the geometrical surface and displays power maps of the post modulated ophthalmic lens surface. The ophthalmic lens of FIG. 10, as shown in FIG. 10C, therefore, may have a central zone 1003 containing a base lens surface 1002 contributing to the power profile of the ophthalmic lens to correct the refractive error of the wearer, 6 modulated annular zones 1004 to 1009 surrounding the central zone 1003 and incorporating a plurality of geometrically defined shapes and/or contour optical elements and a plurality of annular zones of base lens surface alternating in between the modulated zones 1004 to 1009 that may also contribute to the power profile of the ophthalmic lens to correct the refractive error of the wearer. FIG. 10A shows a cross-section of a portion of the back surface of an ophthalmic lens 1000 as previously described in FIG. 8 (where the ROC center location is not modulated) including the central zone 1003 and a portion of one geometrically defined shape and/or optical contour element in an innermost modulated region 1004. The base lens surface 1001 including in the center zone 1003 may have a central radius of curvature R and surrounded by a first annular post modulated region 1004 having a modulated radius of curvature RM1 modulated by a modulating function circumferentially along the angular direction (de). The modulating function applied to the modulated region 1004 may not include a modulation of the ROC center location parameter e.g. without the application of the lateral separation of an optical axis (LSR) technique. The modulated curvature RM1 over region 1004, in cross section, forms one of the plurality of geometrically defined shape and/or contour optical elements 1005 generated in the first region 1004 on the surface of the ophthalmic lens as shown in FIG. 10A. The tangent lines 1006 (from the surface with the R radius of curvature) and 1007 (from the surface with the RM1 radius of curvature) formed at the intersection of the curvatures R and RM1 form an angle of visibility 1008 and may be related to the conspicuousness of optical features on a lens surface e.g. the greater the angle the more conspicuous may be a geometrically defined shape and/or optical contour element to a wearer of the ophthalmic lens or to an observer, for example, looking at the ophthalmic worn by a wearer from a frontal position.

FIG. 10B, similarly to FIG. 10A, shows a cross-section of a portion of the back surface of an ophthalmic lens 1000 as previously described in FIG. 8 including the central zone 1003 and a portion of one geometrically defined shape and/or optical contour element 1010 in an innermost modulated region 1004. The base lens surface 1001 including the center zone 1003 has a central radius of curvature R and surrounded by a first annular post modulated region 1004 having a modulated radius of curvature RM2 modulated by a modulating function circumferentially along the angular direction (de). The lens of FIG. 10B utilizes a similar modulation of parameter R as the lens of FIG. 10A, however, the modulating process applied to the modulated region 1004 now includes a modulation of the ROC center location parameter e.g. the lateral separation of an optical axis (LSR) technique was a term included in the modulating function and may be applied to the modulated region 1004. The new modulated curvature RM2 forms a geometrically defined shape and/or contour optical element 1010 in the first region 1004 on the surface of the ophthalmic lens shown in FIG. 10B. The tangent lines 1006 (the same as the base lens surface 1006 from FIG. 10A) and 1014 (from the surface with the Rm1 radius of curvature) formed at the intersection of the curvatures R and RM2 form an angle of visibility 1016. As illustrated in FIG. 10B, the ROC center location modulation provided by the LSR technique applied to the center coordinates of the modulated radius of curvature RM2 (e.g., as shown as 1018) decreased the angle of visibility 1016 compared to the angle 1008 in FIG. 10A. Therefore, by modulating the optical axis parameter, the geometrically defined shapes and/or contour optical elements formed on the surface of an ophthalmic lens may be reduced in conspicuousness and enhance the wearability and cosmesis of ophthalmic lenses incorporating geometrically defined shapes and/or optical contour elements. In general, it should be readily understood that the visibility of any junction between two surfaces (e.g., differentiable surfaces) may be modelled (e.g., mathematically or otherwise).

FIG. 10C illustrates a plan view of the geometrical surface 1000A, a sagittal power map 1000B and tangential power map 1000C of the post modulated ophthalmic lens surface described in FIG. 10B. As evidenced by the power maps, the modulated lens surface 1002 may comprise a plurality of geometrically defined shapes and/or contour optical elements on the surface of the ophthalmic lens generated by a modulation process including the modulation of a radius of curvature and an ROC center location parameter (LSR) in the 6 annular modulated regions. However, as previously noted, the modulation of the ROC center location parameter (LSR) parameter may reduce the angle of visibility 1016 substantially compared to the angle 1008 of the lens of FIG. 10A (and therefore the same angle of visibility as the geometrically defined shapes and/or contour optical elements generated in the first region 804 of the lens 800 of FIG. 8) and, therefore, the geometry of the lens surface 1002 shown in the pan view 1000B of FIG. 10C may have a very low visibility and the optical contour elements may be inconspicuous, for example, substantially invisible.

Accordingly, the arrangement of the plurality of geometrically defined shapes and/or contour optical elements in the plurality of regions 1004 to 1009 (e.g., rings) may not be visible but may be present in substantially the same locations as shown in the back surface geometry illustration 800A of FIG. 8. Like FIG. 8, the plurality of relatively invisible geometrically defined shapes and/or contour optical elements, for example element 1010a in region 1004 illustrated in the plan view 1000A in FIG. 10B may be located substantially identically to a similar element in FIG. 8 and may only be identified by the power maps. As displayed in FIG. 10C, the power maps (sagittal 1000B and tangential 1000C) of the lens 1000 show the number of shapes and/or elements in each region are different with fewer in the innermost regions e.g. 1004 and most in the outermost regions e.g. 1009 and may show about the same shapes and dimensions to the geometrically defined shapes and/or contour optical elements described previously for the ophthalmic lens of FIG. 8. The individual elements in FIG. 10C may have a varying power profile but the power differential between the base lens and the geometrically defined shapes and/or contour optical elements, when including a modulation of the ROC center location parameter LSR, may be much smaller (sagittal (on axis) power range about 0.7D; tangential (on axis) power range about 6D in 1000B and 1000C, respectively) than the power differential between the base lens and the geometrically defined shapes and/or contour optical elements of FIG. 8 (sagittal (on axis) power range about 3D; tangential (on axis) power range about 150D in 800B and 800C, respectively) when the ROC center location parameter (LSR) was not included in the modulation process. In some embodiments, this smaller power differential between the base lens and the geometrically defined shapes and/or contour optical elements may result in geometrically defined shapes and/or contour optical elements that are minimally visible to invisible. In some embodiments, this smaller power differential between the base lens and the geometrically defined shapes and/or contour optical elements resulting from the inclusion of the optical axis parameter in the modulation process may improve (e.g., reduces light loss) the through focus light intensity distribution to the eye. In some embodiments, the reduced tangent angles leading to a lower visibility of the geometrically defined shapes and/or optical contour elements may be desirable in the manufacture of an ophthalmic lens, for example, a spectacle lens. In some embodiments, when the sagittal height differences between a shape and/or optical element and the surrounding base lens surface is high, for example more elevated than the base lens surface for positively powered elements located on the front surface or more recessed into the lens surface for positively powered elements located on the back surface, then the lens may be more prone to certain manufacturing defects and decreased lens yields or development of defects over time during lens surfacing and/or lens polishing and/or lens coatings process steps (e.g., hardness or anti-scratch or UV coating or anti-reflection or anti-fog or light transmittance filters) or when in use by the wearer of the ophthalmic lens. However, an ophthalmic lens, for example with an optical axis modulation, may generate geometrically defined shapes and/or optical contour elements that may be less visible and as such may provide relatively lower sagittal height differences (when either elevated higher than or recessed lower into either the lens front or back surface or both) from the base lens surface surrounding the elements compared to higher visibility shapes or optical contour elements without an optical axis modulation as shown in FIG. 10A.

Figure 11:
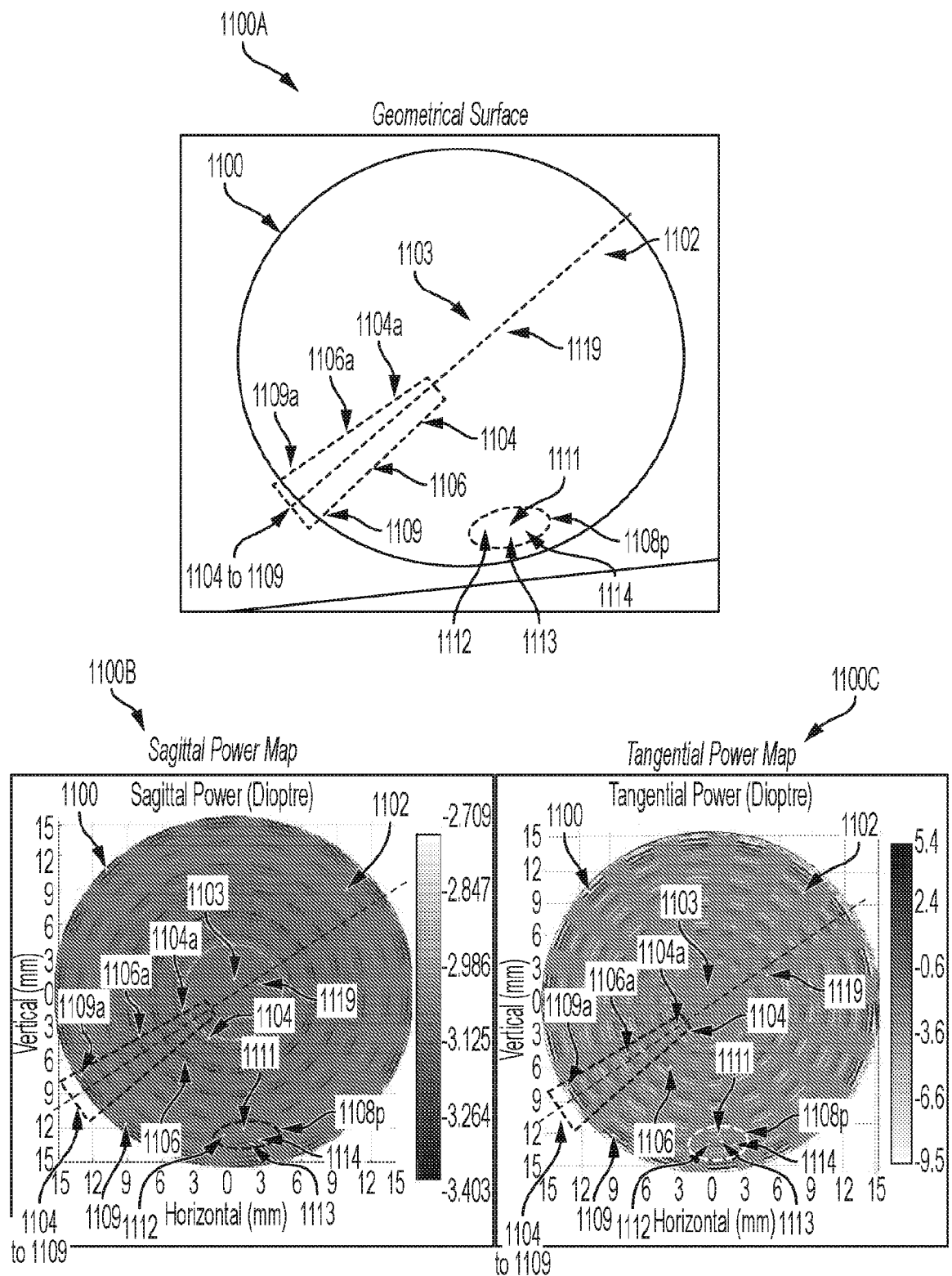
FIG. 11 illustrates an exemplary embodiment of an ophthalmic lens comprising a plurality of geometrically defined shapes and/or contour optical elements on the surface of the ophthalmic lens as described herein.

FIG. 11 describes another embodiment of an ophthalmic lens comprising a plurality of annular zones modulated by a modulating function to generate a plurality of geometrically defined shapes and/or contour optical elements on the surface of the ophthalmic lens in the same arrangement as shown previously in FIG. 9B. (900A) where the number of optical elements may be about the same in each region but the dimensions of elements in each region may be different. FIG. 11 illustrates a plan view of the geometrical surface 1100A, a sagittal power map 1100B and tangential power map 1100C of the post modulated ophthalmic lens surface. The lens of FIG. 11, therefore, may have a central zone 1103 containing a base lens surface 1100 contributing to the power profile of the ophthalmic lens to correct the refractive error of the wearer, six modulated annular zones 1104-1109 incorporating a plurality, e.g., six or more, of geometrically defined shapes and/or contour optical elements and a plurality of annular zones of base lens surface alternating in between the modulated zones 1104 to 1109 that may also contribute to the power profile of the ophthalmic lens to correct the refractive error of the wearer. The example lens of FIG. 11 is based on the ophthalmic lens described in FIG. 9B including the base lens power, modulating parameter R, the modulating direction (e.g., both circumferentially and radially), the modulating region and the frequency, power and dimensions of the geometrically defined shapes and/or contour optical elements on the surface. However, unlike the lens of FIG. 9B, the lens of FIG. 11 further includes the modulation of the ROC center location parameter (LSR) in the modulation process to change the angle of the optical axis relative to the optical axis of the base lens (e.g., lateral separation of the optical axes) to form invisible (or less visible) geometrically defined shapes and/or contour optical elements compared to those illustrated in FIG. 9B. As evidenced by the power maps 1100B and 1100C, the modulated lens surface may comprise a central zone 1103 surrounded by six annular modulated regions 1104-1109 incorporating a plurality (e.g., six or more) of geometrically defined shapes and/or contour optical elements on the surface of the ophthalmic lens generated by a modulation process including the modulation of a radius of curvature and an ROC center location parameter (LSR). However, as previously noted, the modulation of the ROC center location parameter (LSR) may substantially reduce the angle of visibility both circumferentially and tangentially compared to the angle of the lens of FIG. 9B and the geometry of the lens surface 1100A shown in FIG. 11 may have a very low visibility and the optical contour elements may be inconspicuous, for example, almost invisible. Accordingly, the arrangement of the plurality of geometrically defined shapes and/or contour optical elements in the plurality of regions 1104 to 1109 (e.g., rings) may not be visible but may be present in the same locations as shown in the back surface geometry illustration 900A of FIG. 9B, for example, element 908p illustrated in 900A of FIG. 9B may now be located at 1108p in 1100A in FIG. 11. As displayed in the power maps (sagittal 1100B and tangential 1100C) of the lens 1100, the number of shapes and/or elements in each region may be the same, e.g. 6 per region, and may show different shapes and dimensions in each region e.g. the geometrically defined shapes and/or contour optical elements in the innermost regions e.g. 1104 may be smallest in length and the elements in the outermost regions e.g. 1109 may be longest, as described previously for the ophthalmic lens of FIG. 9B. Similarly to the ophthalmic lens of FIG. 9B, the power maps (sagittal 1100B and tangential 1100C) of the lens of FIG. 11 show the individual elements have a varying power profile, but the power differential between the base lens and the geometrically defined shapes and/or contour optical elements in FIG. 11 are much smaller (sagittal (on axis) power range about 0.7D; tangential (on axis) power range about 15D) than the power differential between the base lens and the geometrically defined shapes and/or contour optical elements of FIG. 9B (sagittal (on axis) power range about 3D; tangential (on axis) power range about 156D) when the ROC center location parameter (LSR) was not included in the modulation process. In some embodiments, this smaller power differential between the base lens and the geometrically defined shapes and/or contour optical elements may result in geometrically defined shapes and/or contour optical elements that are minimally visible to invisible. In some embodiments, this smaller power differential between the base lens and the geometrically defined shapes and/or contour optical elements resulting from the inclusion of the ROC center location parameter (LSR) in the modulation process improves (e.g. reduces light loss across the vergences) the through focus light intensity distribution to the eye. In some embodiments, the modulation of the ROC center location parameter (LSR) may be applied in a portion of a region or in multiple regions. In some embodiments, the modulation of the ROC center location parameter (LSR) may be applied only in a radial direction. In some embodiments, the modulation of the ROC center location parameter (LSR) may be applied to an array or a select pattern of the geometrically defined shapes and/or contour optical elements.

Figure 12:
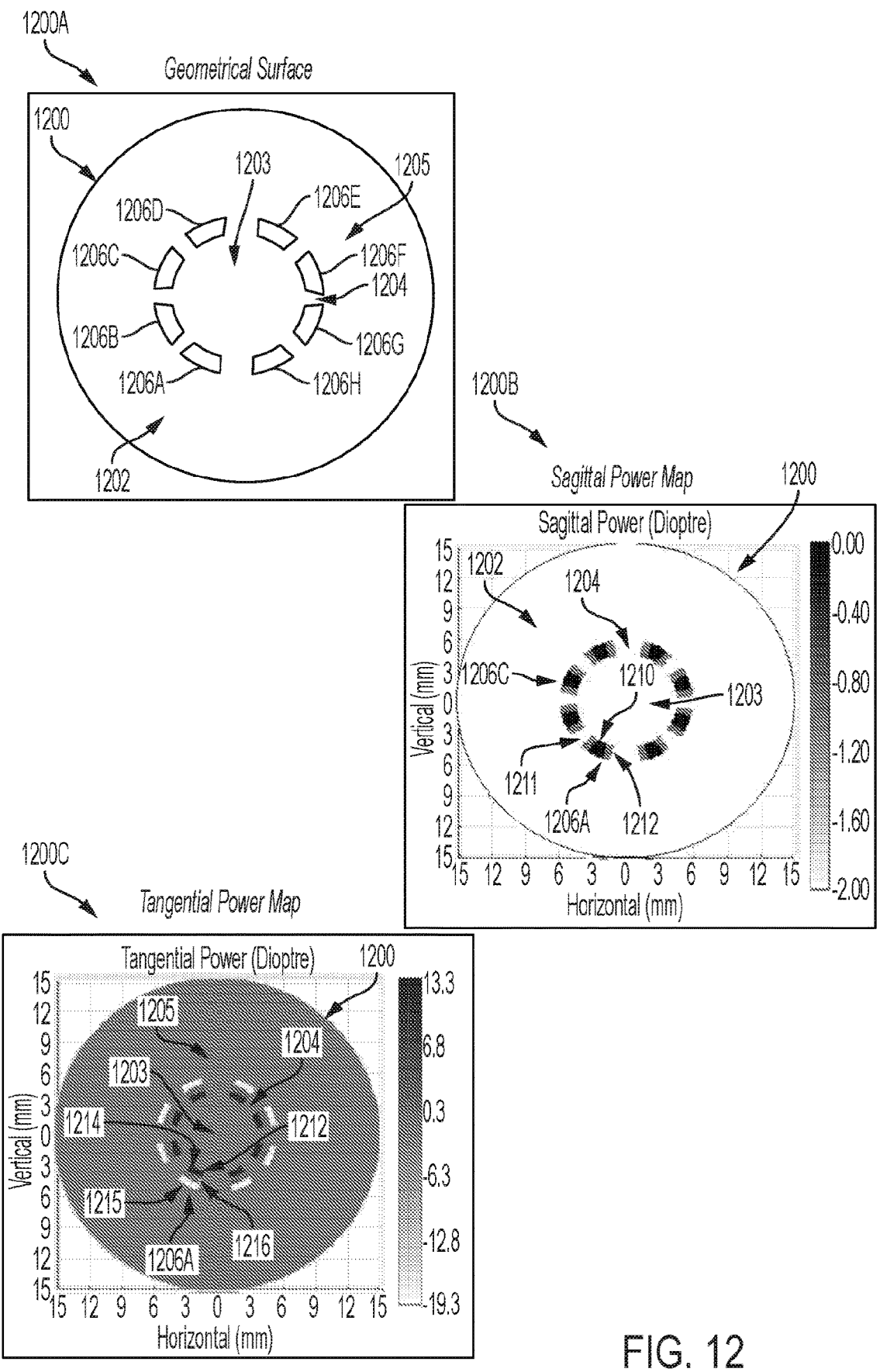
FIG. 12 illustrates an exemplary embodiment of an ophthalmic lens comprising a plurality of geometrically defined shapes and/or contour optical elements on the surface of the ophthalmic lens as described herein.

FIG. 12 describes an ophthalmic lens comprising a plurality of geometrically defined shapes and/or contour optical elements on the surface of the ophthalmic lens generated by modulating a non-geometrical parameter, for example, a refractive index change term in the modulation process. FIG. 12 illustrates a plan view 1200A of the dimensions and location of the geometrically defined shapes and/or contour optical elements formed in the bulk, e.g., in between the surfaces of the lens 1200, a sagittal power map 1200B and tangential power map 1200C of the post modulated ophthalmic lens surface. In the example of FIG. 12, the lens configuration, the modulation process and targeted optical power profile and therefore optical effects may be similar to a previous example lens described in FIG. 2A and FIGS. 2J/2K except that the modulated geometric parameter R (e.g. radius of curvature) may be replaced by the non geometric parameter of refractive index N in the modulation process using the square wave periodic modulating function, as shown in FIG. 2E. In some embodiments, the modulating function may only include a periodic square wave function or it may be a modulating function described in FIG. 2H. In some embodiments, the change in refractive index may be achieved by a laser e.g. a femtosecond laser or a single photon laser, of the surface material or a bulk material including with or without the use of a mask. In some embodiments, a material of a different refractive index may be deposited or added on a lens surface, for example, by an additive process, for example a printing or a lens coating application. Therefore, the lens of FIG. 12 may in some embodiments, where a bulk material change is made by an energy process, have a surface geometry that is the same before and after modulation (e.g., the surface geometry was unchanged by the modulating process). Thus, the ophthalmic lens 1200 of FIG. 12 may be configured similarly to the plan view of the lens 200 shown in FIG. 2A, for example, and may comprise a base lens back surface 1202, a center zone 1203 and peripheral regions 1204 and 1205 with region 1204 formed by a modulation of a refractive index parameter designed to incorporate the geometrically defined shapes and/or contour optical elements in between the surfaces in region 1204 of the ophthalmic lens 1200. The starting surface geometry 1202 remains substantially similar to the post modulated back surface geometry, e.g. may remain unchanged, because a laser modifies the material refractive index in the bulk of the lens matrix in region 1204 forming the geometrically defined shapes and/or contour optical elements 1206A-H having about an identical sagittal power profile ranging from −2D to 0D as previously described. As illustrated in FIGS. 12A, the modulated non-geometric parameter refractive index N may be modulated over the modulated region 1204 similarly to FIG. 2A as follows: N @n=rs to rm, θ=0 to 2π, rs<r≤rm and the direction of modulation is circumferential, e.g. $\vec{a}_\theta$, using the modulating function as previously described in FIG. 2E. Because the same frequency terms were included in the modulating function and applied to the parameter N as in FIG. 2J/K, eight geometrically defined shapes and/or contour optical elements 1206A to 1206H may be formed with the same frequency, distribution and power profile as the previous example lens described in FIG. 2K. So if the refractive material of the lens may be described as N, the refractive index of the base material is N1, and the refractive index of the geometrically defined shapes and/or contour optical elements are N2; diff=N2−N1 and the N may be modulated as:

$$N(r, \theta, z) = \begin{cases} N1 & 0 \le r \le rs \\ N1 + \mathit{diff} * \left(\dfrac{1 + S(\theta)}{2}\right) & rs < r \le rm \end{cases}$$

where;

$$S(\theta) = \begin{cases} \mathrm{sign}(\sin(2\pi f_{sgn}\theta)) & \sin(2\pi f_{sgn}\theta) \ne 0 \\ 1 & \sin(2\pi f_{sgn}\theta) = 0 \end{cases}$$

where the frequency may be written the same as FIG. 2F as follows;
Number of the Cycles in the Ring=8=2π$f_{sgn}$, $f_{sgn}$=4/π and the "modulating value range" in this example is 0 to +diff, which means the parameter N may change by this range via the modulating function.

As illustrated, eight geometrically defined shapes and/or contour optical elements 1206A to 1206H may be generated in the modulated region 1204 of the ophthalmic lens. As shown in FIG. 12, the geometrically defined shapes and/or contour optical elements formed in the ophthalmic lens by the modulation process using a non-geometric parameter N and the resulting sagittal (1200B) and tangential (1200C) power maps were substantially identical to those of the ophthalmic lens of FIG. 2K (289, 290) produced by the modulation of the radius of curvature. The sagittal power map 1200B and dioptric scale included shows the lens base power was about −2D and the individual elements are substantially identical in power profile and, for example, the element 1206A may have a varying power profile with a relatively more positive peak central power 1210 of 0D and the edges of the geometrically defined shapes and/or contour optical elements elements 1211 and 1212 have a relatively less positive in power than the central portion 1210. The tangential power map 1200C reveals the power of the 8 shapes/optical elements 1206A-H may also be substantially identical in power profile and, for example, the element 1206A may have a strongly changing power profile, for example, varying in relative power radially across the element from an inner portion 1214 of about +13.3D to the outer portion 1215 of about −19.3D. The element/shape central power may have a different peak central power at 1216 than the outer element portion 1214 of 13.30D and may also be different than the base power (−2D). The example shape/element 1206A in 1200C may also sharply change in power at 1214 and 1215 radially at the borders between the base lens surface and the shape/element 1206A. The change in refractive index formed across the plurality of geometrically defined shapes and/or contour optical elements 1206A-H in region 1204 may provide, for example, a power profile and/or a higher order aberration profile, resulting in optical properties that may reduce the image quality compared to contour elements that may be, for example, may have more or less focal power than required to focus on a retinal image plane and may be less aberrated or even spherical. In some embodiments, the plurality of geometrically defined shapes and/or contour optical elements formed in a modulated region, for example, an annular region 1204 may provide a combined optical effect that may be desirable for a particular application. In some embodiments, the ophthalmic lens produced by the modulation process of geometrical and/or non-geometrical parameters described herein may result in ophthalmic lenses comprising at least one or more modulated regions of a lens filled with at least one or more, for example, a plurality of spaced apart elements that provide a desired optical effect. In some embodiments, the geometrically defined shapes and/or contour optical elements may not be spaced apart or may be arranged in any pattern that may provide a desired optical effect. In some embodiments, one or more geometrically defined shapes and/or contour optical elements may include more than one modulation of a geometric and/or non-geometric parameter. For example, a femtosecond laser process may modulate the laser energy and/or the energy exposure time and/or the speed of travel or the focal power over the area of the geometrically defined shape and/or contour optical element formed. The one or more modulated laser processing parameters over a defined region and in the defined direction over the modulating value range may alter one or more optical properties over at least a portion of the element area, for example a low laser energy or a short exposure time or a fast speed of travel may only modulate the refractive index but including a modulation of the laser energy may also change the light transmittance of the element, at least in part, as a greater material change is induced while an even longer exposure time may result in substantial material change and a larger element dimension enabling a higher degree of light scattering.

Figure 13:
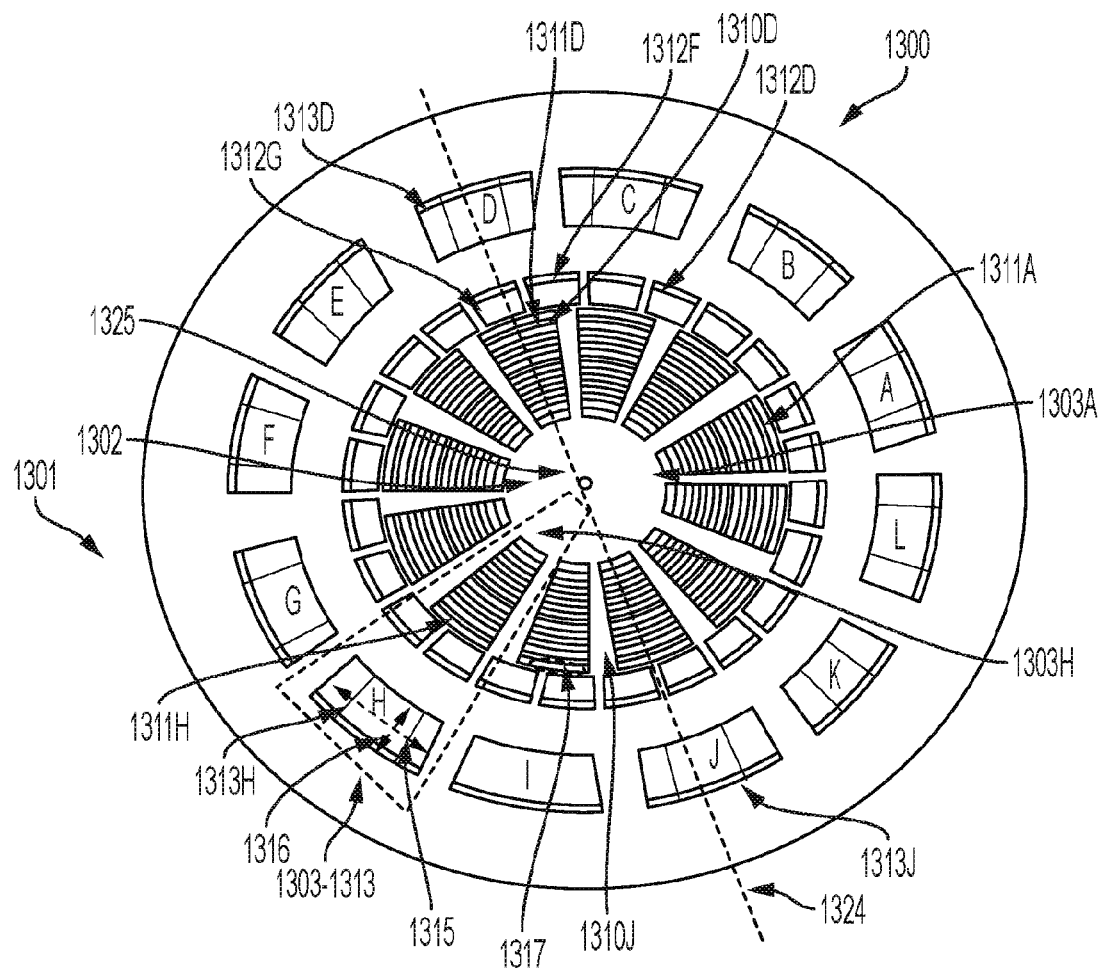
FIG. 13 illustrates an exemplary embodiment of an ophthalmic lens comprising a plurality of geometrically defined shapes and/or contour optical elements on the surface of the ophthalmic lens as described herein.

FIG. 13 illustrates another exemplary embodiment of an ophthalmic lens surface comprising a plurality of differently arranged, shaped and sized geometrically defined shapes and/or contour optical elements located in a plurality of differently configured annular regions on the surface of the ophthalmic lens. FIG. 13 illustrates a plan view of the modulated geometry of the back surface 1301 of an ophthalmic lens 1300 and may incorporate a central zone 1302 and a plurality of annular modulated regions 1303 to 1313 alternating with annular zones of unmodulated base lens surface. The annular modulated regions 1303 to 1313 may incorporate a plurality of geometrically defined shapes and/or contour optical elements spaced apart by the alternating regions of unmodulated base surface that may incorporate a base lens power profile, similar to the central zone 1302, to correct, at least in part, the refractive error of the wearer of the ophthalmic lens. The plan view of the back surface geometry 1301 of the ophthalmic lens 1300 details a range of the dimensions, shapes, locations and spacing of the geometrically defined shapes and/or contour optical elements in the different annular regions of the back surface of the ophthalmic lens. The modulating process used to generate the plurality of geometrically defined shapes and/or contour optical elements may include applying a periodic function (e.g., a function like that described in FIG. 2H, as the modulating function to modulate at least one selected parameter, for example, a radius of curvature of the base lens surface in the 11 annular regions 1303-1313 in a circumferential (e.g., $\vec{a}_\theta$) direction within the defined modulating value ranges). The modulation process may include stages to further produce the geometrically defined shapes and/or contour optical elements and/or the regions in which they may be generated, for example in the regions 1303-1313 described in this example lens of FIG. 13, including the elements or region number, dimensions, separations, patterns, arrangements, fill factors, power profiles, optical characteristics and element offsets with respect to other elements and regions.

As illustrated in FIG. 13, for example, the length of elements in regions 1303-1313 progressively increase in circumferential length (similar to 1315 in 1313H), (for example element 1303H is shorter in length than 1311H) but are of radial similar widths (similar to 1316 in 1313H) and are equidistant apart. It may also be seen in the plan view of FIG. 13 that elements formed in regions 1312 and 1313 may be both wider radially than those formed in regions 1303 to 1311 because different modulating functions, modulation regions, modulation directions and modulating value ranges are used and consequently region 1313 may have wider elements generated than elements in region 1312 and both regions may have wider elements than the remaining regions 1303-1311.

Different modulating functions may be used to control the relative offset or phase of the elements located in different regions and/or within a region. An offset or phase difference between geometrically defined shapes and/or contour optical elements may be defined by the relative positions of the centers of the elements located between regions or within a region. For example, an element may be considered offset or out of phase when the centers of two elements may not be aligned along a radial meridian (e.g., for elements in different regions or circumferential meridian and/or for elements within a region). In FIG. 13, an example element 1312F and 1312G may both be offset with elements 1313D or 1311D because the element circumferential centers may not align radially along a meridian 1324 passing through the center of the lens 1325. Likewise, for example, regions 1303-1311 and 1313 may have the same number of elements and the elements may be in phase (e.g., the centers of the elements in the regions may be aligned along a radial meridian passing 1324 through the optical center 1325 of the lens). In some embodiments, the phase or offset may be defined relative to a targeted meridian passing through a selected reference point on the lens (e.g., a vertical or horizontal or angular meridian passing through or not passing through a lens or optical center) and the meridian may be straight or curved and may be defined for elements and regions not configured in an annular concentric pattern as shown in FIG. 13 (e.g., square, hexagonal, spiral, spoke like or any other non-annular or non-concentric arrangement or pattern). Although the embodiments described herein illustrate regions of the ophthalmic lens that are concentric about a central point on the lens, it is also contemplated that non-concentric regions may also be utilized. In some embodiments the regions may be overlapping. Accordingly, the modulating process may provide the designer with substantial freedom to generate lens designs with desired optical effects by selecting different modulating functions, modulation regions, modulation directions and modulating value ranges and be applied to different surfaces of the ophthalmic lens to configure geometrically defined shapes and/or contour optical elements and therefore target the degree of optical effect(s) derived therefrom.

Figure 14:
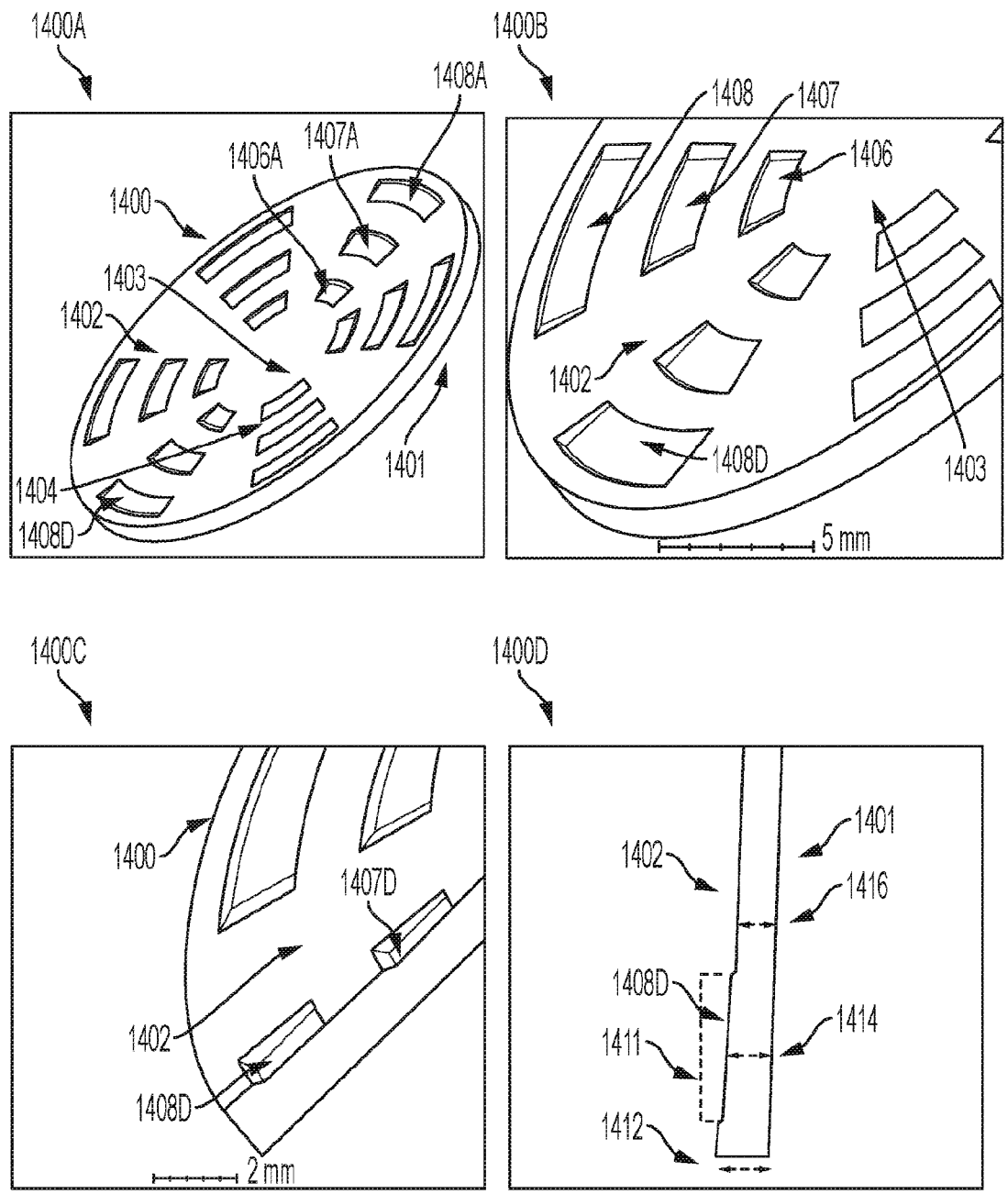
FIG. 14 illustrates an exemplary embodiment of an ophthalmic lens comprising a plurality of geometrically defined shapes and/or contour optical elements on the surface of the ophthalmic lens as described herein.

FIG. 14 illustrates three-dimensional and cross sectional views of an exemplary embodiment of an ophthalmic lens comprising a plurality of geometrically defined shapes and/or contour optical elements on the surface of the ophthalmic lens as described herein. The different views 1400A-1400D show low and high magnification illustrations of the back surface of the ophthalmic lens previously described with respect to FIG. 5 and may be formed by the same modulation process, for example, by the same modulating function applied to the same starting lens geometry, and modulated geometrical parameter (radius of curvature) over the same annular regions in the same circumferential direction and parameter value ranges. As drawn in 1400A, the ophthalmic lens 1400 has a front surface 1401 and a back surface 1402 and a center zone 1403 surrounded by a peripheral zone 1404 comprising three annular concentric regions 1406, 1407 and 1408 incorporating a plurality (e.g., 6) spaced apart geometrically defined shapes and/or contour optical elements (1406A-F, 1407A-F and 1408A-F) formed on the back surface. As drawn in view 1400D, the example element 1408D in region 1408 may have a width of 1411 and may be seen as forming a depression into the lens surface as noted by the lens edge thickness 1412 being thicker than the lens thickness at 1414. In some embodiments, the optical contour elements as described in this example may be recessed on the back surface (e.g., concave side) of the lens 1402, in some embodiments the geometrically defined shapes and/or contour optical elements may be an elevation on the front or back or both surfaces. In some embodiments, the geometrically defined shapes and/or contour optical elements may exist on both the front surface and back surface of the ophthalmic lens and may be recessed and/or elevated within any region or regions modulated on any surface or in any combinations thereof. As previously described in e.g., FIG. 12, a modulation of a non-geometric parameter, e.g., refractive index, may not substantially alter the surface geometry when applied to the lens surface or when applied to a location between the surfaces. Furthermore, in some embodiments the optimal configuration and arrangement of the geometrically defined shapes and/or contour optical elements may be designed to provide the desired optical properties and effects for the application and/or to benefit the ease and/or efficiency and/or the cost of any of the manufacturing processes or steps or to provide any other features and characteristics important for the manufacturer or the distributor or the seller or the wearer of the ophthalmic lenses, including for example ease of wearing and compliance and lens quality.

FIG. 15 illustrates an exemplary embodiment of an ophthalmic lens comprising a plurality of geometrically defined shapes and/or contour optical elements on the back surface of the ophthalmic lens as described herein. In this example, the modulating function does not originate from a mathematically sinusoidal or a square wave function but instead, it originates from a non-periodic mathematical function e.g., a polynomial and is mathematically described in FIG. 15A. As shown in FIG. 15B, the ophthalmic lens 1500 has a base lens back surface 1502 having a base lens curvature, a central zone 1503, a modulated region 1504 between rs to re and an outer peripheral zone 1505 having the same base curvature as the central zone 1503 and the pre-modulated region 1504.

Figure 15A:
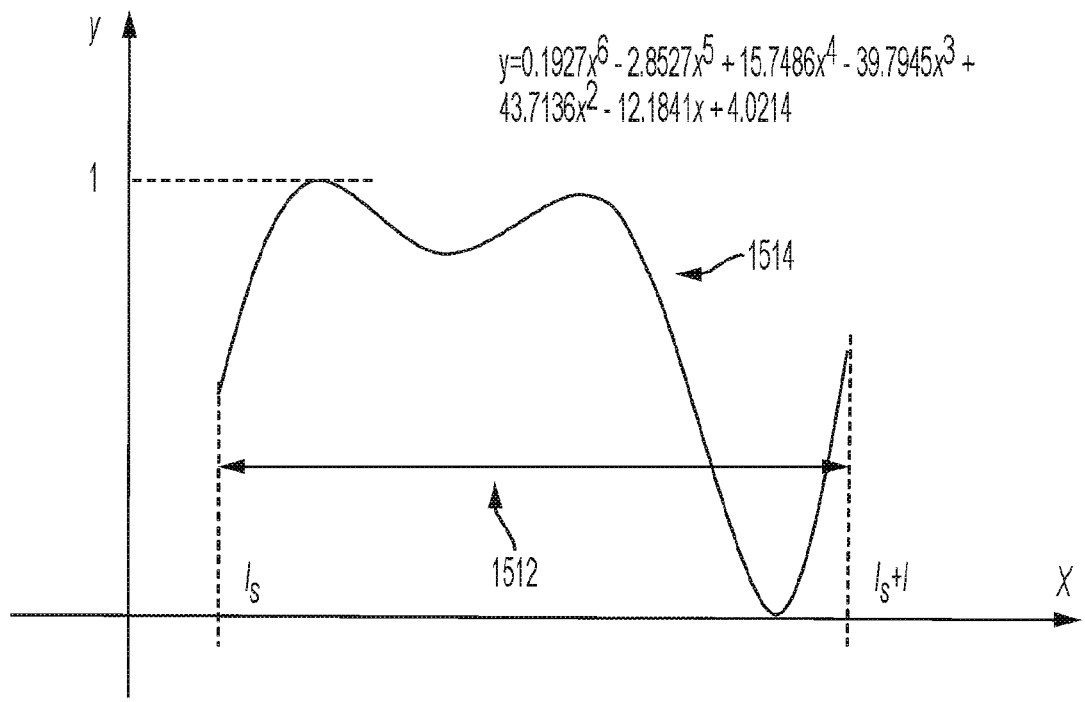
FIGS. 15A, 15B, 15C, 15D, and 15E illustrate an exemplary embodiment of an ophthalmic lens comprising a plurality of geometrically defined shapes and/or contour optical elements on the surface of the ophthalmic lens as described herein.

Since this mathematical function of FIG. 15A is not periodic mathematically, a process may be applied on this function to fabricate the modulating function useable on an ophthalmic lens modulating process (e.g., to convert the non-periodic function into a periodic function along the desired direction of modulation). The first change may be added to the mathematical function argument x, in order to convert the function into a periodic function along the desired direction of the modulation.

$$x = l_s + l\delta/T, \delta = \theta - \text{round}\left(\frac{\theta}{T}\right)$$

The $l_s$ is a mathematical term indicating the starting point along the x axis where the mentioned function in FIG. 15A is considered to be used in the final "modulating function". The parameter l is the length after the point $l_s$ that the mathematical function may be used in the "modulating function". As written above, the argument x, is modified to be a periodic function of the angle θ, in order to create a resultant periodic function;

$$x = l_s + l\delta/T$$

Figure 15B:
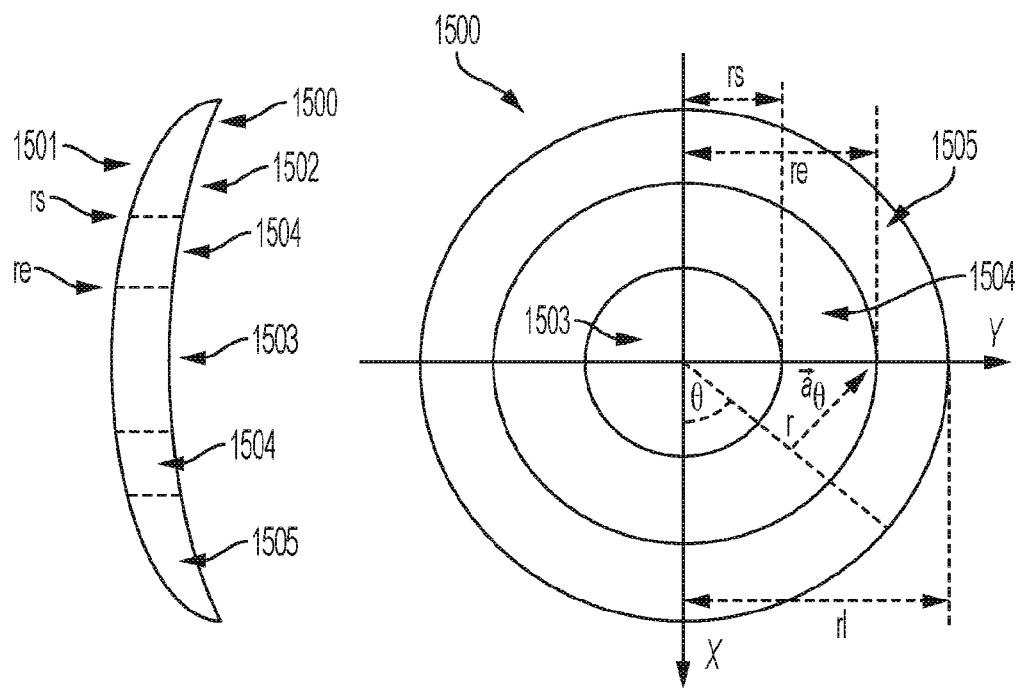

In the above, T is the size of the arc in degrees/radians that may have the full polynomial cycle inside itself, l (1512) is the length of the function used as shown in FIGS. 15A and 15B, and δ is the angular function of θ, that creates the periodic feature on the surface;

$$\delta = \theta - \text{round}\left(\frac{\theta}{T}\right)$$

where round' is a programming function that rounds the division result to the lower integer.

$$T = 2\pi/\omega, \text{ and therefore; } \omega = 2\pi/T$$

Figure 15C:
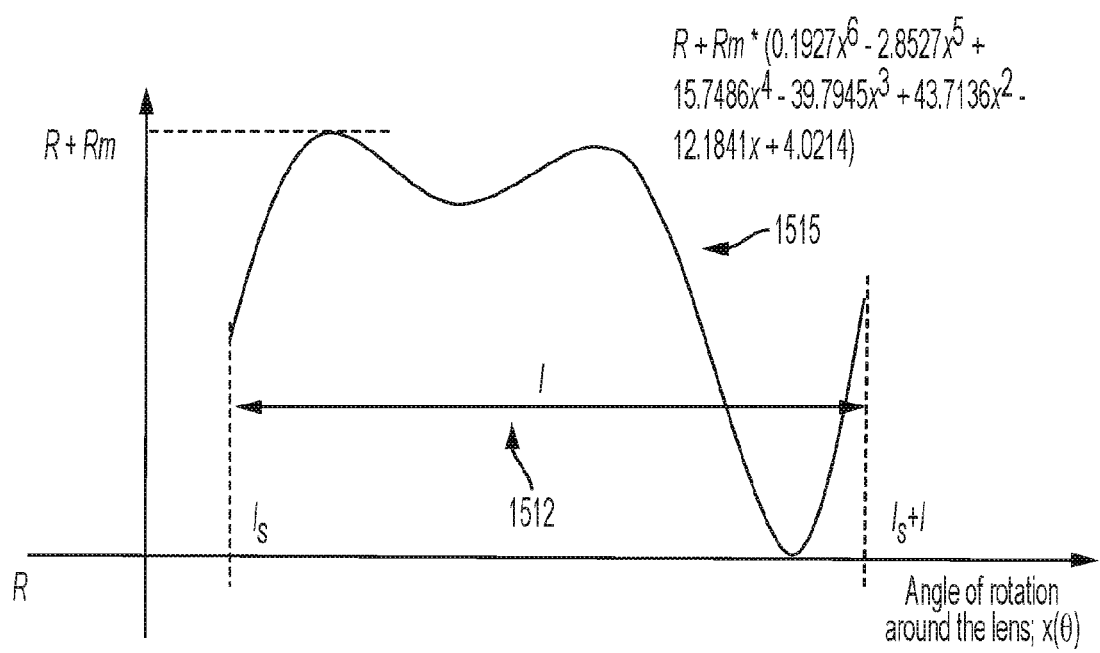

Therefore, using the above new values in the argument x, the mathematical function may now be a "modulating function" as described in FIG. 15C applicable to the modulating process disclosed in this document.

On the other hand, the targeted modulated parameter may be the radius of curvature R and may be modulated over a modulating value range between 0 to +Rm in a single annular modulating region 1504 from rs to re and in a modulating direction along the unity vector $\vec{a}_0$. The starting surface geometry of the base lens surface 1502 in the example may be the same as the previous examples (FIGS. 1-14), and may be shown as follows;

$$\vec{g}(r, \theta, z) = (r*\vec{a}_r) + \left(\sqrt{R^2 - r^2} * \vec{a}_z\right), r = 0 \text{ to } rl$$

After applying the "modulating function" (FIG. 15C to the targeted geometric parameter, radius of curvature, the modulated surface geometry may now be described by the following equation and as shown in FIG. 15C:

$$\vec{gm}(r, \theta, z): \begin{cases} \text{for } r = 0 \text{ to } rs \text{ and } re \text{ to } rl; & (r*\vec{a}_r) + \left(\sqrt{R^2 - r^2} * \vec{a}_z\right) \\ \text{for } r = rs \text{ to } re; & (r*\vec{a}_r) + \left(\sqrt{(RM)^2 - r^2} * \vec{a}_z\right) \end{cases}$$

Where;

$RM=R+Rm*(0.1927x^6-2.8527x^5+15.7486x^4-39.7945x^3+43.7136x^2-12.1841x+4.0214)$

And x may be defined as;

$$x(\theta) = l_s + l\delta/T, \delta = \theta - \left(\frac{\theta}{T}\right), T = 2\pi/\omega$$

Figure 15D:
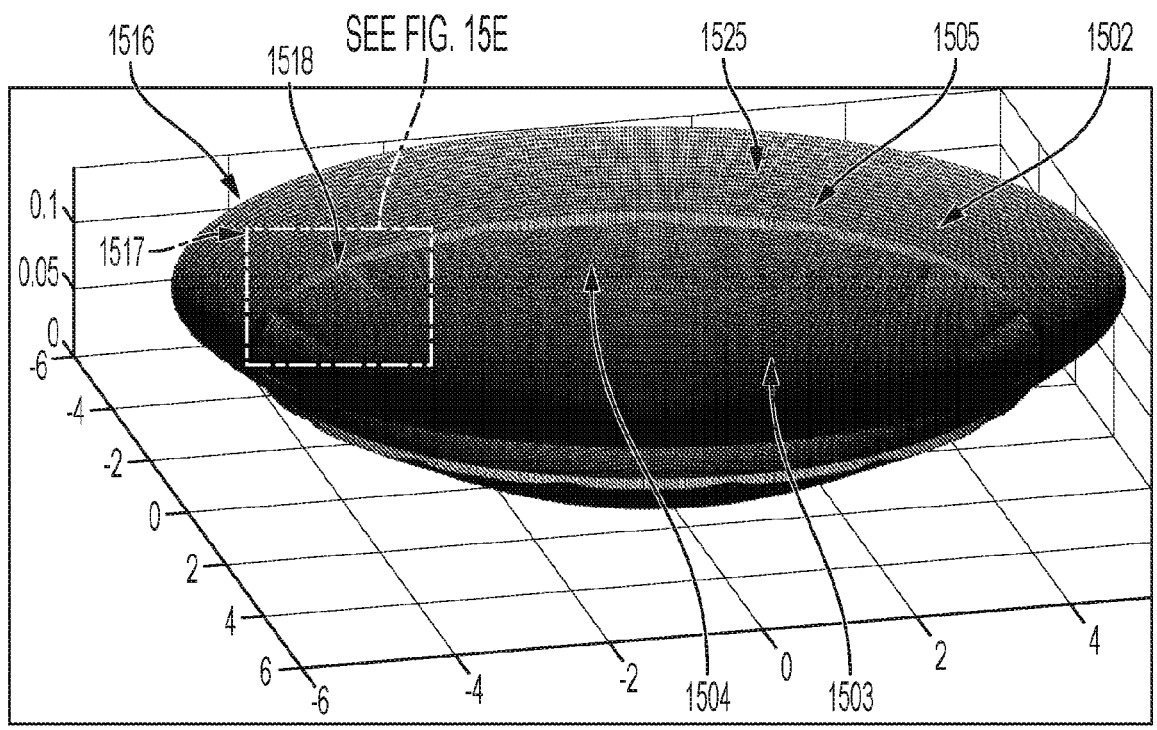
Figure 15E:
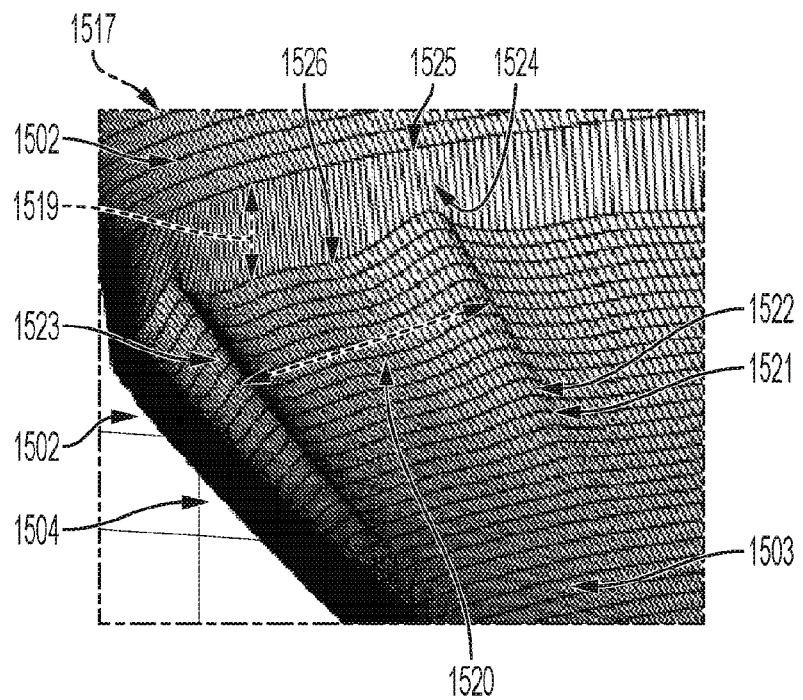

Different values of T in the above equation may change the number of repeats of the polynomial pattern 1515 formed on the surface 1502 in the modulated region 1504. For example, if the T value is set to be 24 degrees, the ω may change to 360/24=15 that means there may be 15 repetitions of the same polynomial pattern formed along the circumferential direction on the surface 1502 in FIG. 15D in the predefined region 1504. The illustration in FIG. 15D shows shown a 3 dimensional view looking down from above at the concave back surface 1502 of a sub-surface 3 dimensional sliver section 1516 (and as a magnified view 1517 in FIG. 15E) of a geometrically defined shapes and/or contour optical elements, for example a single element 1518, in the modulated region 1504. As shown in FIGS. 15D and 15E, the optical contour element 1518 may have a polynomial surface curvature 1526 matching the single polynomial modulating function 1515 described mathematically and plotted in FIG. 15C. The optical contour element 1518 may be recessed into the concave back surface 1502 by a depth shown at 1519 over a length 1520 and showing smooth and continuous surface in the direction of modulation 1521 at 1522 and 1523 and with a sharp discontinuity between the radial edge of the modulated region 1524 and the base lens surface 1502 at 1525. The modulating parameter change of the exemplary lens in the example may be R to R+Rm, where R is the base value of the radius of curvature, and Rm is the maximum amount of change required to dynamically change from the R value to R+Rm as shown in FIG. 15C. The "modulating value range" in the lens of FIG. 15D and FIG. 15E may be selected as 0 to +Rm, and accordingly the parameter R may change by this range via the "modulating function" in FIG. 15C and provide the configuration of the plurality of geometrically defined shapes and/or optical contour elements, e.g., 1517, as shown in FIGS. 15D and 15E. Accordingly, any type of mathematical function may be used along with any number of terms and conditions desired to modulate geometrical and/or non-geometrical parameter(s) in any direction and in any region or regions of a front or back lens surface or bulk in between the surfaces to produce any desired optical effect using any desired optical principle or combinations thereof.

Figure 16A:
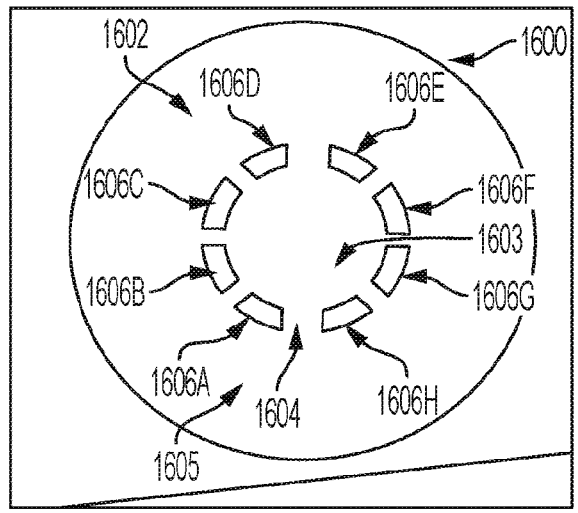
FIGS. 16A, 16B, 16C, 16D, 16 E, and 16F illustrate exemplary embodiments of an ophthalmic lenses comprising a plurality of geometrically defined shapes and/or contour optical elements on the surface of the ophthalmic lens as described herein.

FIG. 16A illustrates a plan view of another exemplary embodiment of an ophthalmic lens 1600 comprising a central zone 1603 and a single annular modulated region 1604 incorporating a plurality of geometrically defined shapes and/or contour optical elements 1606A-1606H surrounded by a peripheral zone 1605 on the surface 1602 of the ophthalmic lens generated using a geometrical parameter other than radius of curvature. In this exemplary embodiment, the geometrically defined shapes and/or contour optical elements 1606A-1606H may be generated by modulating a surface roughness parameter that may affect a light scattering property change across the shapes and/or optical elements. In the example of FIG. 16, the modulation process may be similar to a previous example lens e.g., described in FIG. 2J/2K except that the geometric parameter R (e.g. radius of curvature) was not modulated but another geometric parameter, for example, surface roughness SR was modulated using a periodic square wave function as the modulating function, as previously shown in e.g., FIG. 2E. Therefore, the new modulated lens surface 1602 of FIG. 16A may be modulated in the same modulated region rs<r≤rm with the same frequency term in the modulating function applied to the parameter SR to generate 8 optical elements formed with similar geometrical defined shape and distribution as the previous example lens described in e.g., FIG. 2J/2K. The modulating value range of the SR parameter may be defined if the surface roughness of the whole surface may be described as SR, the surface roughness, for example average surface roughness, of the base material is SR1, and the surface roughness of the geometrically defined shapes and/or contour optical elements are SR2; diff=SR2−SR1 and the SR may be modulated as follows;

$$SR(r, \theta, z) = \begin{cases} SR1 & \text{Otherwise} \\ SR1 + \text{diff} * \left(\frac{1+S(\theta)}{2}\right) & rs < r \le rm \end{cases}$$

where;

$$S(\theta) = \begin{cases} \text{sign}(\sin(2\pi f_{sgn}\theta)) & \sin(2\pi f_{sgn}\theta) \ne 0 \\ 1 & \sin(2\pi f_{sgn}\theta) = 0 \end{cases}$$

where the frequency may be written the same as FIG. 2K as follows:

Number of the cycles in the Ring=8=$2\pi f_{sgn}$, $f_{sgn}=4/\pi$ and the modulating value range in this example is 0 to +diff, which means the parameter SR may change by this range via the modulating function.

As shown in FIG. 16A, the geometrically defined shapes and/or contour optical elements 1606A-H formed by the modulated surface on the ophthalmic lens surface 1602 by the modulation process using a geometric parameter SR may provide optical properties different to the sagittal (289) and tangential power (290) maps shown in e.g., FIG. 2K resulting from the geometrically defined shapes and/or contour optical elements 272A-H formed on the ophthalmic lens 271 produced by the modulation of the radius of curvature. In the embodiment of FIG. 16A, the modulating value range of the modulated parameter SR may change, for example, the surface roughness of the base lens surface by, for example +/−20 um. In some embodiments, the surface roughness may change by +/−17 um or +/−15 um or +/−12 um or +/−10 um or +/−7.5 um or +/−6 um or +/−5 um or +/−1 um or +/−500 nanometers or +/−250 nanometers or +/−150 nanometers or +/−100 nanometers or +/−50 or less. The modulating value range of the modulated parameter SR in the modulated region(s) along the modulating direction(s) with the frequency terms in the modulating function may be selected based on the degree of light scattering (stray light) targeted for the user of the ophthalmic lens, for example, the amount of narrow and/or wide angle stray light introduced over, for example, a 1 to 10 degree angle region and/or a 1 to 5 degree angle region may be <400 stray light units or may be <200 stray light units or may be <150 stray light units or <100 stray light units or <75 stray light units. In some embodiments, geometric and/or non-geometric parameters may be modulated to provide geometrically defined shapes and/or optical contour elements of any shapes to provide light scattering levels (stray light) over both narrower, for example, angles <5 degrees or <2.5 degrees or <1.5 degrees or <1 or lower and wider angles, for example angles >1 degree or >2.5 degrees or >5 degrees and/or between wider angle regions such as 1 to 5 degrees and/or 2 to 4 degrees and/or 2.5 to 5 degrees and/or >5-15 degrees. In some embodiments, geometric and/or non-geometric parameters may be modulated to provide geometrically defined shapes and/or optical contour elements of any shapes that provide light scattering levels (stray light) that have more wider angle stray light than narrower amounts of stray light, for example, where the ratio of wider angle to narrower angle straylight may be more than about 0.5 or more than about 0.9 or more than about 1 or more than about 1.1 or more than about 1.2 or more than about 1.25 or more than about 1.3 or more than about 1.4 or more than about 1.5 or more than about 1.6 or more than about 1.7 or more than about 1.8 or more than about 1.9 or more than about 2 or more than about 4 or be more than about 6 or more than about 8 or higher. In some embodiments, geometrically defined shapes and/or optical contour elements that produce more wider angle stray light may be more effective at reducing image contrast and may be more effective for myopia control and/or may provide more tolerable vision and/or image quality and/or wearability than geometrically defined shapes and/or optical contour elements that may produce more narrow angle straylight. In some embodiments, it may be desirable for the geometrically defined shapes and/or contour optical elements to provide a level of stray light or light amplitude transmittance reduction that reduces the contrast of the image or modulation transfer function formed by the ophthalmic lens, for example, a change in MTF and/or contrast reduction of more than 10% or more than 12.5% or more than 15% or more than 17.5% or more than 20% or more than 25% or more than 30% or more than 35% or more than 40% or more than 45% or more than 50% or more. In some embodiments, the plurality of geometrically defined shapes and/or contour optical elements may be randomly distributed and in some embodiments the geometrically defined shapes and/or contour optical elements may be patterned into an array or into annular zones or concentric zones or asymmetrically arranged or in any other combination thereof or suitable arrangement thereof. In some embodiments the geometrically defined shapes and/or contour optical elements may be a plurality of discrete dot shapes and in some embodiments the geometrically defined shapes and/or contour light scattering optical elements may not be dot shaped e.g., any other configuration that may not be a dot including, for example, patterns depicted in FIS. 5, 6, 8, 9B, 10, 11, 13 or 15 or 16.

In some embodiments, a modulated surface may be produced by a modulation of at least two or more modulating parameters. In some embodiments, a first modulation and then at least one second or more modulations may be applied to a surface sequentially to provide more complex geometrically defined shapes and/or contour optical elements on one or more surfaces or one or more combinations of surface and/or between the surfaces of the ophthalmic lens. For example, at least one or more geometrical parameters and/or non-geometrical parameters may be modulated and may result in one or more modulated optical properties (refractive, non-refractive, diffractive, contrast modulating, phase-modulating, light scattering, aberrated, holographic, diffusing, light deviating (prism), light amplitude modulating or a combination of one or more optical properties thereof). In some embodiments, the at least one or more modulations may be conducted simultaneously by applying the at least one or more geometric and non-geometric parameters in the one or more modulating value ranges to the modulating function resulting in the change of or introduction of one or more optical effects or optical properties included in the one or more geometrically defined shapes and/or contour optical elements that may be located in a portion or portions of an ophthalmic lens, including overlapping portions, at least in part.

Figure 16B:
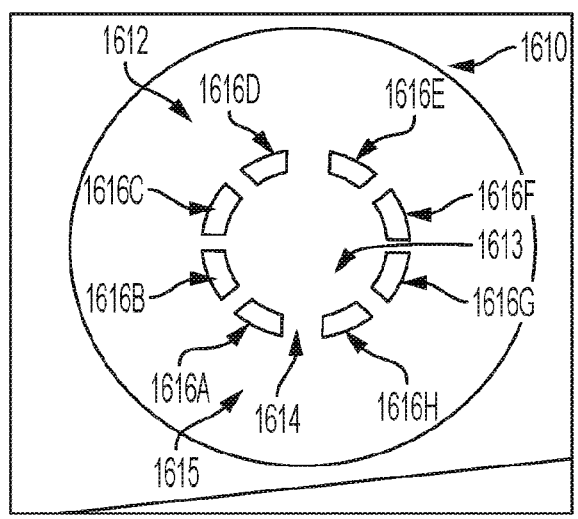

FIG. 16B illustrates a plan view of another exemplary embodiment of an ophthalmic lens 1610 comprising a central zone 1613 and a single annular modulated region 1614 incorporating a plurality of geometrically defined shapes and/or contour optical elements 1616A-1616H surrounded by a peripheral zone 1615 on the surface 1612 of the ophthalmic lens generated using a geometrical parameter other than radius of curvature. In this exemplary embodiment, the geometrically defined shapes and/or contour optical elements 1616A-1616H may be generated by modulating a density mask that may affect a light amplitude transmittance property change across the shapes and/or optical elements. In the example of FIG. 16B, the modulation process may be similar to a previous example lens described in e.g., FIG. 2J/2K except that the geometric parameter R (e.g., radius of curvature) was not modulated but another geometric parameter, for example, density mask DM was modulated using a periodic square wave function as the modulating function, as previously shown in FIG. 2E. Therefore, the new modulated lens surface 1612 of FIG. 16B may be modulated in the same modulated region rs<r≤rm with the same frequency term in the "modulating function" applied to the parameter DM to generate eight geometrically defined shapes and/or contour optical elements 1616A-1616H formed with the same geometrical defined shape and distribution as the previous example lens described in FIG. 2J/2K. The modulating value range of the DM parameter may be defined if the density mask value of the whole surface may be described as DM, the density mask, for example average DM, of the base material is DM1, and the density mask of the geometrically defined shapes and/or contour optical elements are DM2; diff=DM2−DM1 and the DM may be modulated in a manner similar to that described above (e.g., with respect to FIG. 15). The parameter DM may range between the binary limits 0 (100% transmittance) to 1 (0% transmittance) and may change by this range via the modulating function.

As shown in FIG. 16B, the geometrically defined shapes and/or contour optical elements 1616A-H formed by the modulated surface on the ophthalmic lens surface 1612 by the modulation process using a geometric parameter DM may now provide optical properties different to the sagittal (289) and tangential power (290) maps shown in FIG. 2K resulting from the geometrically defined shapes and/or contour optical elements 272A-H formed on the ophthalmic lens 271 produced by the modulation of the radius of curvature. In the embodiment of FIG. 16B, the modulating value range of the modulated parameter DM may change, for example, the density mask light transmittance of the base lens surface by, for example, the light amplitude transmittance between, for example 0 to 1, where 0 is no light transmittance i.e., light is blocked and a value of 1 means that no light is blocked by the elements relative to the base lens. The modulating value range of the modulated parameter DM in the modulated region(s) along the modulating direction(s) with the frequency terms in the modulating function may be selected based on the degree of light transmittance or light amplitude modulation targeted for the user of the ophthalmic lens, for example, the amount of light transmittance changed over, for example, a field of view. In some embodiments, the light amplitude may change by any specified gradient over any specified modulating region and in any specified modulating direction. The modulating region, direction and value range of the modulated parameter DM may be selected based on the degree of light transmittance desired to modulate the MTF over any spatial frequency distribution or light scattering to provide any desired image quality and/or contrast change. For example, the size and area and distribution (e.g., fill factor) or arrangement or pattern (e.g., random or arrays) or light amplitude transmittance gradient of the at least one geometrically defined shapes and/or contour optical elements that modulate the light amplitude may be created on or in the ophthalmic lens to provide the desired optical quality e.g., MTF and therefore a desired image quality. In some embodiments, a geometrically defined shape and/or contour optical element may be modulated by more than one modulating parameter in the modulating function to incorporate one or more optical effects, for example an element may be formed by modulating a mask density parameter and/or a refractive index parameter and/or a light scattering parameter and/or a light deviating parameter.

Figure 16C:
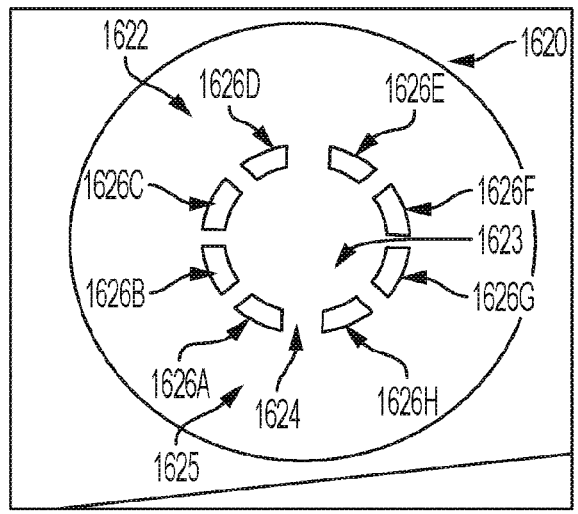

FIG. 16C illustrates a plan view of another exemplary embodiment of an ophthalmic lens 1620 where similar to FIG. 16A and FIG. 16B, a modulating function that may be described in the FIG. 2E may be applied to the geometrical parameter of surface step to create the (e.g., eight) geometrically defined shapes and/or contour optical elements 1626A-H as shown on the region 1624. These geometrically defined shapes and/or contour optical elements may alter the light phase value and result in diffraction and/or refraction properties in the opthalmic lens.

FIG. 16D illustrates a plan view of another exemplary embodiment of an ophthalmic lens 1630 where the starting geometry may be similar to that illustrated in FIG. 1 and FIG. 2, and a modulating function described in FIG. 2E may be applied to radius of curvature 106 in FIG. 1B on the region of 204 in FIG. 2A along the angular direction 209 in FIG. 2A. This modulating function has only the lower frequency sinusoidal term (square wave in form) and has significantly higher Tsgn value that may be a reason for the larger or substantially larger size of the geometrically defined shape and/or contour optical element 1631 on the region 1634. Such a lens may create a partial ring of focus inside the eye in front or behind the retina and may only be continuous with base surface between the 1631 and the central zone 1633.

FIG. 16E illustrates a plan view of another exemplary embodiment of an ophthalmic lens 1640 where the starting geometry may be similar or substantially similar to that illustrated in FIG. 1 and FIG. 2. The front surface 1642 may be modulated with the modulating function applied on the radius of curvature 106 in FIG. 1B, and the direction and the region of modulation may be similar or substantially similar to FIG. 1 and FIG. 2. However, the modulating function may be a square wave with modified lengths of squares in each interval that may be adjusted mathematically and non-equally. Such a modulation may create irregular geometrically defined shapes and/or contour optical elements 1641A-C in the modulating region 1644.

Figure 16F:
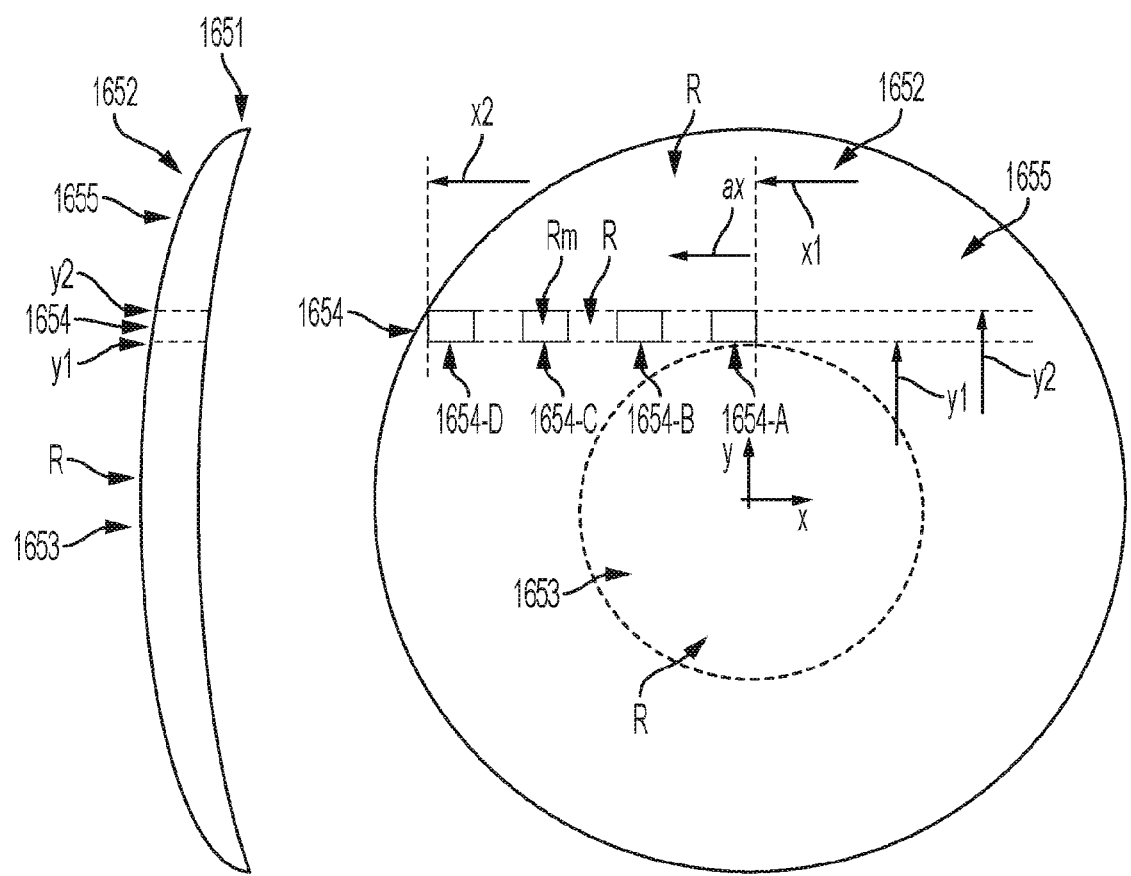

FIG. 16F illustrates cross-sectional and plan views of an exemplary embodiment of an ophthalmic lens 1651 having a modulated front surface geometry 1652 comprising a plurality of geometrically defined shapes and/or contour optical elements 1654-A to 1654-D in a non-annular, for example horizontal, region 1654. The lens 1651 has a central zone 1653 a modulated region 1654 and an outer peripheral zone 1655. The geometry of lens surface 1652 may be configured by applying a periodic modulating function to the modulated parameter radius of curvature R over a modulated region x1 to x2 and y1 to y2 in the direction of the vector unity ax over a modulating value range of R to Rm. In some embodiments, the modulating function may be a periodic square wave function or a sin wave function. In some embodiments, the modulating function may be as described in FIG. 2H and in some embodiments, the modulating function may be any periodic function. The final modulated front surface geometry 1652 of the lens 1651 may be formed by applying the modulating function i.e. the periodic square wave function with a frequency term on parameter R, to modify R, in the desired direction ax over the defined region 1654 in the "modulating range" so that four geometrically defined shapes and/or contour optical elements 1654-A to 1654-D may be formed on the front surface in a horizontal meridian. In some embodiments, the frequency term and therefore the number of elements formed in the defined region may be at least one and may be 2, 3, 4, 5, 6, 7, 8, 9, and/or 10 or more. In some embodiments, the number of defined regions may be altered, for example more than one region may be defined and therefore the number of regions may be at least one and may be 2, 3, 4, 5, 6, 7, 8, 9, and/or 10 or more in order to create a new arrangement of the geometrically defined shapes and/or contour optical elements. In some embodiments, the direction of modulation may be a horizontal direction or a vertical direction or in an angular direction or any direction or combination thereof.

In some embodiments, any mathematical function that may describe a surface may be used to define the density and distribution of the mask that may modulate light transmittance, for example, conics or polynomials or Zernike wavefronts or superconics and the like. In some embodiments it may be desirable for the geometrically defined shapes and/or contour optical elements to provide a level of light amplitude transmittance change that reduces the contrast of the image formed by the ophthalmic lens. In some embodiments, the plurality of geometrically defined shapes and/or contour optical elements may be randomly distributed and in some embodiments the geometrically defined shapes and/or contour optical elements may be patterned into an array or annular zones or concentric zones or asymmetrically arranged or any other combination thereof or suitable arrangement. In some embodiments the geometrically defined shapes and/or contour optical elements may be a plurality of discrete round or spot shapes and in some embodiments the geometrically defined shapes and/or contour light amplitude modifying optical elements may be of any shape e.g., any other configuration that may not be round including, for example, at least, a portion of or a complete annular rings that may or may not be concentric or may be patterns depicted in e.g., FIG. 5, 6, 8, 9B, 10, 11, 13 or 15. In some embodiments, the at least one or more shapes may be open shapes or closed shapes or sectors or elongated lines or bands, or rectangular or curved or swirls or arcs that may be spaced apart or may be conjoined or clumped or any combinations thereof.

In some embodiments, a modulated surface may be produced by a modulation of at least two modulating parameters. In some embodiments, a modulated surface may be produced by a modulation of at least one or more geometric parameters. In some embodiments, a modulated surface may be produced by a modulation of at least one or more non-geometric parameters. In some embodiments, a modulated surface may be produced by a modulation of at least one geometric parameter and by a modulation of at least one non-geometric parameter to create a new modulated surface comprising a plurality of geometrically defined shapes and/or contour optical elements that may incorporate modulated geometric and non-geometric parameters that may alter the optical properties of the lens. In some embodiments, the ophthalmic lens may incorporate a modulated surface and/or a modulated portion of the lens and/or geometrically defined shapes and/or optical contour elements that may be based on at least one or more optical principles. In some embodiments, the ophthalmic lens may incorporate a modulated surface and/or a modulated portion of the lens and/or geometrically defined shapes and/or optical contour elements that may include a refractive and/or a non-refractive optical effect. In some embodiments, the ophthalmic lens may incorporate a modulated surface and/or a modulated portion of the lens and/or geometrically defined shapes and/or optical contour elements that may provide a refractive and a light scattering optical effects. In some embodiments, the ophthalmic lens may incorporate a modulated surface and/or a modulated portion of the lens and/or geometrically defined shapes and/or optical contour elements that may provide a refractive and a light scattering and a modified light amplitude transmittance optical effects. In some embodiments, the ophthalmic lens may incorporate a modulated surface and/or a modulated portion of the lens and/or geometrically defined shapes and/or optical contour elements that may provide a refractive and/or a light scattering and/or a modified light amplitude transmittance and/or a prismatic light deviating optical effects. For example, a modulated surface produced by a modulation of a geometric parameter e.g., a radius of curvature as in FIGS. 2J, 2K may be further modulated by a modulation of a non-geometric parameter e.g., by the material property refractive index as in FIG. 12 to create a new modulated surface comprising a plurality of geometrically defined shapes and/or contour optical elements that may incorporate modulated geometric parameters (e.g., radius of curvature, surface roughness, lateral separation of optical axes, thickness, sagittal depth) and non-geometric parameters (e.g., refractive index, properties to form a resultant power profile and/or at least one or more optical property that may alter image quality, such as refractive, non-refractive, diffractive, contrast, phase, light scattering, aberrated, holographic, diffusing, light deviating, light amplitude modulating or a combination of one or more optical properties thereof).

In some embodiments, a modulated surface produced by a modulation of a geometrical parameter e.g., a radius of curvature as in FIGS. 2J, 2K, may be further modulated by a modulation of another geometrical parameter e.g., a surface roughness parameter as in FIG. 16A to create a new modulated surface comprising a plurality of geometrically defined shapes and/or contour optical elements that may incorporate modulated geometrical parameters, e.g., radius of curvature R, and surface roughness SR, to form a resultant optical effect by combining refractive and light scattering optical properties that may alter image quality e.g., an image contrast may be altered by prescribing a desired narrow angle (e.g. refractive aberration and/or straylight) and wide angle light scattering (straylight) combination over a field of view, for example, a 10 or 15 or 20 degree field of view or wider. The resultant image quality may deliver a more optimal and/or targeted image quality e.g., MTF (contrast loss) at defined spatial frequencies. It has been hypothesized that eye growth responses leading to axial elongation and progressing myopia in children and young adults may be influenced, for example, controlled by image quality over mid spatial frequencies and so image contrast may be a desired optical property to modulate in a controlled fashion as disclosed herein.

In some other examples, a modulated surface produced by a modulation of a first non-geometrical parameter e.g., a refractive index, as in FIG. 12 may be further modulated by the modulation of a second non-geometrical parameter e.g., a density mask DM (affecting the light amplitude transmittance), as in FIG. 16B to create a new modulated surface comprising a plurality of geometrically defined shapes and/or contour optical elements that may incorporate at least 2 modulated optical properties, e.g., refraction and light amplitude transmittance, to form an ophthalmic lens with a desired resultant image contrast e.g., a light refraction and a light amplitude combination over a field of view, for example, a 10 or 15 degree field of view or wider. In some embodiments, the geometric and non-geometric parameter modulation may correspond to the same plurality of geometrically defined shapes and/or contour optical elements. In some embodiments, the geometrical and non-geometrical parameter modulation may not correspond to the same plurality of geometrically defined shapes and/or contour optical elements, for example, the geometric and non-geometric parameter modulated elements are spaced apart or partially correspond or are, at least in part, overlapping or conjoined. In some embodiments, the at least one or more geometrically defined shape and/or contour optical element is, at least in part, modulated by a geometric parameter and or non-geometric parameter. In some embodiments, the at least one or more parameters modulated may impact the same optical property or in some embodiments may impact different optical properties. In some embodiments, the at least one or more parameters modulated may impact the same optical property or in some embodiments may impact different optical properties including the type, arrangement, size, magnitude and/or strength of the one or more refractive, diffractive, contrast, light scattering, light deviating, aberrated, holographic, diffusing, and/or phase or light amplitude modulating myopia control elements or a combination of one or more of the elements may be varied across the regions of the ophthalmic lens based, at least in part, on the rate of myopia progression of the eye of the individual. For example, it may be desirable to the wearer of an ophthalmic lens to limit excessively modulating a single geometrical parameter to change a single optical property in order to achieve a targeted image quality. For example, the myopia of a progressing child myope may be controlled by introducing a refractive defocus optical property or a light scattering optical property by modulating, for example, a surface curvature parameter R and/or a surface roughness parameter SR to alter image quality and/or focal point locations of the myope. Ophthalmic lens designs that may control myopia progression by manipulating a single optical property principle may result in undesirable characteristics e.g., visual acuity, visual quality, cosmesis of the lens, wearing comfort, distortions and distortions exacerbated by dynamic eye or head movements and so it may be desirable to deliver the required image quality by different means or a combination of optical properties that when combined provide a resulting change in optical properties and image quality that may be less noticeable to the wearer.

In some embodiments, ophthalmic lenses may be designed and/or manufactured that incorporate at least one or more geometrically defined shapes and/or contour optical elements of at least one or more shapes that may provide at least two or more optical properties that may form a retinal image quality that may be effective for slowing axial elongation of the progressive myope. In some embodiments, the at least one or more geometrically defined shapes and/or contour optical elements may be of any desired shape(s) and may have at least one or more different refractive indexes to the base lens and/or may have a reduced light amplitude transmittance and/or may have light scattering properties and/or may have a refractive power profile and/or may have a higher order aberration power profile and/or a light deviating effect as the object and/or the eye of the wearer may move relative to the optics of the ophthalmic lens. In some embodiments, at least one or more geometrically defined shapes and/or contour optical elements of at least one or more shapes may or may not form a dome shape, for example, or any shape or dome that may not be elevated from the base surface and/or may be formed within the matrix of the lens between the surfaces or may be formed as part of a lens coating process or may be covered or coated by a lens coating process. In some embodiments, the at least one or more geometrically defined shapes and/or contour optical elements of at least one or more shapes may form a dome shape, for example, any shape or element that may be elevated from the base surface and/or may be formed on at least one of a front or back surfaces or may be formed as part of a lens coating process or may be covered or coated by a lens coating process or formed or covered by printing process, for example inkjet printing or 3D printing. In some embodiments, the at least one or more geometrically defined shapes and/or contour optical elements may reduce light transmittance by about 10% or more or 15% or more or 20% or more or 25% or more or 30% or more or 35% or more or 40% or more or 45% or more or 50% or more or 55% or more or 60% or more or 75% or more or 80% or more and/or may scatter light and/or may produce a ratio of wide angle straylight to narrow angle straylight that may be more than about 0.5 or more or about 0.9 or more than about 1 or more than about 1.1 or more than about 1.2 or more than about 1.25 or more than about 1.3 or more than about 1.4 or more than about 1.5 or more than about 1.6 or more than about 1.7 or more than about 1.8 or more than about 1.9 or more than about 2 or more than about 4 or be more than about 6 or more than about 8 or higher and/or may have a different refractive index by about 0.01 or more or by about 0.02 or more or by about 0.04 or more or about 0.07 or more or by about 0.09 or by about 0.15 or by about 0.3 or more than about 1 or more or more than about 1.5 and higher. In some embodiments, the at least one or more geometrically defined shapes and/or contour optical elements that may incorporate one or more optical principles or optical effects may be produced by at least one or more of a molding process or a laser or a printer (e.g., an inkjet printer and/or a 3D printer where a polymer is deposited and/or formed by a curing process, for example a UV curing process or a 2 photon lithographic process or a stamping or an embossing or a coating process or a coating process that may include a drying and/or an evaporative step.

Figure 17A:
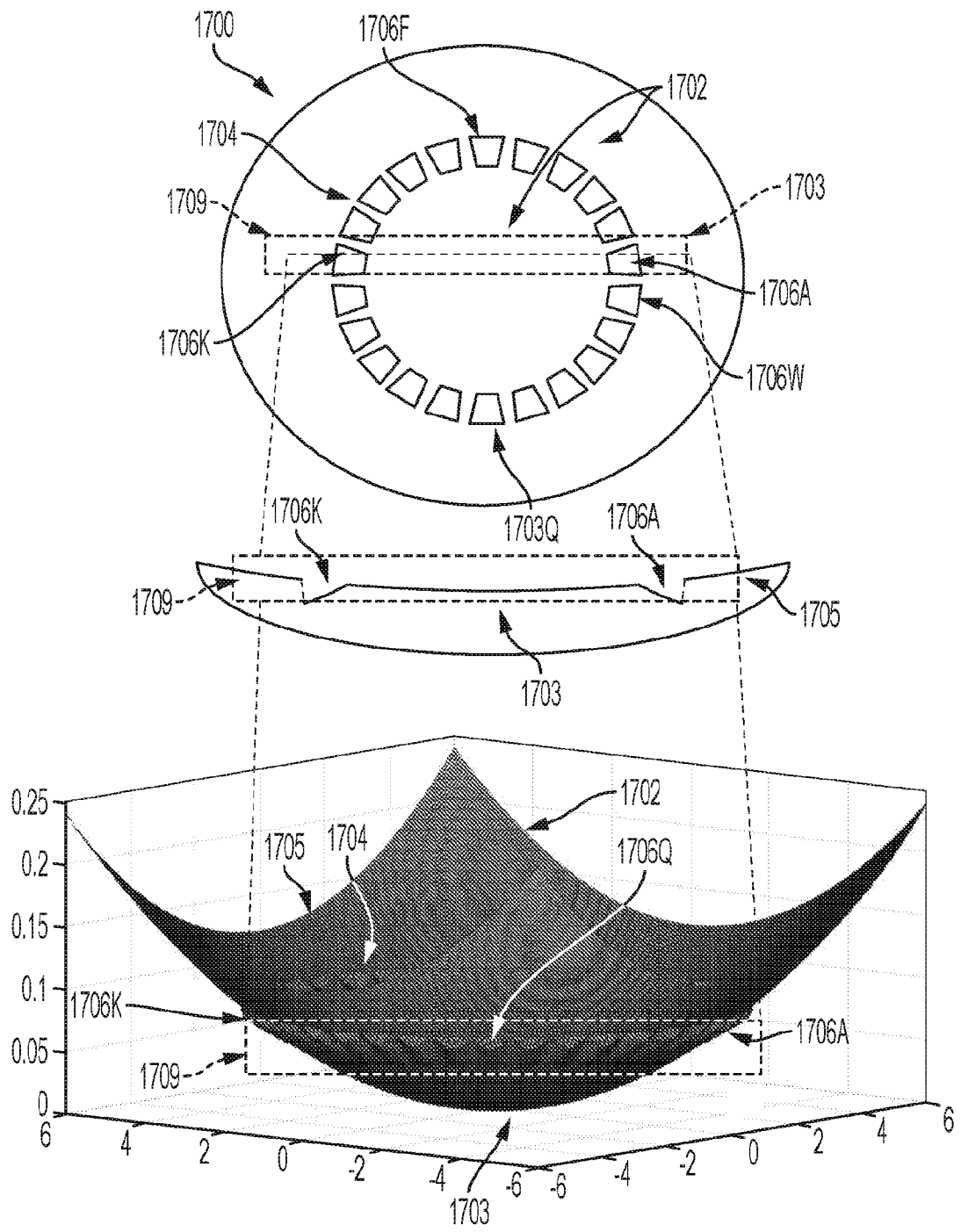
FIGS. 17A, 17B, and 17C illustrate an exemplary embodiment of an ophthalmic lens comprising a plurality of geometrically defined shapes and/or contour optical elements on the surface of the ophthalmic lens as described herein.

FIG. 17A illustrates a plan view of the geometry of a back surface of an exemplary embodiment of an ophthalmic lens 1700 comprising a central zone 1703 and a single annular modulated region 1704 incorporating a plurality of geometrically defined shapes and/or contour optical elements 1706 surrounded by a peripheral zone 1705 on the surface 1702 of the ophthalmic lens generated using a geometrical parameter, for example radius of curvature center location. FIG. 17A also illustrates a cross section of the lens 1700 in a magnified view and a three-dimensional sliver section 1709 of the lens back surface 1702 concave down. The lens of FIG. 17A is based on the surface modulated ophthalmic lens 200 described in FIG. 2I. Like the lens described in FIG. 2I, the ophthalmic lens 1700 illustrated in FIG. 17A uses the same high frequency sinusoidal modulating function i.e. the function 240 from FIG. 2F, applied over a similar modulated annular region 1704 and modulating direction, e.g. unity vector $\vec{a}_\theta$ (similar to 209 of FIG. 2A) to generate the plurality of geometrically defined shapes and/or contour optical elements 1706A-1706W in region 1704. However, the ophthalmic lens 1700 of FIG. 17A uses a different modulated geometrical parameter (radius of curvature center location) over a different modulating value range (affecting the optical property of prism power) along each of the meridians of the lens (affecting the optical property of prism angle).

Figure 17B:
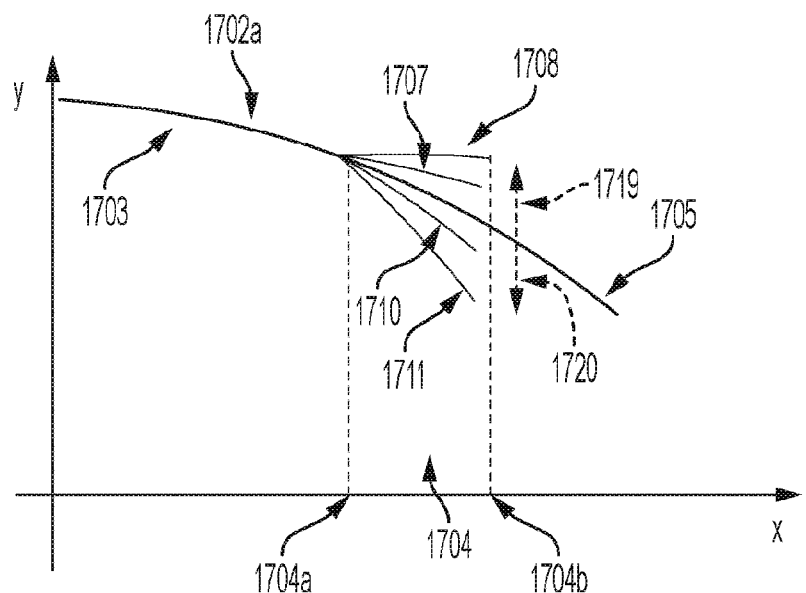
Figure 17C:
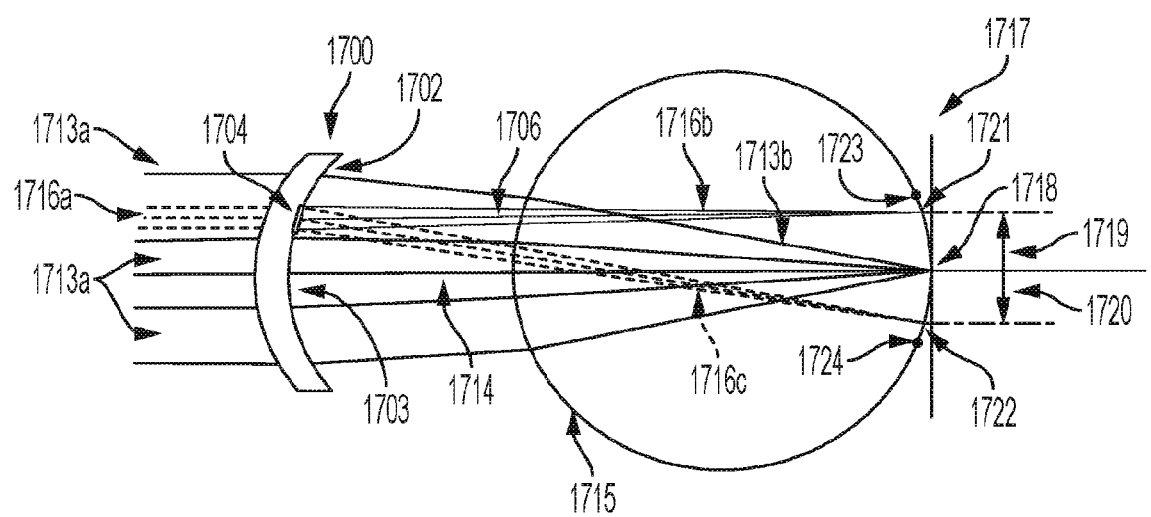

FIG. 17B shows a cross-section of the geometry of the central zone 1703, modulated region 1704 and a portion region 1705 of the ophthalmic lens back surface 1702 with a curvature 1702a in unmodulated zones 1703 and 1705. Using the sinusoidal modulating function as described to modulate the radius of curvature center location parameter from the pre-modulated curvature 1702a in region 1704 between 1704a and 1704b may form a surface curvature tilting, for example curvatures 1707 or 1708 in an outward direction or 1710 or 1711 in an inward direction and may result in a prism power and a prism angle. Therefore, for example, the curvature tilting 1708 may produce a larger prism power at a greater angle than the curvature tilting indicated by 1707. Thus, larger surface curvature tilts 1708 (outwards) and 1711 (inwards) may result in a larger prism power and a greater shift or deviation in the focal point(s) in the direction of the prism angle. FIG. 17C illustrates a simplified schematic ray diagram (i.e. without the inclusion of the refractive elements of the eye) for light rays from a far distant object passing through the ophthalmic lens 1700 including the central zone 1703, peripheral zone 1705 and the modulated region 1704 incorporating the geometrically defined shapes and/or contour optical elements 1706 generated by a modulation of the radius of curvature center location (tilt) parameter in the direction of a first example outward prism angle by a distance of 1719 and a second example inward prism angle by a distance of 1720. As drawn in FIG. 17C, a first group of light rays 1713a originate from a single object in the far distance and are parallel to the optical axis 1714 and are refracted (1713b) by the zones 1703 and 1705 incorporating the base lens power profile of the ophthalmic lens 1700 and the optics of the eye 1715 to form a focal point 1718 on the retinal plane 1717 along the optical axis to correct the distance refractive error of the wearer. A second group of distant light rays 1716a pass through a portion of the modulated surface region 1704 incorporating a geometrically defined shape and/or contour optical element 1706 having a first example tilted radius of curvature outwards 1706 or a second example tilted curvature inwards 1710 with respect to the base lens radius of curvature 1702*a* (FIG. 17B) and may form a focal point on the retina at 1722 or 1721, for the outward and inward curvatures (tilt) respectively by deviating light rays 1716*c* (in the case of the first example) or 1716*b* (in the case of the second example) with respect to light rays 1713*b* that formed the on-axis focal point 1718 by the un-tilted curvature 1702*a*. The deviation e.g., the displacements 1719 and 1720 of focal points from 1718 to 1721 or 1722 may be proportional to the prism power and/or prism angle resulting from the curvature tilting parameter modulation over the modulating value range and direction. Accordingly, the larger surface curvature tilts drawn in FIG. 17B, for example, 1708 (outwards) and 1711 (inwards) may result in an even larger prism power and a greater shift in the focal point(s) in the direction of the prism angle, for example, located at 1723 and 1724.

The geometrically defined shapes and/or contour optical elements on the surface of the ophthalmic lens may be designed to be smooth and continuous in the direction of modulation. In some embodiments, the geometrically defined shapes and/or contour optical elements may be modulated in a circumferential direction or a radial direction or in any direction or all directions or any combinations thereof to configure the desired contour of the lens surface at the intersection of the geometrically defined shapes and/or contour optical element with the surrounding lens surface when that surrounding surface may be either a non-modulated portion of the lens base surface or when the intersection with the surrounding lens surface may be within the modulated region. As previously described, the modulating function may be defined to control any configuration or feature of the geometrically defined shapes and/or contour optical elements, for example, the addition of the sinusoidal function to the square wave function (e.g. as shown in FIG. 2I) may be necessary or desirable to form geometrically defined shapes and/or contour optical elements on the surface of the ophthalmic lens that are smooth and continuous in the direction of modulation. In some embodiments, the modulating function may be defined to produce elements that may not be smooth and/or continuous.

Figure 18:
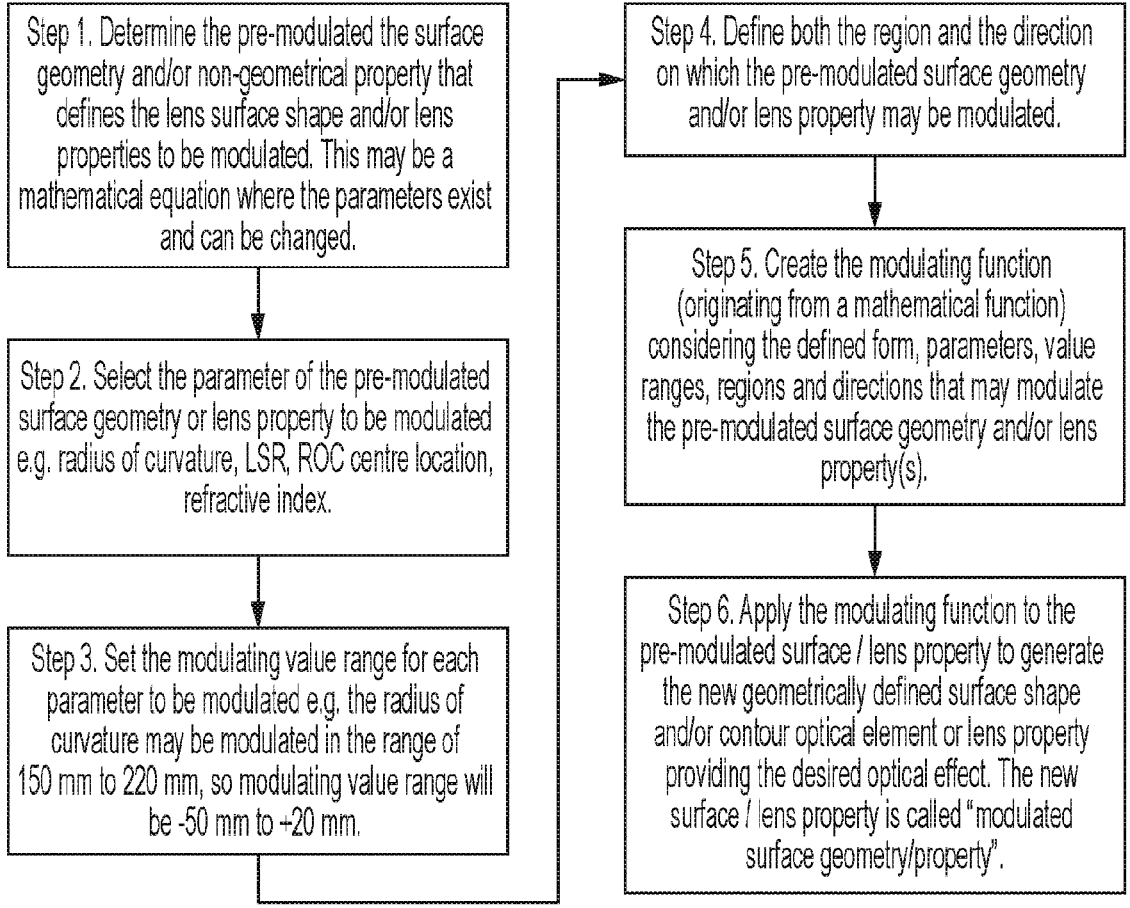
FIG. 18 is a flow chart illustrating an exemplary embodiment of a process for designing/applying a plurality of geometrically defined shapes and/or contour optical elements on the surface of the ophthalmic lens as described herein.

In some embodiments as previously disclosed herein, a plurality of geometrically defined shapes and/or contour optical elements may be formed by the modulation process outlined in FIG. 18. For example, geometric parameter(s) or non-geometric parameter(s) or combinations thereof of the ophthalmic lens may be modulated sequentially by different modulating functions originating from a mathematical function in defined regions and directions over ranges of the parameter(s) values defined to generate a new modulated surface geometry incorporating geometrically defined shapes and/or optical contour elements having the desired dimensions and optical properties resulting in the desired optical quality and image quality. In some embodiments, the modulated parameter may be defined, for example, as a radius of curvature modulated in a single direction to form at least one or more geometrically defined shapes and/or contour optical elements on a surface of the ophthalmic lens. For example, Step 1 may comprise determining the pre-modulated surface geometry and/or non-geometric property that defines the lens surface shape and/or lens properties to be modulated. This may be a mathematical equation where the parameters exist and can be changed. Step 2 may comprise selecting the parameter of the pre-modulated surface geometry or lens property to be modulated e.g., radius of curvature, LSR, ROC center location, refractive index. Next, Step 3 may comprise setting the modulating value range for the parameters to be modulated e.g., the radius of curvature may be modulated in the range of 150 mm to 220 mm, so modulating value range may be −50 mm to +20 mm. Step 4 may comprise defining both the region and the direction on which the pre-modulated surface geometry and/or lens property may be modulated. Step 5 may comprise creating the modulating function (originating from a mathematical function) considering any combination of one or more of the defined form, parameters, value ranges, regions and directions that may modulate the pre-modulated surface geometry and/or lens property(s). Step 6 may comprise applying the modulating function to the pre-modulated surface/lens property to generate the new geometrically defined surface shape and/or contour optical element or lens property providing the desired optical effect. The new surface/lens property may be referred to as the "modulated surface geometry/property". In some embodiments, the process described herein may not only include a modulating function to generate an element but also may used to describe a lens surface (or portion of a lens surface) retrospectively. For example, in some embodiments, the element may be described and specified on a point by point basis or by a series of stitched together regions without using a modulating function. However, the resulting (e.g., final) surface geometry or optical properties may be described by a modulating process and/or a modulating function of any parameters (including, e.g., the parameters described herein) forming the element having the optical parameters specified.

Figure 19:
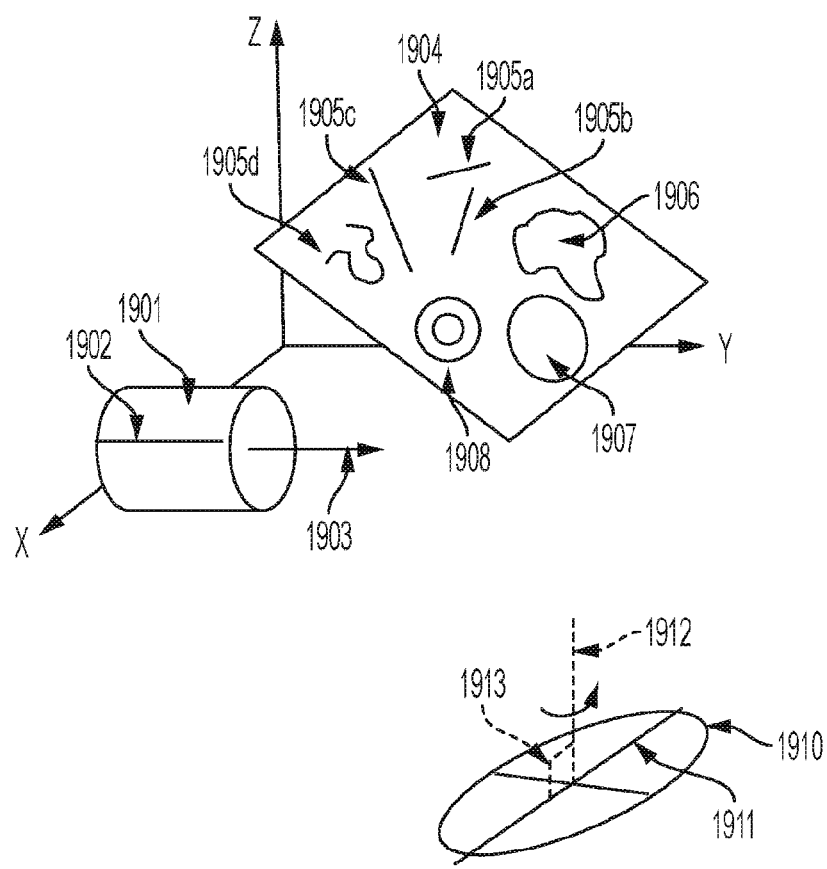
FIGS. 19A, 19B, and 19C illustrate a Cartesian coordinates system including different exemplary surface geometries to explain a spatial flat surface that may be used on either or both surfaces of an ophthalmic lens as a geometrically defined shapes and/or contour optical element.

In some embodiments, as illustrated in FIG. 19A, a geometrically defined shape and/or contour optical element 1906 may not be created using the modulation process described in FIG. 18, and may be created by the intersection of geometrical plane with the base surface, and may be substantially flat.

In some embodiments, a line geometry 1902 in FIG. 19A that may only be flat in one direction 1903 and as such may generate a surface 1901 by the revolution of a line 1902 around an axis 1903 that is not a flat portion. However, in some embodiments the geometrically defined shapes and/or contour optical elements may be generated on an ophthalmic lens surface by the intersection of curvatures or shapes that may be part of one or more spatial planes.

As shown in FIG. 19B, a spatial plane 1904 may include different shapes, 1905*a-d*, 1906, 1907 and 1908 where some shapes may be lines 1905*a-d* and may have an open contour and may be located on a plane 1904 or where some different shapes, for example 1906, 1907 and 1908 may have a closed contour formed at the junction. In some embodiments, as illustrated in FIG. 19C, a flat portion 1910 may be formed by the revolution of 1911 (line geometry) around its normal axis 1912 where the axis is at the right angle 1913. In some embodiments the contour shapes may be open or closed and of any size, shape or combinations or multiple shapes. In some embodiments, the contour shapes may be on at least one or more spatial planes to provide a plurality of geometrically defined shapes and/or contour optical elements on the surface of the ophthalmic lens in any arrangement and combination of geometrical and/or non-geometrical parameters to impart any optical properties including the type, arrangement, size, magnitude and/or strength of the one or more refractive, diffractive, contrast, light scattering, light deviating, aberration, holographic, diffusing, and/or phase or light amplitude modulating myopia control elements or a combination of one or more of the elements is varied across the regions of the ophthalmic lens based, at least in part, on the rate of myopia progression of the eye of the individual.

Figure 20A:
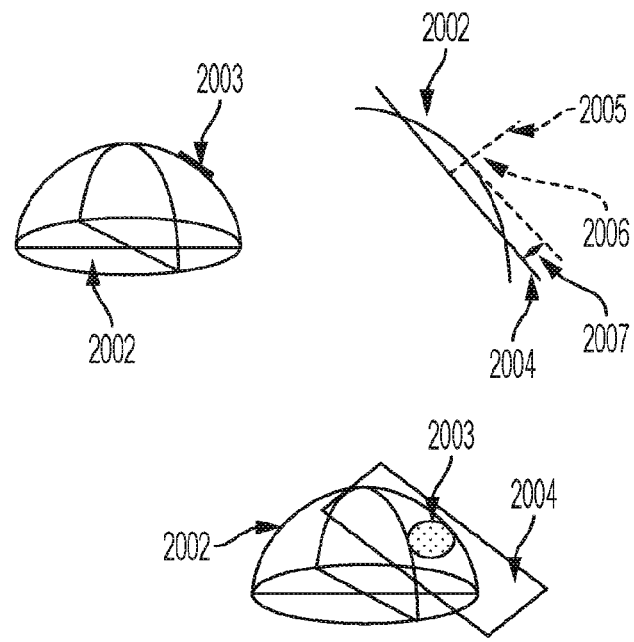
FIGS. 20A and 20B illustrate the geometrical intersection of a desirable plane with an exemplary portion of a sphere that may form back, front or both surface of an ophthalmic lens, to create the geometrically defined shapes and/or contour optical element feature that may compromise a circular contour of different sizes.
Figure 20B:
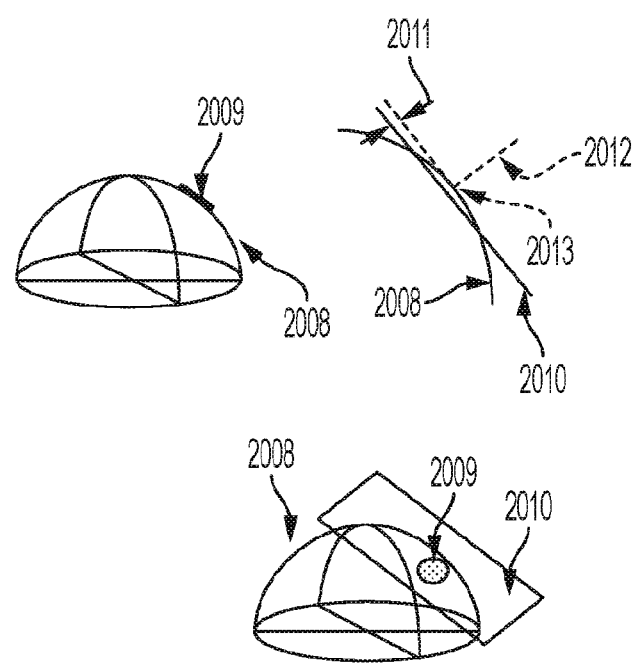
Figure 21:
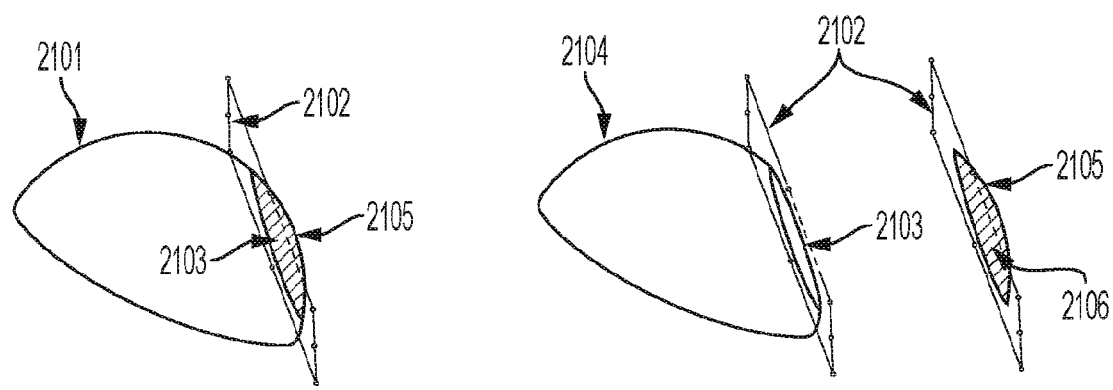

FIG. 20A-B shows a schematic diagram of a front surface of an ophthalmic lens comprising a round geometrically defined shape and/or contour optical element formed by the geometrical intersection of a plane with a portion of the front surface of an ophthalmic lens resulting in a substantially round or circular contour geometrically defined shapes and/or contour optical element of different sizes (FIG. 20A and FIG. 20B). As shown in FIG. 20A, a geometrically defined shape and/or contour optical element 2003 may be formed on the spherical base front surface of the ophthalmic lens 2002 by intersecting a spatially flat plane 2004 with a substantially spherical or spherical base surface 2002 creating a substantially round or circular contour 2003 when the plane 2004 is moved along an axis 2005 in a direction normal to the plane 2004. While moving along the axis 2005, the plane 2004 first intersects the base surface 2002 at the first surface intersecting location 2006 until stopping at a distance 2007 from the first intersecting location 2006. In this example, the size of the substantially round or circular contour 2003 created is proportional to the distance 2007 the plane moves along the axis 2005 after the first intersecting location 2006 with the base surface 2002. FIG. 20B shows an illustration of the same lens of FIG. 20A but where the geometrically defined shape and/or contour optical element 2009 is smaller than the element 2003 in the example of FIG. 20A. The smaller geometrically defined shape and/or contour optical element 2009 may be formed by the spatial plane 2010 travelling a smaller perpendicular distance 2011 along the axis 2012 from the first intersecting location 2013 between the flat plane 2010 and the base surface 2008 than the distance of travel 2007 in FIG. 20A.

FIG. 2I illustrates a further magnified three dimensional perspective of a surface of an ophthalmic lens 2101 where a flat plane 2102 has intersected with a portion of the spherical base lens surface 2101 to form a round, flat facet-like geometrically defined shape and/or contour optical element 2103, similar to that described in FIG. 20A. The plane 2102 intersects the lens surface 2101 at the first intersecting location 2105 and travels an axis normal to the surface at the first intersecting location a distance to create a new lens surface geometry 2104 by forming the flat portion element 2103 on the inner side of the plane 2102 while a second geometry 2106 may be created (and removed) on the outer side of the plane 2102 equal to the lens volume change from the original surface base geometry 2101 and the new surface geometry 2104.

Figure 22:
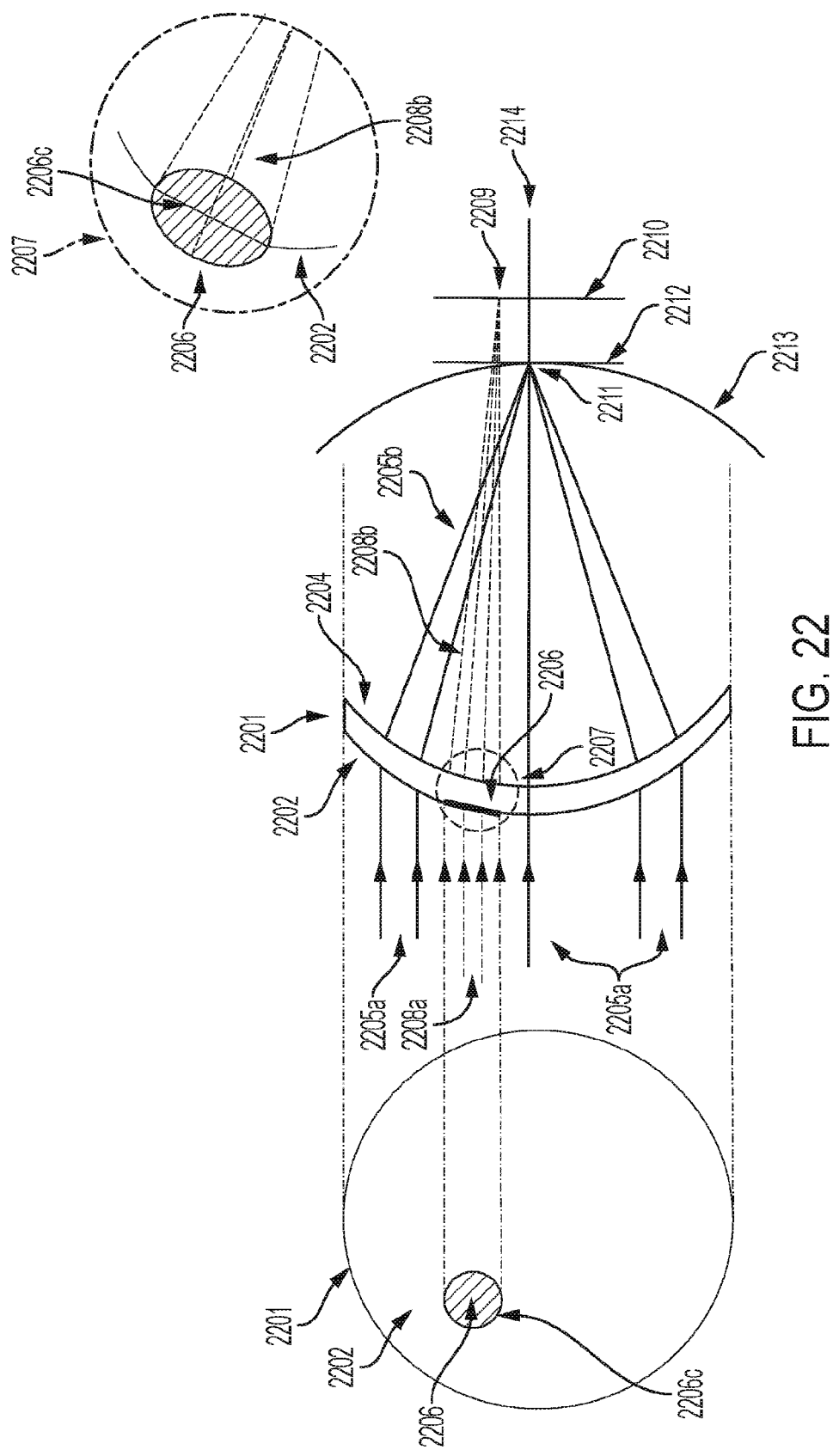
FIG. 22 illustrates an ophthalmic lens and its simplified rays' location inside a human eye model and on the retina, with one geometrically defined shapes and/or contour optical element created by a spatially flat surface on the front surface of the lens resulting in an image in front of the retina from that geometrically defined shapes and/or contour optical element.

FIG. 22 illustrates a plan and cross sectional views, of an ophthalmic lens 2201 incorporating at least one flat geometrically defined shape and/or contour optical element 2206 on the lens. The geometrically defined shape and/or contour optical element may be a spatially flat surface and may be formed by the intersection of a flat plane surface on the lens front surface as disclosed herein. The illustrations in FIG. 22 include simplified ray diagrams, for example, in a simplified model eye where only light rays directed towards and emerging from the lens 2201 are illustrated without drawing the other components of the ophthalmic lens and eye optical system in existence when in use with an eye, such as a cornea, an ocular lens, a vertex distance (in the case of spectacles) and the like. FIG. 22 shows, diagrammatically, ray tracing of a number of light ray groups entering and emerging from the simplified model eye system. The lens 2201 has a base power profile to correct the distance refractive error of the eye and as such may refract a first group of rays 2205$a$ travelling from a distant object parallel to the optical axis 2214 and may direct light rays 2205$b$ to form an on-axis focal point 2211 on the retinal image plane 2212. A second group of light rays 2208$a$ from a distant object pass through the flat geometrically defined shape and/or contour optical element 2206 located on the front surface and model eye optical system that may direct light rays 2208$b$ to form an off axis focal point 2209 in the image plane 2210 behind the retinal image plane 2212. A magnified window 2207 of the geometrically defined shape and/or contour optical element 2206 is illustrated in 2207 where the front surface 2202 curvature changes to a part of a spatially flat plane creating the contour 2206$c$ of the geometrically defined shape and/or contour optical element 2206.

Figure 23:
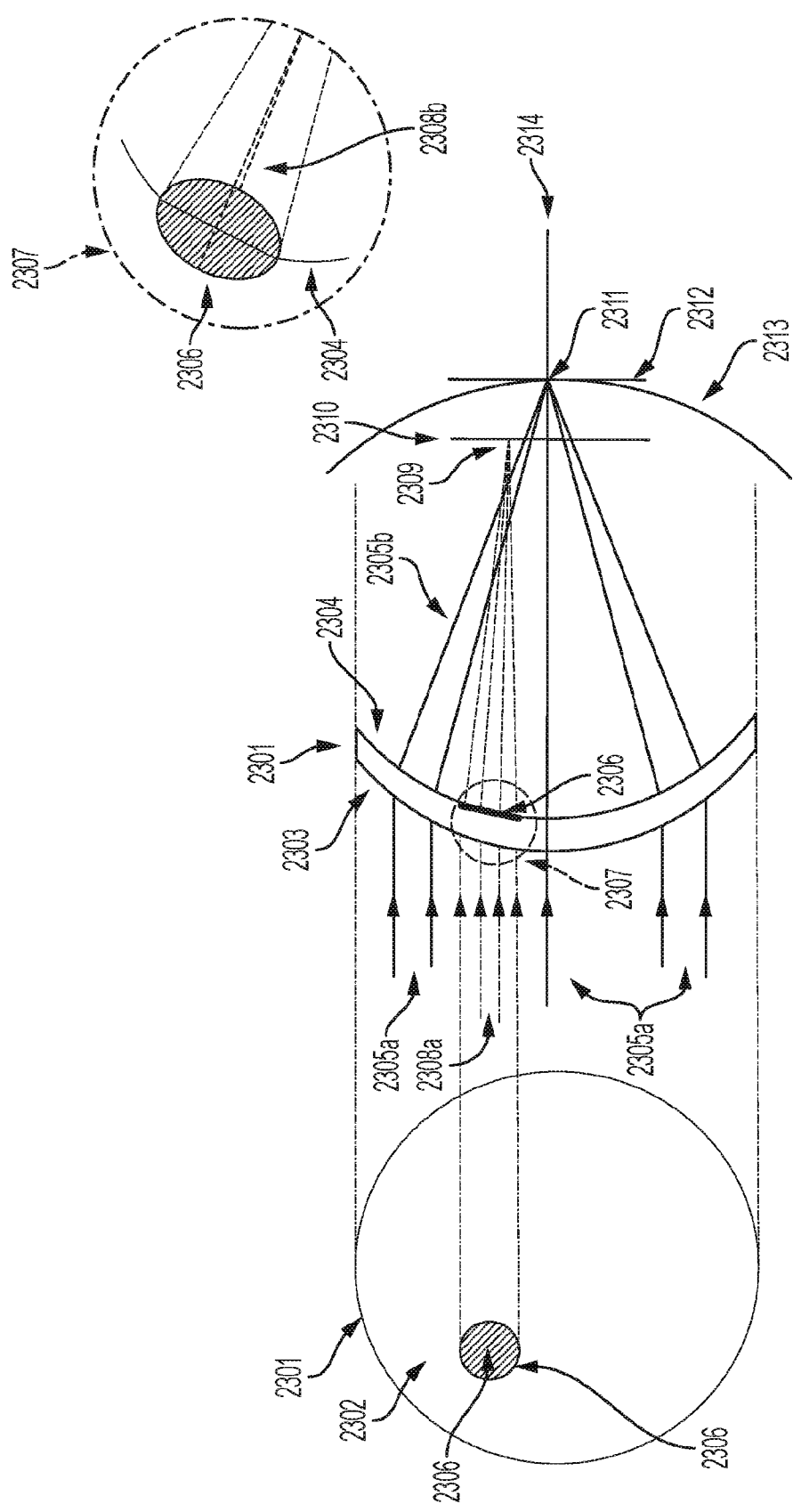
FIG. 23 illustrates an ophthalmic lens and its exemplary rays' locations inside a simplified schematic human eye model and on the retina, with one geometrically defined shapes and/or contour optical element created by a spatially flat surface on the back surface of the lens resulting in an image behind the retina from that geometrically defined shapes and/or contour optical element.

FIG. 23 illustrates a plan and cross sectional views, of an ophthalmic lens 2301 incorporating at least one geometrically defined shape and/or contour optical element 2306 on the lens back surface 2304. The geometrically defined shape and/or contour optical element 2306 is a spatially flat surface and may be formed by the intersection of a flat plane surface on the lens back surface as disclosed herein rather than through a modulation process. The illustrations in FIG. 23 include simplified ray diagrams, for example, in a simplified model eye where only light rays directed towards and emerging from the lens 2301 are illustrated without drawing the other components of the ophthalmic lens and eye optical system in existence when in use with the eye, such as a cornea, an ocular lens, a vertex distance (in the case of spectacles) and the like. FIG. 23 shows, diagrammatically, ray tracing of a number of light ray groups entering and emerging from the simplified model eye system. The lens 2301 has a base power profile to correct the distance refractive error of the eye and as such may refract a first group of rays 2305$a$ travelling from a distant object parallel to the optical axis 2314 and may direct light rays 2205$b$ and may form an on axis focal point 2311 on the retinal image plane 2312. A second group of light rays 2308$a$ from a distant object pass through the flat plane geometrically defined shape and/or contour optical element 2306 located on the back surface and model eye optical system and may direct light rays 2308$b$ to form an off axis focal point 2309 in the image plane 2310 in front of the retinal image plane 2310. A magnified window 2307 of the geometrically defined shape and/or contour optical element 2306 is illustrated in 2307 where the back surface 2304 curvature changes to a part of a spatially flat plane creating the geometrically defined shape and/or contour optical element 2306.

Figure 24A:
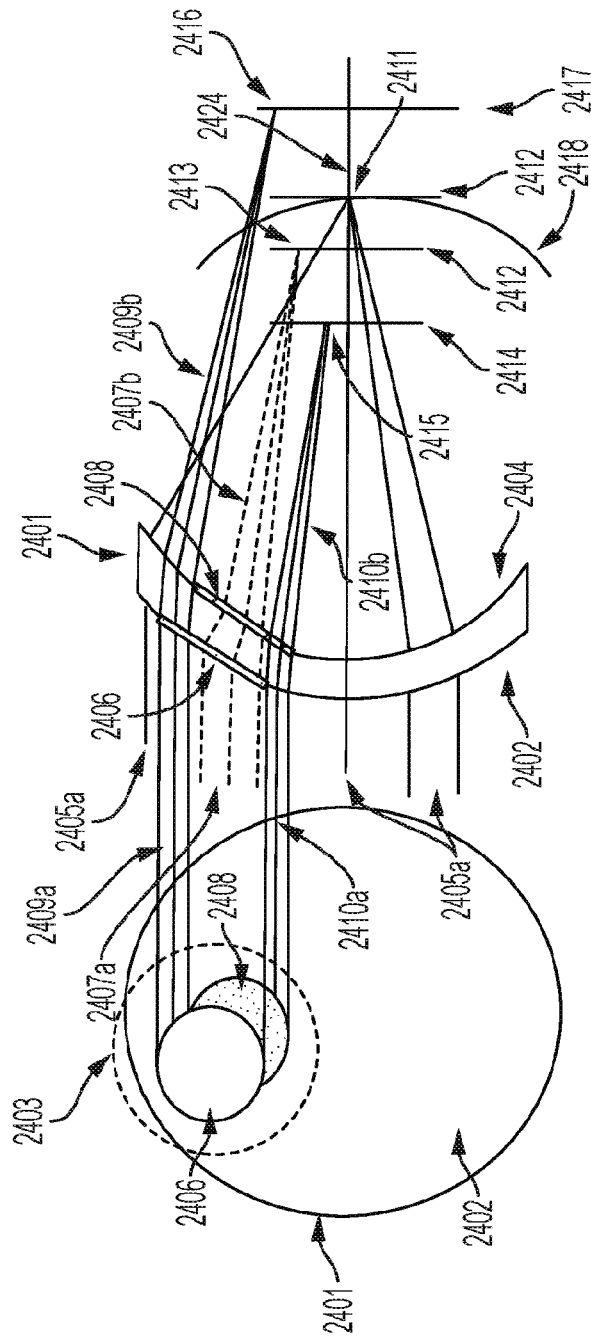
FIG. 24A, 24B, and 24C illustrate an ophthalmic lens and its exemplary rays' locations inside a simplified human eye model and on the retina, with two geometrically defined shapes and/or contour optical elements created by spatial flat surfaces on the front and back surfaces of the lens resulting in focal points and prism effect on the retina from those geometrically defined shapes and/or contour optical elements.
Figure 24B:
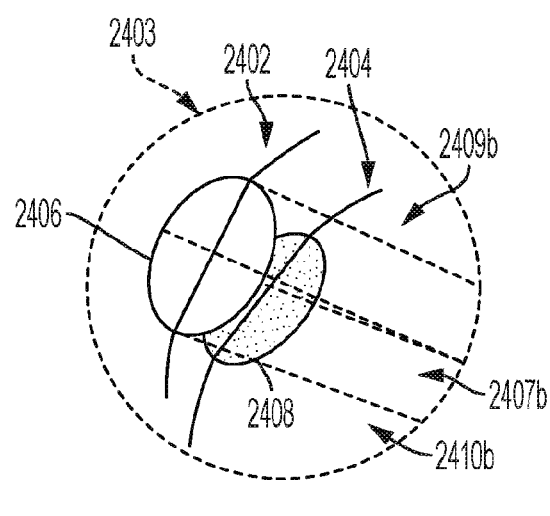
Figure 24C:
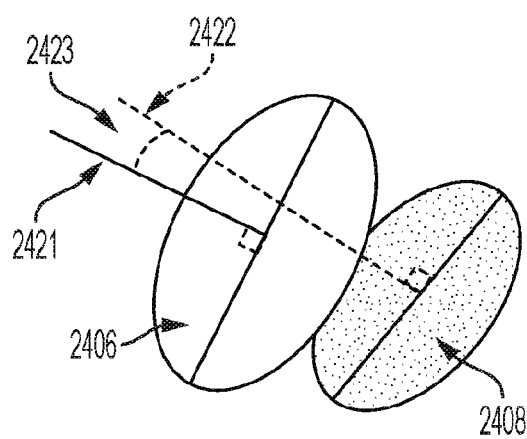

FIG. 24 illustrates a plan and cross-sectional views, of an ophthalmic lens 2401 incorporating flat plane geometrically defined shapes and/or contour optical elements 2406 and 2408 on the front and back surfaces of the lens, respectively. The geometrically defined shapes and/or contour optical elements are spatially flat surfaces and may be formed by the intersection of a flat plane surface on the lens front and back surfaces as previously disclosed herein. As shown in FIG. 24A to FIGS. 24C, the flat plane surface geometrically defined shape and/or contour optical element located on the front and back surfaces are of different dimensions, are positioned, at least in part, in alignment and may be tilted, e.g., may not be parallel, relative to each other. The illustrations in FIG. 24A include simplified ray diagrams, for example, in a simplified model eye where only light rays directed towards and emerging from the lens 2401 are illustrated without drawing the other components of the ophthalmic lens and eye optical system in existence when in use with the eye, such as a cornea, an ocular lens, a vertex distance (in the case of spectacles) and the like.

As shown in FIG. 24A the flat plane surface element 2406 located on the front surface is positioned, at least in part, in direct alignment with the flat plane surface element 2408 located on the back surface and the combination may provide no refractive power in that part of the ophthalmic lens 2401 e.g., the power profile of the geometrically defined shapes and/or contour optical elements may not refract light and the light rays 2407a may pass through both elements without refracting the light rays. FIGS. 24B and 24C show magnified windows of the flat surface geometrically defined shapes and/or contour optical elements on the front surface 2402 and back surface 2404 of the ophthalmic lens where the surface curvatures change on each surface to a part of a spatially flat plane creating the geometrically defined shape and/or contour optical element 2406 and 2408. The geometrically defined shape and/or contour optical element 2406 on the front surface 2402 may be of a different size than that of the geometrically defined shape and/or contour optical element 2408 on the back surface 2404. Furthermore, the at least one geometrically defined shape and/or contour optical element 2406 and 2408 on each surface may be of different geometrical dimensions and different optically dimensions, meaning light entering the edge of the front surface plane 2406 may not pass through the edge of the back surface plane 2408. Consequently, light passing through the front surface element 2406 is able to pass through the base lens 2401 without passing through the flat plane 2408 positioned on the back surface of the ophthalmic lens, at least for when the user is looking at distant objects in primary gaze. FIG. 24C shows the relative tilt (prism angle 2423) of the flat plane surface on the front and back surfaces as depicted by the angle of the normal to the surface vector axis (2421 and 2422, respectively) shown on both surfaces. Consequently, light rays entering the ophthalmic lens and passing through the flat planes on both surfaces that may be relatively tilted with respect to each other, although not refracted, may be deviated based on the amount (prism power) and direction (prism angle) of tilt of the respective planes. The combination of these two geometrically defined shapes and/or contour optical elements 2406 and 2408 is referred to as a "prismlet" in this disclosure. In some embodiments, prismlets may exhibit zero, plus, minus or one or more combination of powers while combined with the other optical elements of the lens and eye optical system.

FIG. 24A shows, diagrammatically, ray tracing of a number of light ray groups entering and emerging from the simplified model eye system. The lens 2401 has a −2D base power profile to correct the distance refractive error of the myopic eye and as such may refract a first group of rays 2405a travelling from a distant object parallel to the optical axis 2420 and may form an on axis focal point 2411 on the retinal image plane 2412. A second group of light rays 2407a from a distant object pass through the flat plane geometrically defined shape and/or contour optical element 2406 on the front surface and through the lens optical eye system including the flat plane geometrically defined shape and/or contour optical element 2408 located on the back surface of the lens and may form an off axis focal point 2413 in front of the retinal image plane 2412 because the flat planes may provide no refractive power (i.e. they remain collimated through the lens). The focal point may also be displaced laterally from the optical axis 2424 because the planes may be tilted with respect to each other (FIG. 24C) and as such the resulting prism power provides a light deviating configuration. A third group of light rays 2409a from a distant object pass through the flat plane geometrically defined shape and/or contour optical element 2406 located on the front surface and model eye optical system but excluding the flat plane geometrically defined shape and/or contour optical element 2408 located on the back surface and may form an off axis focal point 2416 in the image plane 2417 behind the retinal image plane 2412. A fourth group of light rays 2410a from a distant object pass may not pass through the element 2406 on the front surface and passes only through the lens optical eye system including through the flat plane geometrically defined shape and/or contour optical element 2408 located on the back surface and model eye optical system and may form an off axis focal point 2415 in the image plane 2414 in front of the retinal image plane 2412.

Figure 25A:
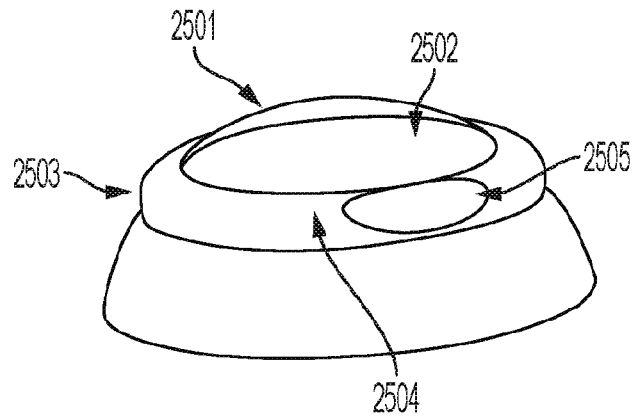
FIG. 25A, 25B, and 25C illustrate the intersection of a plane surface with an LSR ring creating a flat surface geometrically defined shapes and/or contour optical elements with an almost elliptical contour.
Figure 25B:
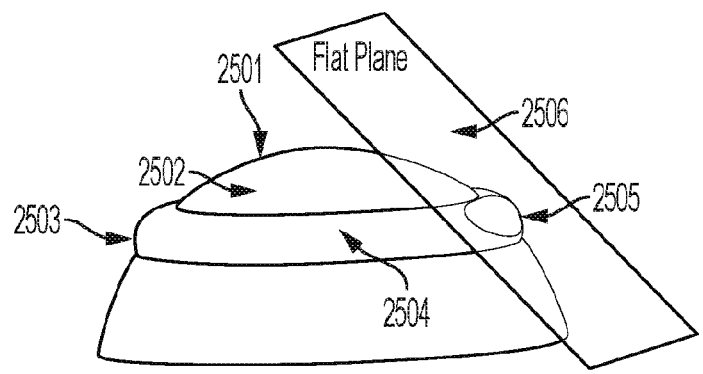
Figure 25C:
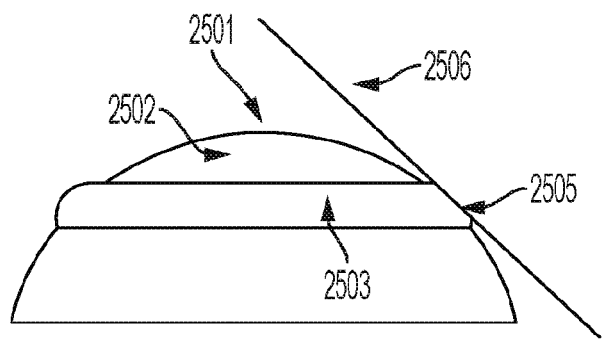

This exemplary configuration of the flat plane geometrically defined shapes and/or contour optical elements on the front and/or back surfaces of the ophthalmic lens may result in a light dispersion and/or a light deviating optical effect on the retina when in use on a wearer of the ophthalmic lens when the eyes move independently of the lens optics positioned in the spectacle plane. In some embodiments, a plurality of flat plane geometrically defined shapes and/or contour optical elements on the front and back surfaces may be incorporated onto the surfaces of an ophthalmic lens to create a plurality of independent light deviations with eye or head movements when the ophthalmic lens is, for example, a spectacle lens. In some embodiments, the light dispersion and/or a light deviating optical effect on the retina may be at least in part, all in the same direction or may not be all in the same direction. In some embodiments, the light dispersion and/or a light deviating optical effect on the retina may be random. In some embodiments, the light dispersion and/or a light deviating optical effect on the retina may be all the same amount or may be not all the same amount. In some embodiments, the light dispersion and/or a light deviating optical effect on the retina may be constant across all viewing angles or directions of gaze or retinal locations and in some embodiments the light dispersion and/or light deviating optical effect on the retina may vary with the direction of gaze or with retinal locations. Furthermore, in some embodiments, the flat plane elements may be configured to provide a light dispersion and/or light deviating optical effects that may be at least in part include a refractive portion or may not include a refractive portion. In the example lens illustrated in FIG. 24A the dimensions of the two planes on each surface may not be the same, and in this example, the front surface plane is larger than the back surface plane and the flat planes are not in direct alignment. Accordingly, a portion of both planes overlap and for light arising from a distant object the planes will have a region where light rays travel entirely through both planes and may be deviated or dispersed based on the relative tilt but may not be refracted by the lens. However, because of the different dimensions of the planes some light rays passing through the front surface plane may not pass through the back surface plane and may travel through the base lens back surface curvature and may be refracted as well as deviated based on the front plane tilt and the relative curvature of the surfaces. In some embodiments, the relative shapes, tilts, locations and dimensions of the respective planes may be configured to provide any possible configuration of overlap in a primary gaze or any eccentric gaze or head or eye movement, from where one plane completely surrounds another plane and thus encircling the light dispersion and/or light deviating optical effects with refractive (or any other optical principle or combinations thereof) from the larger dimensioned plane or to where a plane, at least in part, overlaps a portion of the other plane to provide at least in part a portion of light dispersion and or light deviating optical effects that may be free of refraction effects. In some embodiments, the planes may also be configured in primary gaze such that the 2 planes may be substantially in direct alignment and substantially the same dimensions so that all the light passing through the front plane passes through the back plane. However, in this configuration light rays, for non-primary gazes or from non-parallel light rays to the optical axis, e.g., off axis light rays, may pass through one plane but not the other due to the light ray angle and/or the thickness of the lens and may result in a light dispersing and/or a light deviating optical effect on the retina when the eye of a wearer in use moves independently of the lens optics in the spectacle plane. Consequently, light rays may be deviated and/or dispersed with or without refractive effects. The configuration and positioning of the at least one or more geometrically defined shapes and/or contour optical elements on the front and back surfaces of the ophthalmic lens 2401 may result in a light dispersion and/or a light deviating optical effect on the retina when the eye of a wearer in use moves independently of the lens optics in the spectacle plane and may be useful to differentially stimulate the different types of retinal ganglion cells, for example, the center-surround ON-OFF and OFF-ON type ganglion cells. The repeated and/or repetitive and/or constant and/or inconsistent deviation of or dispersion of light with eye movement or head movement or combinations thereof whilst in use may stop or slow adverse signaling of the receptor cells responsible for signaling eye growth in children, teenagers and young adults with progressive myopia FIG. 25 illustrates three-dimensional (FIG. 25A-B) and 2 dimensional (FIG. 25C) views of an ophthalmic lens surface incorporating an annular curved ring 2503 and a non-circular, for example, elliptical flat plane geometrically defined shape and/or contour optical element 2505 formed according to techniques previously disclosed herein. The annular curved ring 2503 may be pre-formed on the base lens. The base lens geometry of the ophthalmic lens 2501 shows a non-sphere form of an ophthalmic lens. The surface includes a single annular 2504. The flat plane geometrically defined shape and/or contour optical element 2505 may be formed by the intersection of a single flat plane 2506 with the annular curved geometrically defined shape and/or contour optical element 2503 (FIG. 25B) according to the technique previously disclosed herein in the example FIG. 20. The element 2505 formed may not be circular, for example may be elliptical, in its contour shape. In some embodiments, the configuration, for example, dimensions and/or shapes of the geometrically defined shape and/or contour optical element formed by the intersection of the plane may be dependent on the surface shape of the lens surface undergoing the modulation process.

Figure 26:
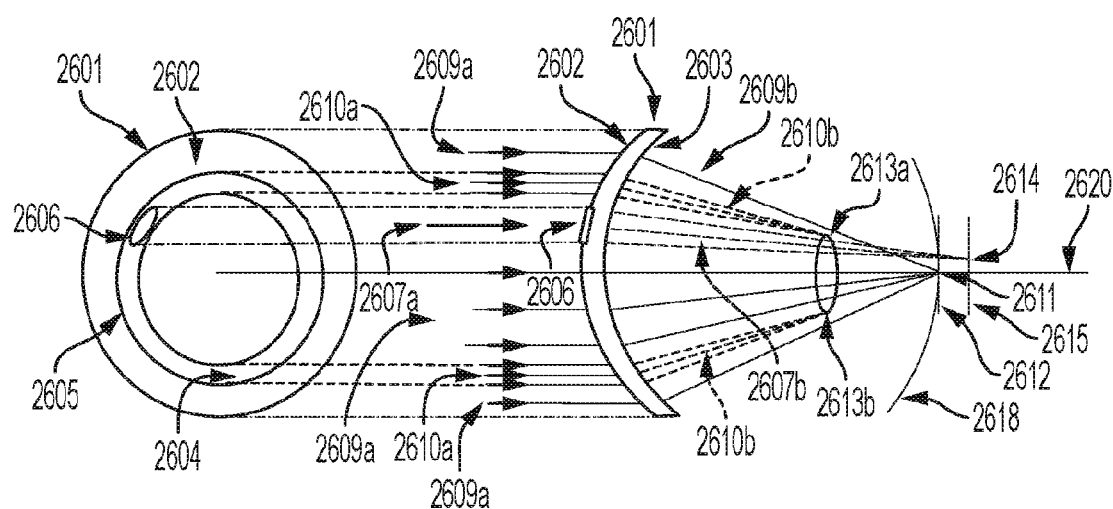
FIG. 26 illustrate an ophthalmic lens and its exemplary rays' locations inside a human eye model and on the retina, with an geometrically defined shapes and/or contour optical element created by spatial flat surfaces on the front surface of an LSR ring on the lens resulting in a formation of an optically powered minus area geometrically defined shape and/or contour optical element on the lens with an elliptical contour forming the off-axis focal point behind the retina.

FIG. 26 illustrates the ray tracing and focal points for light rays from a distant object passing through a simplified optical system including an ophthalmic lens and a model eye previously shown in FIG. 25. FIG. 26 illustrates a plan view and a cross sectional view of an ophthalmic lens 2601 having a pre-formed front surface 2602. The surface already includes optical LSR (laterally shifting ring) element 2605. Also included on the pre-formed surface geometry is one elliptically shaped flat plane geometrically defined shape and/or contour optical element 2606 formed by the intersection of a spatially flat plane surface with the annular LSR ring 2605 according to that previously disclosed herein in FIG. 20. As schematically illustrated, the ophthalmic lens 2601 when in use with the eye forms an optical system with optical properties that may form focal points and optical effects based on the optical design. For simplicity of description, the ray tracing shown in cross-section in FIG. 26 shows a simplified model eye, for example, only light rays directed towards and emerging from the lens 2601 are illustrated without drawing the other components of the ophthalmic lens and eye optical system in existence when in use with the eye, such as a cornea, an ocular lens, a vertex distance (in the case of spectacles) and the like. FIG. 26 shows, diagrammatically, ray tracing of a number of light ray groups entering and emerging from the simplified model eye system. The lens 2601 has a base power profile to correct the distance refractive error of the eye and as such may refract a first group of rays 2609*a* travelling from a distant object parallel to the optical axis 2620 and may form focal point 2611 in the retinal plane 2612. A second group of light rays 2610*a* from a distant object pass through the annular rings 2605 and may form off axis focal points 2613*a* and 2613*b* (also represented as a focal ring in 3D). A third group of light rays 2607*a* from a distant object pass through the flat plane 2606 and form a single off axis focal point 2614 at image plane 2615 behind the retinal image plane 2612.

Figure 27A:
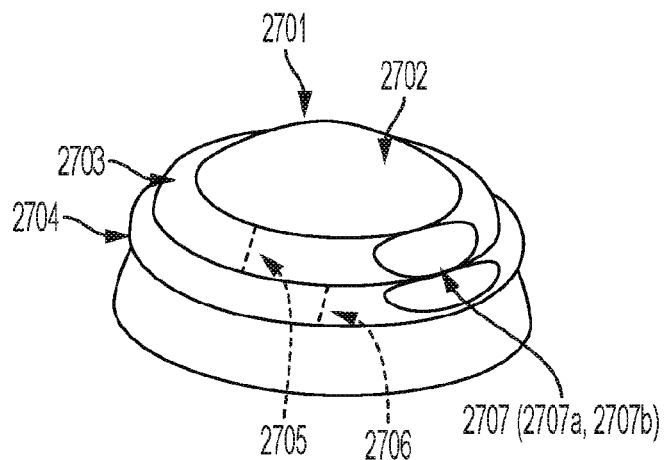
FIG. 27A, 27B, and 27C illustrate the intersection of a plane with the base geometry where the base geometry includes two LSR curves and a flat geometrically defined shapes and/or contour optical elements.
Figure 27B:
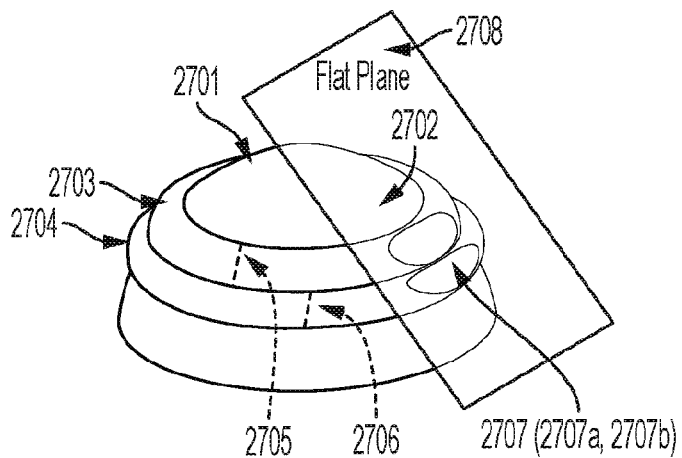
Figure 27C:
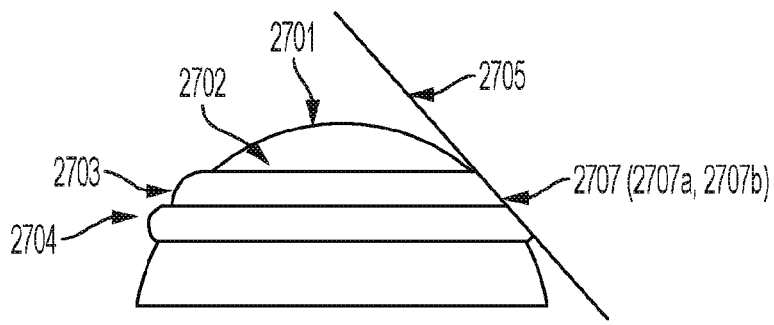

FIG. 27 illustrates three dimensional (FIG. 27A-B) and two dimensional (FIG. 27C) views of an ophthalmic lens incorporating two annular LSR rings 2703, 2704 and one flat plane geometrically defined shape and/or contour optical element 2707 according to techniques previously disclosed herein. The flat plane geometrically defined shape and/or contour optical element 2707 may be formed by the intersection of a single flat plane 2708 with the 2 annular curved LSR rings 2703, 2704 (FIG. 27B) according to the technique previously disclosed herein in the example FIG. 20. The flat plane geometrically defined shape and/or contour optical element 2707 may be formed by the intersection of a spatially flat plane surface 2708 with the two annular LSR conjoined rings 2703 and 2704 and may create a geometrically defined shape and/or contour optical element 2707 that may not be circular in shape but may be irregular or any shape.

Figure 28:
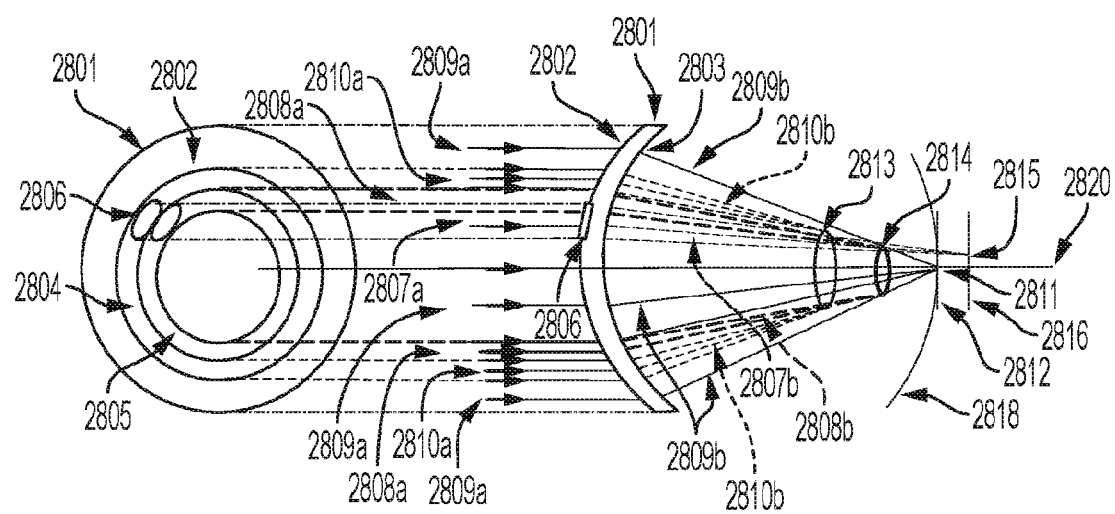
FIG. 28 illustrates the ray tracing and focal points inside a simplified model eye to show the optics of an ophthalmic system in FIG. 27.

FIG. 28 illustrates the ray tracing and focal points inside a simplified model eye for the ophthalmic lens shown in FIG. 27. FIG. 28 illustrates a plan view and a cross sectional view of an ophthalmic lens 2801. The surface has a pre-defined form with LSR rings 2804, 2805. Also included on the surface geometry are two conjoined flat plane shapes and/or contour optical elements 2806*a* and 2806*b* formed by the intersection of a spatially flat plane surface with the two annular rings 2804 and 2805 according to that previously disclosed herein in FIG. 20. As schematically illustrated, the ophthalmic lens 2801 when in use with the eye forms an optical system with optical properties that may form focal points and optical effects based on the optical design. For simplicity of description, the ray tracing shown in cross-section in FIG. 28 shows a simplified model eye, for example, only light rays directed towards and emerging from the lens 2801 are illustrated without drawing the other components of the ophthalmic lens and eye optical system in existence when in use with the eye, such as a cornea, an ocular lens, a vertex distance (in the case of spectacles) and the like. FIG. 28 shows, diagrammatically, ray tracing of a number of light ray groups entering and emerging from the simplified model eye system. The lens 2801 has a base power profile to correct the distance refractive error of the eye and as such may refract a first group of rays 2809*a* travelling from a distant object parallel to the optical axis 2820 and may form focal point 2811 on the retinal plane 2812. A second group of light rays 2808*a* and 2810*a* from LSR rings 2805, 2804 and may form off axis focal points 2814 and 2813 (also represented as focal rings in 3D) in different image planes. A third group of light rays 2807*a* from a distant object pass through the flat planes 2806*a* and 2806*b* and form a single off axis focal point 2815 at image plane 2816 behind the retinal image plane 2812. In some embodiments, the optical elements disclosed herein, may be created by the intersection of one or more spatial plane or planes. The junction of an optical element may be continuous with the base geometry, and the junction between the two, may form a shape defined by the intersection of one or more spatial planes with the base lens surface.

In some embodiments, the junction of an optical element may not necessarily be continuous and may be blended by other geometries, and the junctions may be defined by the designer, and the optical elements may still be a part of one or more spatial planes. In some embodiments, a prismlet may also be used, similar to a diffraction element, to create depth of focus when designed in a particular shape. In some embodiments, phase steps may also be used in the design of an ophthalmic lens. In some embodiments, the optical element may be designed to create an optical power profile so that in combination with an eye model, it creates parallel rays at the retina. In some embodiments, the prismlets may not form an effective focal point due to high level of dispersion inside the model eye.

Figure 29A:
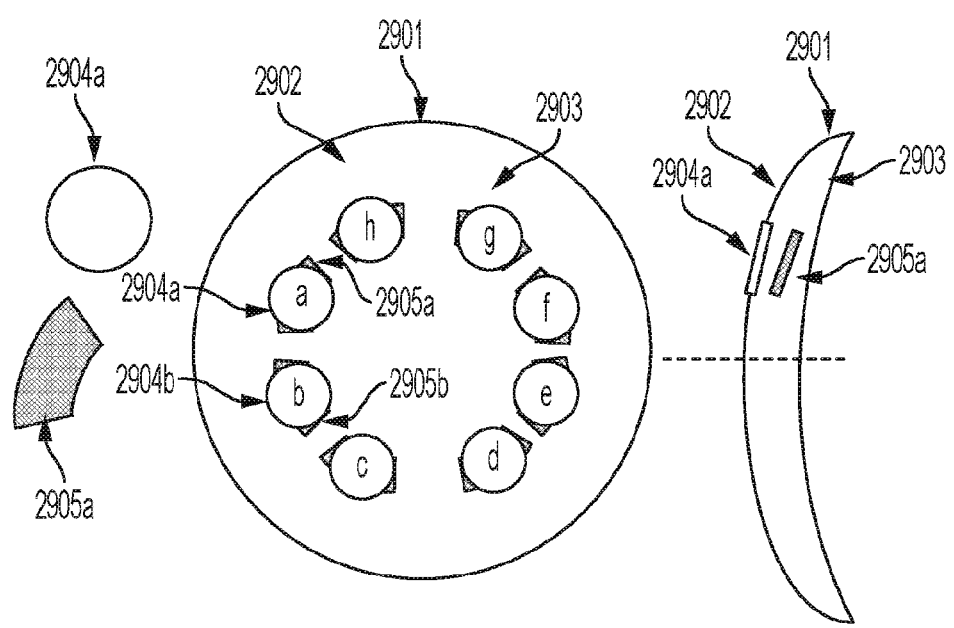
FIG. 29A illustrates plan and cross-sectional views, of an ophthalmic lens incorporating geometrically defined shapes and/or contour optical elements on the front surface of the lens and in between the front and back surfaces of the lens.
Figure 29B:
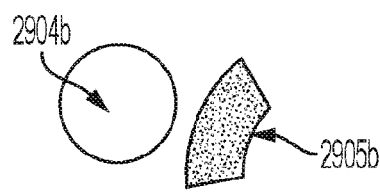
FIGS. 29B-H and FIGS. 29I-L show further embodiments of geometrically defined shapes and/or contour optical elements generating a range of optical effects.
Figure 29E:
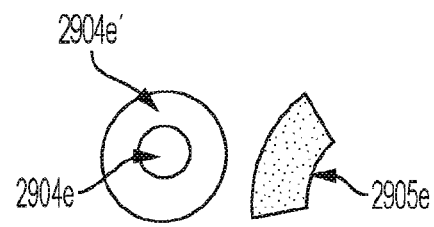
Figure 29C:
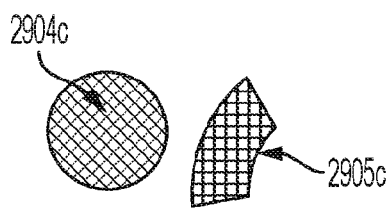
Figure 29F:
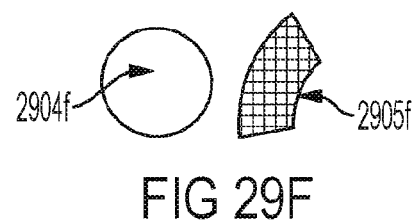
Figure 29D:
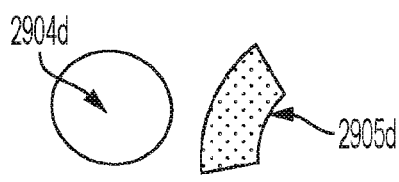
Figure 29G:
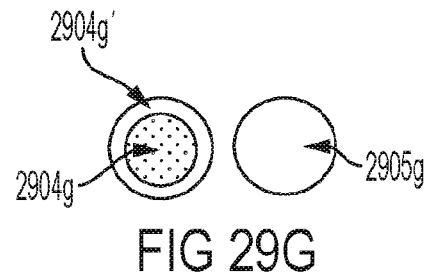
Figure 29H:
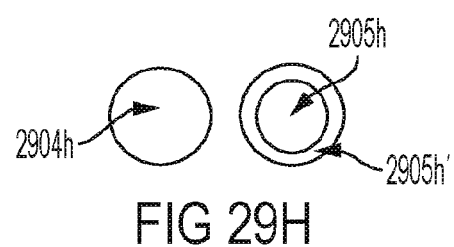

FIG. 29A illustrates plan and cross-sectional views, of an ophthalmic lens 2901 incorporating eight geometrically defined shapes and/or contour optical elements 2904a-h on the front surface of the lens and eight geometrically defined shapes and/or contour optical elements 2905a-h located in between the front and back surfaces of the lens (e.g., as shown in cross-section for elements 2904a and 2905a). The geometrically defined shapes and/or contour optical element 2904a-h may be spatially flat surfaces and/or may be formed by the intersection of a flat plane surface on the base lens front surface as previously disclosed herein and/or may be formed by using a modulating function process as detailed in e.g., FIG. 18. The geometrically defined shapes and/or contour optical elements 2905a-h positioned in the lens bulk between the lens surfaces may be generated using a non-geometrical parameter, for example, by defining a refractive index parameter N modulated using a square wave function as the "modulating function" as described herein e.g., with reference to FIG. 12. The frequency term applied to the modulating function results in a modulated section of the lens of FIG. 29 formed with eight optical elements in the lens bulk formed of the same shape, distribution and power profile (tangential and sagittal power maps) as described e.g., with reference to FIG. 12. In some embodiments, the elements may be in substantially direct alignment e.g., the front surface element may be paired with the element in the lens matrix and in some embodiments the two corresponding elements may not be in direct alignment e.g., the front surface element may not be paired with the element in the bulk of the lens and may be at least in part be spatially spaced apart or spatially overlapped, at least in part. In some embodiments some of the elements may be aligned and some of the elements may not be aligned. In some embodiments the two elements may be of different dimensions and in some embodiments the dimensions may be substantially the same. In some embodiments, the two elements may be parallel to each other and in some embodiments the elements may be tilted with respect to each other. In some embodiments, the elements may have substantially the same optical effects, for example, both may have refractive properties such as derived from curvatures, line curvatures, flat planes, refractive indexes, phase differences, and/or prisms. In some embodiments the two elements may have different optical properties such as one element e.g., the front surface element, may have refractive properties and the second element of the pair may provide a non refractive property, a light scattering property, a diffractive, and/or light transmittance amplitude property. In some embodiments, the elements may be paired and in some embodiments the two elements may be, at least in part, spaced apart and not paired. As shown in FIG. 29A, the flat plane surface elements 2904a-h located on the front surface may be positioned in substantially direct alignment e.g., paired and optically cooperate, for at least a portion of each element in, at least, a defined gaze position, for example a primary straight ahead gaze, when a wearer looks through the optical center of the lens when viewing in the far distance and with the 2905a-h elements located in the bulk of the lens matrix. Therefore, the combination of geometrically defined shapes and/or contour optical elements may provide an altered optical effect, for example a refractive power, in that region of the ophthalmic lens 2901 as the geometrically defined shapes and/or contour optical elements may refract the light passing through each element. However, as detailed in the example of FIGS. 24A-C, the flat plane elements 2904a-h and non-geometrical elements 2905a-h may be tilted relative to each other, for example, the elements may not be parallel to each other. Furthermore, the at least one geometrically defined shape and/or contour optical element, for example elements 2904a and 2905a, may be of different geometrical dimensions but optically the same dimensions, meaning light entering the very edge of the front surface plane 2904a may also pass through the very edge of the back surface plane 2905a and consequently, substantially no light passing through the front surface element 2904a may pass through the lens (in primary gaze) without passing through the second element 2905a. In some embodiments, however, when the elements may be of different dimensions optically and/or for light rays received in non-primary gaze or from non-parallel light rays entering the ophthalmic lens, the configuration and positioning of the at least one geometrically defined shape and/or contour optical element on the front, bulk and/or back surfaces of the ophthalmic lens 2901 may result in a light dispersion and/or a light deviation and/or an image size change, for example magnification or minification or distortion, or other such optical effects on the retina when the eye of a wearer in use moves independently of the lens optics of the ophthalmic lens, especially for a spectacle lens. Such a configuration may be useful to differentially stimulate different types of retinal ganglion cells, for example, the center-surround ON-OFF and OFF-ON type ganglion cells as described elsewhere herein. The repetitive and/or repeating and/or intermittent light deviation of or light dispersion of or image sizing or distorting signals, especially with eye movements, may stop or slow adverse signaling of the receptor cells responsible for signaling eye growth in children, teenagers and young adults with progressive myopia.

FIG. 29B-H show exemplary embodiments of the geometrically defined shapes and/or contour optical elements producing a range of optical effects and/or combinations of optical effects resulting from light rays passing through the combination of an at least one or more geometrically defined shapes and/or contour optical elements with an at least one or more geometrically defined shapes and/or contour optical element derived from geometric or non-geometric parameters where the optical properties of the at least one or more elements are non-homogeneous, for example, where the optical properties within the element are non-homogeneous or some embodiments where the at least one or more element combines with at least one or more other element in whole or in part as a result of a difference between any combination of one or more of the elements of shape, dimension, separation, location, alignment or tilt or optical properties or light ray deviation or light transmittance or light reflection or light scatter mismatch. In some embodiments, the elements may be formed by the modulation of geometrical parameters and/or non-geometrical parameters and/or from the intersection of shapes distributed on flat planes and/or may form geometrical or non-geometrical optical properties or any combinations thereof. Any optical principle may be used alone or in combination with the one or more geometrically defined shapes and/or contour optical elements, for example, at least one or more geometrical parameters and/or non-geometric parameters may be modulated and may result in one or more modulated optical properties within an element and/or one or more elements in an array (refractive, non-refractive, diffractive, contrast modulating, phase-modulating, light scattering, aberrated, holographic, diffusing, light deviating (prism), light amplitude modulating or any combination of one or more optical properties thereof). In some embodiments, the at least one or more modulations may be conducted sequentially or simultaneously by applying the at least one or more geometric and non-geometric parameters in the one or more modulating value ranges to the modulating function resulting in one or more optical properties included in the one or more geometrically defined shapes and/or contour optical elements that may be located in a portion or portions of an ophthalmic lens.

In certain embodiments, it may be desirable to provide an ophthalmic lens for myopia control with a higher degree of myopia control than the "average" or improve the myopia control in eyes with a lower than anticipated myopia control. Furthermore, in certain embodiments, it may be desirable to not impact on the visual quality to improve wearability of the lens. For example, in some embodiments, the increased refractive defocus or light scattering or light transmittance modulation or light deviations or other undesirable optical side effects may reduce image quality to the extent the lenses may not be worn for long periods and be rendered less effective and/or may be even myopia inducing. Therefore, it may be desirable to improve the effectiveness of treatment priority zones without adversely impacting vision and wearability of the progressing myope using the ophthalmic lenses. Thus, in certain embodiments, it may be desirable to refine or "customize" either one or more of the geometrically defined shapes and/or contour optical elements and/or the one or more treatment priority zones of the ophthalmic lens to "remodel" the optical signal delivered at the retina of the eye. Therefore, in some embodiments, one or more of the geometrically defined shapes and/or contour optical elements may be customized to deliver a remodeled optical signal at the retina of the eye. In some embodiments, the ophthalmic lens may comprise one or more vision priority zones with a power profile to primarily correct the refractive error of the eye and one or more treatment priority zones comprising one or more "customized" geometrically defined shapes and/or contour optical elements designed to remodel the optical signal at the retina of the eye to alter eye growth. In some embodiments, the one or more "customized" geometrically defined shapes and/or contour elements designed to remodel the optical signal at the retina of the eye to alter eye growth may further reduce or retard or slow or suppress or prevent eye growth compared to non-customized elements. In some embodiments, the one or more "customized" geometrically defined shapes and/or contour elements designed to remodel the optical signal at the retina of the eye to alter eye growth may enhance or stimulate or progress eye growth. In some embodiments, the one or more geometrically defined shapes and/or contour optical elements may be customized by incorporation of a refractive, non-refractive, diffractive, contrast modulating, phase-modulating, light scattering, aberrated, holographic, diffusing, light deviating (prism), light amplitude modulating feature and/or any combination of features thereof. In some embodiments, the one or more geometrically defined shapes and/or contour optical elements may be customized by incorporation of a refractive, non-refractive, diffractive, contrast modulating, phase-modulating, light scattering, aberrated, holographic, diffusing, light deviating (prism), light amplitude modulating feature and/or any combination of features either within or surrounding or encircling or incorporating in part of or circumscribing part of or on the surface of or a combination thereof of the geometrically defined shapes and/or contour optical elements. In certain embodiments, the ophthalmic lens may comprise one or more "customized" geometrically defined shapes and/or contour elements that may remodulate the defocus such that one or more focal points at the retina may be in myopic defocus or hyperopic defocus or both. In certain other embodiments, the one or more "customized" geometrically defined shapes and/or contour elements in the one or more treatment priority zone(s) may remodel the retinal image quality. In some embodiments, the ophthalmic lenses, such as spectacle lenses or contact lenses may comprise one or more treatment priority zone(s) comprising one or more "customized" geometrically defined shapes and/or contour optical elements that may be in the form of lenslets or rings or shapes or areas of the treatment zones. In some other embodiments, the ophthalmic lenses, such as spectacle lenses or contact lenses may comprise one or treatment priority zone(s) comprising one or more "customized" geometrically defined shapes and/or contour optical elements that may be in the form of light scattering elements and/or light amplitude modulating elements arranged in arrays or masks and designed to provide a conflicting optical signal, for example a different optical signal, to that provided by a non-customized geometrically defined shape and/or contour optical element at the retina of the eye to alter or modify or control contrast and/or alter or modify or control the detection of contrast and/or myopia inducing optical signals and/or myopia controlling optical signals by the retinal receptors. In some other embodiments, the ophthalmic lenses, such as spectacle lenses or contact lenses may comprise one or more treatment priority zone(s) comprising one or more "customized" geometrically defined shapes and/or contour optical elements that may be in the form of light scattering elements and/or light amplitude modulating elements arranged in arrays or masks and designed to provide a remodeled optical signal at the retina of the eye to alter or modify or introduce scatter and/or a light transmittance modulation. In some embodiments, the ophthalmic lens may comprise one or more vision priority zones with a power profile to primarily correct the refractive error of the myopic eye and one or more treatment priority zones that comprise one or more "customized" geometrically defined shapes and/or contour optical elements designed to introduce a remodeled optical signal at the retina of the eye to alter eye growth. In some embodiments a remodeled optical signal is delivered at the retina by "customizing" the one or geometrically defined shape and/or contour optical element with a higher power profile or a more aberrated power profiles. In certain other embodiments, a remodeled optical signal is delivered at the retina by altering or increasing the density of the "customized" geometrically defined elements per unit area. In certain other embodiments, a remodeled optical signal is delivered at the retina by altering or increasing or decreasing the number of "customized" to "non customized" geometrically defined elements per unit area. In some embodiments, a remodeled optical signal is delivered at the retina by "customizing" the one or refactive based geometrically defined shape and/or contour optical elements with a light scattering region surrounding the element and/or a light amplitude modulating region surrounding the element. In some embodiments, the customizing feature may be distributed within at least a portion of the treatment priority zone and/or within at least a portion of an element and/or be distributed in at least a portion of the vision priority zone.

In certain other embodiments, the ophthalmic lens may comprise one or more vision priority zones and one or more treatment priority zones comprising one or more geometrically defined shapes and/or contour optical elements wherein the one or more vision priority zones and/or one or more of the treatment priority zones are "customized" to deliver a remodeled optical signal at the retina of the eye. In certain embodiments, the remodeled optical signal is enhanced or altered or modulated or changed or varied or strengthened compared to the optical signal delivered by the ophthalmic lens wherein the one or more vision priority zones or one or more of the treatment priority zones and/or the one or more geometrically defined shapes and/or contour optical elements are not customized. In some embodiments, the ophthalmic lens with one or more "customized" treatment priority zones may incorporate one or more features that are located or positioned, in or around or adjacent or conjoined or proximal to or distal to or spaced apart or overlapping or overlying or underlying, or interspersed amongst or around the one or more geometrically defined shape and/or contour optical elements to remodel the optical signal at the retina of the eye without significantly compromising wearability. In some embodiments, the features may be included in a vision priority zone or a treatment priority zone and/or may be associated with any geometrically defined shapes and/or contour optical elements designed to provide a conflicting optical signal at the retina of the eye and may selectively remodel the optical signals reaching the retinal image plane, for example the retinal image quality and/or a modulation transfer function and/or an image contrast and/or a retinal illumination and/or a uniformity or an evenness across the image of the optical signal reaching the retinal image plane. In some embodiments, the one or more "customized" treatment priority zone or vision priority zone may be designed, to work more effectively, by contributing the remodeled optical signals during natural eye movements such as microsaccades and/or other larger eye movements. In some embodiments, the remodeled optical signal may enhance the suppression e.g. reduce the detection or further reduce the image quality of myopia growth stimulating images by the retinal receptors and/or may enhance the detection or improve the image quality of myopia controlling images by the retinal receptors over and above that provided by unmodelled optical signal. In some embodiments, the remodeled optical signals may be designed to differentially target one or more regions of the retina that may have different sensitivities to such optical signals, for example more central areas within 5 degrees around the macula or parafoveal or mid-peripheral areas between 5 and 15 degrees or the peripheral retina >15 degrees from the macula. In some embodiments, any regional direction may be targeted because retinal sensitivities to optical signals may vary regionally in the retina, for example, a horizontal and/or a vertical and/or angular directions may be targeted and by different degrees of alteration of the optical signals. Thus the effectiveness of ophthalmic lenses for myopia control may be improved by customizing one or more of the vision priority zones and/or the treatment priority zones and/or the one or more geometrically defined shapes and/or contour optical elements without substantially changing or altering or increasing the strength or the fill factors of the treatment priority zones and without further compromising the image quality of the vision and/or treatment priority zones, including for example, image quality, dynamic vision quality with head and/or eye movements and wearability.

In some embodiments, the vision priority zones and/or treatment priority zones may provide a remodeled optical signal to the retina of an eye. In some embodiments, the one or more geometrically defined shapes and/or contour optical elements forming an exemplary array in a treatment priority zone may be customized by surrounding the one or more geometrically defined shapes and/or contour optical element with an annular region(s), wherein at least in part, the annular region(s) may provide a remodeled optical signal such as a modified or varied contrast optical signal compared to either the non-customized vision priority zone and/or the geometrically defined shape and/or contour optical element. The altered or conflicting optical signal may, for example, target the retinal receptors in the parafoveal region of the eye from 5 to about 15 degrees from the fovea, and may alter the retinal contrast detection e.g. make images less detectable, by about 20% or more, about 40% or more, about 50% or more or about 75% or more or about 100% or more compared to a geometrically defined shape and/or optical contour element that is not surrounded by the altered vision priority region(s). In some embodiments, the remodeled optical signal may be rotationally symmetric and in other embodiments may be rotationally asymmetric, and may be horizontally oriented and/or vertically oriented and/or angularly oriented or any combinations thereof. In some embodiments, the ratio of the area of the lens customized and contributing a remodelled optical signal may be about 10% of the area of the at least one or more elements or about 30% or more or about 50% or more or about 100% or more than the area of the associated elements. In some embodiments, the optical signal customized and that may be altered may be a spatial frequency and/or an image contrast and may be a low spatial frequency (<5 cycles/degree or a medium spatial frequency (5-10 cycles/degree) or a high spatial frequency (>10 cycles/degree). In some embodiments, the contrast may be altered by about 10% or more or 25% or more or about 50% or more or about 100% or more than the contrast of the associated element and/or the vision priority zone. In some embodiments, the "customized" vision priority zone may include surrounding a geometrically defined shape and/or contour optical element with an annular region that resulted in a remodeled optical signal. In certain embodiments, the annular region may incorporate a contrast reducing feature that remodels the contrast of the retinal image by about 20%. In some embodiments, the optical signal provided to the retinal receptors by the element in the treatment zone may be reduced by 50% or more when the annular region of the vision priority zone surrounding the element in the treatment zone has a width that projects about 3 degrees on the parafoveal retina and provides a retinal image contrast of about double to around 40% in a lower spatial frequency range. In some embodiments, the "customized" vision priority zone surrounding the geometrically defined shape and/or contour optical element may be formed by altering surface roughness or by forming light scattering features or any other contrast reducing optical design. Therefore, the effectiveness of geometrically defined shapes and/or contour optical elements forming treatment priority zones incorporated into ophthalmic lenses for myopia control may be improved without altering the treatment priority or the vision priority zones, respectively. Thus, more effective myopia control may be achieved without an increase in visual disturbances that may impact wearability. For example, the ophthalmic lenses described herein may comprise a "customized" feature in one or more of the vision priority zones and/or in a portion of a geometrically defined shape and/or contour optical element located on a lens that provides a remodeled optical signal at the retina of the eye to alter or slow axial elongation and therefore myopia progression. The remodeled optical signals result in in alteration or change or enhancement or reduction of one or more of properties of light such as defocus or light scattering or light deviation or light transmittance or any other optical property at one or more regions the retina of the eye and may be delivered by modulating one or more geometrical parameters and/or non-geometric parameters incorporating one or more of refractive, non-refractive, diffractive, contrast modulating, phase-modulating, light scattering, aberrated, holographic, diffusing, light deviating (prism), light amplitude modulating or a combination of one or more elements thereof.

Figure 29I:
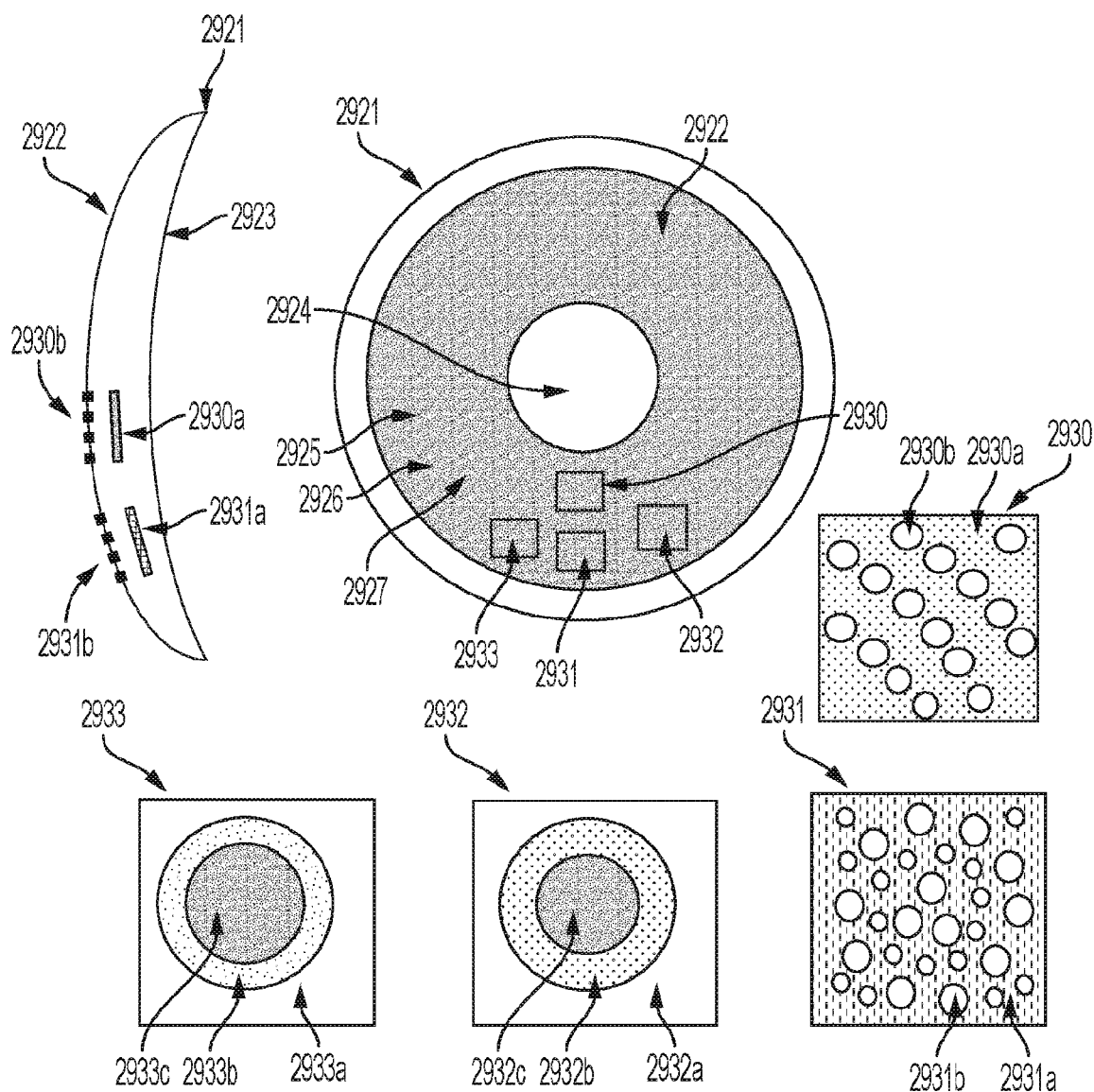

FIG. 29I illustrates a cross section and plan views of an ophthalmic lens, a spectacle lens 2921, comprising a central vision priority zone 2924 and a peripheral zone 2925 incorporating peripheral vision priority zones 2926 and a plurality of peripheral treatment priority zones 2927. The central vision priority zone 2924 and peripheral vision priority zones 2926 contain a base power profile to correct e.g., the 2D myopic refraction of the young progressive myope. Windows 2930, 2931, 2932 and 2933 illustrate magnified details of the optical configurations of the peripheral vision priority zone 2926 and peripheral treatment priority zones 2927 distributed through the peripheral zone 2925 for four exemplary embodiments of the spectacle lens 2921. Each of the four embodiments shown in 2930-2933 show the treatment priority zones may be formed by at least one of a geometrically defined shape and/or contour optical element formed on the front surface 2922 of the ophthalmic lens and may have a relatively more positive power profile than the vision priority zones by about +3D. In some embodiments, the elements may be formed by molding e.g., cast or injection molding or by printing e.g. inkjet printing or 3D printing of a polymer and may involve a curing step. In the exemplary configuration of FIG. 29I, the peripheral vision priority zone 2926 surrounds, at least in part, each geometrically defined shapes and/or contour optical elements. Thus, the peripheral zone 2927 may be covered by the plurality of treatment priority zones e.g., the geometrically defined shapes and/or contour optical elements, may be deemed to have a fill factor ratio, e.g., the proportion of the peripheral zone covered by the elements, of 40% in the case of the embodiment configured according to window 2930, by the geometrically defined shapes and/or contour optical elements 2930b and 60% by the peripheral vision priority zone 2930a incorporating the base power profile. Accordingly, the presence of defocused focal points and/or change in retinal image quality and/or the changed optical signals to the retinal receptors of the wearer corresponding to the field of vision, whilst using the spectacle lens, may be altered by an amount related to the fill factor and thus a myopia control signal may be detected by the retinal receptors and myopia may be controlled. Therefore, a myopia control signal to the retina may be altered, for example, by changing the fill factor e.g., increasing the signal by changing the fill from 40% to 45% or more or 50% or more by increasing the number of geometrically defined shapes and/or contour optical elements for a given area or by increasing the dimension or reducing the spacing between, for example, increasing the diameter of the geometrically defined shapes and/or contour optical elements within the given area and/or increasing the power profile of the elements themselves. In some embodiments, the diameter of the one or more elements 2930b may be increased by 0.1 mm or more or by 0.2 mm or more or by 0.5 mm or more to achieve a desired increase in fill factor ratio to increase the myopia control signal or the elements power profile may be increased by +0.5D or more or by +1D or more or the rate of change of power across the elements may be increased more than the original power profile or the spacing between the elements reduced by 0.2 mm or more or by 0.3 mm or more. In all these approaches the increased area and/or strength of the treatment priority zones in the peripheral zone 2925 may be achieved but at the expense of the vision priority zone 2926 image quality surrounding the geometrically defined shapes and/or contour optical elements and may result in increased undesirable effects on vision and wearability and compliance to wearing the ophthalmic lens.

In some embodiments, ophthalmic lenses disclosed herein may enable the plurality of geometrically defined shapes and/or contour optical elements positioned within the treatment priority zones to be customized and more effectively treat and control the myopia progression by increasing the effectiveness of the optical signals produced by the ophthalmic lens and received by the retinal receptors without adversely effecting vision and wearability and compliance. The increased effectiveness of the treatment priority zones and/or the geometrically defined shapes and/or contour optical elements positioned within the treatment priority zones may be delivered without substantively or excessively increasing the fill factor to the same extent and/or without increasing the strength and/or rate of power change across of each geometrically defined shapes and/or contour optical elements and thus maintaining the vision quality and wearability and compliance with lens wear. In some embodiments, the effectiveness of the customized geometrically defined shapes and/or contour optical elements within a peripheral treatment priority zones in changing the myopia control optical signals reaching the retina may be enhanced by altering the peripheral vision priority zones surrounding, at least in part, the treatment priority zones and/or surrounding the geometrically defined shapes and/or contour optical elements. In some embodiments, the effectiveness of the plurality of peripheral treatment priority zones in changing the myopia control optical signals reaching the retina may be enhanced by altering a portion of one or more of the geometrically defined shapes and/or contour optical elements positioned within the treatment priority zones or treatment priority zone arrays. In some embodiments, the myopia control optical signals reaching the retina may be an image contrast and/or an image contrast profile and/or an image deviation and/or light amplitude. For example, windows 2930-2933 show several examples of enhanced peripheral vision priority zones that customize the geometrically defined shapes and/or contour optical elements used for treatment of myopia control. Windows 2930 and 2931 illustrate the presence of small light scattering elements (2930a) and larger light scattering elements (2931a) that may introduce an appropriate amount of light scattering, for example as straylight to not substantially alter the image quality focused on the retina for myopic vision correction but which may substantially modify the retinal receptor signals promoting axial elongation from one or more of the plurality of the geometrically defined shapes and/or contour optical elements making up the treatment priority zones 2930b, 2931b respectively. In some embodiments, as drawn in cross section in FIG. 29I, the small light scattering features 2930a and larger light scattering features 2931 may be located on one or both surfaces or within the bulk of the ophthalmic lens in between both surfaces or formed as part of the lens coating process or incorporated as particles in the lens coating material or layered underneath a lens coating and may be of any suitable size, shape and/or dimension to achieve the desired arrangement and effect. The light scattering elements may be formed by, for example, the use of a laser, for example a femtosecond laser or a $CO_2$ laser, to create a change in material property e.g., a light transmittance and/or a refractive index and/or a light scattering. In some embodiments, the elements may be formed by a molding process or by a stamping or an embossing or printing e.g. inkjet printing or 3D printing of a polymer and may involve a curing step or a drying or evaporative step or may be formed by a surface roughing or material removal process including by a microblasting process. In other embodiments, a film or a layer providing the optical property (s) may be incorporated onto or into the lens material. The light scattering elements in 2930a and 2931a may be substantially evenly distributed in the vision priority zones surrounding the shapes and/or elements thereby customizing the elements and providing a remodeled optical signal to the retinal receptors that may enhance the effectiveness of the treatment priority zone(s). In some embodiments, the distribution of light scattering elements may be located on one or both surfaces and/or in between the surfaces or any combination thereof. In some embodiments, the features may not be evenly distributed but rather randomly distributed. In some embodiments, the features may be distributed in a pattern or an array.

Figure 29J:
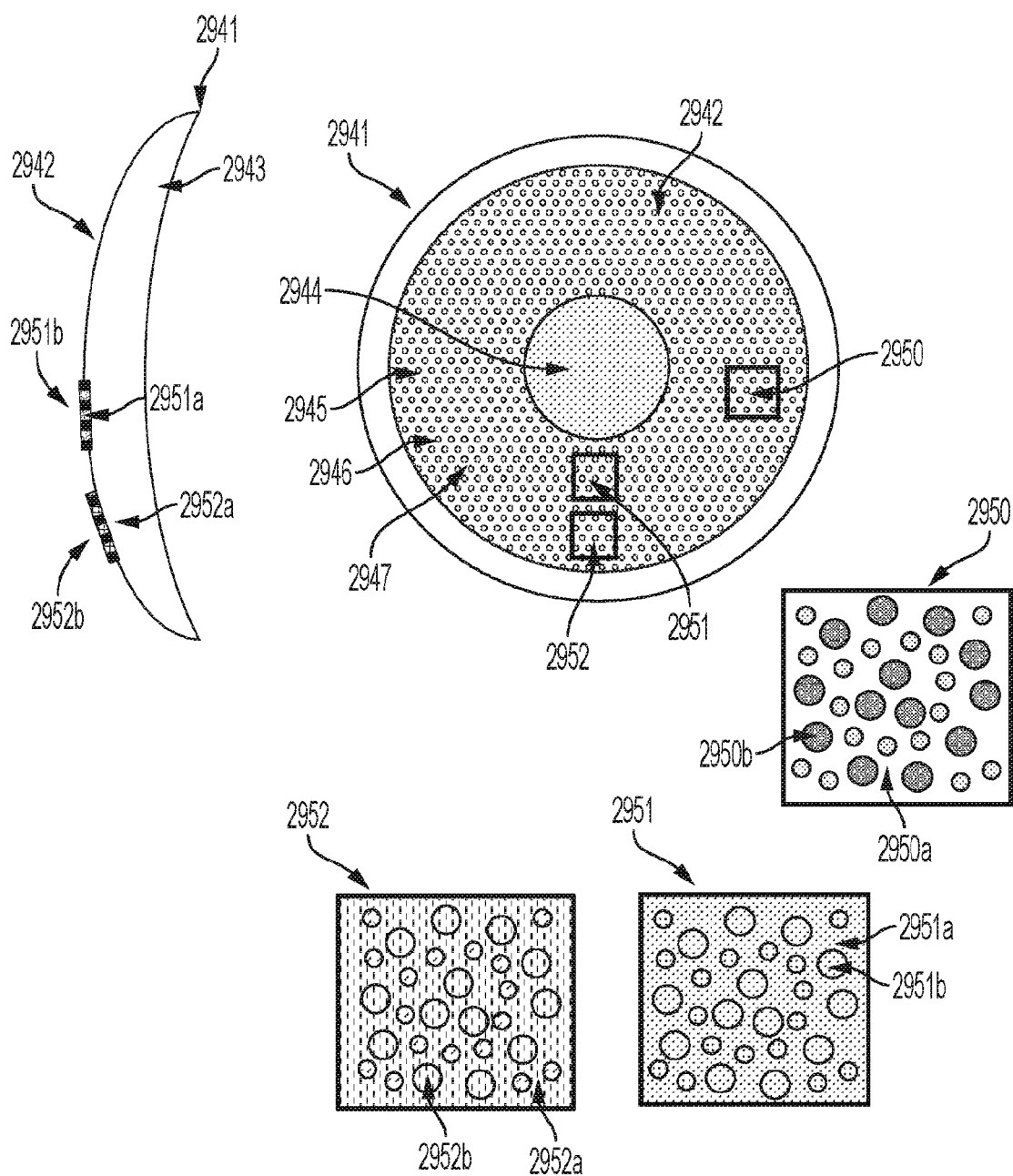

In some embodiments as drawn in FIG. 29J the plurality of geometrically defined shapes and/or contour optical elements may be distributed across the central zone 2944 and peripheral zone 2945 on the front surface of the ophthalmic lens and the light scattering features may also be distributed across both peripheral vision priority zone 2946 and peripheral treatment priority zones 2947 on a front surface (2951a and 2952a) or wholly within the plurality of shapes/elements of the treatment priority zones (2950b). In some embodiments, the light scattering elements may be integral to the element itself or may act as or may form the geometrically defined shapes and/or contour optical elements. In some embodiments, the treatment priority zones may be on the same surface as the vision priority enhancement zones or different surfaces or between the surfaces or any combinations thereof. In some embodiments, the vision priority zone may have the enhanced optical features distributed in a more localized or concentrated arrangement around the treatment priority zone(s). For example, FIG. 29I illustrates magnified view windows 2932 and 2933 of a single geometrically defined shape and/or contour optical element similar to that illustrated in windows 2930 or 2931. The element 2932c has a power profile of +3D more positive power than the −2D power of the peripheral vision priority zone 2932a used to correct the myopic refractive error of the progressive myope. In some embodiments, the power profile of one or more or all of the elements may be more negative than the base power. Surrounding the element 2932c is a portion of the peripheral vision priority zone 2932b, also having a power profile of −2D to correct the myopic refractive error, and also incorporating light scattering features according to that shown in 2930 or 2931. The enhanced peripheral vision priority zone 2932b may incorporate a more concentrated distribution of light scattering features immediately surrounding, at least a portion, of the single treatment element 2932c than may exist in the other areas of the peripheral vision priority zones 2932a (no optical design features) and 2932b. The optical features 2932b may be configured to provide a controlled change in image quality, for example a reduced image contrast and/or reduced image contrast and/or a non uniform image contrast for different spatial frequencies e.g. lower spatial frequencies, compared to the other areas of the peripheral vision priority zone and compared to the image quality of an element in a treatment priority zone. In some embodiments, the enhanced portions of the vision priority zones and/or enhanced and/or customised treatment priority zones or customized elements within the treatment priority zones or arrays may provide a remodeled optical signal to the retinal receptors and may alter an image quality or an image contrast detection or an image suppression and/or an image deviation and/or a transient image deviation and/or light amplitude when in use with the user of the ophthalmic lens.

The enhanced portion of the peripheral vision priority zone surrounding one or more of the plurality of customized elements that may form one or more treatment priority zones may incorporate an optical design that may alter the contrast (e.g., slightly alter the contrast and provide a conflicting optical signal and/or a remodeled optical signal) from the vision priority zone. In some embodiments, the enhanced portion of the peripheral vision priority zone may surround the geometrically defined shape and/or contour optical element and may have a width subtending about 1 degree or more or about 3 degrees or more or about 5 degrees or more or may be more than 8 degrees or may be 10 degrees and higher and may have a contrast or an average contrast of about 10% or more or 30% or more or 50% or more and with a low or a medium or a high spatial frequency Both the width of the, at least in part, annulus and image quality, for example image contrast, formed by light passing through the annulus may be different to and conflict with the image quality, for example, image contrast and/or spatial frequency of the treatment priority zones and may occupy a portion of the vision priority zones, for example, <50% or <30% or <15% or <10% or less than 5% and effectively may have a clinically insignificant impact on the base power and/or the refractive error correction and/or the vision derived from the vision priority zones because the relatively small dimensions of the portion selected relative to the size of the remaining vision priority zones. However, the presence of the enhanced portion of the peripheral vision priority zone as described may substantially increase the effectiveness of the myopia control optical signals reaching the retina from the treatment priority zones without actually altering the treatment priority zones and increasing any adverse effects on the vision and wearability provided to the user of the ophthalmic lens. For example, when the width of the enhanced vision priority zone is an annulus surrounding a treatment priority zone and subtends about 3 degrees and a contrast of about 50% the treatment priority zone element further reduces image quality by more than 30% and may be more than 50% or may be more than 100% or more. In some embodiments, a portion of the treatment zone e.g., a geometrically defined shape and/or contour optical element may incorporate an optical feature as described herein to enhance the effectiveness of the element for delivering myopia control optical signals to the retina. Consequently, the ophthalmic lens may have treatment priority zones that may be more powerful, for example, increase image contrast loss and/or decrease retinal receptor detection of myopia inducing optical signals and/or increase the retinal receptor of myopia controlling optical signals without adversely affecting the wearability or vision of the spectacle lens.

In some embodiments the region 2932b may reduce the contrast compared to other regions of the vision priority zones by about 10% or more or by about 20% or more or by about 50% or more. In some embodiments, the low, medium and/or high spatial frequencies of the light passing through the enhanced vision priority zone 2932b may be reduced by about 10% or more or by about 20% or more or by about 50% or more. In some embodiments, the light scattering features in region 2932b surrounding a portion of the at least one geometrically defined shape and/or contour optical element in the peripheral treatment priority zone 2932c may be replaced by a higher order aberration power profile, for example, a spherical aberration power profile as shown in window 2933 as enhanced peripheral vision priority zone 2933b. In some embodiments, any other optical principle may be applied to at least a portion of the central or peripheral vision priority zone(s) and/or any portion of the treatment priority zones or any geometrically defined shapes and/or contour optical elements in order to enhance the effectiveness of the at least one or more central and/or peripheral treatment priority zones. For example, other optical principles may include refractive, non-refractive, diffractive, contrast modulating, phase-modulating, light scattering, aberrated, holographic, diffusing, light deviating (prism), light amplitude modulating or a combination of one or more optical properties thereof.

Figure 29K:
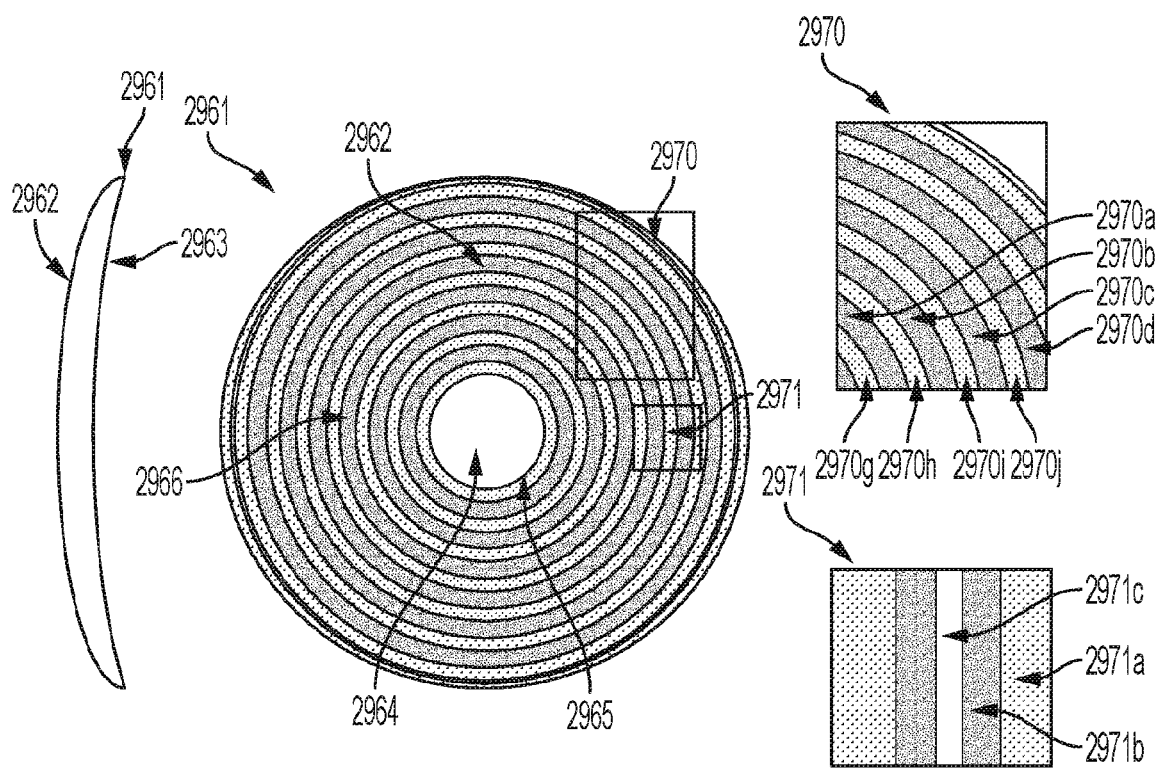

In some embodiments, for example, the spectacle lens of FIG. 29K has a central vision priority zone 2964 containing a base power of –3D for correcting the myopic refraction of the child and a plurality of annular peripheral vision priority zones 2965, also of –3D power profile, and a plurality of annular peripheral treatment priority zones 2966 formed by a plurality of geometrically defined shapes and/or contour optical elements with a relatively more positive power than the vision priority zone of +2.5D. In this configuration, the plurality of annular geometrically defined shapes and/or contour optical elements of the peripheral vision priority zones (for example 2970a-d as illustrated in magnified window 2970) of the spectacle lens alternate between the annular treatment priority zones (for example 2970g-j as illustrated in magnified window 2970). The peripheral vision priority zones 2970a-d may be enhanced vision priority zones and may incorporate optical design features as disclosed herein that may change the effectiveness of the treatment priority zones 2970g-j in changing retinal image quality and/or the retinal receptor detection of myopia inducing or myopia controlling optical signals and thereby improving myopia control effectiveness of the ophthalmic lens 2961 compared to that without the enhanced vision priority zones and without imparting a significant impact on the vision through the vision priority zones. In some embodiments, the entire annular peripheral vision priority zone 2966 may be enhanced with the optical design features. In some embodiments, for example, as detailed in magnified window 2971 the annular peripheral treatment priority zone 2971c may be, at least in part, conjoined with a portion of an enhanced vision priority zone 2971b while the remaining portion of the vision priority zone 2971a may not be enhanced by the optical design features shown in 2971b or alternatively, in some embodiments, 2971a may not incorporate any enhanced optical design features. In some embodiments, the vision priority zone may enhance the performance of the treatment priority zones by introducing an aberration such as a higher order aberration or a progressive power profile or an aberrated power profile or other optical design that may be formed over an entire zone surrounding the treatment priority zones or be localized to areas surrounding or surrounding and conjoined with the treatment priority zones and thereby enhancing the myopia controlling optical signals reaching the retinal receptors from the ophthalmic lens including the treatment priority zones. In some embodiments, the enhancement region of the vision priority zone(s) may be evenly distributed or concentrated or may be exclusively in the vision priority zones or may be exclusively in the treatment priority zone or may be at least a portion of both zones or in at least a portion of the one or more geometrically defined shapes and/or contour optical elements.

Figure 29L:
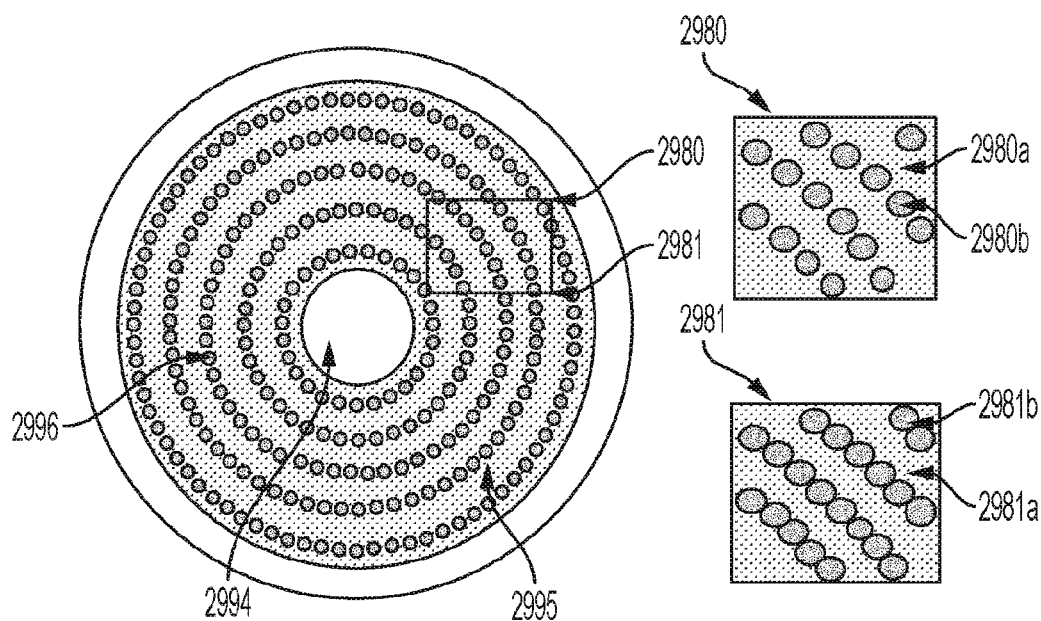

In some embodiments as illustrated in FIG. 29L the enhanced peripheral vision priority zones 2995 (2980a, 2981a) may have optical design features distributed across the peripheral zone 2996 and surround, at least a portion of the round geometrically defined shapes and/or contour optical elements 2996 (2980b, 2981b) that are lens-like and arranged in a regular pattern or array, for example, as shown in an annular and concentric ring arrangement either separated (2980) or conjoined (2981). As can be noted in the drawing, any arrangements and dimensions of the geometrically defined shapes and/or contour optical elements may be possible as disclosed herein. Alternate embodiments may introduce the optical changes to the vision priority zones adjacent or surrounding the treatment priority zones including filters or refractive index changes or additive materials or coatings or treatments or films or photolithographic changes. The changes may also be surface geometry changes or optical changes only or combinations thereof. In some embodiments, either or both surfaces may be changed including areas directly underneath the treatment zones.

Further advantages of the claimed subject matter will become apparent from the following examples describing certain embodiments of the claimed subject matter. In certain embodiments, one or more than one (including for instance all) of the following further embodiments may comprise each of the other embodiments or parts thereof.

A Examples

A1. An ophthalmic lens comprising: a front surface; a back surface; and one or more geometrically defined shapes and/or contour optical elements formed on one or more surfaces of the ophthalmic lens; wherein the one or more geometrically defined shape and/or contour elements on the surface of the ophthalmic lens is/are formed by applying one or more modulating functions to one or more parameters of the ophthalmic lens; wherein the one or more geometrically defined shape and/or contour elements is formed in a predefined region (e.g., anywhere on the front and/or back surface of the ophthalmic lens) of the ophthalmic lens and in a predefined direction (e.g., a ring shape, a spiral shape, and/or a non-annular shape).

A2. The ophthalmic lens of any of the A examples, wherein the ophthalmic lens comprises a plurality of geometrically defined shapes and/or contour optical elements.

A3. The ophthalmic lens of any of the D examples, wherein the one or more geometrically defined shapes and/or contour optical elements comprises a power profile that varies in the predefined direction and/or a direction perpendicular to the predefined direction.

A4. The ophthalmic lens of any of the A examples, wherein the one or more geometrically defined shapes and/or contour optical elements comprises a power profile that decreases at the edges in the predefined direction.

A5. The ophthalmic lens of any of the A examples, wherein the one or more geometrically defined shapes and/or contour optical elements comprises a power profile that decreases in a direction perpendicular to the predefined direction.

A6. The ophthalmic lens of any of the A examples, wherein the size of the geometrically defined shapes and/or contour optical elements increases, decreases, and/or remains the same in a direction extending radially from a center of the ophthalmic lens.

A7. The ophthalmic lens of any of the A examples, wherein the modulation of a geometric parameter is applied to the front and/or back surface of the ophthalmic lens to create one or more depressions on the front and/or back surface of the lens corresponding to the one or more geometrically defined shapes and/or contour optical elements.

A8. The ophthalmic lens of any of the A examples, wherein the modulation of a geometric parameter is applied to the front and/or back surface of the ophthalmic lens to create one or more elevation on the front and/or backsurface of the lens corresponding to the one or more geometrically defined shapes and/or contour optical elements.

A9. The ophthalmic lens of any of the A examples, wherein the one or more geometrically defined shapes and/or contour optical elements are configured to correct, slow, reduce, and/or control the progression of an optical disorder (e.g., myopia and/or presbyopia)

A10. The ophthalmic lens of any of the A examples, wherein the one or more geometrically defined shapes and/or contour optical elements are configured to create any combination of one or more of positive defocus, negative defocus, focus, and/or redirection of light in a predefined direction (e.g., symmetrically, asymmetrically, aberrated in at least one direction, single focus, and/or multi foci).

A11. The ophthalmic lens of any of the A examples, wherein the modulating function is originating from any combination of one or more mathematical functions, including, for example, a logarithmic function, a sinusoidal function, a conic function, a polynomial function and/or any pre-defined mathematical function.

A12. The ophthalmic lens of any of the A examples, wherein the modulating function is a periodic function and the resulting one or more geometrically defined shapes and/or contour optical elements are periodic relative to one another.

A13. The ophthalmic lens of any of the A examples, wherein the modulating function is originating from a combination (e.g., the product) of a sinusoidal function with a first frequency and a square function with a second frequency.

A14. The ophthalmic lens of any of the A examples, wherein the modulating function is originating from a combination (e.g., the product) of a sinusoidal function with a first frequency and a square function with a second frequency for defining the number of geometrically defined shapes and/or contour optical elements in the predefined region.

A15. The ophthalmic lens of any of the A examples, wherein the one or more parameters to be modulated in the modulation process comprises any combination of one or more of geometrical and/or non-geometrical parameters.

A16. The ophthalmic lens of any of the A examples, wherein the one or more geometrical and/or non-geometrical parameters modulated during the modulation process affect any combination of one or more of an optical power properties in a predefined direction (e.g., sagittal and/or tangential and/or the optical modulation transform function (MTF) and/or a light scattering function); refractive power, prism power; optical axes angle and direction (e.g., lateral separation of an optical axis).

A17. The ophthalmic lens of any of the A examples, wherein the predefined region comprises the entire surface of the lens or a region of the ophthalmic lens.

A18. The ophthalmic lens of any of the A examples, wherein the predefined region comprises a portion of the ophthalmic lens defined by an inner radius and extending to the outer edge of the ophthalmic lens.

A19. The ophthalmic lens of any of the A examples, wherein the predefined region comprises a ring on the surface the ophthalmic lens defined by an inner radius and an outer radius.

A20. The ophthalmic lens of any of the A examples, wherein the predefined region comprises a plurality of concentric rings on the surface of the ophthalmic lens defined by an inner radius and a corresponding outer radius.

A21. The ophthalmic lens of any of the A examples, wherein the predefined modulated region comprises a ring defined by an inner radius and a corresponding outer radius and the predefined modulated region comprises 1, 2, 3, 4, 5, 6, 7, 8, 9, 10, 11, 12, 13, 14, 15, 16, 17, 18, 19, 20, 21, 22, 23, 24, or 25 geometrically defined shapes and/or contour optical elements.

A22. The ophthalmic lens of any of the A examples, wherein the ophthalmic lens comprises at least two predefined modulated regions defined by concentric rings with the same (or different) number of geometrically defined shapes and/or contour optical elements in the at least two (e.g., 2, 3, 4, 5, 6, 7, 8, 9, or 10)concentric rings, wherein the location of the geometrically defined shapes and/or contour optical elements in one ring is in-phase (or out of phase) with the geometrically defined shapes and/or contour optical elements in the other ring.

A23. The ophthalmic lens of any of the A examples, wherein the predefined direction comprises any combination of one or more spatial directions of the ophthalmic lens (e.g., any combination of one or more of a radial, angular, arithmetic spiral, diagonal, and/or sinusoidal direction).

A24. The ophthalmic lens of any of the A examples, wherein the predefined direction comprises any combination of a radial direction, non-radial, angular, and/or non-angular (e.g., linear) direction.

A25. The ophthalmic lens of any of the A examples, wherein the modulating function is continuous in the predefined direction.

A26. The ophthalmic lens of any of the A examples, wherein the modulating function is applied on a mathematical surface geometry that is a definition of an ophthalmic lens surface or portion of an ophthalmic lens surface.

A27. The ophthalmic lens of any of the A examples, wherein the modulating function is selected to define any combination of one or more of a shape, form, power, configuration, quantity, and/or location of the one or more geometrically defined shapes and/or contour optical elements.

A28. The ophthalmic lens of any of the A examples, wherein the one or more geometrically defined shapes and/or contour optical elements are distributed in any combination of one or more of a radial direction, a non-radial direction, an angular direction, a non-angular (e.g., linear) direction, a circumferential direction, a horizontal direction, a vertical direction, a diagonal direction, and/or a spiral direction.

A29. The ophthalmic lens of any of the A examples, wherein the one or more geometrically defined shapes and/or contour optical elements have any combination of power profiles.

A30. The ophthalmic lens of any of the A examples, wherein the one or more geometrically defined shapes and/or contour optical elements are configured to create any combination of one or more of light scattering, diffraction, and/or diffusion and with or without a power profile and/or a light amplitude modulation (e.g., reduced transparency, different refractive index).

A31. The ophthalmic lens of any of the A examples, wherein any one of the one or more geometrically defined shapes and/or contour optical elements are configured to create any combination of one or more of light scattering, diffraction, diffusion.

A32. The ophthalmic lens of any of the A examples, wherein the one or more geometrically defined shapes and/or contour optical elements are configured to be inconspicuous (e.g., not be readily visible) by further modulating certain parameters of the geometrically defined shapes and/or contour optical elements.

A33. The ophthalmic lens of any of the A examples, wherein the ophthalmic lens comprising the one or more geometrically defined shapes and/or contour optical elements is manufactured using CNC machining, free-form manufacturing techniques, three-dimensional printing techniques, and/or lasers (e.g., femtosecond lasers).

A34. The ophthalmic lens of any of the A examples, wherein the ophthalmic lens is one of a spectacle lens, contact lens or intraocular lens.

A35. The ophthalmic lens of any of the A examples, wherein the ophthalmic lens is configured to correct, slow, reduce, and/or control the progression of myopia.

A36. The ophthalmic lens of any of the A examples, wherein the ophthalmic lens is configured to correct or substantially correct for presbyopia.

A37. The ophthalmic lens of any of the A examples, wherein the junctions of one or more geometrically defined shapes and/or contour optical elements are not continuous with the base geometry of the ophthalmic lens.

A38. The ophthalmic lens of any of the A examples, wherein the junctions of one or more geometrically defined shapes and/or contour optical elements are continuous with the base geometry of the ophthalmic lens.

B Examples

B1. A method for forming one or more geometrically defined shapes and/or contour optical elements on a surface of an ophthalmic lens comprising: defining a modulating function to modify one or more parameters of the ophthalmic lens by applying the modulating function on the one or more parameters of the ophthalmic lens in a predefined region of the ophthalmic lens and in a predefined direction (e.g., a ring shape, a spiral shape, and/or a non-annular shape); and forming the one or more geometrically defined shapes and/or contour optical elements in the ophthalmic lens resulting in the change of the curvature of at least one of a front surface of the ophthalmic lens and/or a back surface of the ophthalmic lens.

B2. The method of any of the B examples, wherein the ophthalmic lens comprises a plurality of geometrically defined shapes and/or contour optical elements.

B3. The method of any of the B examples, wherein the one or more geometrically defined shapes and/or contour optical elements comprises a power profile that varies in the predefined direction and/or a direction perpendicular to the predefined direction.

B4. The method of any of the B examples, wherein the one or more geometrically defined shapes and/or contour optical elements comprises a power profile that decreases at the edges in the predefined direction.

B5. The method of any of the B examples, wherein the one or more geometrically defined shapes and/or contour optical elements comprises a power profile that decreases in a direction perpendicular to the predefined direction.

B6. The method of any of the B examples, wherein the size of the geometrically defined shapes and/or contour optical elements increases, decreases, and/or remains the same in a direction extending radially from a center of the ophthalmic lens.

B7. The method of any of the B examples, wherein the modulating function is applied to a parameter on the front and/or back surface of the ophthalmic lens to create one or more depressions on the front and/or back surface of the lens corresponding to the one or more geometrically defined shapes and/or contour optical elements.

B8. The method of any of the B examples, wherein the modulating function is applied to a parameter on the front and/or back surface of the ophthalmic lens to create one or more elevation on the front and/or back surface of the lens corresponding to the one or more geometrically defined shapes and/or contour optical elements.

B9. The method of any of the B examples, wherein the one or more geometrically defined shapes and/or contour optical elements are configured to correct, slow, reduce, and/or control the progression of an optical disorder (e.g., myopia and/or presbyopia)

B10. The method of any of the B examples, wherein the one or more geometrically defined shapes and/or contour optical elements are configured to create any combination of one or more of positive defocus, negative defocus, focus, and/or redirection of light in a predefined direction (e.g., symmetrically, asymmetrically, aberrated in at least one direction, single focus, and/or multi foci).

B11. The method of any of the B examples, wherein the modulation function originates from any combination of one or more mathematical functions, including, for example, a logarithmic function, a sinusoidal function, a conic function, a polynomial function and/or any pre-defined surface pattern.

B12. The method of any of the B examples, wherein the modulating function is a periodic function and the resulting one or more geometrically defined shapes and/or contour optical elements are periodic relative to one another.

B13. The method of any of the B examples, wherein the modulating function is a combination (e.g., the product) of a sinusoidal function with a first frequency and a square function with a second frequency.

B14. The method of any of the B examples, wherein the modulating function originates from a combination (e.g., the product) of a sinusoidal function with a first frequency and a square function with a second frequency for defining the number of geometrically defined shapes and/or contour optical elements in the predefined region.

B15. The method of any of the B examples, wherein the modulated one or more parameters comprises any combination of one or more of geometrical and/or non-geometrical parameters.

B16. The method of any of the B examples, wherein the modulated one or more parameters affects any combination of one or more of an optical power in a predefined direction (e.g., sagittal and/or tangential and/or the optical modulation transform function (MTF) and/or a light scattering function); refractive power; prism power and angle of the geometrically defined shapes and/or contour optical elements geometries; optical axes angle and direction (e.g., lateral separation of an optical axis).

B17. The method of any of the B examples, wherein the predefined region comprises the entire surface of the lens or a region of the ophthalmic lens.

B18. The method of any of the B examples, wherein the predefined region comprises a portion of the ophthalmic lens defined by an inner radius and extending to the outer edge of the ophthalmic lens.

B19. The method of any of the B examples, wherein the predefined region comprises a ring on the surface the ophthalmic lens defined by an inner radius and an outer radius.

B20. The method of any of the B examples, wherein the predefined region comprises a plurality of concentric rings on the surface the ophthalmic lens defined by an inner radius and a corresponding outer radius.

B21. The method of any of the B examples, wherein the predefined region comprises a ring defined by an inner radius and a corresponding outer radius and the predefined region comprises 1, 2, 3, 4, 5, 6, 7, 8, 9, 10, 11, 12, 13, 14, 15, 16, 17, 18, 19, 20, 21, 22, 23, 24, or 25 geometrically defined shapes and/or contour optical elements.

B22. The method of any of the B examples, wherein the ophthalmic lens comprises at least two predefined regions defined by concentric rings with the same (or different) number of geometrically defined shapes and/or contour optical elements in the at least two (e.g., 2, 3, 4, 5, 6, 7, 8, 9, or 10)concentric rings, wherein the location of the geometrically defined shapes and/or contour optical elements in one ring is in-phase (or out of phase) with the geometrically defined shapes and/or contour optical elements in the other ring.

B23. The method of any of the B examples, wherein the predefined direction comprises any combination of one or more spatial directions of the ophthalmic lens (e.g., any combination of one or more of a radial, angular, arithmetic spiral, diagonal, and/or sinusoidal direction).

B24. The method of any of the B examples, wherein the predefined direction comprises any combination of a radial direction, non-radial, angular, and/or non-angular (e.g., linear) direction.

B25. The method of any of the B examples, wherein the modulating function is continuous in the predefined direction.

B26. The method of any of the B examples, wherein the pre-modulated surface geometry is a definition of an ophthalmic lens surface or portion of an ophthalmic lens surface.

B27. The method of any of the B examples, wherein the modulating function is selected to change any combination of one or more of a shape, form, power, configuration, quantity, and/or location of the one or more geometrically defined shapes and/or contour optical elements.

B28. The method of any of the B examples, wherein the one or more geometrically defined shapes and/or contour optical elements are distributed in any combination of one or more of a radial direction, a non-radial direction, an angular direction, a non-angular (e.g., linear) direction, a circumferential direction, a horizontal direction, a vertical direction, a diagonal direction, and/or a spiral direction.

B29. The method of any of the B examples, wherein the one or more geometrically defined shapes and/or contour optical elements have any combination of power profiles.

B30. The method of any of the B examples, wherein the one or more geometrically defined shapes and/or contour optical elements are configured to create any combination of one or more of light scattering, diffraction, and/or diffusion and with or without a power profile and/or a light amplitude modulation (e.g., reduced transparency, different refractive index).

B31. The method of any of the B examples, wherein any one of the one or more geometrically defined shapes and/or contour optical elements are configured to create any combination of one or more of light scattering, diffraction, diffusion.

B32. The method of any of the B examples, wherein the one or more geometrically defined shapes and/or contour optical elements are configured to be inconspicuous (e.g., not be readily visible) by further modulating certain parameters of the geometrically defined shapes and/or contour optical elements.

B33. The method of any of the B examples, wherein the ophthalmic lens comprising the one or more geometrically defined shapes and/or contour optical elements is manufactured using CNC machining, free-form manufacturing techniques, three-dimensional printing techniques, and/or lasers (e.g., femtosecond lasers).

B34. The method of any of the B examples, wherein the ophthalmic lens is one of a spectacle lens, contact lens or intraocular lens.

B35. The method of any of the B examples, wherein the ophthalmic lens is configured to correct, slow, reduce, and/or control the progression of myopia.

B36. The method of any of the B examples, wherein the ophthalmic lens is configured to correct or substantially correct for presbyopia.

B37. The ophthalmic lens of any of the B examples, wherein the junctions of one or more geometrically defined shapes and/or contour optical elements are not continuous with the base geometry of the ophthalmic lens.

B38. The ophthalmic lens of any of the B examples, wherein the junctions of one or more geometrically defined shapes and/or contour optical elements are continuous with the base geometry of the ophthalmic lens.

C Examples

C1. An ophthalmic lens comprising a front surface, a back surface and one or more geometrically defined shapes and/or contour optical elements formed by the intersection of one or more spatial flat planes with at least one of the front surface or back surface of the ophthalmic lens.

C2. The ophthalmic lens of and f the C examples, wherein the ophthalmic lens is configured to correct presbyopia and/or myopia and/or hyperopia and/or stop/slow myopia progression.

75. The ophthalmic lens of any of the C examples, wherein the ophthalmic lens is manufactured using CNC machining, free-form manufacturing techniques, three-dimensional printing techniques, and/or lasers (e.g., femtosecond lasers).

The ophthalmic lens of any of the C examples, wherein the junctions of one or more geometrically defined shapes and/or contour optical elements are not continuous with the base geometry of the ophthalmic lens.

The ophthalmic lens of any of the C examples, wherein the junctions of one or more geometrically defined shapes and/or contour optical elements are continuous with the base geometry of the ophthalmic lens.

D Examples

D1. An ophthalmic lens comprising: a front surface; a back surface; a lens bulk located between the front surface and the back surface; and one or more geometrically defined shapes and/or contour optical elements formed on one or more surfaces of the ophthalmic lens and/or in the lens bulk; wherein the one or more geometrically defined shapes and/or contour elements on the surface of the ophthalmic lens and/or in the lens bulk is/are formed by applying one or more modulating functions to one or more parameters of the ophthalmic lens; wherein the one or more geometrically defined shape and/or contour elements is formed in a pre-defined region (e.g., anywhere on the front and/or back surface of the ophthalmic lens and/or in the bulk of the lens) of the ophthalmic lens and in a predefined direction (e.g., a ring shape, a spiral shape, and/or a non-annular shape).

D2. The ophthalmic lens of any of the D examples, wherein the ophthalmic lens comprises a plurality of geometrically defined shapes and/or contour optical elements.

D3. The ophthalmic lens of any of the D examples, wherein the one or more geometrically defined shapes and/or contour optical elements comprises a power profile that varies in the predefined direction and/or a direction perpendicular to the predefined direction.

D4. The ophthalmic lens of any of the D examples, wherein the one or more geometrically defined shapes and/or contour optical elements comprises a power profile that decreases at the edges in the predefined direction.

D5. The ophthalmic lens of any of the D examples, wherein the one or more geometrically defined shapes and/or contour optical elements comprises a power profile that decreases in a direction perpendicular to the predefined direction.

D6. The ophthalmic lens of any of the D examples, wherein the size of the geometrically defined shapes and/or contour optical elements increases, decreases, and/or remains the same in a direction extending radially from a center of the ophthalmic lens.

D7. The ophthalmic lens of any of the D examples, wherein the modulation of a geometric parameter is applied to the front and/or back surface of the ophthalmic lens to create one or more depressions on the front and/or back surface of the lens corresponding to the one or more geometrically defined shapes and/or contour optical elements.

D8. The ophthalmic lens of any of the D examples, wherein the modulation of a geometric parameter is applied to the front and/or back surface of the ophthalmic lens to create one or more elevation on the front and/or backsurface of the lens corresponding to the one or more geometrically defined shapes and/or contour optical elements.

D9. The ophthalmic lens of any of the D examples, wherein the one or more geometrically defined shapes and/or contour optical elements are configured to correct, slow, reduce, and/or control the progression of an optical disorder (e.g., myopia and/or presbyopia)

D10. The ophthalmic lens of any of the D examples, wherein the one or more geometrically defined shapes and/or contour optical elements are configured to create any combination of one or more of positive defocus, negative defocus, focus, and/or redirection of light in a predefined direction (e.g., symmetrically, asymmetrically, aberrated in at least one direction, single focus, and/or multi foci).

D11. The ophthalmic lens of any of the D examples, wherein the modulating function is originating from any combination of one or more mathematical functions, including, for example, a logarithmic function, a sinusoidal function, a conic function, a polynomial function and/or any pre-defined mathematical function.

D12. The ophthalmic lens of any of the D examples, wherein the modulating function is a periodic function and the resulting one or more geometrically defined shapes and/or contour optical elements are periodic relative to one another.

D13. The ophthalmic lens of any of the D examples, wherein the modulating function is originating from a combination (e.g., the product) of a sinusoidal function with a first frequency and a square function with a second frequency.

D14. The ophthalmic lens of any of the D examples, wherein the modulating function is originating from a combination (e.g., the product) of a sinusoidal function with a first frequency and a square function with a second frequency for defining the number of geometrically defined shapes and/or contour optical elements in the predefined region.

D15. The ophthalmic lens of any of the D examples, wherein the one or more parameters to be modulated in the modulation process comprises any combination of one or more of geometrical and/or non-geometrical parameters.

D16. The ophthalmic lens of any of the D examples, wherein the one or more geometrical and/or non-geometrical parameters modulated during the modulation process affect any combination of one or more of an optical power properties in a predefined direction (e.g., sagittal and/or tangential and/or the optical modulation transform function (MTF) and/or a light scattering function); refractive power, prism power; optical axes angle and direction (e.g., lateral separation of an optical axis).

D17. The ophthalmic lens of any of the D examples, wherein the predefined region comprises the entire surface of the lens or a region of the ophthalmic lens.

D18. The ophthalmic lens of any of the D examples, wherein the predefined region comprises a portion of the ophthalmic lens defined by an inner radius and extending to the outer edge of the ophthalmic lens.

D19. The ophthalmic lens of any of the D examples, wherein the predefined region comprises a ring on the surface the ophthalmic lens and/or in the lens bulk defined by an inner radius and an outer radius.

D20. The ophthalmic lens of any of the D examples, wherein the predefined region comprises a plurality of concentric rings on the surface of the ophthalmic lens and/or in the lens bulk defined by an inner radius and a corresponding outer radius.

D21. The ophthalmic lens of any of the D examples, wherein the predefined modulated region comprises a ring defined by an inner radius and a corresponding outer radius and the predefined modulated region comprises 1, 2, 3, 4, 5, 6, 7, 8, 9, 10, 11, 12, 13, 14, 15, 16, 17, 18, 19, 20, 21, 22, 23, 24, or 25 geometrically defined shapes and/or contour optical elements.

D22. The ophthalmic lens of any of the D examples, wherein the ophthalmic lens comprises at least two pre-defined modulated regions defined by concentric rings with the same (or different) number of geometrically defined shapes and/or contour optical elements in the at least two (e.g., 2, 3, 4, 5, 6, 7, 8, 9, or 10)concentric rings, wherein the location of the geometrically defined shapes and/or contour optical elements in one ring is in-phase (or out of phase) with the geometrically defined shapes and/or contour optical elements in the other ring.

D23. The ophthalmic lens of any of the D examples, wherein the predefined direction comprises any combination of one or more spatial directions of the ophthalmic lens (e.g., any combination of one or more of a radial, angular, arithmetic spiral, diagonal, and/or sinusoidal direction).

D24. The ophthalmic lens of any of the D examples, wherein the predefined direction comprises any combination of a radial direction, non-radial, angular, and/or non-angular (e.g., linear) direction.

D25. The ophthalmic lens of any of the D examples, wherein the modulating function is continuous in the predefined direction.

D26. The ophthalmic lens of any of the D examples, wherein the modulating function is applied on a mathematical surface geometry that is a definition of an ophthalmic lens surface or portion of an ophthalmic lens surface.

D27. The ophthalmic lens of any of the D examples, wherein the modulating function is selected to define any combination of one or more of a shape, form, power, configuration, quantity, and/or location of the one or more geometrically defined shapes and/or contour optical elements.

D28. The ophthalmic lens of any of the D examples, wherein the one or more geometrically defined shapes and/or contour optical elements are distributed in any combination of one or more of a radial direction, a non-radial direction, an angular direction, a non-angular (e.g., linear) direction, a circumferential direction, a horizontal direction, a vertical direction, a diagonal direction, and/or a spiral direction.

D29. The ophthalmic lens of any of the D examples, wherein the one or more geometrically defined shapes and/or contour optical elements have any combination of power profiles.

D30. The ophthalmic lens of any of the D examples, wherein the one or more geometrically defined shapes and/or contour optical elements are configured to create any combination of one or more of light scattering, diffraction, and/or diffusion and with or without a power profile and/or a light amplitude modulation (e.g., reduced transparency, different refractive index).

D31. The ophthalmic lens of any of the D examples, wherein any one of the one or more geometrically defined shapes and/or contour optical elements are configured to create any combination of one or more of light scattering, diffraction, diffusion.

D32. The ophthalmic lens of any of the D examples, wherein the one or more geometrically defined shapes and/or contour optical elements are configured to be inconspicuous (e.g., not be readily visible) by further modulating certain parameters of the geometrically defined shapes and/or contour optical elements.

D33. The ophthalmic lens of any of the D examples, wherein the ophthalmic lens comprising the one or more geometrically defined shapes and/or contour optical elements is manufactured using CNC machining, free-form manufacturing techniques, three-dimensional printing techniques, and/or lasers (e.g., femtosecond lasers).

D34. The ophthalmic lens of any of the D examples, wherein the ophthalmic lens is one of a spectacle lens, contact lens or intraocular lens.

D35. The ophthalmic lens of any of the D examples, wherein the ophthalmic lens is configured to correct, slow, reduce, and/or control the progression of myopia.

D36. The ophthalmic lens of any of the D examples, wherein the ophthalmic lens is configured to correct or substantially correct for presbyopia.

D37. The ophthalmic lens of any of the D examples, wherein the junctions of one or more geometrically defined shapes and/or contour optical elements are not continuous with the base geometry of the ophthalmic lens.

D38. The ophthalmic lens of any of the D examples, wherein the junctions of one or more geometrically defined shapes and/or contour optical elements are continuous with the base geometry of the ophthalmic lens.

It will be understood that the embodiments disclosed and defined in this specification extends to all alternative combinations of two or more of the individual features mentioned or evident from the text or drawings. All of these different combinations constitute various alternative aspects of the present disclosure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:
1. An ophthalmic lens comprising:
 a base lens comprising:
  a front surface;
  a back surface; and
  a power profile for correcting refractive error; and
 one or more geometrically defined shapes and/or contour optical elements formed on one or more surfaces of the ophthalmic lens;
 wherein the one or more geometrically defined shapes and/or contour optical elements on the one or more surfaces of the ophthalmic lens is/are formed by applying one or more modulating functions to one or more parameters of the ophthalmic lens;
 wherein the one or more geometrically defined shapes and/or contour optical elements is formed in one or more predefined regions of the ophthalmic lens and in a predefined direction and the ophthalmic lens comprises at least one other region with an unmodulated base surface forming the base power profile; and
 and the ophthalmic lens comprises at least one other region with an unmodulated base surface forming the base power profile.

2. The ophthalmic lens of claim 1, wherein the ophthalmic lens comprises a plurality of geometrically defined shapes and/or contour optical elements in at least one of the one or more predefined regions.

3. The ophthalmic lens of claim 1, wherein the one or more geometrically defined shapes and/or contour optical elements comprises a power profile that varies in the predefined direction and/or a direction perpendicular to the predefined direction.

4. The ophthalmic lens of claim 1, wherein the one or more geometrically defined shapes and/or contour optical elements comprises a power profile that is relatively less positive in power in the predefined direction at the edges than a central portion of the one or more geometrically defined shapes and/or contour optical elements.

5. The ophthalmic lens of claim 1, wherein the one or more geometrically defined shapes and/or contour optical elements comprises a power profile that decreases in a direction perpendicular to the predefined direction.

6. The ophthalmic lens of claim 1, wherein the size of the geometrically defined shapes and/or contour optical elements increases, decreases, and/or remains the same in a direction extending radially from a center of the ophthalmic lens.

7. The ophthalmic lens of claim 1, wherein the one or more modulating functions are applied to one or more modulating functions are the front and/or back surface of the ophthalmic lens to create one or more depressions on the front and/or back surface of the lens corresponding to the one or more geometrically defined shapes and/or contour optical elements.

8. The ophthalmic lens of claim 1, wherein the one or more modulating functions are applied to one or more modulating functions are the front and/or back surface of the ophthalmic lens to create one or more elevations on the front and/or back surface of the lens corresponding to the one or more geometrically defined shapes and/or contour optical elements.

9. The ophthalmic lens of claim 1, wherein the one or more geometrically defined shapes and/or contour optical elements are configured to correct, slow, reduce, and/or control the progression of an optical disorder.

10. The ophthalmic lens of claim 1, wherein the modulating function is any combination of one or more functions including a logarithmic function, a sinusoidal function, a conic function, a polynomial function and/or any pre-defined surface pattern.

11. The ophthalmic lens of claim 1, wherein the modulating function is a periodic function and the resulting one or more geometrically defined shapes and/or contour optical elements are periodic relative to one another.

12. The ophthalmic lens of claim 1, wherein the modulating function is a combination of a sinusoidal function with a first frequency and a square function with a second frequency.

13. The ophthalmic lens of claim 1, wherein the modulating function is a combination of a sinusoidal function with a first frequency and a square function with a second frequency for defining the number of geometrically defined shapes and/or contour optical elements in the one or more predefined regions.

14. The ophthalmic lens of claim 1, wherein the one or more parameters comprises any combination of one or more of geometrical and/or non-geometrical parameters.

15. The ophthalmic lens of claim 1, wherein the one or more parameters includes any combination of one or more of an optical power in a predefined direction; the radius of curvature; radial and/or axial thickness; center coordinates of the geometrically defined shapes and/or contour optical elements geometries; optical axes angle and direction; and/or refractive index.

16. The ophthalmic lens of claim 1, wherein the one or more predefined regions comprises the entire surface of the lens or a region of the ophthalmic lens.

17. The ophthalmic lens of claim 1, wherein the one or more predefined regions comprises a portion of the ophthalmic lens defined by an inner radius and extending to the outer edge of the ophthalmic lens.

18. The ophthalmic lens of claim 1, wherein the one or more predefined regions comprises a ring on the surface the ophthalmic lens defined by an inner radius and an outer radius.

19. The ophthalmic lens of claim 1, wherein the one or more predefined regions comprises a plurality of concentric rings on the surface the ophthalmic lens defined by an inner radius and a corresponding outer radius.

20. The ophthalmic lens of claim 1, wherein the one or more predefined regions comprises a ring defined by an inner radius and a corresponding outer radius and the predefined region comprises 1, 2, 3, 4, 5, 6, 7, 8, 9, 10, 11, 12, 13, 14, 15, 16, 17, 18, 19, 20, 21, 22, 23, 24, or 25 geometrically defined shapes and/or contour optical elements.

21. The ophthalmic lens of claim 1, wherein the ophthalmic lens comprises at least two predefined regions defined by concentric rings with the same (or different) number of geometrically defined shapes and/or contour optical elements in the at least two concentric rings, wherein the location of the geometrically defined shapes and/or contour optical elements in one ring is in-phase (or out of phase) with the geometrically defined shapes and/or contour optical elements in the other ring.

22. The ophthalmic lens of claim 1, wherein the predefined direction comprises any combination of one or more spatial directions of the ophthalmic lens.

23. The ophthalmic lens of claim 1, wherein the predefined direction comprises any combination of a radial direction, non-radial, angular, and/or non-angular direction.

24. The ophthalmic lens of claim 1, wherein the modulating function is continuous in the predefined direction.

25. The ophthalmic lens of claim 1, wherein the modulating function is a definition of an ophthalmic lens surface or portion of an ophthalmic lens surface.

26. The ophthalmic lens of claim 1, wherein the modulating function is selected to define any combination of one or more of a shape, form, power, configuration, quantity, and/or location of the one or more geometrically defined shapes and/or contour optical elements.

27. The ophthalmic lens of claim 1, wherein the one or more geometrically defined shapes and/or contour optical elements are distributed in any combination of one or more of a radial direction, a non-radial direction, an angular direction, a non-angular direction, a circumferential direction, a horizontal direction, a vertical direction, a diagonal direction, and/or a spiral direction.

28. The ophthalmic lens of claim 1, wherein the one or more geometrically defined shapes and/or contour optical elements have any combination of power profiles.

29. A method for forming one or more geometrically defined shapes and/or contour optical elements on a surface of an ophthalmic lens comprising a base lens comprising: a front surface, a back surface and a base power profile for correcting refractive error, the method comprising:
    defining a function to modify one or more parameters of the ophthalmic lens in one or more predefined regions of the ophthalmic lens and in a predefined direction; and
    forming the one or more geometrically defined shapes and/or contour optical elements by applying the function to the surface of the ophthalmic lens to change the curvature of at least one of the front surface of the ophthalmic lens and/or the back surface of the ophthalmic lens, wherein and the ophthalmic lens comprises at least one other region with an unmodulated base surface forming the base power profile and the one or more geometrically defined shapes and/or contour optical elements are configured to create a combination of positive defocus and negative defocus.

\* \* \* \* \*